United States Patent
Zhang et al.

(10) Patent No.: US 12,540,323 B2
(45) Date of Patent: *Feb. 3, 2026

(54) NUCLEIC ACID, PHARMACEUTICAL COMPOSITION, CONJUGATE, PREPARATION METHOD, AND USE

(71) Applicant: SUZHOU RIBO LIFE SCIENCE CO., LTD., Jiangsu (CN)

(72) Inventors: Hongyan Zhang, Jiangsu (CN); Shan Gao, Jiangsu (CN); Daiwu Kang, Jiangsu (CN); Baolei Tian, Jiangsu (CN)

(73) Assignee: SUZHOU RIBO LIFE SCIENCE CO., LTD., Jiangsu (CN)

( * ) Notice: Subject to any disclaimer, the term of this patent is extended or adjusted under 35 U.S.C. 154(b) by 1080 days.

This patent is subject to a terminal disclaimer.

(21) Appl. No.: 17/595,584

(22) PCT Filed: May 21, 2020

(86) PCT No.: PCT/CN2020/091489
§ 371 (c)(1),
(2) Date: Nov. 19, 2021

(87) PCT Pub. No.: WO2020/233655
PCT Pub. Date: Nov. 26, 2020

(65) Prior Publication Data
US 2023/0313195 A1    Oct. 5, 2023

(30) Foreign Application Priority Data

May 22, 2019  (CN) .......................... 201910431319.2
May 23, 2019  (CN) .......................... 201910433243.7

(51) Int. Cl.
*C12N 15/113* (2010.01)
*A61P 1/16* (2006.01)
*A61P 43/00* (2006.01)

(52) U.S. Cl.
CPC .......... *C12N 15/1137* (2013.01); *A61P 43/00* (2018.01); *C12N 2310/11* (2013.01); *C12N 2310/315* (2013.01)

(58) Field of Classification Search
CPC ............ C12N 15/1137; C12N 2310/11; C12N 2310/315; C12N 2310/14; C12N 2310/351; C12N 2320/30; C12N 15/113; C12N 2310/322; C12N 2310/3525; A61P 43/00; A61P 1/16; A61P 3/06; A61P 9/10; A61P 9/12; C12Y 304/21061; A61K 31/713; A61K 47/549; C07H 21/00
See application file for complete search history.

(56) References Cited

U.S. PATENT DOCUMENTS

| | | |
|---|---|---|
| 8,030,474 B2 | 10/2011 | Khvorova et al. |
| 8,106,022 B2 | 1/2012 | Manoharan et al. |
| 8,334,372 B2 | 12/2012 | Freier et al. |
| 8,344,125 B2 | 1/2013 | Manoharan et al. |
| 9,428,751 B2 | 8/2016 | Macdonald et al. |
| 9,670,492 B2 | 6/2017 | Freier et al. |
| 10,130,651 B2 | 11/2018 | Wooddell et al. |
| 10,246,708 B2 | 4/2019 | Kasperkovitz et al. |
| 10,294,477 B2 | 5/2019 | Swayze |
| 10,370,453 B2 | 8/2019 | Sexton et al. |
| 10,934,544 B2 | 3/2021 | Akinc et al. |
| 11,084,884 B2 | 8/2021 | Sexton et al. |
| 11,414,661 B2 | 8/2022 | Zhang et al. |
| 11,414,665 B2 | 8/2022 | Zhang et al. |
| 11,492,620 B2 | 11/2022 | Zhang et al. |
| 11,633,482 B2 * | 4/2023 | Zhang ................ C12N 15/1131 514/25 |
| 11,918,600 B2 | 3/2024 | Zhang et al. |
| 2003/0206887 A1 | 11/2003 | Morrissey et al. |

(Continued)

FOREIGN PATENT DOCUMENTS

| | | |
|---|---|---|
| AU | 2014208251 A1 | 8/2014 |
| CA | 2930393 A1 | 6/2009 |

(Continued)

OTHER PUBLICATIONS

The First Office Action issued on Jan. 30, 2022, by the State Intellectual Property Office of the People's Republic of China in Chinese Patent Application No. 201880049520.8 and an English translation of the Action. (11 pages).

(Continued)

*Primary Examiner* — Abigail Vanhorn
(74) *Attorney, Agent, or Firm* — Panitch Schwarze Belisario & Nadel LLP

(57) ABSTRACT

An siRNA which inhibits proprotein convertase subtilisin/kexin type 9 (PCSK9) gene expression, a pharmaceutical composition containing the siRNA, and a conjugate. Each nucleotide in the siRNA is independently a modified or unmodified nucleotide. The siRNA contains a sense strand and an antisense strand. The sense strand contains nucleotide sequence I; nucleotide sequence I having the same length as the nucleotide sequence shown in SEQ ID NO: 1, with no more than three nucleotides differences. The antisense strand contains nucleotide sequence II, nucleotide sequence II having the same length as the nucleotide sequence shown in SEQ ID NO: 2, with no more than three nucleotides differences. The siRNA, pharmaceutical composition thereof and the conjugate can effectively treat and/or prevent hypercholesterolemia.

19 Claims, 5 Drawing Sheets
Specification includes a Sequence Listing.

(56) References Cited

U.S. PATENT DOCUMENTS

| | | |
|---|---|---|
| 2004/0266707 A1 | 12/2004 | Leake et al. |
| 2005/0245475 A1 | 11/2005 | Khvorova et al. |
| 2005/0246794 A1 | 11/2005 | Khvorova et al. |
| 2005/0255487 A1 | 11/2005 | Khvorova et al. |
| 2008/0113351 A1 | 5/2008 | Naito et al. |
| 2008/0146788 A1 | 6/2008 | Bhat et al. |
| 2010/0063132 A1 | 3/2010 | Kim et al. |
| 2010/0137414 A1 | 6/2010 | Freier et al. |
| 2011/0015252 A1 | 1/2011 | Fitzgerald et al. |
| 2011/0039914 A1 | 2/2011 | Pavco et al. |
| 2011/0054005 A1 | 3/2011 | Naito et al. |
| 2012/0052487 A9 | 3/2012 | Khvorova et al. |
| 2012/0108803 A1 | 5/2012 | Han et al. |
| 2012/0172412 A1 | 7/2012 | Rozema et al. |
| 2012/0184595 A1 | 7/2012 | Macdonald et al. |
| 2012/0201756 A1 | 8/2012 | Sexton |
| 2012/0227119 A1 | 9/2012 | Doran et al. |
| 2013/0005793 A1 | 1/2013 | Chin et al. |
| 2013/0023579 A1 | 1/2013 | Crooke et al. |
| 2013/0041133 A1 | 2/2013 | Aaronson et al. |
| 2013/0096288 A1 | 4/2013 | Han et al. |
| 2013/0123482 A1 | 5/2013 | Xi et al. |
| 2013/0158021 A1 | 6/2013 | Dong et al. |
| 2013/0190484 A1 | 7/2013 | Rozema et al. |
| 2014/0099666 A1 | 4/2014 | Rossomando et al. |
| 2014/0128453 A1 | 5/2014 | Mullick et al. |
| 2014/0179768 A1 | 6/2014 | Bettencourt et al. |
| 2014/0194489 A1 | 7/2014 | Bumcrot et al. |
| 2014/0343123 A1 | 11/2014 | Prakash et al. |
| 2015/0093444 A1 | 4/2015 | Zhang et al. |
| 2015/0152436 A1 | 6/2015 | Musunuru et al. |
| 2015/0174260 A1 | 6/2015 | Yang et al. |
| 2015/0191726 A1 | 7/2015 | Manoharan et al. |
| 2015/0247143 A1 | 9/2015 | Fitzgerald et al. |
| 2015/0263948 A1 | 9/2015 | Jan et al. |
| 2015/0291958 A1 | 10/2015 | Albaek et al. |
| 2015/0315584 A1 | 11/2015 | Macdonald et al. |
| 2015/0315594 A1 | 11/2015 | Prakash et al. |
| 2016/0017335 A1 | 1/2016 | Borodovsky et al. |
| 2016/0186180 A1 | 6/2016 | Bettencourt et al. |
| 2016/0237438 A1 | 8/2016 | Brown et al. |
| 2016/0283653 A1 | 9/2016 | Staudt et al. |
| 2016/0354404 A1 | 12/2016 | Hinkle et al. |
| 2017/0000815 A1 | 1/2017 | Fitzgerald et al. |
| 2017/0002094 A1 | 1/2017 | Sexton et al. |
| 2017/0114341 A1 | 4/2017 | Bradshaw et al. |
| 2018/0087054 A1 | 3/2018 | Querbes et al. |
| 2018/0148722 A1 | 5/2018 | Fitzgerald et al. |
| 2018/0216114 A1 | 8/2018 | Fitzgerald et al. |
| 2018/0245077 A1 | 8/2018 | Chiu et al. |
| 2019/0062749 A1 | 2/2019 | Zhang |
| 2019/0078088 A1 | 3/2019 | Li et al. |
| 2019/0202855 A1 | 7/2019 | Sakamuri et al. |
| 2019/0255091 A1 | 8/2019 | Li et al. |
| 2019/0292547 A1 | 9/2019 | Li et al. |
| 2020/0199591 A1 | 6/2020 | Fitzgerald et al. |
| 2020/0338201 A1 | 10/2020 | Zhang et al. |
| 2020/0360522 A1 | 11/2020 | Zhang et al. |
| 2021/0032623 A1 | 2/2021 | Zhang et al. |
| 2021/0275564 A1 | 9/2021 | Zhang et al. |
| 2021/0277400 A1 | 9/2021 | Zhang et al. |
| 2021/0401994 A1 | 12/2021 | Zhang et al. |
| 2022/0049249 A1 | 2/2022 | Zhang et al. |
| 2022/0062427 A1 | 3/2022 | Zhang et al. |
| 2022/0186221 A1 | 6/2022 | Zhang et al. |
| 2022/0235359 A1 | 7/2022 | Zhang et al. |
| 2022/0315929 A1 | 10/2022 | Zhang et al. |
| 2022/0356474 A1 | 11/2022 | Zhang et al. |
| 2022/0389428 A1 | 12/2022 | Zhang et al. |
| 2022/0395526 A1 | 12/2022 | Zhang et al. |
| 2023/0076803 A1 | 3/2023 | Zhang et al. |
| 2023/0132756 A1 | 5/2023 | Zhang et al. |
| 2023/0193277 A1 | 6/2023 | Zhang et al. |
| 2023/0257827 A1 | 8/2023 | Zhang et al. |
| 2023/0313195 A1 | 10/2023 | Zhang et al. |
| 2024/0200060 A1 | 6/2024 | Zhang et al. |
| 2024/0200076 A1 | 6/2024 | Zhang et al. |
| 2025/0057870 A1 | 2/2025 | Liang et al. |

FOREIGN PATENT DOCUMENTS

| | | |
|---|---|---|
| CA | 2 677 068 A1 | 3/2011 |
| CN | 101603042 A | 12/2009 |
| CN | 102006890 A | 4/2011 |
| CN | 102016036 A | 4/2011 |
| CN | 102124107 A | 7/2011 |
| CN | 102140458 A | 8/2011 |
| CN | 102140459 A | 8/2011 |
| CN | 102140460 A | 8/2011 |
| CN | 102140461 A | 8/2011 |
| CN | 102344477 A | 2/2012 |
| CN | 102439148 A | 5/2012 |
| CN | 102719434 A | 10/2012 |
| CN | 102753186 A | 10/2012 |
| CN | 102869774 A | 1/2013 |
| CN | 103380113 A | 10/2013 |
| CN | 102083983 B | 4/2014 |
| CN | 103890000 A | 6/2014 |
| CN | 104107437 A | 10/2014 |
| CN | 104232644 A | 12/2014 |
| CN | 104328121 A | 2/2015 |
| CN | 104717982 A | 6/2015 |
| CN | 104854242 A | 8/2015 |
| CN | 104922141 A | 9/2015 |
| CN | 105324485 A | 2/2016 |
| CN | 105378082 A | 3/2016 |
| CN | 105392488 A | 3/2016 |
| CN | 105452465 A | 3/2016 |
| CN | 105517556 A | 4/2016 |
| CN | 105713092 A | 6/2016 |
| CN | 105814204 A | 7/2016 |
| CN | 106132442 A | 11/2016 |
| CN | 106146591 A | 11/2016 |
| CN | 106232831 A | 12/2016 |
| CN | 106255755 A | 12/2016 |
| CN | 106460025 A | 2/2017 |
| CN | 107075516 A | 8/2017 |
| CN | 107109405 A | 8/2017 |
| CN | 107250362 A | 10/2017 |
| CN | 107854478 A | 3/2018 |
| CN | 108271386 A | 3/2018 |
| CN | 108064294 A | 5/2018 |
| CN | 108064313 A | 5/2018 |
| CN | 108220293 A | 6/2018 |
| CN | 108239644 A | 7/2018 |
| CN | 108265052 A | 7/2018 |
| CN | 108348541 A | 7/2018 |
| CN | 110945131 A | 3/2020 |
| CN | 110959011 A | 4/2020 |
| CN | 111050807 A | 4/2020 |
| CN | 111973617 A | 11/2020 |
| CN | 111973618 A | 11/2020 |
| CN | 111973619 A | 11/2020 |
| CN | 111979237 A | 11/2020 |
| CN | 112423795 A | 2/2021 |
| CN | 113330117 A | 8/2021 |
| EP | 1 752 536 A1 | 2/2007 |
| EP | 2 194 128 A1 | 6/2010 |
| EP | 2 213 738 A2 | 8/2010 |
| EP | 2 376 641 | 10/2011 |
| EP | 2 669 377 A2 | 12/2013 |
| EP | 2 990 410 A1 | 3/2016 |
| EP | 3 312 281 A2 | 4/2018 |
| EP | 3 315 608 A1 | 5/2018 |
| EP | 3 335 715 A2 | 6/2018 |
| EP | 3409780 A1 | 12/2018 |
| EP | 3 719 128 A1 | 10/2020 |
| EP | 3 862 024 A1 | 8/2021 |
| JP | 2013523149 A | 6/2013 |
| JP | 2013537423 A | 10/2013 |
| JP | 2016501195 A | 1/2016 |
| JP | 2016523087 A | 8/2016 |
| JP | 2017521045 A | 8/2017 |
| JP | 2017534290 A | 11/2017 |

(56) References Cited

FOREIGN PATENT DOCUMENTS

| | | |
|---|---|---|
| RU | 2013 134 745 A | 2/2015 |
| RU | 2 558 258 C2 | 7/2015 |
| RU | 2015 133 167 A | 3/2017 |
| TW | 201925471 A | 7/2019 |
| TW | 201929905 A | 8/2019 |
| WO | 00/27795 A1 | 5/2000 |
| WO | 2004/045543 A2 | 6/2004 |
| WO | 2004/078181 A1 | 9/2004 |
| WO | 2005/116204 A1 | 12/2005 |
| WO | 2006/006948 A2 | 1/2006 |
| WO | 2006/096018 A1 | 9/2006 |
| WO | 2007/134161 A2 | 11/2007 |
| WO | 2008/011431 A2 | 1/2008 |
| WO | 2008/109472 A2 | 9/2008 |
| WO | 2009/073809 A2 | 6/2009 |
| WO | 2009/082607 A2 | 7/2009 |
| WO | 2009/134487 A2 | 11/2009 |
| WO | 2010/012244 A1 | 2/2010 |
| WO | 2010/045509 A2 | 4/2010 |
| WO | 2010/068978 A1 | 6/2010 |
| WO | 2010/083615 A1 | 7/2010 |
| WO | 2010/101951 A1 | 9/2010 |
| WO | 2010/121074 A1 | 10/2010 |
| WO | 2010/131916 A2 | 11/2010 |
| WO | 2010/147992 A1 | 12/2010 |
| WO | 2011005793 A1 | 1/2011 |
| WO | 2011/028938 A1 | 3/2011 |
| WO | WO-2011038031 A1 * | 3/2011 .......... A61K 31/713 |
| WO | 2011/085271 A2 | 7/2011 |
| WO | 2011/104169 A1 | 9/2011 |
| WO | 2011126974 A1 | 10/2011 |
| WO | 2011/139702 A2 | 11/2011 |
| WO | 2011/154331 A1 | 12/2011 |
| WO | 2012/013127 A1 | 2/2012 |
| WO | 2012/024170 A2 | 2/2012 |
| WO | 2012/037254 A1 | 3/2012 |
| WO | 2012/068176 A1 | 5/2012 |
| WO | 2012/083185 A2 | 6/2012 |
| WO | 2012/089352 A1 | 7/2012 |
| WO | 2012/130086 A1 | 10/2012 |
| WO | 2012/139081 A2 | 10/2012 |
| WO | 2012/139469 A1 | 10/2012 |
| WO | 2012/177784 A2 | 12/2012 |
| WO | 2013/060261 A1 | 5/2013 |
| WO | 2013/070771 A1 | 5/2013 |
| WO | 2013061295 A1 | 5/2013 |
| WO | 2013/166155 A1 | 11/2013 |
| WO | 2014/025805 A1 | 2/2014 |
| WO | 2014076195 A1 | 5/2014 |
| WO | 2014/089313 A1 | 6/2014 |
| WO | 2014/118267 A2 | 11/2014 |
| WO | 2014/179626 A2 | 11/2014 |
| WO | 2014/179627 A2 | 11/2014 |
| WO | 2014/179629 A2 | 11/2014 |
| WO | 2014205451 A1 | 12/2014 |
| WO | 2015/006498 A2 | 1/2015 |
| WO | 2015/006740 A2 | 1/2015 |
| WO | 2015/015496 A1 | 2/2015 |
| WO | 2015/031679 A2 | 3/2015 |
| WO | 2015/051366 A2 | 4/2015 |
| WO | 2015/100394 A1 | 7/2015 |
| WO | 2015/113922 A1 | 8/2015 |
| WO | 2015/148580 A2 | 10/2015 |
| WO | 2015/168532 A2 | 11/2015 |
| WO | 2015168589 A1 | 11/2015 |
| WO | 2015/188197 A2 | 12/2015 |
| WO | 2016/077321 A2 | 12/2015 |
| WO | 2015188194 A1 | 12/2015 |
| WO | 2015/011123 A1 | 1/2016 |
| WO | 2016/028649 A1 | 2/2016 |
| WO | 2016/040589 A1 | 3/2016 |
| WO | 2016/081444 A1 | 5/2016 |
| WO | 2016077349 A1 | 5/2016 |
| WO | 2016/099982 A2 | 6/2016 |
| WO | 2016/149331 A2 | 9/2016 |
| WO | 2016/154127 A2 | 9/2016 |
| WO | 2016/168286 A1 | 10/2016 |
| WO | 2016/179342 A2 | 11/2016 |
| WO | 2016/188473 A1 | 12/2016 |
| WO | 2016/201301 A1 | 12/2016 |
| WO | 2016/206626 A1 | 12/2016 |
| WO | 2017/015175 A1 | 1/2017 |
| WO | 2017/019660 A1 | 2/2017 |
| WO | 2017/019891 A2 | 2/2017 |
| WO | 2017/035340 A1 | 3/2017 |
| WO | 2017/055627 A1 | 4/2017 |
| WO | 2017/100542 A1 | 6/2017 |
| WO | 2017/120397 A1 | 7/2017 |
| WO | 2017131236 A1 | 8/2017 |
| WO | 2017/184689 A1 | 10/2017 |
| WO | 2017/189813 A1 | 11/2017 |
| WO | 2018/027106 A2 | 2/2018 |
| WO | 2018/035380 A1 | 2/2018 |
| WO | 2018/044350 A1 | 3/2018 |
| WO | 2018/075658 A1 | 4/2018 |
| WO | 2018/140920 A1 | 8/2018 |
| WO | 2018/191278 A2 | 10/2018 |
| WO | 2018/209848 A1 | 11/2018 |
| WO | 2018/223073 A1 | 12/2018 |
| WO | 2019/105403 A1 | 6/2019 |
| WO | 2019/105404 A1 | 6/2019 |
| WO | 2019/105418 A1 | 6/2019 |
| WO | 2019/105419 A1 | 6/2019 |
| WO | 2019/105435 A1 | 6/2019 |
| WO | 2019/105437 A1 | 6/2019 |
| WO | WO-2019105414 A1 * | 6/2019 .......... A61K 31/713 |
| WO | 2019/128611 A1 | 7/2019 |
| WO | 2020038377 A1 | 2/2020 |
| WO | 2020/063198 A1 | 4/2020 |
| WO | 2020/093053 A1 | 5/2020 |
| WO | 2020/135581 A1 | 7/2020 |
| WO | 2020/147847 A1 | 7/2020 |
| WO | 2020233651 A1 | 11/2020 |
| WO | 2020233655 A1 | 11/2020 |
| WO | 2020233680 A1 | 11/2020 |
| WO | 2020238763 A1 | 12/2020 |
| WO | 2020238766 A1 | 12/2020 |

OTHER PUBLICATIONS

Decision of Rejection issued on Mar. 3, 2022, by the State Intellectual Property Office of the People's Republic of China in Chinese Patent Application No. 202010426194.7 and an English translation of the Action. (20 pages).

The Second Office Action issued on Mar. 16, 2022, by the State Intellectual Property Office of the People's Republic of China in Chinese Patent Application No. 201980046892.X and an English translation of the Action. (24 pages).

The Second Office Action issued on Mar. 21, 2022, by the State Intellectual Property Office of the People's Republic of China in Chinese Patent Application No. 201980046893.4 and an English translation of the Action. (19 pages).

The First Office Action issued on May 7, 2022, by the State Intellectual Property Office of the People's Republic of China in Chinese Patent Application No. 201980010095.6 and an English translation of the Action. (27 pages).

The First Office Action issued on May 7, 2022, by the State Intellectual Property Office of the People's Republic of China in Chinese Patent Application No. 201980010175.1 and an English translation of the Action. (30 pages).

The First Office Action issued on May 7, 2022, by the State Intellectual Property Office of the People's Republic of China in Chinese Patent Application No. 201880049190.2 and an English translation of the Action. (31 pages).

The First Office Action issued on May 7, 2022, by the State Intellectual Property Office of the People's Republic of China in Chinese Patent Application No. 201880049191.7 and an English translation of the Action. (30 pages).

The First Office Action issued on May 7, 2022, by the State Intellectual Property Office of the People's Republic of China in

(56) References Cited

OTHER PUBLICATIONS

Chinese Patent Application No. 202080007282.1 and an English translation of the Action. (33 pages).
The First Office Action issued on May 7, 2022, by the State Intellectual Property Office of the People's Republic of China in Chinese Patent Application No. 201880049564.0 and an English translation of the Action. (29 pages).
The First Office Action issued on May 7, 2022, by the State Intellectual Property Office of the People's Republic of China in Chinese Patent Application No. 201880049586.7 and an English translation of the Action. (33 pages).
The First Office Action issued on May 7, 2022, by the State Intellectual Property Office of the People's Republic of China in Chinese Patent Application No. 201880048597.3 and an English translation of the Action. (34 pages).
The First Office Action issued on May 7, 2022, by the State Intellectual Property Office of the People's Republic of China in Chinese Patent Application No. 201880048600.1 and an English translation of the Action. (34 pages).
The First Office Action issued on May 7, 2022, by the State Intellectual Property Office of the People's Republic of China in Chinese Patent Application No. 202080009787.1 and an English translation of the Action. (50 pages).
The First Office Action issued on May 7, 2022, by the State Intellectual Property Office of the People's Republic of China in Chinese Patent Application No. 201880048949.5 and an English translation of the Action. (33 pages).
The First Office Action issued on May 20, 2021, by the State Intellectual Property Office of the People's Republic of China in Chinese Patent Application No. 202010426194.7 and an English translation of the Action. (20 pages).
The First Office Action issued on Jun. 23, 2021, by the State Intellectual Property Office of the People's Republic of China in Chinese Patent Application No. 201980046892.X and an English translation of the Action. (13 pages).
The First Office Action issued on Jun. 23, 2021, by the State Intellectual Property Office of the People's Republic of China in Chinese Patent Application No. 201980046893.4 and an English translation of the Action. (12 pages).
The First Office Action issued on Jun. 29, 2022, by the State Intellectual Property Office of the People's Republic of China in Chinese Patent Application No. 201980046892.X and an English translation of the Action. (8 pages).
The First Office Action issued on Jun. 29, 2022, by the State Intellectual Property Office of the People's Republic of China in Chinese Patent Application No. 201980046893.4 and an English translation of the Action. (8 pages).
The First Office Action issued on Oct. 25, 2021, by the State Intellectual Property Office of the People's Republic of China in Chinese Patent Application No. 202010426196.6 and an English translation of the Action. (16 pages).
The Second Office Action issued on Nov. 12, 2021, by the State Intellectual Property Office of the People's Republic of China in Chinese Patent Application No. 202010426194.7 and an English translation of the Action. (16 pages).
The Extended European Search Report issued on Jun. 9, 2022, by the European Patent Office in European Patent Application Publication No. 19851738.5. (64 pages).
The Extended European Search Report issued on Jul. 19, 2022, by the European Patent Office in European Patent Application No. 19867686.8. (12 pages).
The Extended European Search Report and Supplementary European Search Report issued on Aug. 9, 2021, by the European Patent Office in European Patent Application Publication No. 18883362.8. (9 pages).
The Extended European Search Report issued on Sep. 16, 2021, by the European Patent Office in European Patent Application No. 18883803.1. (10 pages).
Extended European Search Report dated Sep. 17, 2021, issued by the European Patent Office in corresponding European Application No. 18883982.3. (9 pages).
Extended European Search Report dated Sep. 29, 2021, issued by the European Patent Office in corresponding European Application No. 18884492.2. (45 pages).
The Extended European Search Report issued on Oct. 7, 2021, by the European Patent Office in European Patent Application Publication No. 18896766.5. (19 pages).
Invitation to remedy deficiencies pursuant to Rule 30(3) EPC / Rule 163(3) EPC issued on Feb. 22, 2022, by the European Patent Office in European Patent Application No. 20809029.0. (2 pages).
Communication pursuant to Rule 159 and Rule 58 EPC Invitation to remedy deficiencies in the application documents issued on Jan. 24, 2022, by the European Patent Office in European Patent Application No. 20815633.1 (2 pages).
Supplementary European Search Report issued on Jul. 27, 2021, by the European Patent Office in European Patent Application No. 18883153. (7 pages).
Notification of Substantive Examination Result issued on Aug. 24, 2021, by the Intellectual Property Office of the Republic of Indonesia in Indonesian Patent Application No. P00202003131 and an English translation of the Notification. (6 pages).
Notification of Substantive Examination Result issued on Dec. 2, 2021, by the Intellectual Property Office of the Republic of Indonesia in Indonesian Patent Application No. P00202003125 and an English translation of the Notification. (6 pages).
Examination report under sections 12 & 13 of the Patents Act, 1970 and the Patents Rules, 2003 issued on Nov. 24, 2021, by the Intellectual Property Office of India in Indian Patent Application No. 202047017398 and English translation of the Report. (7 pages).
International Preliminary Report on Patentability issued on Jun. 11, 2020, by the International Bureau of WIPO in International Patent Application No. PCT/CN2018/118191. (7 pages).
International Preliminary Report on Patentability issued on Jul. 2, 2020, by the International Bureau of WIPO in International Patent Application No. PCT/CN2018/118232 and English translation of the Report. (14 pages).
International Preliminary Report on Patentability issued on Jul. 8, 2021, by the International Bureau of WIPO in International Patent Application No. PCT/CN2019/128686 and English translation of the Report. (17 pages).
International Preliminary Report on Patentability issued on Sep. 3, 2021, by the State Intellectual Property Office of the People's Republic of China in International Patent Application No. PCT/CN2020/091489 and English translation of the Report. (12 pages).
Written Opinion of the International Searching Authority and International Search Report issued on Feb. 20, 2019, by the State Intellectual Property Office of the People's Republic of China in International Patent Application No. PCT/CN2018/118107 and English translation. (22 pages).
Written Opinion of the International Searching Authority and International Search Report issued on Feb. 25, 2019, by the State Intellectual Property Office of the People's Republic of China in International Patent Application No. PCT/CN2018/118212 and English translation. (23 pages).
English translation of the Written Opinion of the International Searching Authority and International Search Report issued on Feb. 27, 2019, by the State Intellectual Property Office of the People's Republic of China in International Patent Application No. PCT/CN2018/118224. (13 pages).
Written Opinion of the International Searching Authority and International Search Report issued on Feb. 28, 2019, by the State Intellectual Property Office of the People's Republic of China in International Patent Application No. PCT/CN2018/118300 and English translation. (20 pages).
Written Opinion of the International Searching Authority and International Search Report issued on Mar. 6, 2019, by the State Intellectual Property Office of the People's Republic of China in International Patent Application No. PCT/CN2018/118106 and English translation. (20 pages).
Written Opinion of the International Searching Authority and International Search Report issued on Mar. 6, 2019, by the State

(56) References Cited

OTHER PUBLICATIONS

Intellectual Property Office of the People's Republic of China in International Application No. PCT/CN2018/118191 and English translation. (17 pages).
Written Opinion of the International Searching Authority and International Search Report issued on Mar. 7, 2019, by the State Intellectual Property Office of the People's Republic of China in International Patent Application No. PCT/CN2018/118303 and English translation. (22 pages).
Written Opinion of the International Searching Authority and International Search Report issued on Mar. 7, 2019, by the State Intellectual Property Office of the People's Republic of China in International Patent Application No. PCT/CN2018/118232 and English translation. (24 pages).
Written Opinion of the International Searching Authority and International Search Report issued on Mar. 26, 2020, by the State Intellectual Property Office of the People's Republic of China in International Patent Application No. PCT/CN2019/129016 and English translation. (27 pages).
Written Opinion of the International Searching Authority and International Search Report issued on Mar. 26, 2020, by the State Intellectual Property Office of the People's Republic of China in International Patent Application No. PCT/CN2019/128686 and English translation. (27 pages).
Written Opinion of the International Searching Authority and International Search Report issued on Aug. 19, 2020, by the State Intellectual Property Office of the People's Republic of China in International Patent Application No. PCT/CN2020/091489 and English translation. (26 pages).
Written Opinion of the International Searching Authority and International Search Report issued on Aug. 21, 2020, by the State Intellectual Property Office of the People's Republic of China in International Patent Application No. PCT/CN2020/091484 and English translation. (29 pages).
Written Opinion of the International Searching Authority and International Search Report issued on Aug. 21, 2020, by the State Intellectual Property Office of the People's Republic of China in International Patent Application No. PCT/CN2020/091614 and English translation. (24 pages).
Written Opinion of the International Searching Authority and International Search Report issued on Aug. 24, 2020, by the State Intellectual Property Office of the People's Republic of China in International Patent Application No. PCT/CN2020/091624 and English translation. (26 pages).
Written Opinion of the International Searching Authority and International Search Report issued on Aug. 25, 2020, by the State Intellectual Property Office of the People's Republic of China in International Patent Application No. PCT/CN2020/091485 and English translation. (30 pages).
Written Opinion of the International Searching Authority and International Search Report issued on Aug. 28, 2020, by the State Intellectual Property Office of the People's Republic of China in International Patent Application No. PCT/CN2020/091649 and English translation. (25 pages).
Written Opinion of the International Searching Authority and International Search Report issued on Sep. 2, 2020, by the State Intellectual Property Office of the People's Republic of China in International Patent Application No. PCT/CN2020/091606 and English translation. (28 pages).
Written Opinion of the International Searching Authority and International Search Report issued on Nov. 21, 2019, by the State Intellectual Property Office of the People's Republic of China in International Patent Application No. PCT/CN2019/101653 and English translation. (23 pages).
Written Opinion of the International Searching Authority and International Search Report issued on Nov. 28, 2019, by the State Intellectual Property Office of the People's Republic of China in International Patent Application No. PCT/CN2019/101656 and English translation. (21 pages).

Written Opinion of the International Searching Authority and International Search Report issued on Apr. 17, 2020, by the State Intellectual Property Office of the People's Republic of China in International Patent Application No. PCT/CN2020/072813 and English translation. (32 pages).
Office Action issued on Mar. 9, 2022, by the Russian Agency for Patents and Trademarks in Russian Patent Application No. 2020118025/10(030488) and English translation of the Action. (14 pages).
Office Action issued on May 11, 2022, by the Russian Agency for Patents and Trademarks in Russian Patent Application No. 2020121741/04(037329) and English translation of the Action. (18 pages).
Office Action issued on Jan. 28, 2022, by the U.S. Patent and Trademark Office in U.S. Appl. No. 16/758,532. (28 pages).
Office Action issued on Mar. 11, 2022, by the U.S. Patent and Trademark Office in U.S. Appl. No. 16/758,720. (21 pages).
Notice of Allowance issued on Mar. 31, 2022, by the U.S. Patent and Trademark Office in U.S. Appl. No. 16/764,307. (7 pages).
Notice of Allowance issued on Apr. 5, 2022, by the U.S. Patent and Trademark Office in U.S. Appl. No. 16/763,058. (7 pages).
Office Action issued on May 27, 2022, by the U.S. Patent and Trademark Office in U.S. Appl. No. 16/758,532. (8 pages).
Notice of Allowance issued on Jul. 25, 2022, by the U.S. Patent and Trademark Office in U.S. Appl. No. 16/758,720. (5 pages).
Office Action issued on Aug. 24, 2022, by the U.S. Patent and Trademark Office in U.S. Appl. No. 16/758,532. (13 pages).
Office Action issued on Oct. 29, 2021, by the U.S. Patent and Trademark Office in U.S. Appl. No. 16/764,307. (17 pages).
Office Action issued on Nov. 16, 2021, by the U.S. Patent and Trademark Office in U.S. Appl. No. 16/763,058. (26 pages).
Office Action issued Aug. 14, 2020, by the Intellectual Property Office of Vietnam in Vietnamese Patent Application No. 1-2020-03065 and an English translation of the Action. (3 pages).
Office Action issued Aug. 28, 2020, by the Intellectual Property Office of Vietnam in Vietnamese Patent Application No. 1-2020-03777 and an English translation of the Action. (3 pages).
Payment and Certificate of Renewal issued on May 30, 2022 by the Patent Office of South Africa in South African Patent Application No. 2020/03833. (1 page).
Ahmad Dar et al., "siRNAmod: A database of experimentally validated chemically modified SiRNAs," Scientific Reports, Jan. 28, 2016, vol. 6, No. 1. (8 pages).
Beaucage et al., "Advances in the Synthesis of Oligonucleotides by the Phosphoramidite Approach", Tetrahedron, 1992, vol. 48, No. 12, pp. 2223-2311.
Behlke, Mark A., "Chemical Modification of siRNAs for In Vivo Use," Oligonucleotides, 2008, vol. 18, pp. 305-320.
Berthold et al., "Cellular Delivery and Antisense Effects of Peptide Nucleic Acid Conjugated to Polyethyleneimine via Disulfide Linkers," Bioconjugate Chemistry, 2010, vol. 21, No. 10, pp. 1933-1938.
Chen et al., "Research progress on factor XI as a novel target for antithrombotic therapy," Chinese Pharmacological Bulletin, Apr. 15, 2015, vol. 31, No. 5, with English abstract, pp. 619-622.
Dai et al., "A vital role for Angpll3 in the PAN-induced podocyte loss by affecting detachment and apoptosis in vitro," BMC Nephrology, 2015, vol. 16, No. 1. (10 pages).
Ding et al., "Limited role of kininogen in the host response during gram-negative pneumonia derived sepsis," American Journal of Physiology Lung Cellular and Molecular Physiology, Nov. 9, 2017. (33 pages).
Dong et al., "Lipopeptide nanoparticles for potent and selective siRNA delivery in rodents and nonhuman primates", Proceedings of the National Academy of Sciences, Feb. 2014, www.pnas.org/cgi/doi/10.1073/pnas.1322937111 (6 pages).
Dong et al., "A novel packaging system of recombinant AAV5/5 vector," Chinese Journal of Biotechnology, May 25, 2010, vol. 26, No. 5, pp. 679-686.
Common knowledge "RNAi technology," 2005, with English translation. (5 pages).
Foster et al., "Advanced siRNA Designs Further Improve In Vivo Performance of GalNAc-SiRNA Conjugates," Molecular Therapy, Mar. 2018, vol. 26, No. 3, pp. 708-717.

(56) References Cited

OTHER PUBLICATIONS

Greene et al., "Protection for the Hydroxyl Group, Including 1,2- and 1,3-DIOLS", Protective Groups in Organic Synthesis, Third Edition, 1999 John Wiley & Sons, Inc. pp. 17-245, (229 pages).
"*Homo sapiens* Kininogen 1 (KNG1), Transcript Variant 1, mRNA" GenBank, May 2, 2018, NM 00102416.2. (8 pages).
Khaitmetova et al., "Synthesis and Study of the Properties of Polymer Complexes of Ethacizin with Carboxymethylcellulose," Chemistry of Plant Raw Materials, 2017, No. 4, with English translation. (18 pages).
Khan et al., "High-Molecular-Weight Kininogen Fragments Stimulate the Secretion of Cytokines and Chemokines Through uPAR, Mac-1, and gC1qR in Monocytes," Arteriosclerosis, Thrombosis, and Vascular Biology, Oct. 2006, vol. 26, No. 10, pp. 2260-2266.
Khvorova et al., "The chemical evolution of oligonucleotide therapies of clinical utility", Nature Biotechnology Advance Online Publication, Feb. 27, 2017; doi:10.1038/nbt.3765, (11 pages).
Kim et al., "Bifunctional compounds for targeted hepatic gene delivery," Gene Therapy, 2007, vol. 14, pp. 704-708.
Liu et al., "Determination of Human Plasma Pre-Kallikrein," Journal of China Medical University, 1988, vol. 17, No. 6, with English abstract, pp. 432-436.
Liu et al., "Coagulation factor XI induces Ca2+ response and accelerates cell migration in vascular smooth muscle cells via proteinase-activated receptor 1," American Journal of Physiology, Cell Physiology, Mar. 1, 2019, vol. 316, No. 3, pp. C377-C392.
Love et al., "Lipid-like materials for low-dose, in vivo gene silencing", Proceedings of the National Academy of Sciences, Feb. 2, 2010, vol. 107, No. 5, pp. 1864-1869. (7 pages).
Matsuda et al., "siRNA Conjugates Carrying Sequentially Assembled Trivalent N-Acetylgalactosamine Linked Through Nucleosides Elicit Robust Gene Silencing In Vivo in Hepatocytes", ACS Chemical Biology, 2015, DOI: 10.1021/cb501028c. (7 pages).
Montagne et al., "Pericyte degeneration causes white matter dysfunction in the mouse CNS," Nature Medicine, 2018, vol. 24, vol. 3, pp. 326-337.
Nair et al., "Multivalent N-Acetylgalactosamine-Conjugated siRNA Localizes in Hepatocytes and Elicits Robust RNAi-Mediated Gene Silencing", Journal of the American Chemical Society, 2014, vol. 136, pp. 16958-16961.
Nakagawa et al., "The RNAi-Mediated Silencing of Xanthine Dehydrogenase Impairs Growth and Fertility and Accelerates Leaf Senescence in Transgenic Arabidopsis Plants," Plant & Cell Physiology, 2007, vol. 48, No. 10, pp. 1484-1495.
Nakamoto et al., "Enhanced Intercellular Delivery of cRGD-siRNA Conjugates by an Additional Oligospermine Modification," ACS Omega, 2018, vol. 3, pp. 8226-8232. (7 pages).
Norata et al., "Gene silencing approaches for the management of dyslipidaemia," Trends in Pharmacological Sciences, Apr. 13, 2013, vol. 34, No. 4, pp. 198-205.
Nordestgaard et al., "Advances in lipid-lowering therapy through gene-silencing technologies," Nature Reviews, Feb. 8, 2018, vol. 15. (12 pages).
Nothisen et al., "Cationic siRNAs Provide Carrier-Free Gene Silencing in Animal Cells," Journal of the American Chemical Society, 2009, vol. 131, No. 29, pp. 17730-17731. (2 pages).
Papulov, Yu. G., "Relationship between Properties of Compounds with Their Structures: Math Modeling," Advances in Modern Natural Sciences, 2006, with English translation, pp. 75-76.
Paris et al., "Conjugating Phosphospermines to siRNAs for Improved Stability in Serum, Intracellular Delivery and RNAi-Mediated Gene Silencing," Molecular Pharmaceutics, 2012, vol. 9, No. 12, pp. 3464-3475.
Peña-Altamira, et al., "Release of soluble and vesicular purine nucleoside phosphorylase from rat astrocytes and microglia induced by pro-inflammatory stimulation with extracellular ATP via P2X7 receptors," Neurochemistry International, May 31, 2018, vol. 115, pp. 37-49.
Pessentheiner et al., "ANGPTL3 targeting: The power of versatile lipid-lowering," Atherosclerosis, Jan. 2018, vol. 268, pp. 185-187.
Prakash et al., "Comprehensive Structure-Activity Relationship of Triantennary N-Acetylgalactosamine Conjugated Antisense Oligonucleotides for Targeted Delivery to Hepatocytes," Journal of Medicinal Chemistry, 2016, vol. 59, pp. 2718-2733.
Rajeev et al., "Hepatocyte-Specific Delivery of siRNAs Conjugated to Novel Non-nucleosidic Trivalent N-Acetylgalactosamine Elicits Robust Gene Silencing in Vivo" ChemBioChem, 2015, vol. 16, pp. 903-908.
Ren et al., "Synthesis of bifunctional cationic compound for gene delivery," Tetrahedron Letters, 2001, vol. 42, pp. 1007-1010.
Ren et al., "Gene Expression Profile of Transgenic Mouse Kidney Reveals Pathogenesis of Hepatitis B Virus Associated Nephropathy," Journal of Medical Virology, 2006, vol. 78, pp. 551-560.
Ren et al., "Stable Inhibition of Hepatitis B Virus Expression and Replication by Expressed siRNA", Biochemical and Biophysical Research Communications, Oct. 7, 2005, vol. 335, No. 4, with English abstract, pp. 1051-1058.
Springer et al., "GalNAc-siRNA Conjugates: Leading the Way for Delivery of RNAi Therapeutics," Nucleic Acid Therapeutics, May 2018, vol. 28, No. 3, pp. 109-118.
Su et al., "Progress on the Inhibition of Hepatitis B virus by siRNA Strategy," China Biotechnology, 2014, vol. 34, No. 9, with English abstract, pp. 102-107.
Tangkijvanich et al., "Low pretreatment serum HBsAg level and viral mutations as predictors of response to PEG-interferon alpha-2b therapy in chronic hepatitis B," Journal of Clinical Virology, vol. 46, 2009, pp. 117-123.
Ui-Tei et al., "Functional dissection of siRNA sequence by systematic DNA substitution: modified siRNA with a DNA seed arm is a powerful tool for mammalian gene silencing with significantly reduced off-target effect", Nucleic Acids Research, 2008, vol. 36, No. 7, pp. 2136-2151.
Watts et al., "Chemically modified siRNA: tools and applications," Drug Discovery Today, Oct. 2008, vol. 13, Nos. 19/20, pp. 842-855.
Wooddell et al., "Hepatocyte-targeted RNAi Therapeutics for the Treatment of Chronic Hepatitis B Virus Infection," The American Society of Gene & Cell Therapy, 2013, doi:10.1038/mt.2013.31. (13 pages).
Wu et al., "Cleaved high molecular weight kininogen inhibits tube formation of endothelial progenitor cells via suppression of matrix metalloproteinase 2," Journal of Thrombosis and Haemostasis, 2010, vol. 8, pp. 185-193.
Wu et al., "Contact pathway of coagulation and inflammation," Thrombosis Journal, 2015, pp. 13-17.
Xu et al., "Role of angiopoielin-like 3 (ANGPTL3) in regulating plasma level of low-density lipoprotein cholesterol," Atherosclerosis, 2018, vol. 268, pp. 196-206.
Yang et al., "A critical role for plasma kallikrein in the pathogenesis of autoantibody-induced arthritis," Federation of American Societies for Experimental Biology, Nov. 2017, vol. 31, No. 12, pp. 5419-5431.
Yang et al., "An essential role of high-molecular-weight kininogen in endotoxemia," Journal of Experimental Medicine, Sep. 4, 2017, vol. 214, No. 9, pp. 2649-2670.
Durnov, et al., "Children's Oncology", Paediatric Oncology, Second Edition, Moscow Publishing House Medicine, 2002, p. 139 and its English translation. Cited in Office Action issued on Oct. 10, 2022 in Russian Application No. 2020121741). (4 pages).
Dysop, "Chemistry of Synthetic Drugs", Publishing House MIR, 1964, pp. 12-19 and its English translation. Cited in Office Action issued on Oct. 10, 2022 in Russian Application No. 2020121741). (18 pages).
Belikov, V.G., "Pharmaceutical Chemistry", textbook, Moscow, 11th Edition, MEDpress-inform, 2007, pp. 27-29 and its English translation. (Cited in Office Action issued on Oct. 10, 2022 in Russian Application No. 2020121741). (8 pages).
Examination Report No. 2 issued on Feb. 3, 2023, by the Australian Government IP Australia in Australian Patent Application No. 2018394875 (4 pages).
Ren et al., "Synthesis of Galactosyl Compounds for Targeted Gene Delivery", Bioorganic & Medicinal Chemistry, 2001, 9(11), pp. 2969-2978.

(56) References Cited

OTHER PUBLICATIONS

Extended European Search Report issued on Mar. 27, 2023, by the European Patent Office in European Patent Application No. 19902173.4 (11 pages).
Li et al., "The silencing of ApoC3 suppresses oxidative stress and inflammatory responses in placenta cells from mice with preeclampsia via inhibition of the Nf-B signaling pathway", Biomedicine & Pharmacotherapy, Aug. 31, 2018, vol. 107, pp. 1377-1384.
Notice of Reasons for Refusal issued on Jun. 1, 2023, by the Japanese Patent Office in Japanese Patent Application No. 2021-537877, with an English translation of the Notice (6 pages).
Kanasty et al., "Delivery materials for siRNA therapeutics", Nature Materials, Nov. 2023, vol. 12, pp. 967-977.
Notice of Reasons for Refusal issued on Jun. 6, 2023, by the Japanese Patent Office in Japanese Patent Application No. 2021-509880, with an English translation of the Notice (6 pages).
Fedin A.I. et al., "Review of clinical recommendations for treatment and prevention of ischemic stroke", S. S. Korsakov Journal of Neurology and Psychiatry, 2019, vol. 119, No. 8, pp. 91-96, doi: 10.17116/jnevro201911908291, with English abstract. (Cited in Office Action issued on Mar. 6, 2024, in corresponding Russian Application No. 2021130601) (6 pages).
Meijers J.C. et al., "High levels of coagulation factor XI as a risk factor for venous thrombosis", N. Engl. J. Med., 2000, vol. 342, No. 10, pp. 696-701, doi: 10.1056/NEJM200003093421004. (Cited in Office Action issued on Mar. 6, 2024, in corresponding Russian Application No. 2021130601) (6 pages).
Soodabeh S. et al., "From in vitro Experiments to in vivo and Clinical Studies; Pros and Cons", Curr. Drug Discov. Technol., 2015, vol. 12, No. 4, pp. 218-224. (Cited in Office Action issued on Mar. 6, 2024, in corresponding Russian Application No. 2021130601) (7 pages).
Shafer A.I. et al., "Thrombotic Disorders Diagnosis and Treatment", Am. Soc. Hematol. Educ. Program, 2003, v. 1, pp. 520-539, doi 10.1182asheducation-2003.1.520. (Cited in Office Action issued on Mar. 6, 2024, in corresponding Russian Application No. 2021130601) (20 pages).
Sehgal, Alfica et al., "Liver as a target for oligonucleotide therapeutics", Journal of hepatology, 2013, vol. 59, pp. 1354-1359. (Cited in Office Action issued on Mar. 11, 2024, in corresponding Taiwanese Patent Application No. 109116935) (6 pages).
Diaz-Torné, Cesar et al., "New medications in development for the treatment of hyperuricemia of gout", Current opinion in rheumatology. 2015, vol. 27, No. 2, pp. 164-169. (Cited in Office Action issued on Mar. 11, 2024, in corresponding Taiwanese Patent Application No. 109116934) (6 pages).
Kojima, S. et al., "Tumour suppressors miR-1 and miR-133a target the oncogenic function ofphosphorylase (PNP) in prostate cancer", Br. J. Cancer, 2012, vol. 106(2), pp. 405-413. (Cited in Office Action issued on May 21, 2024, in corresponding Japanese Patent Application No. JP2021-569112) (9 pages).
Bertrand, et al., "Comparison of antisense oligonucleotides and siRNAs in cell culture and in vivo," Biochemical and Biophysical Research Communications, 2002, vol. 296, Issue 4, pp. 1000-1004, ISSN 0006-291X.
Qui, S. et al., "Dickkopf 3 attenuates xanthine dehydrogenase expression to prevent oxidative stress-induced apoptosis," Genes to Cells, 2017, vol. 22, pp. 406-417. (cited in Extended European Search Report issued on Jan. 30, 2024, in European Patent Application No. 20813863.6).
Yasuda, T. et al., "Anti-Gout Agent Allopurinol Exerts Cytotoxicity to Human Hormone-Refractory Prostate Cancer Cells in Combination with Tumor Necrosis Factor-Related Apoptosis-Inducing Ligand," Mol Cancer Res, Dec. 2008, vol. 6, No. 12, pp. 1852-1860. (cited in Extended European Search Report issued on Jan. 30, 2024, in European Patent Application No. 20813863.6).

Hashimoto, K. et al., "Sulfotransferase-1A1-dependent bioactivation of aristolochic acid I and N-hydroxyaristolactam I in human cells," Carcinogenesis, 2016, vol. 37, No. 7, pp. 647-655. (cited in Extended European Search Report issued on Jan. 30, 2024, in European Patent Application No. 20813863.6).
Chen et al., "Proof-of-concept Studies for siRNA-mediated Gene Silencing for Coagulation Factors in Rat and Rabbit". Molecular Therapy—Nucleic Acids, Jan. 27, 2015, vol. 4, No. 1, p. e224.
Ferrone et al., "IONIS-PKK Rx a Novel Antisense Inhibitor of Prekallikrein and Bradykinin Production", Nucleic Acid Therapeutics, Apr. 1, 2019, vol. 29, No. 2, pp. 82-91.
Ghosh et al., "Effectiveness and Safety of Inclisiran, A Novel Long-Acting RNA Therapeutic Inhibitor of Proprotein Convertase Subtilisin/Kexin 9", American Journal of Cardiology, Cahners Publishing Co., Newton, MA, US, Jul. 3, 2018, vol. 122, No. 7, pp. 1272-1277.
Joshi et al., "siRNA: novel therapeutics from functional genomics", Biotechnology and Genetic Engineering Reviews, Jan. 2, 2014, vol. 30, No. 1, pp. 1-30.
Pawluczyk et al., "Kallikrein gene 'knock-down' by small interfering RNA transfection induces a profibrotic phenotype in rat mesangial cells", Journal of Hypertension, Lippincott Williams & Wilkens, Ltd., Jan. 1, 2008, vol. 26, No. 1, pp. 93-101.
Revenko et al., "Selective depletion of plasma prekallikrein or coagulation factor XII inhibits thrombosis in mice without increased risk of bleeding", Blood, American Society of Hematology, Nov. 10, 2011, vol. 118, No. 19, pp. 5302-5311.
Yamasaki et al., "Novel molecular targets regulated by tumor suppressors microRNA-1 and microRNA-133a in bladder cancer", International Journal of Oncology, Feb. 29, 2012, vol. 40, pp. 1821-1830.
Supplementary European Search Report issued on Jun. 14, 2023, by the European Patent Office in European Patent Application No. 20809702.2 (12 pages).
Supplementary European Search Report issued on Jun. 16, 2023, by the European Patent Office in European Patent Application No. 20814338.8 (10 pages).
Partial Supplementary European Search Report issued on Jul. 5, 2023, by the European Patent Office in European Patent Application No. 20810635.1 (13 pages).
Partial Supplementary European Search Report issued on Jul. 10, 2023, by the European Patent Office in European Patent Application No. 20815633.1 (17 pages).
Dana et al., "Molecular Mechanisms and Biological Functions of siRNA," International Journal of Biomedical Science, vol. 13, No. 2, pp. 48-57 (2017).
Elbashir et al., "Functional anatomy of siRNAs for mediating efficient RNAi in *Drosophila melanogaster* embryo lysate," The EMBO Journal, vol. 20, No. 23, pp. 6877-6888 (2001).
Fakhr et al., "Precise and efficient siRNA design: a key point in competent gene silencing," Cancer Gene Therapy, vol. 23, pp. 73-82 (2016).
Girardet et al., "Urate Crystal Deposition Disease and Gout—New Therapies for an Old Problem," Annual Reports in Medicinal Chemistry, vol. 49, pp. 151-164 (2014).
Kliuchnikov et al., "Improving the potency prediction for chemically modified siRNAs through insights from molecular modeing of individual sequence positions," Molecular Therapy: Nucleic Acids, vol. 36, pp. 1-14 (2025).
Lorenzer et al., "Going beyond the liver: Progress and Challenges of Targeted Delivery of siRNA Therapeutics," Journal of Controlled Release, vol. 203, pp. 1-15 (2015).
Willoughby et al., "Evaluation of GalNAc-siRNA Conjugate Activity in Pre-clinical Animal Models with Reduced Asialoglycoprotein Receptor Expression," Molecular Therapy, vol. 26, No. 1, pp. 105-114 (2018).

\* cited by examiner

NUCLEIC ACID, PHARMACEUTICAL COMPOSITION, CONJUGATE, PREPARATION METHOD, AND USE

SEQUENCE LISTING

Incorporated by reference herein in its entirety is a computer-readable sequence listing submitted via EFS-Web and identified as follows: One (71912 byte ASCII (Text)) file named "20220517 Revised sequence listing.txt" created on May 17, 2022.

TECHNICAL FIELD

The present disclosure relates to a nucleic acid capable of inhibiting the expression of proprotein convertase subtilisin/kexin type 9 (PCSK9) gene, a pharmaceutical composition and an siRNA conjugate. The present disclosure also relates to a preparation method and use of such nucleic acids, pharmaceutical compositions and siRNA conjugates.

BACKGROUND ART

Dyslipidemia, especially persistently high levels of low-density lipoprotein cholesterol (LDL-c), is an important risk factor that induces and promotes the occurrence and development of atherosclerosis, and is closely related to ischemic cardiovascular and cerebrovascular diseases, posing a serious threat to human health. The currently available medicines for treating dyslipidemia mainly include statins, cholesterol absorption inhibitors, resins, probucol, fibrates, niacins, and derivatives thereof. The application of lipid-lowering medicines for lowering plasma cholesterol levels can reduce the risk of cardiovascular and cerebrovascular diseases. Nevertheless, there is still a considerable proportion of patients who fail to achieve desired lipid levels.

Studies show that the proprotein convertase subtilisin/kexin type 9 (PCSK9) gene plays an important role in lipid metabolism, especially cholesterol metabolism. By inhibiting the expression of PCSK9 gene, plasma cholesterol levels can be effectively reduced. Based on the mechanism of RNA interference (RNAi), small interfering RNA (siRNA) could inhibit or block the expression of a target gene of interest in a sequence-specific manner, so as to achieve the purpose of treating diseases. Inhibiting the expression of PCSK9 gene at mRNA level will undoubtedly be the most ideal treatment means.

The key to developing siRNA medicines that inhibit the expression of PCSK9 gene and treat hypercholesterolemia is to find suitable siRNA and its modification and effective delivery system.

SUMMARY OF THE INVENTION

The inventors of the present disclosure have surprisingly found that the siRNA conjugate provided by the present disclosure below is capable of specifically inhibitng the expression of PCSK9 gene, and specifically targeting the liver and inhibiting the expression of PCSK9 gene in the liver, thereby achieving the treatment or prevention of hypercholesterolemia. In addition, the inventors have further invented siRNAs with higher activity and pharmaceutical compositions.

In some embodiments, the present disclosure provides an siRNA conjugate having a structure as shown by Formula (308):

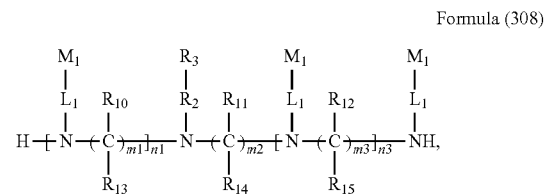

Formula (308)

wherein
n1 is an integer of 1-3, and n3 is an integer of 0-4;
m1, m2, or m3 independently of one another is an integer of 2-10;
$R_{10}$, $R_{11}$, $R_{12}$, $R_{13}$, $R_{14}$, or $R_{15}$ independently of one another is H, or selected from the group consisting of $C_1$-$C_{10}$ alkyl, $C_1$-$C_{10}$ haloalkyl, and $C_1$-$C_{10}$ alkoxy;
$R_3$ is a group having a structure as shown by Formula (A59):

(A59)

wherein,
$E_1$ is OH, SH or $BH_2$;
Nu is an siRNA;
the siRNA comprises a sense strand and an antisense strand; each nucleotide in the siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; the nucleotide sequence I and the nucleotide sequence II are the sequences selected from one of the following groups i)-vi):
i) the nucleotide sequence I and the nucleotide sequence as shown by SEQ ID NO: 1 have an equal length and no more than 3 nucleotide differences, and the nucleotide sequence II and the nucleotide sequence as shown by SEQ ID NO: 2 have an equal length and no more than 3 nucleotide differences:

```
                                       (SEQ ID NO: 1)
          5'-AAGCAAGCAGACAUUUAUZ₁-3';

(SEQ ID NO: 2)
          5'-Z₂AUAAAUGUCUGCUUGCUU-3',
``` wherein, $Z_1$ is C and $Z_2$ is G, and
the nucleotide sequence I comprises a nucleotide $Z_3$ at the position corresponding to $Z_1$; the nucleotide sequence II comprises a nucleotide $Z_4$ at the position corresponding to $Z_2$, wherein $Z_4$ is the first nucleotide at 5' terminal of the antisense strand;
ii) the nucleotide sequence I and the nucleotide sequence as shown by SEQ ID NO: 61 have an equal length and no more than 3 nucleotide differences, and the nucleotide sequence II and the nucleotide sequence as shown by SEQ ID NO: 62 have an equal length and no more than 3 nucleotide differences:

5'-UUUGUAGCAUUUUUAUUAZ$_5$-3'; (SEQ ID NO: 61)

5'-Z$_6$GUAAUAAAAAUGCUACAAA-3', (SEQ ID NO: 62)

wherein, $Z_5$ is A and $Z_6$ is U, and
the nucleotide sequence I comprises a nucleotide $Z_7$ at the position corresponding to $Z_5$; the nucleotide sequence II comprises a nucleotide $Z_8$ at the position corresponding to $Z_6$, wherein $Z_8$ is the first nucleotide at 5' terminal of the antisense strand;
iii) the nucleotide sequence I and the nucleotide sequence as shown by SEQ ID NO: 121 have an equal length and no more than 3 nucleotide differences, and the nucleotide sequence II and the nucleotide sequence as shown by SEQ ID NO: 122 have an equal length and no more than 3 nucleotide differences:

5'-GCCUGGAGUUUAUUCGGAZ$_9$-3'; (SEQ ID NO: 121)

5'-Z$_{10}$UCCGAAUAAACUCCAGGC-3', (SEQ ID NO: 122)

wherein, $Z_9$ is A and $Z_{10}$ is U, and
the nucleotide sequence I comprises a nucleotide $Z_{11}$ at the position corresponding to $Z_9$; the nucleotide sequence II comprises a nucleotide $Z_{12}$ at the position corresponding to $Z_{10}$, wherein $Z_{12}$ is the first nucleotide at 5' terminal of the antisense strand;
iv) the nucleotide sequence I and the nucleotide sequence as shown by SEQ ID NO: 181 have an equal length and no more than 3 nucleotide differences, and the nucleotide sequence II and the nucleotide sequence as shown by SEQ ID NO: 182 have an equal length and no more than 3 nucleotide differences:

5'-CUGUUUUGCUUUUGUAACZ$_{13}$-3'; (SEQ ID NO: 181)

5'-Z$_{14}$GUUACAAAAGCAAAACAG-3', (SEQ ID NO: 182)

wherein, $Z_{13}$ is U and $Z_{14}$ is A, and
the nucleotide sequence I comprises a nucleotide $Z_{15}$ at the position corresponding to $Z_{13}$; the nucleotide sequence II comprises a nucleotide $Z_{16}$ at the position corresponding to $Z_{14}$, wherein $Z_{16}$ is the first nucleotide at 5' terminal of the antisense strand;
v) the nucleotide sequence I and the nucleotide sequence as shown by SEQ ID NO: 241 have an equal length and no more than 3 nucleotide differences, and the nucleotide sequence II and the nucleotide sequence as shown by SEQ ID NO: 242 have an equal length and no more than 3 nucleotide differences:

5'-GGUUUUGUAGCAUUUUUAZ$_{17}$-3'; (SEQ ID NO: 241)

5'-Z$_{18}$UAAAAAUGCUACAAAACC-3', (SEQ ID NO: 242)

wherein, $Z_{17}$ is U and $Z_{18}$ is A, and
the nucleotide sequence I comprises a nucleotide $Z_{19}$ at the position corresponding to $Z_{17}$; the nucleotide sequence II comprises a nucleotide $Z_{20}$ at the position corresponding to $Z_{18}$, wherein $Z_{20}$ is the first nucleotide at 5' terminal of the antisense strand; and
vi) the nucleotide sequence I and the nucleotide sequence as shown by SEQ ID NO: 301 have an equal length and no more than 3 nucleotide differences, and the nucleotide sequence II and the nucleotide sequence as shown by SEQ ID NO: 302 have an equal length and no more than 3 nucleotide differences:

5'-GUGACUUUUUAAAAUAAAZ$_{21}$-3'; (SEQ ID NO: 301)

5'-Z$_{22}$UUUAUUUAAAAAGUCAC-3', (SEQ ID NO: 302)

wherein, $Z_{21}$ is A and $Z_{22}$ is U, and
the nucleotide sequence I comprises a nucleotide $Z_{23}$ at the position corresponding to $Z_{21}$; the nucleotide sequence II comprises a nucleotide $Z_{24}$ at the position corresponding to $Z_{22}$, wherein $Z_{24}$ is the first nucleotide at 5' terminal of the antisense strand;
$R_2$ is a linear alkylene of 1 to 20 carbon atoms in length, wherein one or more carbon atoms are optionally replaced with any one or more groups selected from the group consisting of: C(O), NH, O, S, CH=N, S(O)$_2$, $C_2$-$C_{10}$ alkenylene, $C_2$-$C_{10}$ alkynylene, $C_6$-$C_{10}$ arylene, $C_3$-$C_{18}$ heterocyclylene, and $C_5$-$C_{10}$ heteroarylene; and wherein $R_2$ optionally has any one or more substituents selected from the group consisting of: $C_1$-$C_{10}$ alkyl, $C_6$-$C_{10}$ aryl, $C_5$-$C_{10}$ heteroaryl, $C_1$-$C_{10}$ haloalkyl, —O$C_1$-$C_{10}$ alkyl, —O$C_1$-$C_{10}$ alkylphenyl, —$C_1$-$C_{10}$ alkyl-OH, —O$C_1$-$C_{10}$ haloalkyl, —S$C_1$-$C_{10}$ alkyl, —S$C_1$-$C_{10}$ alkylphenyl, —$C_1$-$C_{10}$ alkyl-SH, —S$C_1$-$C_{10}$ haloalkyl, halo, —OH, —SH, —NH$_2$, —$C_1$-$C_{10}$ alkyl-NH$_2$, —N($C_1$-$C_{10}$ alkyl)($C_1$-$C_{10}$ alkyl), —NH ($C_1$-$C_{10}$ alkyl), N($C_1$-$C_{10}$ alkyl)($C_1$-$C_{10}$ alkylphenyl), NH($C_1$-$C_{10}$ alkylphenyl), cyano, nitro, —CO$_2$H, —C(O)O($C_1$-$C_{10}$ alkyl), —CON($C_1$-$C_{10}$ alkyl)($C_1$-$C_{10}$ alkyl), —CONH($C_1$-$C_{10}$ alkyl), —CONH$_2$, —NHC(O) ($C_1$-$C_{10}$ alkyl), —NHC(O)(phenyl), —N($C_1$-$C_{10}$ alkyl) C(O)($C_1$-$C_{10}$ alkyl), —N($C_1$-$C_{10}$ alkyl)C(O)(phenyl), —C(O)$C_1$-$C_{10}$ alkyl, —C(O)$C_1$-$C_{10}$ alkylphenyl, —C(O)$C_1$-$C_{10}$ haloalkyl, —OC(O)$C_1$-$C_{10}$ alkyl, —SO$_2$($C_1$-$C_{10}$ alkyl), —SO$_2$(phenyl), —SO$_2$($C_1$-$C_{10}$ haloalkyl), —SO$_2$NH$_2$, —SO$_2$NH($C_1$-$C_{10}$ alkyl), —SO$_2$NH(phenyl), —NHSO$_2$($C_1$-$C_{10}$ alkyl), —NHSO$_2$(phenyl), and —NHSO$_2$($C_1$-$C_{10}$ haloalkyl);
each $L_1$ independently is a linear alkylene of 1 to 70 carbon atoms in length, wherein one or more carbon atoms are optionally replaced with any one or more groups selected from the group consisting of: C(O), NH, O, S, CH=N, S(O)$_2$, $C_2$-$C_{10}$ alkenylene, $C_2$-$C_{10}$ alkynylene, $C_6$-$C_{10}$ arylene, $C_3$-$C_{18}$ heterocyclylene, and $C_5$-$C_{10}$ heteroarylene; and wherein $L_1$ optionally has any one or more substituents selected from the group consisting of: $C_1$-$C_{10}$ alkyl, $C_6$-$C_{10}$ aryl, $C_5$-$C_{10}$ heteroaryl, $C_1$-$C_{10}$ haloalkyl, —O$C_1$-$C_{10}$ alkyl, —O$C_1$-$C_{10}$ alkylphenyl, —$C_1$-$C_{10}$ alkyl-OH, —O$C_1$-$C_{10}$ haloalkyl, —S$C_1$-$C_{10}$ alkyl, —S$C_1$-$C_{10}$ alkylphenyl, —$C_1$-$C_{10}$ alkyl-SH, —S$C_1$-$C_{10}$ haloalkyl, halo, —OH, —SH, —NH$_2$, —$C_1$-$C_{10}$ alkyl-NH$_2$, —N($C_1$-$C_{10}$ alkyl) ($C_1$-$C_{10}$ alkyl), —NH($C_1$-$C_{10}$ alkyl), N($C_1$-$C_{10}$ alkyl) ($C_1$-$C_{10}$ alkylphenyl), NH($C_1$-$C_{10}$ alkylphenyl), cyano, nitro, —CO$_2$H, —C(O)O(C$_1$-C$_{10}$ alkyl), —CON(C$_1$-C$_{10}$ alkyl)(C$_1$-C$_{10}$ alkyl), —CONH(C$_1$-C$_{10}$ alkyl), —CONH$_2$, —NHC(O)(C$_1$-C$_{10}$ alkyl), —NHC(O)(phenyl), —N(C$_1$-C$_{10}$ alkyl)C(O)(C$_1$-C$_{10}$ alkyl), —N(C$_1$-C$_{10}$ alkyl)C(O)(phenyl), —C(O)C$_1$-C$_{10}$ alkyl, —C(O)C$_1$-C$_{10}$ alkylphenyl, —C(O)C$_1$-C$_{10}$ haloalkyl, —OC(O)C$_1$-C$_{10}$ alkyl, —SO$_2$(C$_1$-C$_{10}$ alkyl), —SO$_2$(phenyl), —SO$_2$(C$_1$-C$_{10}$ haloalkyl), —SO$_2$NH$_2$, —SO$_2$NH(C$_1$-C$_{10}$ alkyl), —SO$_2$NH(phenyl), —NHSO$_2$(C$_1$-C$_{10}$ alkyl), —NHSO$_2$(phenyl), and —NHSO$_2$(C$_1$-C$_{10}$ haloalkyl);

~~~ represents the site where a group is covalently linked; and M$_1$ represents a targeting group.

In some embodiments, the present disclosure provides an siRNA capable of inhibiting the expression of PCSK9 gene, wherein the siRNA comprises a sense strand and an antisense strand; each nucleotide in the sense strand and the antisense strand is independently a fluoro modified nucleotide and a non-fluoro modified nucleotide; wherein the sense strand comprises a nucleotide sequence I and the antisense strand comprises a nucleotide sequence II; the nucleotide sequence I and the nucleotide sequence II are at least partly reverse complementary to form a double-stranded region; the fluoro modified nucleotides are located in the nucleotide sequence I and the nucleotide sequence II; and in the direction from 5' terminal to 3' terminal, the nucleotides at positions 7, 8 and 9 of the nucleotide sequence I in the sense strand are fluoro modified nucleotides, and the nucleotides at the rest of positions in the sense strand of the siRNA are non-fluoro modified nucleotides; in the direction from 5' terminal to 3' terminal, the nucleotides at positions 2, 6, 14, and 16 of the nucleotide sequence II in the antisense strand are fluoro modified nucleotides, and the nucleotides at the rest of positions in the antisense strand of the siRNA are non-fluoro modified nucleotides; and the nucleotide sequence I and the nucleotide sequence II are the sequences selected from one of the aforementioned groups i)-vi).

In some embodiments, the present disclosure provides a pharmaceutical composition, comprising the siRNA of the present disclosure, and a pharmaceutically acceptable carrier.

In some embodiments, the present disclosure provides an siRNA conjugate comprising the siRNA of the present disclosure and a conjugation group conjugatively linked to the siRNA.

In some embodiments, the present disclosure provides use of the siRNA, and/or the pharmaceutical composition, and/or the siRNA conjugate of the present disclosure in the manufacture of a medicament for treating and/or preventing diseases or physiological conditions caused by abnormal expression of PCSK9 gene.

In some embodiments, the present disclosure provides a method for treating and/or preventing diseases or physiological conditions caused by abnormal expression of PCSK9 gene, comprising administering an effective amount of the siRNA, and/or the pharmaceutical composition, and/or the siRNA conjugate of the present disclosure to a subject in need.

In some embodiments, the present disclosure provides a method for inhibiting the expression of PCSK9 gene in hepatocytes, comprising contacting an effective amount of the siRNA, and/or the pharmaceutical composition, and/or the siRNA conjugate of the present disclosure with the hepatocytes.

In some embodiments, the present disclosure provides a kit, comprising the siRNA, and/or the pharmaceutical composition, and/or the siRNA conjugate of the present disclosure.

Beneficial Effects

The siRNA, the pharmaceutical composition, and the siRNA conjugate of the present disclosure could exhibit good stability, higher inhibitory activity against PCSK9 mRNA, and lower off-target effect and toxicity, and/or can significantly treat and/or prevent diseases or physiological conditions caused by abnormal expression of PCSK9 gene, such as hypercholesterolemia.

In some embodiments, the siRNA, the pharmaceutical composition or the siRNA conjugate of the present disclosure exhibits excellent inhibitory activity against the target mRNA in in vitro cell experiments. In some embodiments, the siRNA, the pharmaceutical composition or the siRNA conjugate of the present disclosure exhibits an inhibition rate of at least 20%, 30%, 40%, 50%, 60%, 70%, 80%, 90% or 95% against the target mRNA in hepatocytes.

In some embodiments, the siRNA, the pharmaceutical composition or the siRNA conjugate of the present disclosure may have higher stability and/or higher activity in vivo. In some embodiments, the siRNA, the pharmaceutical composition or the siRNA conjugate of the present disclosure exhibits an inhibition rate of at least 20%, 30%, 40%, 50%, 60%, 70%, 80%, 90% or 95% against the expression of the target gene in vivo. In some embodiments, the siRNA, the pharmaceutical composition or the siRNA conjugate of the present disclosure exhibits an inhibition rate of at least 20%, 30%, 40%, 50%, 60%, 70%, 80%, 90% or 95% against the expression of PCSK9 gene in vivo. In some embodiments, the siRNA, the pharmaceutical composition or the siRNA conjugate of the present disclosure exhibits an inhibition rate of at least 20%, 30%, 40%, 50%, 60%, 70%, 80%, 90% or 95% against the expression of PCSK9 gene in livers in vivo. In some embodiments, the siRNA, the pharmaceutical composition or the siRNA conjugate of the present disclosure exhibits an inhibition rate of at least 20%, 30%, 40%, 50%, 60%, 70%, 80%, 90% or 95% against the expression of PCSK9 gene in livers in animal models in vivo. In some embodiments, the siRNA, the pharmaceutical composition or the siRNA conjugate of the present disclosure exhibits an inhibition rate of at least 20%, 30%, 40%, 50%, 60%, 70%, 80%, 90% or 95% against the expression of PCSK9 gene in livers in human subjects in vivo. In some embodiments, the siRNA, the pharmaceutical composition or the siRNA conjugate of the present disclosure does not exhibit an obvious off-target effect. Off-target effects can be, for example, inhibition of normal expression of non-target genes. It is believed that if the binding/inhibition of the expression of off-target genes is less than 50%, 40%, 30%, 20% or 10% compared with the effect on the target gene, the off-target effect is not significant.

In some embodiments, the siRNA of the present disclosure shows higher inhibitory activity in the psiCHECK system, with the IC$_{50}$ values ranging from 0.0194 nM to 0.0561 nM for the target sequence. In some embodiments, after a single subcutaneous injection of 9 mg/kg into cynomolgus monkeys, the siRNA conjugate of the present disclosure shows an inhibition rate of up to 56-81% against PCSK9 mRNA in the liver tissue of NHP on day 15 after the administration relative to day 7 before the administration. In some embodiments, the siRNA conjugate of the present disclosure exhibits more significant inhibition against the expression of PCSK9 protein in serum, and shows an inhibition rate of up to more than 90% against the expression of PCSK9 protein in serum on day 14 after administration. In some embodiments, the siRNA conjugate of the present disclosure can significantly inhibit LDL-c and CHO levels in serum, and especially shows an inhibition rate of up to 30%, or even up to 64% against LDL-c during the period from day 14 to day 29 after administration; it also shows a higher inhibition rate, even up to more than 35%, against CHO. In some embodiments, after single administration of 9 mg/kg, the siRNA conjugate of the present disclosure can maintain an inhibition rate of higher than 50% against LDL-c for 11 weeks, and the siRNA conjugate of the present disclosure does not show obvious toxicity in rats or mice. In conclusion, the siRNA conjugate of present disclosure has a rapid onset and long duration of action, can significantly inhibit the expression of target mRNA, can effectively reduce the content of PCSK9 protein in serum, has a strong inhibitory effect on LDL-c and CHO in serum, and have good biological safety.

Therefore, the siRNA, the pharmaceutical composition and the siRNA conjugate of the present disclosure could inhibit the expression of PCSK9 gene, effectively treat and/or prevent diseases or physiological conditions caused by the abnormal expression of PCSK9 gene, and thus show a promising prospect of application.

Additional features and advantages of the present disclosure will be detailedly illustrated in the following part "DETAILED DESCRIPTION OF THE INVENTION".

DETAILED DESCRIPTION OF THE INVENTION

Figure 1A:
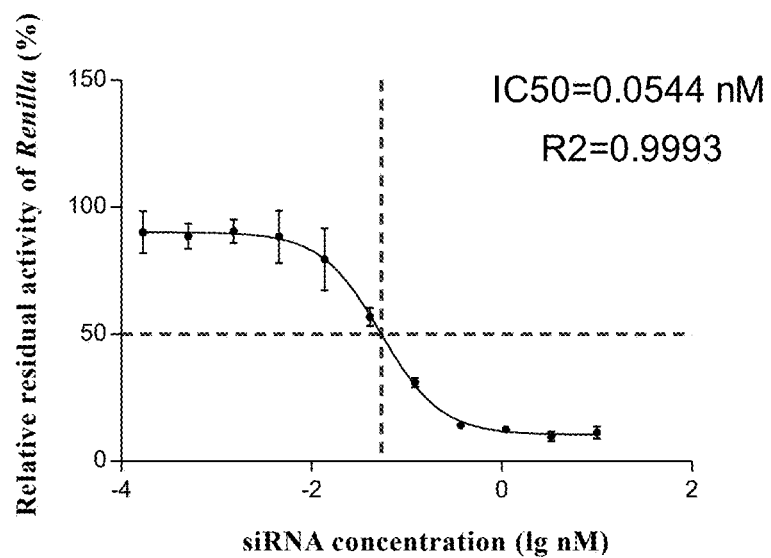
FIGS. 1A-1F show the dose-effect curves fitted according to the relative residual activity of the reporter gene Renilla in the psiCHECK system after transfection with different siRNAs (siRNAs 1-6).
Figure 1B:
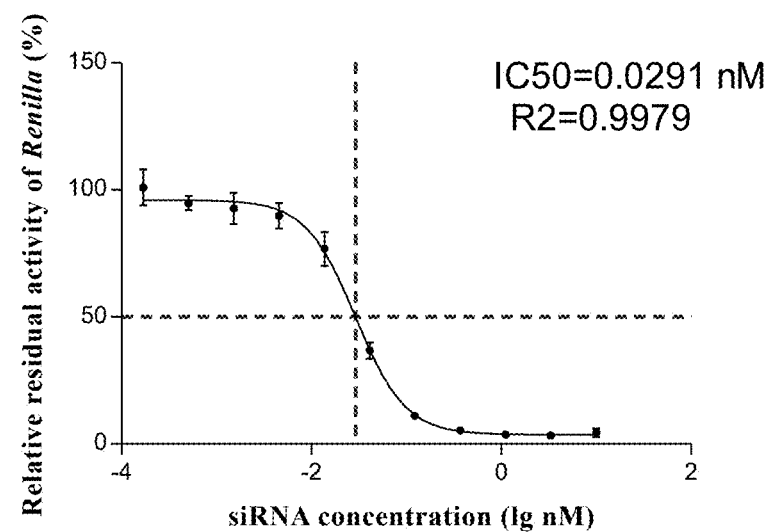
Figure 1C:
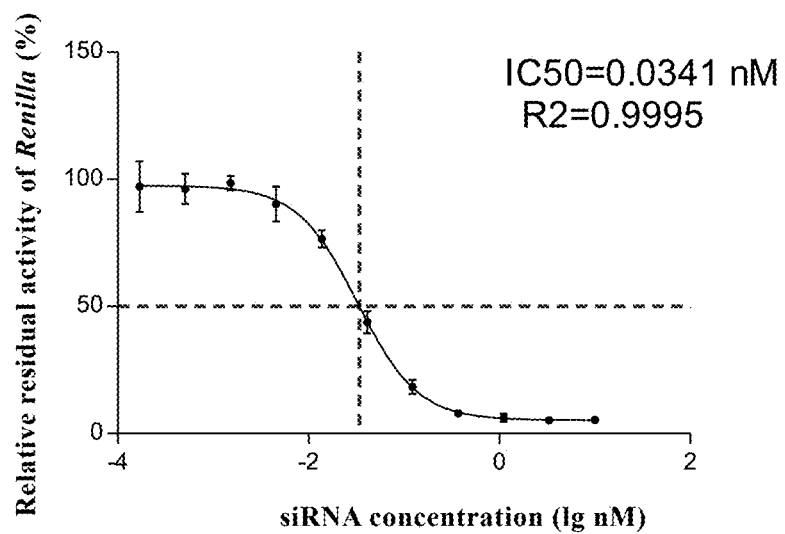
Figure 1D:
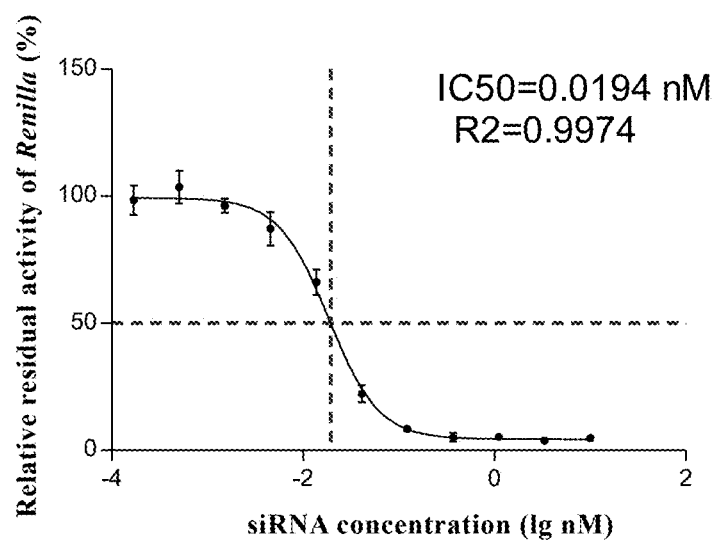
Figure 1E:
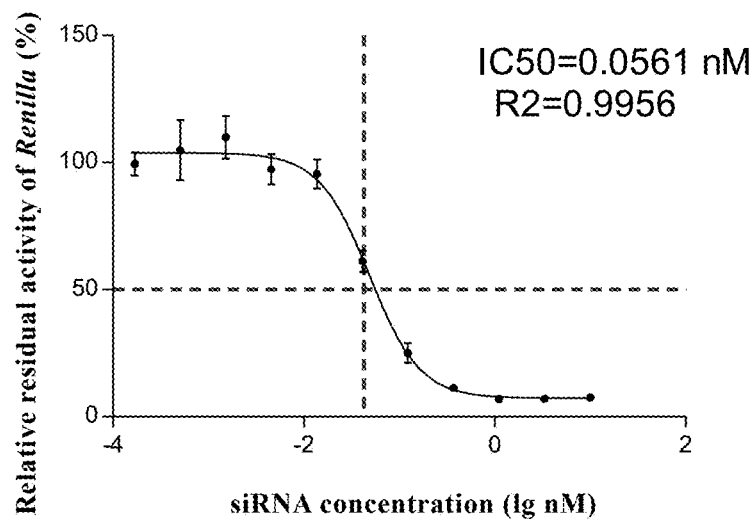
Figure 1F:
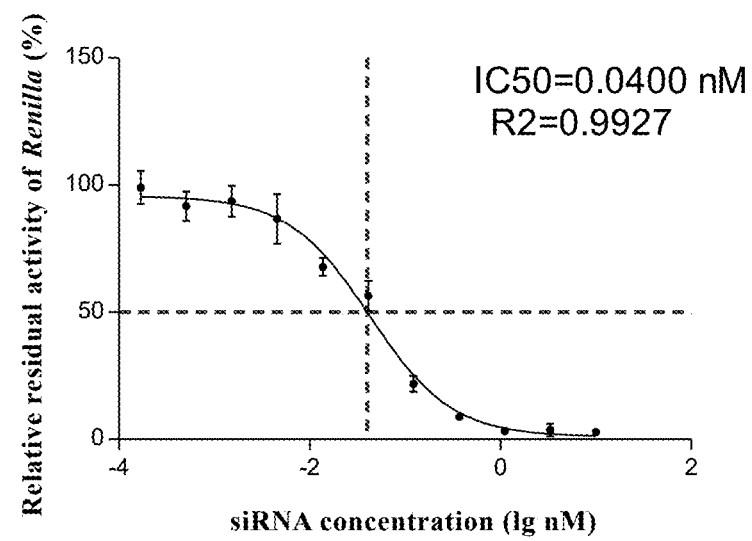

The following is the detailed description of the specific embodiments of the present disclosure. It should be understood that the specific embodiments described herein are only used to illustrate and explain the present disclosure and are not intended to limit the present disclosure.

In the present disclosure, PCSK9 mRNA is the mRNA of the sequence as shown in Genbank Accession No. NM_174936.3. Further, unless otherwise specified, the term "target gene" used in the present disclosure refers to the gene that can transcribe the above PCSK9 mRNA; and the term "target mRNA" refers to the above PCSK9 mRNA.

Definitions

In the context of the present disclosure, unless otherwise specified, C, G, U, A and T represent the base composition of a nucleotide; m represents that the nucleotide adjacent to the left side of the letter m is a methoxy modified nucleotide; f represents that the nucleotide adjacent to the left side of the letter f is a fluoro modified nucleotide; s represents the two nucleotides adjacent to both sides of the letter s are linked by a thiophosphate linkage; P1 represents that the nucleotide adjacent to the right side of P1 is a 5'-phosphate nucleotide or a 5'-phosphate analogue modified nucleotide, VP represents that the nucleotide adjacent to the right side of VP is a vinyl phosphate modified nucleotide; Ps represents that the nucleotide adjacent to the right side of Ps is a thiophosphate modified nucleotide; and P represents that the nucleotide adjacent to the right side of the letter P is a 5'-phosphate nucleotide.

In the context of the present disclosure, a "fluoro modified nucleotide" refers to a nucleotide formed by substituting 2'-hydroxy of the ribose group with a fluorine atom. A "non-fluoro modified nucleotide" refers to a nucleotide formed by substituting 2'-hydroxy of the ribose group with a non-fluoro group, or a nucleotide analogue. A "nucleotide analogue" refers to a group that can replace a nucleotide in a nucleic acid, while structurally differs from an adenine ribonucleotide, a guanine ribonucleotide, a cytosine ribonucleotide, a uracil ribonucleotide, or thymine deoxyribonucleotide, such as an isonucleotide, a bridged nucleotide (bridged nucleic acid, BNA) or an acyclic nucleotide. The "methoxy modified nucleotide" refers to a nucleotide formed by 40 substituting 2'-hydroxy of the ribose group with a methoxy group.

In the context of the present disclosure, expressions "complementary" and "reverse complementary" can be interchangeably used, and have a well-known meaning in the art, namely, the bases in one strand each are complementarily paired with those in the other strand in a double-stranded nucleic acid molecule. In DNAs, a purine base adenine (A) is always paired with a pyrimidine base thymine (T) (or a uracil (U) in RNAs); and a purine base guanine (G) is always paired with a pyrimidine base cytosine (C). Each base pair comprises a purine and a pyrimidine. While adenines in one strand are always paired with thymines (or uracils) in another strand, and guanines are always paired with cytosines, the two strands are considered as being complementary with each other; and the sequence of a strand may be deduced from the sequence of its complementary strand. Correspondingly, a "mispairing" means that the bases at corresponding positions are not present in a manner of complementary pairing in a double-stranded nucleic acid.

In the context of the present disclosure, unless otherwise specified, "basically reverse complementary" means that there are no more than 3 base mispairings between two nucleotide sequences. "Substantially reverse complementary" means that there is no more than 1 base mispairing between two nucleotide sequences. "Completely reverse complementary" means that there is no base mispairing between two nucleotide sequences.

In the context of the present disclosure, when a nucleotide sequence has a "nucleotide difference" from another nucleotide sequence, the bases of the nucleotides at the same position therebetween are changed. For example, if a nucleotide base in the latter sequence is A and the nucleotide base at the same position in the former sequence is U, C, G, or T, the two nucleotide sequences are considered as having a nucleotide difference at this position. In some embodiments, if a nucleotide at a position is replaced with an abasic nucleotide or a nucleotide analogue, it is also considered that there is a nucleotide difference at the position.

In the context of the present disclosure, particularly in the description of the siRNA, the pharmaceutical composition, or the method for preparing the siRNA conjugate of the present disclosure, unless otherwise specified, the "nucleoside monomer" refers to, according to the type and sequence of the nucleotides in the siRNA or siRNA conjugate to be prepared, unmodified or modified nucleoside phosphoramidite monomer (unmodified or modified RNA phosphoramidites; sometimes RNA phosphoramidites are referred to as nucleoside phosphoramidites) used in a phosphoramidite solid phase synthesis. The phosphoramidite solid phase synthesis is a well-known method for RNA synthesis by those skilled in the art. Nucleoside monomers used in the present disclosure are all commercially available.

In the context of the present disclosure, unless otherwise specified, "conjugation" means that two or more chemical moieties each having specific function are linked to each other via a covalent linkage. Correspondingly, a "conjugate" refers to a compound formed by covalent linkage of individual chemical moieties. Furthermore, a "siRNA conjugate" represents a compound formed by covalently attaching one or more chemical moieties each with specific functions to an siRNA. In the following text, the siRNA conjugate of the present disclosure is sometimes abbreviated as "conjugate". According to the context of the present disclosure, the siRNA conjugate should be understood as the generic term of many siRNA conjugates, or an siRNA conjugate shown by a chemical formula. In the context of the present disclosure, "conjugation molecules" should be interpreted as specific compounds capable of being conjugated to an siRNA via reactions, thereby finally forming the siRNA conjugate of the present disclosure.

As used herein, "optional" or "optionally" means that the subsequently described event or circumstance may or may not occur, and that the description includes instances in which the event or circumstance occurs and instances in which it does not. For example, "optionally substituted alkyl" encompasses both "alkyl" and "substituted alkyl" as defined below. Those skilled in the art would understand, with respect to any group containing one or more substituents, that such groups are not intended to introduce any substitution or substitution patterns that are sterically impractical, synthetically infeasible and/or inherently unstable.

As used herein, "alkyl" refers to straight chain and branched chain alkyl having the indicated number of carbon atoms, usually from 1 to 20 carbon atoms, for example 1 to 10 carbon atoms, such as 1 to 8 or 1 to 6 carbon atoms. For example, $C_1$-$C_6$ alkyl encompasses both straight and branched chain alkyl of from 1 to 6 carbon atoms. When an alkyl residue having a specific number of carbon atoms is referred to, all branched and straight chain forms having that number of carbon atoms are intended to be encompassed; thus, for example, "butyl" is meant to encompass n-butyl, sec-butyl, isobutyl, and t-butyl; "propyl" includes n-propyl and isopropyl. Alkylene is a subset of alkyl, referring to the same residues as alkyl, but having two attachment points.

As used herein, "alkenyl" refers to an unsaturated branched or straight-chain alkyl group having at least one carbon-carbon double bond obtained by repectively removing one hydrogen molecule from two adjacent carbon atoms of the parent alkyl. The group may be in either the cis or trans configuration of the double bond(s). Typical alkenyl groups include, but are not limited to, ethenyl; propenyl, such as prop-1-en-1-yl, prop-1-en-2-yl, prop-2-en-1-yl (allyl), prop-2-en-2-yl; butenyl, such as but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl; and the like. In certain embodiments, an alkenyl group has from 2 to 20 carbon atoms, and in other embodiments, from 2 to 10, 2 to 8, or 2 to 6 carbon atoms. Alkenylene is a subset of alkenyl, referring to the same residues as alkenyl, but having two attachment points.

As used herein, "alkynyl" refers to an unsaturated branched or straight-chain alkyl group having at least one carbon-carbon triple bond obtained by respectively removing two hydrogen molecules from two adjacent carbon atoms of the parent alkyl. Typical alkynyl groups include, but are not limited to, ethynyl; propynyl, such as prop-1-yn-1-yl, prop-2-yn-1-yl; butynyl, such as but-1-yn-1-yl, but-1-yn-3-yl, but-3-yn-1-yl; and the like. In certain embodiments, an alkynyl group has from 2 to 20 carbon atoms, and in other embodiments, from 2 to 10, 2 to 8, or 2 to 6 carbon atoms. Alkynylene is a subset of alkynyl, referring to the same residues as alkynyl, but having two attachment points.

As used herein, "alkoxy" refers to an alkyl group of the indicated number of carbon atoms attached through an oxygen bridge, for example, methoxy, ethoxy, propoxy, isopropoxy, n-butoxy, sec-butoxy, tert-butoxy, pentyloxy, 2-pentyloxy, isopentyloxy, neopentyloxy, hexyloxy, 2-hexyloxy, 3-hexyloxy, 3-methylpentyloxy, and the like. Alkoxy group usually has from 1 to 10, 1 to 8, 1 to 6, or 1 to 4 carbon atoms attached through oxygen bridge.

As used herein, "aryl" refers to a radical derived from an aromatic monocyclic or multicyclic hydrocarbon ring system by removing a hydrogen atom from a ring carbon atom. The aromatic monocyclic or multicyclic hydrocarbon ring system contains only a hydrogen atom and 6 to 18 carbon atoms, wherein at least one ring in the ring system is fully unsaturated, i.e., it contains a cyclic, delocalized $(4n+2)\pi$-electron system in accordance with the Hückel theory. Aryl groups include, but are not limited to, groups such as phenyl, fluorenyl, and naphthyl. Arylene is a subset of aryl, referring to the same residues as aryl, but having two attachment points.

As used herein, "halo substituent" or "halo" refers to fluoro, chloro, bromo, or iodo, and the term "halogen" includes fluorine, chlorine, bromine, or iodine.

As used herein, "haloalkyl" refers to alkyl as defined above in which the specified number of carbon atoms are substituted with one or more (up to the maximum allowable number) halogen atoms. Examples of haloalkyl include, but are not limited to, trifluoromethyl, difluoromethyl, 2-fluoroethyl, ord penta-fluoroethyl.

"Heterocyclyl" refers to a stable 3 to 18 membered non-aromatic ring radical that comprises 2 to 12 carbon atoms and 1 to 6 heteroatoms selected from nitrogen, oxygen or sulfur. Unless stated otherwise in the specification, the heterocyclyl is a monocyclic, bicyclic, tricyclic, or tetracyclic ring system, which may include fused or bridged ring system(s). The heteroatom(s) in the heterocyclyl may be optionally oxidized. One or more nitrogen atoms, if present, are optionally quaternized. The heterocyclyl is partially or fully saturated. The heterocyclyl may be attached to the rest of the molecule through any ring atom. Examples of such heterocyclyl include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxapiperazinyl, 2-oxapiperidinyl, 2-oxapyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl.

"Heteroaryl" refers to a radical derived from a 3 to 18 membered aromatic ring radical that comprises 2 to 17 carbon atoms and 1 to 6 heteroatoms selected from nitrogen, oxygen or sulfur. As used herein, the heteroaryl may be a monocyclic, bicyclic, tricyclic or tetracyclic ring system, wherein at least one ring in the ring system is fully unsaturated, i.e., it contains a cyclic, delocalized (4n+2)π-electron system in accordance with the Hückel theory. Heteroaryl includes fused or bridged ring system(s). The heteroatom(s) in the heteroaryl is optionally oxidized. One or more nitrogen atoms, if present, are optionally quaternized. The heteroaryl is attached to the rest of the molecule through any ring atom. Examples of heteroaryl include, but are not limited to, azepinyl, acridinyl, benzimidazolyl, benzindolyl, 1,3-benzodioxazolyl, benzofuranyl, benzoxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzooxazolyl, benzodioxolyl, benzodioxinyl, benzopyranyl, benzopyranonyl, benzofuranyl, benzofuranonyl, benzothienyl, benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothienyl, furanyl, furanonyl, furo[3,2-c]pyridinyl, 5,6,7,8,9,10 hexahydrocycloocta[d]pyrimidinyl, 5,6,7,8,9,10-hexahydrocyclohepta[d]pyridazinyl, 5,6,7,8,9,10-hexahydrocycloocta[d]pyridinyl, isothiazolyl, imidazolyl, indazolyl, indolyl, isoindolyl, indolinyl, isoindolinyl, isoquinolyl, indolizinyl, isoxazolyl, 5,8-methano-5,6,7,8-tetrahydroquinazolinyl, naphthyridinonyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, quinazolinyl, quinoxalinyl, quinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl and thiophenyl/thienyl.

Various hydroxyl protecting groups may be used in the present disclosure. In general, protecting groups render chemical functional groups inert to specific reaction conditions, and may be appended to and removed from such functional groups in a molecule without substantially damaging the remainder of the molecule. Representative hydroxyl protecting groups are disclosed in Beaucage et al., Tetrahedron 1992, 48, 2223-2311, and also in Greene and Wuts, Protective Groups in Organic Synthesis, Chapter 2, 2d ed, John Wiley & Sons, New York, 1991, which are respectively incorporated herein by reference in their entirety. In some embodiments, the protecting group is stable under basic conditions but may be removed under acidic conditions. In some embodiments, non-exclusive examples of the hydroxyl protecting groups that may be used herein include dimethoxytrityl (DMT), monomethoxytrityl, 9-phenylxanthen-9-yl (Pixyl) and 9-(p-methoxyphenyl)xanthen-9-yl (Mox). In some embodiments, non-exclusive examples of the hydroxyl protecting groups that may be used herein comprises Tr (trityl), MMTr (4-methoxytrityl), DMTr (4,4'-dimethoxytrityl), and TMTr (4,4',4"-trimethoxytrityl).

The term "subject", as used herein, refers to any animal, e.g., a mammal or marsupial. The subject of the present disclosure includes, but are not limited to, human, non-human primate (e.g., rhesus or other types of macaques), mouse, pig, horse, donkey, cow, sheep, rat, and any kind of poultry.

As used herein, "treatment" refers to an approach for obtaining beneficial or desirable results, including but not limited to therapeutic benefit. By "therapeutic benefit" is meant eradication or amelioration of the underlying disorder being treated. Also, a therapeutic benefit is achieved by eradicating or ameliorating one or more physiological symptoms associated with the underlying disorder, thereby observaing amelioration in the subject, although the subject may still be afflicted with the underlying disorder.

As used herein, "prevention" refers to an approach for obtaining beneficial or desirable results, including but not limited to a prophylactic benefit. In order to obtain "prophylactic benefit", the siRNA conjugates or pharmaceutical compositions may be administered to a subject at risk of developing a particular disease, or to a subject reporting one or more physiological symptoms of a disease, even a diagnosis of this disease has not been made.

In one aspect, the present disclosure provides six siRNAs capable of inhibiting the expression of PCSK9 gene.

The siRNA of the present disclosure comprises nucleotide groups as basic structural units. It is well known to those skilled in the art that the nucleotide group comprises a phosphate group, a ribose group and a base. Detailed illustrations of these groups are omitted herein.

The siRNA of the present disclosure comprises a sense strand and an antisense strand. The sense strand and the antisense strand have the same or different length, wherein the sense strand has a length of 19 to 23 nucleotides, and the antisense strand has a length of 19 to 26 nucleotides. In this case, the length ratio of the sense strand and the antisense strand of the siRNA of the present disclosurf may be 19/19, 19/20, 19/21, 19/22, 19/23, 19/24, 19/25, 19/26, 20/20, 20/21, 20/22, 20/23, 20/24, 20/25, 20/26, 21/20, 21/21, 21/22, 21/23, 21/24, 21/25, 21/26, 22/20, 22/21, 22/22, 22/23, 22/24, 22/25, 22/26, 23/20, 23/21, 23/22, 23/23, 23/24, 23/25 or 23/26. In some embodiments, the length ratio of the sense strand and the antisense strand of the siRNA is 19/21, 21/23 or 23/25.

First siRNA

According to the present disclosure, the siRNA may be a first siRNA.

The first siRNA comprises a sense strand and an antisense strand, and each nucleotide in the first siRNA is independently a modified or unmodified nucleotide, wherein the sense strand comprises a nucleotide sequence I, and the antisense strand comprises a nucleotide sequence II; the nucleotide sequence I and the nucleotide sequence II are at least partly reverse complementary to form a double-stranded region; wherein the nucleotide sequence I and the nucleotide sequence as shown by SEQ ID NO: 1 have an equal length and no more than 3 nucleotide differences, and the nucleotide sequence II and the nucleotide sequence as shown by SEQ ID NO: 2 have an equal length and no more than 3 nucleotide differences:

5'-AAGCAAGCAGACAUUUAUZ$_1$-3'; (SEQ ID NO: 1)

5'-Z$_2$AUAAAUGUCUGCUUGCUU-3', (SEQ ID NO: 2)

wherein, $Z_1$ is C and $Z_2$ is G, and the nucleotide sequence I comprises a nucleotide $Z_3$ at the position corresponding to $Z_1$; the nucleotide sequence II comprises a nucleotide $Z_4$ at the position corresponding to $Z_2$, wherein $Z_4$ is the first nucleotide at 5' terminal of the antisense strand;

In the context of the present disclosure, "corresponding position" refers to, the same position in the nucleotide sequence when counting from the same terminal of the nucleotide sequence. For example, the first nucleotide at 3' terminal of the nucleotide sequence I is a nucleotide at the position corresponding to the first nucleotide at 3' terminal of SEQ ID NO: 1.

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 1 have no more than 1 nucleotide difference, and/or the nucleotide sequence II and the nucleotide sequence as shown by SEQ ID NO: 2 have no more than 1 nucleotide difference.

In some embodiments, the nucleotide difference between the nucleotide sequence II and the nucleotide sequence as shown by SEQ ID NO: 2 includes a difference at the position $Z_4$, wherein $Z_4$ is selected from A, U or C. In some embodiments, the nucleotide difference is a difference at the position $Z_4$, wherein $Z_4$ is selected from A, U or C. In some embodiments, $Z_3$ is a nucleotide complementary to $Z_4$. The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I and the nucleotide sequence II are basically reverse complementary, substantially reverse complementary, or completely reverse complementary to each other; the "basically reverse complementary" means that there is no more than 3 base mispairings between two nucleotide sequences; the "substantially reverse complementary" means that there is no more than 1 base mispairing between two nucleotide sequences; the "completely reverse complementary" means that there is no mispairing between two nucleotide sequences.

In some embodiments, the nucleotide sequence I is the nucleotide sequence as shown by SEQ ID NO: 3, and the nucleotide sequence II is the nucleotide sequence as shown by SEQ ID NO: 4:

5'-AAGCAAGCAGACAUUUAUZ$_3$-3'; (SEQ ID NO: 3)

5'-Z$_4$AUAAAUGUCUGCUUGCUU-3', (SEQ ID NO: 4)

wherein, $Z_4$ is the first nucleotide at 5' terminal of the antisense strand, $Z_3$ is selected from A, U, G, or C, and $Z_4$ is a nucleotide complementary to $Z_3$; in some embodiments, $Z_3$ is C, and $Z_4$ is G.

In some embodiments, the sense strand further comprises a nucleotide sequence III, the antisense strand further comprises a nucleotide sequence IV, and the nucleotide sequence III and the nucleotide sequence IV independently of one another have a length of 1 to 4 nucleotides; the nucleotide sequence III and the nucleotide sequence IV have an equal length, and are substantially reverse complementary or completely reverse complementary to each other; the nucleotide sequence III is linked to 5' terminal of the nucleotide sequence I, the nucleotide sequence IV is linked to 3' terminal of the nucleotide sequence II. In some embodiments, the nucleotide sequence IV and a second nucleotide sequence are substantially reverse complementary or completely reverse complementary to each other; the second nucleotide sequence refers to a nucleotide sequence that is adjacent to 5' terminal of the nucleotide sequence shown in SEQ ID NO: 1 of the target mRNA and has the same length as the nucleotide sequence IV.

In some embodiments, the nucleotide sequence III and the nucleotide sequence IV both have a length of 1 nucleotide, and the base of the nucleotide sequence III is C, and the base of the nucleotide sequence IV is G; in this case, the length ratio of the sense strand and the antisense strand thereof is 20/20; or, the nucleotide sequence III and the nucleotide sequence IV both have a length of 2 nucleotides, and in the direction from 5' terminal to 3' terminal, the base composition of the nucleotide sequence III is CC, and the base composition of the nucleotide sequence IV is GG; in this case, the length ratio of the sense strand and the antisense strand thereof is 21/21; or, the nucleotide sequence III and the nucleotide sequence IV both have a length of 3 nucleotides, and in the direction from 5' terminal to 3' terminal, the base composition of the nucleotide sequence III is CCC, and the base composition of the nucleotide sequence IV is GGG; in this case, the length ratio of the sense strand and the antisense strand thereof is 22/22; or, the nucleotide sequence III and the nucleotide sequence IV both have a length of 4 nucleotides, and in the direction from 5' terminal to 3' terminal, the base composition of the nucleotide sequence III is ACCC, and the base composition of the nucleotide sequence IV is GGGU; in this case, the length ratio of the sense strand and the antisense strand thereof is 23/23. In some embodiments, the nucleotide sequence III and the nucleotide sequence IV have a length of 2 nucleotides, and in the direction from 5' terminal to 3' terminal, the base composition of the nucleotide sequence III is CC and the base composition of the nucleotide sequence IV is GG; in this case, the length ratio of the sense strand and the antisense strand thereof is 21/21.

In some embodiments, the nucleotide sequence III and the nucleotide sequence IV are completely reverse complementary. Hence, where the base(s) of nucleotide sequence III is(are) provided, the base(s) of nucleotide sequence IV is(are) also determined.

Second siRNA

According to the present disclosure, the siRNA may be a second siRNA.

The second siRNA comprises a sense strand and an antisense strand, and each nucleotide in the second siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; wherein, the nucleotide sequence I and the nucleotide sequence as shown by SEQ ID NO: 61 have an equal length and no more than 3 nucleotide differences, and the nucleotide sequence II and the nucleotide sequence as shown by SEQ ID NO: 62 have an equal length and no more than 3 nucleotide differences:

(SEQ ID NO: 61)
5'-UUUGUAGCAUUUUUAUUAZ$_5$-3';

(SEQ ID NO: 62)
5'-Z$_6$UAAUAAAAAUGCUACAAA-3', wherein, $Z_5$ is A and $Z_6$ is U, and the nucleotide sequence I comprises a nucleotide $Z_7$ at the position corresponding to $Z_5$; the nucleotide sequence II comprises a nucleotide $Z_8$ at the position corresponding to $Z_6$, wherein $Z_8$ is the first nucleotide at 5' terminal of the antisense strand;

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 61 have no more than 1 nucleotide difference, and/or the nucleotide sequence II and the nucleotide sequence as shown by SEQ ID NO: 62 have no more than 1 nucleotide difference.

In some embodiments, the nucleotide difference between the nucleotide sequence II and the nucleotide sequence as shown by SEQ ID NO: 62 includes a difference at the position $Z_8$, wherein $Z_8$ is selected from A, C or G. In some embodiments, the nucleotide difference is a difference at the position $Z_8$, wherein $Z_8$ is selected from A, C or G. In some embodiments, $Z_7$ is a nucleotide complementary to $Z_8$. The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I and the nucleotide sequence II are basically reverse complementary, substantially reverse complementary, or completely reverse complementary to each other.

In some embodiments, the nucleotide sequence I is the nucleotide sequence as shown by SEQ ID NO: 63, and the nucleotide sequence II is the nucleotide sequence as shown by SEQ ID NO: 64:

(SEQ ID NO: 63)
5'-UUUGUAGCAUUUUUAUUAZ$_7$-3';

(SEQ ID NO: 64)
5'-Z$_8$UAAUAAAAAUGCUACAAA-3', wherein, $Z_8$ is the first nucleotide at 5' terminal of the antisense strand, $Z_7$ is selected from A, U, G, or C, and $Z_8$ is a nucleotide complementary to $Z_7$; in some embodiments, $Z_7$ is A, and $Z_8$ is U.

In some embodiments, the sense strand further comprises a nucleotide sequence III, the antisense strand further comprises a nucleotide sequence IV, and the nucleotide sequence III and the nucleotide sequence IV independently of one another have a length of 1 to 4 nucleotides; the nucleotide sequence III and the nucleotide sequence IV have an equal length, and are substantially reverse complementary or completely reverse complementary to each other; the nucleotide sequence III is linked to 5' terminal of the nucleotide sequence I, the nucleotide sequence IV is linked to 3' terminal of the nucleotide sequence II; the nucleotide sequence IV and a second nucleotide sequence are substantially reverse complementary or completely reverse complementary to each other; the second nucleotide sequence refers to a nucleotide sequence that is adjacent to 5' terminal of the nucleotide sequence shown in SEQ ID NO: 61 of the target mRNA and has the same length as the nucleotide sequence IV.

In some embodiments, the nucleotide sequence III and the nucleotide sequence IV both have a length of 1 nucleotide, and the base of the nucleotide sequence III is U, and the base of the nucleotide sequence IV is A; in this case, the length ratio of the sense strand and the antisense strand thereof is 20/20; or, the nucleotide sequence III and the nucleotide sequence IV both have a length of 2 nucleotides, and in the direction from 5' terminal to 3' terminal, the base composition of the nucleotide sequence III is GU, and the base composition of the nucleotide sequence IV is AC; in this case, the length ratio of the sense strand and the antisense strand thereof is 21/21; or, the nucleotide sequence III and the nucleotide sequence IV both have a length of 3 nucleotides, and in the direction from 5' terminal to 3' terminal, the base composition of the nucleotide sequence III is GGU, and the base composition of the nucleotide sequence IV is ACC; in this case, the length ratio of the sense strand and the antisense strand thereof is 22/22; or, the nucleotide sequence III and the nucleotide sequence IV both have a length of 4 nucleotides, and in the direction from 5' terminal to 3' terminal, the base composition of the nucleotide sequence III is GGGU and the base composition of the nucleotide sequence IV is ACCC; in this case, the length ratio of the sense strand and the antisense strand thereof is 23/23. In some embodiments, the nucleotide sequence III and the nucleotide sequence IV have a length of 2 nucleotides, and in the direction from 5' terminal to 3' terminal, the base composition of the nucleotide sequence III is GU, and the base composition of the nucleotide sequence IV is AC; in this case, the length ratio of the sense strand and the antisense strand thereof is 21/21.

In some embodiments, the nucleotide sequence III and the nucleotide sequence IV are completely reverse complementary. Hence, where the base(s) of nucleotide sequence III is(are) provided, the base(s) of nucleotide sequence IV is(are) also determined.

Third siRNA

According to the present disclosure, the siRNA may be a third siRNA.

The third siRNA comprises a sense strand and an antisense strand, and each nucleotide in the third siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; wherein the nucleotide sequence I and the nucleotide sequence as shown by SEQ ID NO: 121 have an equal length and no more than 3 nucleotide differences, and the nucleotide sequence II and the nucleotide sequence as shown by SEQ ID NO: 122 have an equal length and no more than 3 nucleotide differences:

(SEQ ID NO: 121)
5'-GCCUGGAGUUUAUUCGGAZ$_9$-3';

(SEQ ID NO: 122)
5'-Z$_{10}$UCCGAAUAAACUCCAGGC-3', wherein, $Z_9$ is A and $Z_{10}$ is U, and the nucleotide sequence I comprises a nucleotide $Z_{11}$ at the position corresponding to $Z_9$; the nucleotide sequence II comprises a nucleotide $Z_{12}$ at the position corresponding to $Z_{10}$, wherein $Z_{12}$ is the first nucleotide at 5' terminal of the antisense strand;

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 121 have no more than 1 nucleotide difference, and/or the nucleotide sequence II and the nucleotide sequence as shown by SEQ ID NO: 122 have no more than 1 nucleotide difference.

In some embodiments, the nucleotide difference between the nucleotide sequence II and the nucleotide sequence as shown by SEQ ID NO: 122 includes a difference at the position $Z_{12}$, wherein $Z_{12}$ is selected from A, C or G. In some embodiments, the nucleotide difference is a difference at the position $Z_{12}$, wherein $Z_{12}$ is selected from A, C or G. In some embodiments, $Z_{11}$ is a nucleotide complementary to $Z_{12}$. The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I and the nucleotide sequence II are basically reverse complementary, substantially reverse complementary, or completely reverse complementary to each other.

In some embodiments, the nucleotide sequence I is the nucleotide sequence as shown by SEQ ID NO: 123, and the nucleotide sequence II is the nucleotide sequence as shown by SEQ ID NO: 124:

```
                                     (SEQ ID NO: 123)
5'-GCCUGGAGUUUAUUCGGAZ₁₁-3';

(SEQ ID NO: 124)
5'-Z₁₂UCCGAAUAAACUCCAGGC-3',
``` wherein, $Z_{12}$ is the first nucleotide at 5' terminal of the antisense strand, $Z_{11}$ is selected from A, U, G, or C, and $Z_{12}$ is a nucleotide complementary to $Z_{11}$; in some embodiments, $Z_{11}$ is A, and $Z_{12}$ is U.

In some embodiments, the sense strand further comprises a nucleotide sequence III, the antisense strand further comprises a nucleotide sequence IV, and the nucleotide sequence III and the nucleotide sequence IV independently of one another have a length of 1 to 4 nucleotides; the nucleotide sequence III and the nucleotide sequence IV have an equal length, and are substantially reverse complementary or completely reverse complementary to each other; the nucleotide sequence III is linked to 5' terminal of the nucleotide sequence I, the nucleotide sequence IV is linked to 3' terminal of the nucleotide sequence II; the nucleotide sequence IV and a second nucleotide sequence are substantially reverse complementary or completely reverse complementary to each other; the second nucleotide sequence refers to a nucleotide sequence that is adjacent to 5' terminal of the nucleotide sequence shown in SEQ ID NO: 121 of the target mRNA and has the same length as the nucleotide sequence IV.

In some embodiments, the nucleotide sequence III and the nucleotide sequence IV both have a length of 1 nucleotide, and the base of the nucleotide sequence III is G, and the base of the nucleotide sequence IV is C; in this case, the length ratio of the sense strand and the antisense strand thereof is 20/20; or, the nucleotide sequence III and the nucleotide sequence IV both have a length of 2 nucleotides, and in the direction from 5' terminal to 3' terminal, the base composition of the nucleotide sequence III is AG, and the base composition of the nucleotide sequence IV is CU; in this case, the length ratio of the sense strand and the antisense strand thereof is 21/21; or, the nucleotide sequence III and the nucleotide sequence IV both have a length of 3 nucleotides, and in the direction from 5' terminal to 3' terminal, the base composition of the nucleotide sequence III is UAG, and the base composition of the nucleotide sequence IV is CUA; in this case, the length ratio of the sense strand and the antisense strand thereof is 22/22; or, the nucleotide sequence III and the nucleotide sequence IV both have a length of 4 nucleotides, and in the direction from 5' terminal to 3' terminal, the base composition of the nucleotide sequence III is AUAG, and the base composition of the nucleotide sequence IV is CUAU; in this case, the length ratio of the sense strand and the antisense strand thereof is 23/23. In some embodiments, the nucleotide sequence III and the nucleotide sequence IV have a length of 2 nucleotides, and in the direction from 5' terminal to 3' terminal, the base composition of the nucleotide sequence III is AG, and the base composition of the nucleotide sequence IV is CU; in this case, the length ratio of the sense strand and the antisense strand thereof is 21/21.

In some embodiments, the nucleotide sequence III and the nucleotide sequence IV are completely reverse complementary. Hence, where the base(s) of nucleotide sequence III is(are) provided, the base(s) of nucleotide sequence IV is(are) also determined.

Fourth siRNA

According to the present disclosure, the siRNA may be a fourth siRNA.

The fourth siRNA comprises a sense strand and an antisense strand, and each nucleotide in the fourth siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; wherein, the nucleotide sequence I and the nucleotide sequence as shown by SEQ ID NO: 181 have an equal length and no more than 3 nucleotide differences, and the nucleotide sequence II and the nucleotide sequence as shown by SEQ ID NO: 182 have an equal length and no more than 3 nucleotide differences:

```
                                     (SEQ ID NO: 181)
5'-CUGUUUUGCUUUUGUAACZ₁₃-3';

(SEQ ID NO: 182)
5'-Z₁₄GUUACAAAAGCAAAACAG-3',
``` wherein, $Z_{13}$ is U and $Z_{14}$ is A, and
the nucleotide sequence I comprises a nucleotide $Z_{15}$ at the position corresponding to $Z_{13}$, the nucleotide sequence II comprises a nucleotide $Z_{16}$ at the position corresponding to $Z_{14}$, wherein $Z_{16}$ is the first nucleotide at 5' terminal of the antisense strand.

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 181 have no more than 1 nucleotide difference, and/or the nucleotide sequence II and the nucleotide sequence as shown by SEQ ID NO: 182 have no more than 1 nucleotide difference.

In some embodiments, the nucleotide difference between the nucleotide sequence II and the nucleotide sequence as shown by SEQ ID NO: 182 includes a difference at the position $Z_{16}$, wherein $Z_{16}$ is selected from U, C or G. In some embodiments, the nucleotide difference is a difference at the position $Z_{16}$, wherein $Z_{16}$ is selected from U, C or G. In some embodiments, $Z_{15}$ is a nucleotide complementary to $Z_{16}$. The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I and the nucleotide sequence II are basically reverse complementary, substantially reverse complementary, or completely reverse complementary to each other.

In some embodiments, the nucleotide sequence I is the nucleotide sequence as shown by SEQ ID NO: 183, and the nucleotide sequence II is the nucleotide sequence as shown by SEQ ID NO: 184:

```
                                        (SEQ ID NO: 183)
5'-CUGUUUUGCUUUUGUAACZ₁₅-3';

(SEQ ID NO: 184)
5'-Z₁₆GUUACAAAAGCAAAACAG-3',
``` wherein, $Z_{16}$ is the first nucleotide at 5' terminal of the antisense strand, $Z_{15}$ is selected from A, U, G, or C, and $Z_{16}$ is a nucleotide complementary to $Z_{15}$; in some embodiments, $Z_{15}$ is U, and $Z_{16}$ is A.

In some embodiments, the sense strand further comprises a nucleotide sequence III, the antisense strand further comprises a nucleotide sequence IV, and the nucleotide sequence III and the nucleotide sequence IV independently of one another have a length of 1 to 4 nucleotides; the nucleotide sequence III and the nucleotide sequence IV have an equal length, and are substantially reverse complementary or completely reverse complementary to each other; the nucleotide sequence III is linked to 5' terminal of the nucleotide sequence I, the nucleotide sequence IV is linked to 3' terminal of the nucleotide sequence II; the nucleotide sequence IV and a second nucleotide sequence are substantially reverse complementary or completely reverse complementary to each other; the second nucleotide sequence refers to a nucleotide sequence that is adjacent to 5' terminal of the nucleotide sequence shown in SEQ ID NO: 181 of the target mRNA and has the same length as the nucleotide sequence IV.

In some embodiments, the nucleotide sequence III and the nucleotide sequence IV both have a length of 1 nucleotide, and the base of the nucleotide sequence III is C, and the base of the nucleotide sequence IV is G; in this case, the length ratio of the sense strand and the antisense strand thereof is 20/20; or, the nucleotide sequence III and the nucleotide sequence IV both have a length of 2 nucleotides, and in the direction from 5' terminal to 3' terminal, the base composition of the nucleotide sequence III is AC, and the base composition of the nucleotide sequence IV is GU; in this case, the length ratio of the sense strand and the antisense strand thereof is 21/21; or, the nucleotide sequence III and the nucleotide sequence IV both have a length of 3 nucleotides, and in the direction from 5' terminal to 3' terminal, the base composition of the nucleotide sequence III is GAC, and the base composition of the nucleotide sequence IV is GUC; in this case, the length ratio of the sense strand and the antisense strand thereof is 22/22; or, the nucleotide sequence III and the nucleotide sequence IV both have a length of 4 nucleotides, and in the direction from 5' terminal to 3' terminal, the base composition of the nucleotide sequence III is AGAC, and the base composition of the nucleotide sequence IV is GUCU; in this case, the length ratio of the sense strand and the antisense strand thereof is 23/23. In some embodiments, the nucleotide sequence III and the nucleotide sequence IV have a length of 2 nucleotides, and in the direction from 5' terminal to 3' terminal, the base composition of the nucleotide sequence III is AC, and the base composition of the nucleotide sequence IV is GU; in this case, the length ratio of the sense strand and the antisense strand thereof is 21/21.

In some embodiments, the nucleotide sequence III and the nucleotide sequence IV are completely reverse complementary. Hence, where the base(s) of nucleotide sequence III is(are) provided, the base(s) of nucleotide sequence IV is(are) also determined.

Fifth siRNA

According to the present disclosure, the siRNA may be a fifth siRNA.

The fifth siRNA comprises a sense strand and an antisense strand, and each nucleotide in the fifth siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; wherein, the nucleotide sequence I and the nucleotide sequence as shown by SEQ ID NO: 241 have an equal length and no more than 3 nucleotide differences, and the nucleotide sequence II and the nucleotide sequence as shown by SEQ ID NO: 242 have an equal length and no more than 3 nucleotide differences:

```
                                        (SEQ ID NO: 241)
5'-GGUUUUGUAGCAUUUUUAZ₁₇-3';

(SEQ ID NO: 242)
5'-Z₁₈UAAAAAUGCUACAAAACC-3',
``` wherein, $Z_{17}$ is U and $Z_{18}$ is A, and
the nucleotide sequence I comprises a nucleotide $Z_{19}$ at the position corresponding to $Z_{17}$, the nucleotide sequence II comprises a nucleotide $Z_{20}$ at the position corresponding to $Z_{18}$, wherein $Z_{20}$ is the first nucleotide at 5' terminal of the antisense strand.

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 241 have no more than 1 nucleotide difference, and/or the nucleotide sequence II and the nucleotide sequence as shown by SEQ ID NO: 242 have no more than 1 nucleotide difference.

In some embodiments, the nucleotide difference between the nucleotide sequence II and the nucleotide sequence as shown by SEQ ID NO: 242 includes a difference at the position $Z_{20}$, wherein $Z_{20}$ is selected from U, C or G. In some embodiments, the nucleotide difference is a difference at the position $Z_{20}$, wherein $Z_{20}$ is selected from U, C or G. In some embodiments, $Z_{19}$ is a nucleotide complementary to $Z_{20}$. The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I and the nucleotide sequence II are basically reverse complementary, substantially reverse complementary, or completely reverse complementary to each other.

In some embodiments, the nucleotide sequence I is the nucleotide sequence as shown by SEQ ID NO: 243, and the nucleotide sequence II is the nucleotide sequence as shown by SEQ ID NO: 244:

```
                                            (SEQ ID NO: 243)
            5'-GGUUUUGUAGCAUUUUUAZ₁₉-3';

(SEQ ID NO: 244)
            5'-Z₂₀UAAAAAUGCUACAAAACC-3',
``` wherein, $Z_{20}$ is the first nucleotide at 5' terminal of the antisense strand, $Z_{19}$ is selected from A, U, G, or C, and $Z_{20}$ is a nucleotide complementary to $Z_{19}$; in some embodiments, $Z_{19}$ is U, and $Z_{20}$ is A.

In some embodiments, the sense strand further comprises a nucleotide sequence III, the antisense strand further comprises a nucleotide sequence IV, and the nucleotide sequence III and the nucleotide sequence IV independently of one another have a length of 1 to 4 nucleotides; the nucleotide sequence III and the nucleotide sequence IV have an equal length, and are substantially reverse complementary or completely reverse complementary to each other; the nucleotide sequence III is linked to 5' terminal of the nucleotide sequence I, the nucleotide sequence IV is linked to 3' terminal of the nucleotide sequence II; the nucleotide sequence IV and a second nucleotide sequence are substantially reverse complementary or completely reverse complementary to each other; the second nucleotide sequence refers to a nucleotide sequence that is adjacent to 5' terminal of the nucleotide sequence shown in SEQ ID NO: 241 of the target mRNA and has the same length as the nucleotide sequence IV.

In some embodiments, the nucleotide sequence III and the nucleotide sequence IV both have a length of 1 nucleotide, and the base of the nucleotide sequence III is G, and the base of the nucleotide sequence IV is C; in this case, the length ratio of the sense strand and the antisense strand thereof is 20/20; or, the nucleotide sequence III and the nucleotide sequence IV both have a length of 2 nucleotides, and in the direction from 5' terminal to 3' terminal, the base composition of the nucleotide sequence III is UG, and the base composition of the nucleotide sequence IV is CA; in this case, the length ratio of the sense strand and the antisense strand thereof is 21/21; or, the nucleotide sequence III and the nucleotide sequence IV both have a length of 3 nucleotides, and in the direction from 5' terminal to 3' terminal, the base composition of the nucleotide sequence III is CUG, and the base composition of the nucleotide sequence IV is CAG; in this case, the length ratio of the sense strand and the antisense strand thereof is 22/22; or, the nucleotide sequence III and the nucleotide sequence IV both have a length of 4 nucleotides, and in the direction from 5' terminal to 3' terminal, the base composition of the nucleotide sequence III is UCUG, and the base composition of the nucleotide sequence IV is CAGA; in this case, the length ratio of the sense strand and the antisense strand thereof is 23/23. In some embodiments, the nucleotide sequence III and the nucleotide sequence IV have a length of 2 nucleotides, and in the direction from 5' terminal to 3' terminal, the base composition of the nucleotide sequence III is UG, and the base composition of the nucleotide sequence IV is CA; in this case, the length ratio of the sense strand and the antisense strand thereof is 21/21.

In some embodiments, the nucleotide sequence III and the nucleotide sequence IV are completely reverse complementary. Hence, where the base(s) of nucleotide sequence III is(are) provided, the base(s) of nucleotide sequence IV is(are) also determined.

Sixth siRNA

According to the present disclosure, the siRNA may be a sixth siRNA.

The sixth siRNA comprises a sense strand and an antisense strand, and each nucleotide in the sixth siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; wherein, the nucleotide sequence I and the nucleotide sequence as shown by SEQ ID NO: 301 have an equal length and no more than 3 nucleotide differences, and the nucleotide sequence II and the nucleotide sequence as shown by SEQ ID NO: 302 have an equal length and no more than 3 nucleotide differences:

```
                                            (SEQ ID NO: 301)
            5'-GUGACUUUUUAAAAUAAAZ₂₁-3';

(SEQ ID NO: 302)
            5'-Z₂₂UUUAUUUUAAAAAGUCAC-3',
``` wherein, $Z_{21}$ is A and $Z_{22}$ is U, and
the nucleotide sequence I comprises a nucleotide $Z_{23}$ at the position corresponding to $Z_{21}$, the nucleotide sequence II comprises a nucleotide $Z_{24}$ at the position corresponding to $Z_{22}$, wherein $Z_{24}$ is the first nucleotide at 5' terminal of the antisense strand.

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 301 have no more than 1 nucleotide difference, and/or the nucleotide sequence II and the nucleotide sequence as shown by SEQ ID NO: 302 have no more than 1 nucleotide difference.

In some embodiments, the nucleotide difference between the nucleotide sequence II and the nucleotide sequence as shown by SEQ ID NO: 302 includes a difference at the position $Z_{24}$, wherein $Z_{24}$ is selected from A, C or G. In some embodiments, the nucleotide difference is a difference at the position $Z_{24}$, wherein $Z_{24}$ is selected from A, C or G. In some embodiments, $Z_{23}$ is a nucleotide complementary to $Z_{24}$. The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I and the nucleotide sequence II are basically reverse complementary, substantially reverse complementary, or completely reverse complementary to each other.

In some embodiments, the nucleotide sequence I is the nucleotide sequence as shown by SEQ ID NO: 303, and the nucleotide sequence II is the nucleotide sequence as shown by SEQ ID NO: 304:

```
                                            (SEQ ID NO: 303)
            5'-GUGACUUUUUAAAAUAAAZ₂₃-3';

(SEQ ID NO: 304)
            5'-Z₂₄UUUAUUUUAAAAAGUCAC-3',
``` wherein, $Z_{24}$ is the first nucleotide at 5' terminal of the antisense strand, $Z_{23}$ is selected from A, U, G, or C, and $Z_{24}$ is a nucleotide complementary to $Z_{23}$; in some embodiments, $Z_{23}$ is A, and $Z_{24}$ is U.

In some embodiments, the sense strand further comprises a nucleotide sequence III, the antisense strand further comprises a nucleotide sequence IV, and the nucleotide sequence III and the nucleotide sequence IV independently of one another have a length of 1 to 4 nucleotides; the nucleotide sequence III and the nucleotide sequence IV have an equal length, and are substantially reverse complementary or completely reverse complementary to each other; the nucleotide sequence III is linked to 5' terminal of the nucleotide sequence I, the nucleotide sequence IV is linked to 3' terminal of the nucleotide sequence II; the nucleotide sequence IV and a second nucleotide sequence are substantially reverse complementary or completely reverse complementary to each other; the second nucleotide sequence refers to a nucleotide sequence that is adjacent to 5' terminal of the nucleotide sequence shown in SEQ ID NO: 301 of the target mRNA and has the same length as the nucleotide sequence IV.

In some embodiments, the nucleotide sequence III and the nucleotide sequence IV both have a length of 1 nucleotide, and the base of the nucleotide sequence III is G, and the base of the nucleotide sequence IV is C; in this case, the length ratio of the sense strand and the antisense strand thereof is 20/20; or, the nucleotide sequence III and the nucleotide sequence IV both have a length of 2 nucleotides, and in the direction from 5' terminal to 3' terminal, the base composition of the nucleotide sequence III is UG, and the base composition of the nucleotide sequence IV is CA; in this case, the length ratio of the sense strand and the antisense strand thereof is 21/21; or, the nucleotide sequence III and the nucleotide sequence IV both have a length of 3 nucleotides, and in the direction from 5' terminal to 3' terminal, the base composition of the nucleotide sequence III is AUG, and the base composition of the nucleotide sequence IV is CAU; in this case, the length ratio of the sense strand and the antisense strand thereof is 22/22; or, the nucleotide sequence III and the nucleotide sequence IV both have a length of 4 nucleotides, and in the direction from 5' terminal to 3' terminal, the base composition of the nucleotide sequence III is UAUG, and the base composition of the nucleotide sequence IV is CAUA; in this case, the length ratio of the sense strand and the antisense strand thereof is 23/23. In some embodiments, the nucleotide sequence III and the nucleotide sequence IV have a length of 2 nucleotides, and in the direction from 5' terminal to 3' terminal, the base composition of the nucleotide sequence III is UG, and the base composition of the nucleotide sequence IV is CA; in this case, the length ratio of the sense strand and the antisense strand thereof is 21/21.

In some embodiments, the nucleotide sequence III and the nucleotide sequence IV are completely reverse complementary. Hence, where the base(s) of nucleotide sequence III is(are) provided, the base(s) of nucleotide sequence IV is(are) also determined.

Overhang Terminal and Modification of siRNA

The following description regarding the nucleotide sequence V, the nucleic acid sequence, or the nucleotide modification and the modified sequence of the siRNA is applicable to any one of the first siRNA to the sixth siRNA. Namely, unless stated otherwise, the following description of the siRNA should be regarded as the description of each of the first, second, third, fourth, fifth and sixth siRNAs. For example, if no particular siRNA is specifically indicated, "the siRNA further comprises a nucleotide sequence V" means that "the first siRNA, the second siRNA, the third siRNA, the fourth siRNA, the fifth siRNA and the sixth siRNA further comprise a nucleotide sequence V".

In some embodiments, the sense strand and the antisense strand have the same or different length, and the antisense strand further comprises a nucleotide sequence V. The nucleotide sequence V has a length of 1 to 3 nucleotides and is linked to 3' terminal of the antisense strand, thereby forming a 3' overhang terminal of the antisense strand. In this case, the length ratio of the sense strand and the antisense strand of the siRNA of the present disclosure may be 19/20, 19/21, 19/22, 20/21, 20/22, 20/23, 21/22, 21/23, 21/24, 22/23, 22/24, 22/25, 23/24, 23/25, or 23/26. In some embodiments, the nucleotide sequence V has a length of 2 nucleotides. Thus, the length ratio of the sense strand and the antisense strand of the siRNA of the present disclosure may be 19/21, 21/23 or 23/25.

Each nucleotide in the nucleotide sequence V may be any nucleotide. In order to facilitate the synthesis and to save synthesis cost, the nucleotide sequence V is 2 consecutive thymine deoxyribonucleotides (dTdT) or 2 consecutive uracil ribonucleotides (UU); in order to enhance the affinity between the antisense strand of the siRNA and the target mRNA, the nucleotide sequence V is complementary to the nucleotides at the corresponding positions of the target mRNA. Thus, in some embodiments, the length ratio of the sense strand and the antisense strand of the siRNA of the present disclosure is 19/21 or 21/23. In this case, the siRNA of the present disclosure exhibits better mRNA silencing activity.

The nucleotides at the corresponding positions of the target mRNA refer to the nucleotides or nucleotide sequence adjacent to 5' terminal of a third nucleotide sequence of the target mRNA. This third nucleotide sequence refers to the segment of the nucleotide sequence which is substantially reverse complementary or completely reverse complementary with the nucleotide sequence II, or is substantially reverse complementary or completely reverse complementary with the nucleotide sequence consisted of the nucleotide sequence II and the nucleotide sequence IV.

In some embodiments, for the first siRNA, the sense strand of the siRNA comprises the nucleotide sequence as shown by SEQ ID NO: 5, and the antisense strand comprises the nucleotide sequence as shown by SEQ ID NO: 6:

(SEQ ID NO: 5)
5'-AAGCAAGCAGACAUUUAUZ$_3$-3';

(SEQ ID NO: 6)
5'-Z$_4$AUAAAUGUCUGCUUGCUUGG-3';

Alternatively, the sense strand of the siRNA comprises the nucleotide sequence as shown by SEQ ID NO: 7, and the antisense strand comprises the nucleotide sequence as shown by SEQ ID NO: 8:

(SEQ ID NO: 7)
5'-CCAAGCAAGCAGACAUUUAUZ$_3$-3';

(SEQ ID NO: 8)
5'-Z$_4$AUAAAUGUCUGCUUGCUUGGGU-3';

wherein, $Z_4$ is the first nucleotide at 5' terminal of the antisense strand; $Z_3$ is selected from A, U, G or C, and $Z_4$ is a nucleotide complementary to $Z_3$.

In some embodiments, for the second siRNA, the sense strand of the siRNA comprises the nucleotide sequence as shown by SEQ ID NO: 65, and the antisense strand comprises the nucleotide sequence as shown by SEQ ID NO: 66:

(SEQ ID NO: 65)
5'-UUUGUAGCAUUUUUAUUAZ$_7$-3';

(SEQ ID NO: 66)
5'-Z$_8$UAAUAAAAAUGCUACAAAAC-3',

Alternatively, the sense strand of the siRNA comprises the nucleotide sequence as shown by SEQ ID NO: 67, and the antisense strand of the siRNA comprises the nucleotide sequence as shown by SEQ ID NO: 68:

(SEQ ID NO: 67)
55'-GUUUUGUAGCAUUUUUAUUAZ$_7$-3';

(SEQ ID NO: 68)
5'-Z$_8$UAAUAAAAAUGCUACAAAACCC-3', wherein, $Z_8$ is the first nucleotide at 5' terminal of the antisense strand; $Z_7$ is selected from A, U, G or C, and $Z_8$ is a nucleotide complementary to $Z_7$.

In some embodiments, for the third siRNA, the sense strand of the siRNA comprises the nucleotide sequence as shown by SEQ ID NO: 125, and the antisense strand of the siRNA comprises the nucleotide sequence as shown by SEQ ID NO: 126:

(SEQ ID NO: 125)
5'-GCCUGGAGUUUAUUCGGAZ$_{11}$-3';

(SEQ ID NO: 126)
5'-Z$_{12}$UCCGAAUAAACUCCAGGCCU-3',

Alternatively, the sense strand of the siRNA comprises the nucleotide sequence as shown by SEQ ID NO: 127, and the antisense strand of the siRNA comprises the nucleotide sequence as shown by SEQ ID NO: 128:

(SEQ ID NO: 127)
5'-AGGCCUGGAGUUUAUUCGGAZ$_{11}$-3';

(SEQ ID NO: 128)
5'-Z$_{12}$UCCGAAUAAACUCCAGGCCUAU-3', wherein, $Z_{12}$ is the first nucleotide at 5' terminal of the antisense strand; $Z_{11}$ is selected from A, U, G or C, and $Z_{12}$ is a nucleotide complementary to $Z_{11}$.

In some embodiments, for the fourth siRNA, the sense strand of the siRNA comprises the nucleotide sequence as shown by SEQ ID NO: 185, and the antisense strand of the siRNA comprises the nucleotide sequence as shown by SEQ ID NO: 186:

(SEQ ID NO: 185)
5'-CUGUUUUGCUUUUGUAACZ$_{15}$-3';

(SEQ ID NO: 186)
5'-Z$_{16}$GUUACAAAAGCAAAACAGGU-3',

Alternatively, the sense strand of the siRNA comprises the nucleotide sequence as shown by SEQ ID NO: 187, and the antisense strand of the siRNA comprises the nucleotide sequence as shown by SEQ ID NO: 188:

(SEQ ID NO: 187)
5'-ACCUGUUUUGCUUUUGUAACZ$_{15}$-3';

(SEQ ID NO: 188)
5'-Z$_{16}$GUUACAAAAGCAAAACAGGUCU-3', wherein, $Z_{16}$ is the first nucleotide at 5' terminal of the antisense strand; $Z_{15}$ is selected from A, U, G or C, and $Z_{16}$ is a nucleotide complementary to $Z_{15}$.

In some embodiments, for the fifth siRNA, the sense strand of the siRNA comprises the nucleotide sequence as shown by SEQ ID NO: 245, and the antisense strand of the siRNA comprises the nucleotide sequence as shown by SEQ ID NO: 246:

(SEQ ID NO: 245)
5'-GGUUUUGUAGCAUUUUUAZ$_{19}$-3';

(SEQ ID NO: 246)
5'-Z$_{20}$UAAAAAUGCUACAAAACCCA-3',

Alternatively, the sense strand of the siRNA comprises the nucleotide sequence as shown by SEQ ID NO: 247, and the antisense strand of the siRNA comprises the nucleotide sequence as shown by SEQ ID NO: 248:

(SEQ ID NO: 247)
5'-UGGGUUUUGUAGCAUUUUUAZ$_{19}$-3';

(SEQ ID NO: 248)
5'-Z$_{20}$UAAAAAUGCUACAAAACCCAGA-3', wherein, $Z_{20}$ is the first nucleotide at 5' terminal of the antisense strand; $Z_{19}$ is selected from A, U, G or C, and $Z_{20}$ is a nucleotide complementary to $Z_{19}$.

In some embodiments, for the sixth siRNA, the sense strand of the siRNA comprises the nucleotide sequence as shown by SEQ ID NO: 305, and the antisense strand of the siRNA comprises the nucleotide sequence as shown by SEQ ID NO: 306:

(SEQ ID NO: 305)
5'-GUGACUUUUUAAAAUAAAZ$_{23}$-3';

(SEQ ID NO: 306)
5'-Z$_{24}$UUUAUUUUAAAAAGUCACCA-3',

Alternatively, the sense strand of the siRNA comprises the nucleotide sequence as shown by SEQ ID NO: 307, and the antisense strand of the siRNA comprises the nucleotide sequence as shown by SEQ ID NO: 308:

(SEQ ID NO: 307)
5'-UGGUGACUUUUUAAAAUAAAZ$_{23}$-3';

(SEQ ID NO: 308)
5'-Z$_{24}$UUUAUUUUAAAAAGUCACCAUA-3', wherein, $Z_{24}$ is the first nucleotide at 5' terminal of the antisense strand; $Z_{23}$ is selected from A, U, G or C, and $Z_{24}$ is a nucleotide complementary to $Z_{23}$.

In some embodiments, the siRNA of the present disclosure is siPCSKa1, siPCSKa2, siPCSKb1, siPCSKb2, siPCSKc1, siPCSKc2, siPCSKd1, siPCSKd2, siPCSKe1, siPCSKe2, siPCSKf1 or siPCSKf2 listed in Tables 1a-1f.

As mentioned above, in the siRNA of the present disclosure, each nucleotide is independently a modified or unmodified nucleotide. In some embodiments, the nucleotide in the siRNA of the present disclosure is an unmodified nucleotide; in some embodiments, in the siRNA of the present disclosure, some or all of the nucleotides are modified necleotides. These modifications on the nucleotide groups would not lead to significant decrease or loss of the functions for inhibiting the expression of PCSK9 gene of the siRNA of the present disclosure.

In some embodiments, the siRNA of the present disclosure comprises at least 1 modified nucleotide. In the context of the present disclosure, the term "modified nucleotide" used refers to a nucleotide formed by substituting 2'-hydroxy of the ribose group with other groups, or nucleotide analogue, or a nucleotide with a modified base. The modified nucleotide would not lead to significant impairment or loss of the functions for inhibiting gene expression of the siRNA conjugate. For example, the modified nucleotides disclosed in Watts, J. K., G. F. Deleavey and M. J. Damha, *Chemically Modified siRNA: tools and applications. Drug Discov Today*, 2008.13(19-20): p. 842-55 may be selected.

In some embodiments, at least one nucleotide in the sense strand or the antisense strand of the siRNA of the present disclosure is a modified nucleotide, and/or at least one phosphate group is a phosphate group with modified group(s). In other words, at least a portion of the phosphate and/or ribose groups in the phosphate-ribose backbone of at least one single strand in the sense strand and the antisense strand are phosphate groups with modified groups and/or ribose groups with modified groups.

In some embodiments, all the nucleotides in the sense strand and/or the antisense strand are modified nucleotides. In some embodiments, each nucleotide in the sense strand and antisense strand of the siRNA of the present disclosure is independently a fluoro modified nucleotide or a non-fluoro modified nucleotide.

The inventors of the present disclosure surprisingly found that the siRNA of the present disclosure achieves high balance between plasma stability and gene silencing efficiency in animal experiments.

In some embodiments, the fluoro modified nucleotides are located in the nucleotide sequence I and the nucleotide sequence II; and in the direction from 5' terminal to 3' terminal, the nucleotides at least at positions 7, 8 and 9 of the nucleotide sequence I are fluoro modified nucleotides; and in the direction from 5' terminal to 3' terminal, the nucleotides at least at positions 2, 6, 14, and 16 of the nucleotide sequence II are fluoro modified nucleotides.

In some embodiments, the fluoro modified nucleotides are located in the nucleotide sequence I and the nucleotide sequence II; and the nucleotide sequence I comprises no more than 5 fluoro modified nucleotides; and in the direction from 5' terminal to 3' terminal, the nucleotides at positions 7, 8 and 9 of the nucleotide sequence I are fluoro modified nucleotides; the nucleotide sequence II comprises no more than 7 fluoro modified nucleotides; and the nucleotides at positions 2, 6, 14, and 16 of the nucleotide sequence II are fluoro modified nucleotides.

In some embodiments, in the direction from 5' terminal to 3' terminal, the nucleotides at positions 7, 8 and 9 or at positions 5, 7, 8 and 9 of the nucleotide sequence I in the sense strand are fluoro modified nucleotides, and the nucleotides at the other positions in the sense strand are non-fluoro modified nucleotides; in the direction from 5' terminal to 3' terminal, the nucleotides at positions 2, 6, 14, and 16 or at positions 2, 6, 8, 9, 14, and 16 of the nucleotide sequence II in the antisense strand are fluoro modified nucleotides, and the nucleotides at the other positions in the antisense strand are non-fluoro modified nucleotides.

In the context of the present disclosure, a "fluoro modified nucleotide" refers to a nucleotide formed by substituting 2'-hydroxy of the ribose group with a fluorine atom, which has a structure as shown by the following Formula (7). A "non-fluoro modified nucleotide" refers to a nucleotide formed by substituting 2'-hydroxy of the ribose group with a non-fluoro group, or a nucleotide analogue. In some embodiments, each non-fluoro modified nucleotide is independently selected from a nucleotide formed by substituting 2'-hydroxy of the ribose group of a nucleotide with a non-fluoro group, or a nucleotide analogue.

The nucleotides formed by replacing 2'-hydroxy of the ribose group with a non-fluoro group are well-known in the art, and can be one selected from the group consisting of 2'-alkoxy modified nucleotides, 2'-substituted alkoxy modified nucleotides, 2'-alkyl modified nucleotides, 2'-substituted alkyl modified nucleotides, 2'-amino modified nucleotides, 2'-substituted amino modified nucleotides, and 2'-deoxy nucleotides.

In some embodiments, the 2'-alkoxy modified nucleotide is a 2'-methoxy (2'-OMe) modified nucleotide, as shown by Formula (8). In some embodiments, the 2'-substituted alkoxy modified nucleotide is for example a 2'-O-methoxyethyl (2'-MOE) modified nucleotide, as shown by Formula (9). In some embodiments, the 2'-amino (2'-NH$_2$) modified nucleotide is as shown by Formula (10). In some embodiments, the 2'-deoxy nucleotide (DNA) is as shown by Formula (11).

Formula (7)

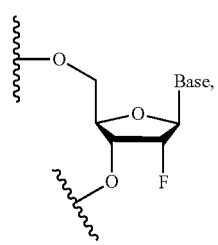

Formula (8)

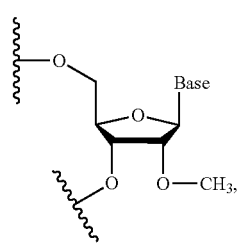

Formula (9)

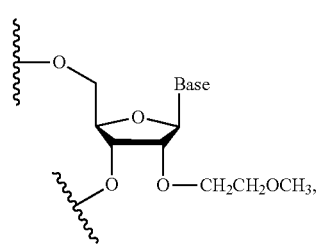

Formula (10)

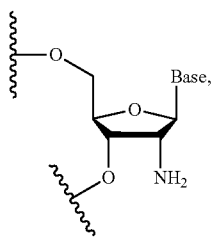

Formula (11)

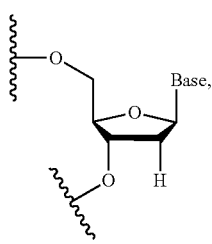

A nucleotide analogue refers to a group that can replace a nucleotide in a nucleic acid, while structurally differs from an adenine ribonucleotide, a guanine ribonucleotide, a cytosine ribonucleotide, a uracil ribonucleotide, or thymine deoxyribonucleotide. In some embodiments, the nucleotide analogue may be an isonucleotide, a bridged nucleotide or an acyclic nucleotide.

A BNA nucleotide (bridged nucleic acid, BNA) is a nucleotide that is constrained or inaccessible. BNA can contain a 5-, 6-membered or a 7-membered ring bridged structure with a "fixed" C3'-endo sugar puckering. The bridge is typically incorporated at the 2'- and 4'-positions of the ribose to afford a 2',4'-BNA nucleotide. In some embodiments, BNA may be LNA, ENA, cET BNA and so on, which are shown by Formulae (12), (13) and (14), respectively.

Formula (12)

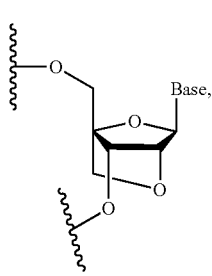

Formula (13)

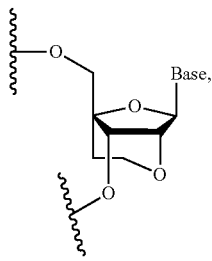

Formula (14)

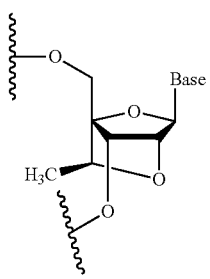

An acyclic nucleotide refers to a class of nucleotides in which the sugar ring is opened. In some embodiments, the acrylic nucleotide is an unlocked nucleic acid (UNA) or a glycerol nucleic acid (GNA), which are as shown by Formulae (15) and (16), respectively.

Formula (15)

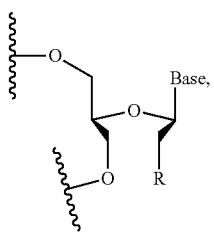

Formula (16)

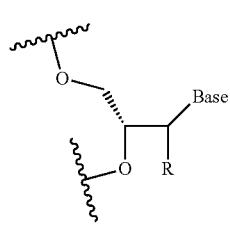

In the above Formulae (15) and (16), R is selected from H, OH or alkoxy (O-alkyl).

An isonucleotide is a compound formed by changing the position of the base on the ribose ring in the nucleotide. In some embodiments, the isonucleotide is a compound formed by transposing the base from 1-position to 2'-position or 3'-position on the ribose ring, as shown by Formula (17) or (18), respectively.

Formula (17)

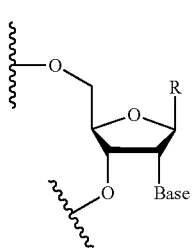

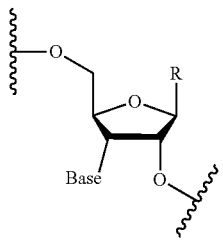

Formula (18)

In the above compounds of Formulae (17)-(18), "Base" represents a base, such as A, U, G, C, or T; R is selected from H, OH, F, or the above non-fluoro group.

In some embodiments, a nucleotide analogue is one selected from the group consisting of isonucleotide, LNA, ENA, cET, UNA, and GNA. In some embodiments, each non-fluoro modified nucleotide is a methoxy modified nucleotide. In the context of the present disclosure, the methoxy modified nucleotide refers to a nucleotide formed by substituting 2'-hydroxy of the ribose group with a methoxy group.

In the context of the disclosure, a "fluoro modified nucleotide", a "2'-fluoro modified nucleotide", a "nucleotide in which 2'-hydroxy of a ribose group is substituted with a fluorine atom", and a "nucleotide with 2'-fluororibosyl" have the same meaning, referring to a compound in which 2'-hydroxy of the nucleotide is substituted with a flurorin atom, which has a structure as shown by Formula (7). A "methoxy modified nucleotide", a "2'-methoxy modified nucleotide", a "nucleotide in which 2'-hydroxy of a ribose group is substituted with a methoxy" and a "nucleotide with 2'-methoxyribosyl" have the same meaning, referring to a compound in which 2'-hydroxy of the ribose group in the nucleotide is substituted with a methoxy, which has a structure as shown by Formula (8).

In some embodiments, the siRNA of the present disclosure is an siRNA with the following modifications: in the direction from 5' terminal to 3' terminal, the nucleotides at positions 7, 8 and 9 or at positions 5, 7, 8 and 9 of the nucleotide sequence I in the sense strand are fluoro modified nucleotides, and the nucleotides at the other positions in the sense strand are methoxy modified nucleotides; the nucleotides at positions 2, 6, 14, and 16 or at positions 2, 6, 8, 9, 14, and 16 of the nucleotide sequence II in the antisense strand are fluoro modified nucleotides, and the nucleotides at the other positions in the antisense strand are methoxy modified nucleotides.

In some embodiments, the siRNA of the present disclosure is an siRNA with the following modifications: in the direction from 5' terminal to 3' terminal, the nucleotides at positions 5, 7, 8, and 9 of the nucleotide sequence I in the sense strand of the siRNA are fluoro modified nucleotides, and the nucleotides at the other positions of the sense strand of the siRNA are methoxy modified nucleotides; and in the direction from 5' terminal to 3' terminal, the nucleotides at positions 2, 6, 8, 9, 14, and 16 of the nucleotide sequence II in the antisense strand of the siRNA are fluoro modified nucleotides, and the nucleotides at the other positions in the antisense strand of the siRNA are methoxy modified nucleotides;

Alternatively, in the direction from 5' terminal to 3' terminal, the nucleotides at positions 5, 7, 8, and 9 of the nucleotide sequence I in the sense strand of the siRNA are fluoro modified nucleotides, and the nucleotides at the other positions in the sense strand of the siRNA are methoxy modified nucleotides; and in the direction from 5' terminal to 3' terminal, the nucleotides at positions 2, 6, 14, and 16 of the nucleotide sequence II in the antisense strand of the siRNA are fluoro modified nucleotides, and the nucleotides at the other positions in the antisense strand of the siRNA are methoxy modified nucleotides.

Alternatively, in the direction from 5' terminal to 3' terminal, the nucleotides at positions 7, 8 and 9 of the nucleotide sequence I in the sense strand of the siRNA are fluoro modified nucleotides, and the nucleotides at the other positions in the sense strand of the siRNA are methoxy modified nucleotides; and in the direction from 5' terminal to 3' terminal, the nucleotides at positions 2, 6, 14, and 16 of the nucleotide sequence II in the antisense strand of the siRNA are fluoro modified nucleotides, and the nucleotides at the other positions in the antisense strand of the siRNA are methoxy modified nucleotides.

In some embodiments, the siRNA of the present disclosure is any one of siPCSKa1-M1, siPCSKa1-M2, siPCSKa1-M3, siPCSKa2-M1, siPCSKa2-M2, siPCSKa2-M3, siPCSKb1-M1, siPCSKb1-M2, siPCSKb1-M3, siPCSKb2-M1, siPCSKb2-M2, siPCSKb2-M3, siPCSKc1-M1, siPCSKc1-M2, siPCSKc1-M3, siPCSKc2-M1, siPCSKc2-M2, siPCSKc2-M3, siPCSKd1-M1, siPCSKd1-M2, siPCSKd1-M3, siPCSKd2-M1, siPCSKd2-M2, siPCSKd2-M3, siPCSKe1-M1, siPCSKe1-M2, siPCSKe1-M3, siPCSKe2-M1, siPCSKe2-M2, siPCSKe2-M3, siPCSKf1-M1, siPCSKf1-M2, siPCSKf1-M3, siPCSKf2-M1, siPCSKf2-M2 or siPCSKf2-M3 listed in Tables 1a-1f.

The siRNAs with the above modifications not only have lower costs, but also cause that the ribonucleases in the blood cannot easily cleave the nucleic acid, thereby increasing the stability of the nucleic acid and rendering the nucleic acid to have stronger resistance against nuclease hydrolysis. Meanwhile, the siRNAs with the above modifications also exhibit higher inhibitory activity against the target mRNA.

In some embodiments, at least a portion of the phosphate groups in the phosphate-ribose backbone of at least one single strand in the sense strand and the antisense strand of the siRNA of the present disclosure are phosphate groups with modified groups. In some embodiments, the phosphate group with modified group(s) is a phosphorothioate group formed by substituting at least one oxygen atom in a phosphodiester bond in the phosphate groups with a sulfur atom. In some embodiments, the phosphate group with modified group(s) is a phosphorothioate group having a structure as shown by Formula (1):

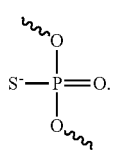

Formula (1)

This modification stabilizes the double-stranded structure of the siRNA, thereby maintaining high specificity and high affinity of base pairing.

In some embodiments, in the siRNA of the present disclosure, the phosphorothioate linkage is located in at least one of the group consisting of the following positions: the position between the first and the second nucleotides at either terminal of the sense or antisense strand, the position between the second and the third nucleotides at either terminal of the sense or antisense strand, or any combination thereof. In some embodiments, the phosphorothioate linkage is located in all the above positions except 5' terminal of the sense strand. In some embodiments, the phosphorothioate linkage is located in all the above positions except 3' terminal of the sense strand. In some embodiments, the phosphorothioate linkage is located in at least one of the following positions:

the position between the first and second nucleotides at 5' terminal of the sense strand;

the position between the second and third nucleotides at 5' terminal of the sense strand;

the position between the first and second nucleotides at 3' terminal of the sense strand;

the position between the second and third nucleotides at 3' terminal of the sense strand;

the position between the first and second nucleotides at 5' terminal of the antisense strand;

the position between the second and third nucleotides at 5' terminal of the antisense strand;

the position between the first and second nucleotides at 3' terminal of the antisense strand; and the position between the second and third nucleotides at 3' terminal of the antisense strand.

In some embodiments, the siRNA of the present disclosure is any one of siPCSKa1-M1S, siPCSKa1-M2S, siPCSKa1-M3S, siPCSKa2-M1S, siPCSKa2-M2S, siPCSKa2-M3S, siPCSKb1-M1S, siPCSKb1-M2S, siPCSKb1-M3S, siPCSKb2-M1S, siPCSKb2-M2S, siPCSKb2-M3S, siPCSKc1-M1S, siPCSKc1-M2S, siPCSKc1-M3S, siPCSKc2-M1S, siPCSKc2-M2S, siPCSKc2-M3S, siPCSKd1-M1S, siPCSKd1-M2S, siPCSKd1-M3S, siPCSKd2-M1S, siPCSKd2-M2S, siPCSKd2-M3S, siPCSKe1-M1S, siPCSKe1-M2S, siPCSKe1-M3S, siPCSKe2-M1S, siPCSKe2-M2S, siPCSKe2-M3S, siPCSKf1-M1S, siPCSKf1-M2S, siPCSKf1-M3S, siPCSKf2-M1S, siPCSKf2-M2S or siPCSKf2-M3S listed in Tables 1a-1f.

In some embodiments, the nucleotide at 5'-terminal in the antisense strand of the siRNA is a 5'-phosphate nucleotide or a 5'-phosphate analogue modified nucleotide.

Typical 5'-phosphate nucleotides or 5'-phosphate analogue modified nucleotides are well known to those skilled in the art. For example, the 5'-phosphate nucleotides may have the following structure:

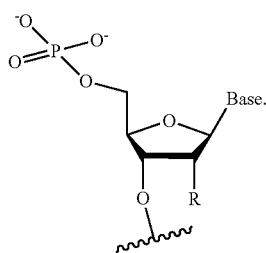

Formula (2)

As another example, Anastasia Khvorova and Jonathan K. Watts, *The chemical evolution of oligonucleotide therapies of clinical utility. Nature Biotechnology*, 2017, 35(3): 238-48 discloses the following four 5'-phosphate analogue modified nucleotides:

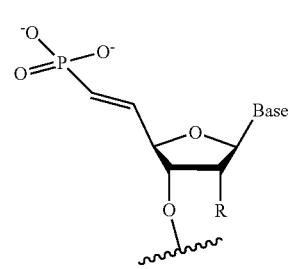

Formula (3)

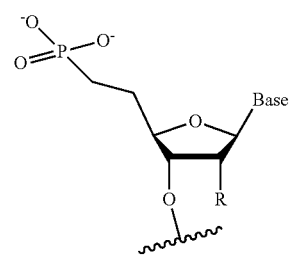

Formula (4)

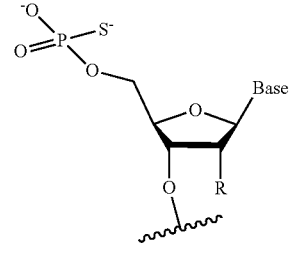

Formula (5)

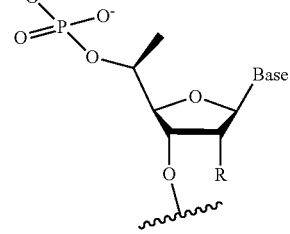

Formula (6)

wherein R is selected from H, OH, methoxy, and F;
"Base" represents a base selected from A, U, C, G, or T.

In some embodiments, the 5'-phosphate nucleotide is a nucleotide with 5'-phosphate as shown by Formula (2); the 5'-phosphate analogue modified nucleotide is a nucleotide with vinylphosphonate (5'-(E)-vinylphosphonate, E-VP) modification as shown by Formula (3), or a phosphorothioate modified nucleotide as shown by Formula (5).

In some embodiments, the siRNA of the present disclosure is any one of siPCSKa1-M1P1, siPCSKa1-M2P1, siPCSKa1-M3P1, siPCSKa2-M1P1, siPCSKa2-M2P1, siPCSKa2-M3P1, siPCSKb1-M1P1, siPCSKb1-M2P1, siPCSKb1-M3P1, siPCSKb2-M1P1, siPCSKb2-M2P1, siPCSKb2-M3P1, siPCSKc1-M1P1, siPCSKc1-M2P1, siPCSKc1-M3P1, siPCSKc2-M1P1, siPCSKc2-M2P1, siPCSKc2-M3P1, siPCSKd1-M1P1, siPCSKd1-M2P1, siPCSKd1-M3P1, siPCSKd2-M1P1, siPCSKd2-M2P1, siPCSKd2-M3P1, siPCSKe1-M1P1, siPCSKe1-M2P1, siPCSKe1-M3P1, siPCSKe2-M1P1, siPCSKe2-M2P1, siPCSKe2-M3P1, siPCSKf1-M1P1, siPCSKf1-M2P1, siPCSKf2-M3P1, siPCSKa1-M1SP1, siPCSKa1-M2SP1, siPCSKa1-M3SP1, siPCSKa2-M1SP1, siPCSKa2-M2SP1, siPCSKa2-M3SP1, siPCSKb1-M1SP1, siPCSKb1-M2SP1, siPCSKb1-M3SP1, siPCSKb2-M1SP1, siPCSKb2-M2SP1, siPCSKb2-M3SP1, siPCSKc1-M1SP1, siPCSKc1-M2SP1, siPCSKc1-M3SP1, siPCSKc2-M1SP1, siPCSKc2-M2SP1, siPCSKc2-M3SP1, siPCSKd1-M1SP1, siPCSKd1-M2SP1, siPCSKd1-M3SP1, siPCSKd2-M1SP1, siPCSKd2-M2SP1, siPCSKd2-M3SP1, siPCSKe1-M1SP1, siPCSKe1-M2SP1, siPCSKe1-M3SP1, siPCSKe2-M1SP1, siPCSKe2-M2SP1, siPCSKe2-M3SP1, siPCSKf1-M1SP1, siPCSKf1-M2SP1, siPCSKf1-M3SP1, siPCSKf2-M1SP1, siPCSKf2-M2SP1 and siPCSKf2-M3SP1 listed in Tables 1a-1f.

Seventh siRNA

According to the present disclosure, the siRNA may be a seventh siRNA.

The seventh siRNA comprises a sense strand and an antisense strand, and each nucleotide in the seventh siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; wherein, the nucleotide sequence I and the nucleotide sequence as shown by SEQ ID NO: 399 have an equal length and no more than 3 nucleotide differences, and the nucleotide sequence II and the nucleotide sequence as shown by SEQ ID NO: 400 have an equal length and no more than 3 nucleotide differences:

(SEQ ID NO: 399)
5'-AGACCUGUUUUGCUUUUG$Z_{25}$-3';

(SEQ ID NO: 400)
5'-$Z_{26}$CAAAAGCAAAACAGGUCU-3', wherein, $Z_{25}$ is U and $Z_{26}$ is A, and the nucleotide sequence I comprises a nucleotide $Z_{27}$ at the position corresponding to $Z_{25}$, the nucleotide sequence II comprises a nucleotide $Z_{28}$ at the position corresponding to $Z_{26}$, wherein $Z_{28}$ is the first nucleotide at 5' terminal of the antisense strand.

In some embodiments, the sense strand comprises only the nucleotide sequence I, and the antisense strand comprises only the nucleotide sequence II.

In some embodiments, the nucleotide sequence I and the nucleotide sequence as shown by SEQ ID NO: 399 have no more than 1 nucleotide difference, and/or the nucleotide sequence II and the nucleotide sequence as shown by SEQ ID NO: 400 have no more than 1 nucleotide difference.

In some embodiments, the nucleotide difference between the nucleotide sequence II and the nucleotide sequence as shown by SEQ ID NO: 400 includes a difference at the position $Z_{28}$, wherein $Z_{28}$ is selected from G, U or C. In some embodiments, the nucleotide difference is a difference at the position $Z_{28}$, wherein $Z_{28}$ is selected from G, U or C. In some embodiments, $Z_{27}$ is a nucleotide complementary to $Z_{28}$.

In some embodiments, the nucleotide difference between the nucleotide sequence I and the nucleotide sequence as shown by SEQ ID NO: 399 includes a difference of the 9th nucleotide Z counted from 5' terminal of the nucleotide sequence I, wherein Z is dT.

In some embodiments, the nucleotide difference between the nucleotide sequence I and the nucleotide sequence as shown by SEQ ID NO: 399 includes a difference at the position $Z_{27}$, wherein $Z_{27}$ is selected from A, G or C.

In some embodiments, the nucleotide difference between the nucleotide sequence I and the nucleotide sequence as shown by SEQ ID NO: 399 have 2 nucleotide differences, and the nucleotide sequence I and the nucleotide sequence II are completely reverse complementary to each other, wherein the 2 nucleotide differences are differences at the positions Z and $Z_{27}$, and Z is dT and $Z_{27}$ is selected from A, G or C.

The siRNAs with the above-mentioned nucleotide differences have higher inhibitory ability against the target mRNA, and these siRNAs comprising the nucleotide differences are within the protection scope of the present disclosure.

In some embodiments, the nucleotide sequence I is the nucleotide sequence as shown by SEQ ID NO: 401, and the nucleotide sequence II is the nucleotide sequence as shown by SEQ ID NO: 402:

(SEQ ID NO: 401)
5'-AGACCUGUdTUUGCUUUUG$Z_{27}$-3';

(SEQ ID NO: 402)
5'-$Z_{28}$CAAAAGCAAAACAGGUCU-3',

Wherein dT is a thymine deoxynucleotide, the $Z_{28}$ is the first nucleotide at 5' terminal of the antisense strand, $Z_{27}$ is selected from A, U, G, or C, and $Z_{28}$ is a nucleotide complementary to $Z_{27}$; in some embodiments, $Z_{27}$ is U, and $Z_{28}$ is A.

In some embodiments, for the seventh siRNA, the sense strand of the siRNA comprises the nucleotide sequence as shown by SEQ ID NO: 403, and the antisense strand of the siRNA comprises the nucleotide sequence as shown by SEQ ID NO: 404:

(SEQ ID NO: 403)
5'-AGACCUGUdTUUGCUUUUG$Z_{27}$-3';

(SEQ ID NO: 404)
5'-$Z_{28}$CAAAAGCAAAACAGGUCUAG-3';

Alternatively, the sense strand of the siRNA comprises the nucleotide sequence as shown by SEQ ID NO: 405, and the antisense strand of the siRNA comprises the nucleotide sequence as shown by SEQ ID NO: 406:

(SEQ ID NO: 405)
5'-CUAGACCUGUdTUUGCUUUUG$Z_{27}$-3';

(SEQ ID NO: 406)
5'-$Z_{28}$CAAAAGCAAAACAGGUCUAGAA-3';

In some embodiments, the siRNA of the present disclosure is siPCSKg3 or siPCSKg4 listed in Table 1g.

In some embodiments, in the above-mentioned siRNAs with nucleotide differences at positions Z and/or $Z_{27}$, at least some of the nucleotides are modified nucleotides, the modified nucleotides are fluoro modified nucleotides or non-fluoro modified nucleotides, the fluoro modified nucleotides are located in the nucleotide sequence I and the nucleotide sequence II, and in the direction from 5' terminal to 3' terminal, the nucleotides at least at positions 2, 6, 14, and 16 of the nucleotide sequence II are fluoro modified nucleotides.

In some embodiments, the siRNA of the present disclosure is any one of siPCSKg3-M4, siPCSKg4-M5, siPCSKg3-M4S, siPCSKg4-M5S, siPCSKg3-M4P1, siPCSKg4-M5P1, siPCSKg3-M4SP1 or siPCSKg4-M5SP1 listed in Table 1g.

The inventors of the present disclosure surprisingly found that the siRNAs of the present disclosure have significantly enhanced plasma and lysosomal stability, while exhibiting higher inhibitory activity against the target mRNA.

The siRNAs of the present disclosure can be obtained by conventional methods for preparing siRNAs in the art, e.g., solid phase synthesis method and liquid phase synthesis method. Commercial customization services have already been available for solid phase synthesis. A modified nucleotide group can be introduced into the siRNA of the present disclosure by using a nucleotide monomer having the corresponding modification. The method for preparing a nucleotide monomer having the corresponding modification and the method for introducing a modified nucleotide group into an siRNA are also well known to those skilled in the art.

Pharmaceutical Composition

The present disclosure provides a pharmaceutical composition, comprising the above siRNA as an active ingredient and a pharmaceutically acceptable carrier.

The pharmaceutically acceptable carrier may be a conventional carrier in the field of siRNA administration, for example, but not limited to, one or more of magnetic nanoparticles (such as $Fe_3O_4$ and $Fe_2O_3$-based nanoparticle), carbon nanotubes, mesoporous silicon, calcium phosphate nanoparticles, polyethylenimine (PEI), polyamidoamine (PAMAM) dendrimer, poly(L-lysine) (PLL), chitosan, 1,2-dioleoyl-3-trimethylammonium-propane (DOTAP), poly(D&L-lactic/glycolic acid) copolymer (PLGA), poly(2-aminoethyl ethylene phosphate) (PPEEA), poly(2-dimethylaminoethyl methacrylate) (PDMAEMA), and derivatives thereof.

In the pharmaceutical composition, the contents of the siRNA and the pharmaceutically acceptable carrier are not specially required, and can be conventional contents of individual components. In some embodiments, the weight ratio of the siRNA to the pharmaceutically acceptable carrier is 1:(1-500), and in some embodiments, the weight ratio is 1:(1-50).

In some embodiments, the pharmaceutical composition may also contain other pharmaceutically acceptable excipients, which may be one or more of various conventional formulations or compounds in the art. For example, said other pharmaceutically acceptable excipients may comprise at least one of a pH buffer, a protection agent and an osmotic pressure regulator.

The pH buffer may be a tris(hydroxymethyl) aminomethane hydrochloride buffer solution with a pH of 7.5-8.5, and/or a phosphate buffer solution with a pH of 5.5-8.5, such as a phosphate buffer solution with a pH of 5.5-8.5.

The protection agent may be at least one of inositol, sorbitol, sucrose, trehalose, mannose, maltose, lactose, and glucose. The content of the protection agent may be from 0.01 wt % to 30 wt % based on the total weight of the pharmaceutical composition.

The osmotic pressure regulator may be sodium chloride and/or potassium chloride. The content of the osmotic pressure regulator renders the osmotic pressure of the pharmaceutical composition to be 200-700 milliosmol/kg. Depending on the desired osmotic pressure, those skilled in the art can readily determine the content of the osmotic pressure regulator.

In some embodiments, the pharmaceutical composition may be a liquid formulation, for example, an injection solution; or a lyophilized powder for injection, which will be mixed with a liquid excipient to form a liquid formulation upon administration. The liquid formulation may be administered by, but not limited to, subcutaneous, intramuscular or intravenous injection, and also may be administered to, but not limited to, lung by spray, or other organs (such as liver) via lung by spray. In some embodiments, the pharmaceutical composition is administered by intravenous injection.

In some embodiments, the pharmaceutical composition may be in the form of a liposome formulation. In some embodiments, the pharmaceutically acceptable carrier used in the liposome formulation comprises an amine-containing transfection compound (hereinafter also referred to as an organic amine), a helper lipid and/or a PEGylated lipid. Therein, the organic amine, the helper lipid and the PEGylated lipid may be respectively one or more selected from the amine-containing transfection compounds or the pharmaceutically acceptable salts or derivatives thereof, the helper lipids and the PEGylated lipids as described in CN103380113A, which is incorporated herein by reference in its entirety.

In some embodiments, the organic amine may be a compound as shown by Formula (201) as described in CN103380113A or a pharmaceutically acceptable salt thereof:

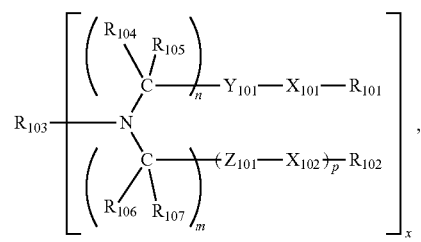

Formula (201)

wherein,
each $X_{101}$ or $X_{102}$ independently of one another is selected from O, S, N-A and C-A, wherein A is hydrogen or a $C_1$-$C_{20}$ hydrocarbon chain;
each $Y_{101}$ or $Z_{101}$ independently of one another is selected from C=O, C=S, S=O, CH—OH or $SO_2$;
each $R_{101}$, $R_{102}$, $R_{103}$, $R_{104}$, $R_{105}$, $R_{106}$ or $R_{107}$ independently of one another is selected from hydrogen; a cyclic or an acyclic, substituted or unsubstituted, branched or linear aliphatic group; a cyclic or an acyclic, substituted or unsubstituted, branched or linear heteroaliphatic group; a substituted or unsubstituted, branched or linear acyl group; a substituted or unsubstituted, branched or linear aryl group; and a substituted or unsubstituted, branched or linear heteroaryl group;
x is an integer of 1-10;
n is an integer of 1-3, m is an integer of 0-20, p is 0 or 1, wherein if m=p=0, then $R_{102}$ is hydrogen; and if at least one of n and m is 2, then $R_{103}$ and nitrogen in Formula (201) form a structure as shown by Formula (202) or (203):

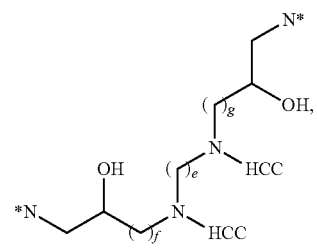

Formula (202)

Formula (203)

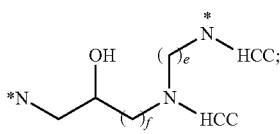

wherein g, e or f independently of one another is an integer of 1-6; "HCC" represents a hydrocarbon chain, and each *N represents a nitrogen atom shown in Formula (201).

In some embodiments, $R_{103}$ is a polyamine. In other embodiments, $R_{103}$ is a ketal. In some embodiments, $R_{101}$ and $R_{102}$ in the Formula (201) independently of one another are any substituted or unsubstituted, branched or linear alkyl or alkenyl, wherein the alkyl or alkenyl has 3-20 carbon atoms (such as 8-18 carbon atoms) and 0-4 double bonds (such as 0-2 double bonds).

In some embodiments, if n and m independently of one another are 1 or 3, $R_{103}$ is any of the following Formulae (204)-(213):

Formula (204)

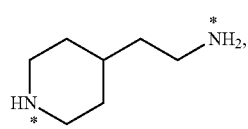

(Formula (205))

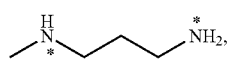

Formula (206)

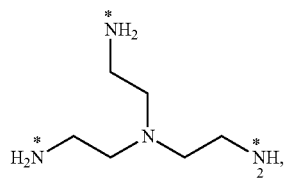

Formula (207)

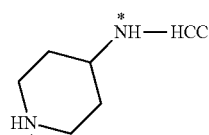

Formula (208)

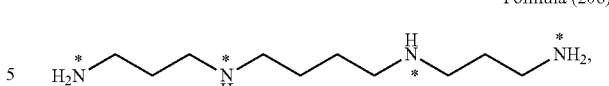

Formula (209)

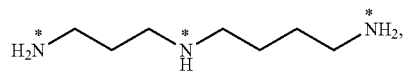

Formula (210)

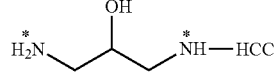

Formula (211)

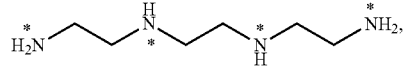

Formula (212)

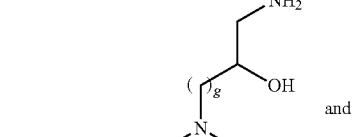

and

Formula (213)

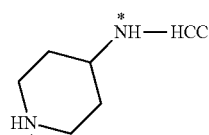

wherein, in Formulae (204)-(213), g, e and f independently of one another are an integer of 1-6, each "HCC" represents a hydrocarbon chain, and each * represents a potential attachment point of $R_{103}$ to the nitrogen atom in Formula (201), wherein each H at any * position can be replaced to achieve the attachment to the nitrogen atom in Formula (201).

The compound as shown by Formula (201) may be prepared as described in CN103380113A.

In some embodiments, the organic amine is an organic amine as shown by Formula (214) and/or an organic amine as shown by Formula (215):

Formula (214)
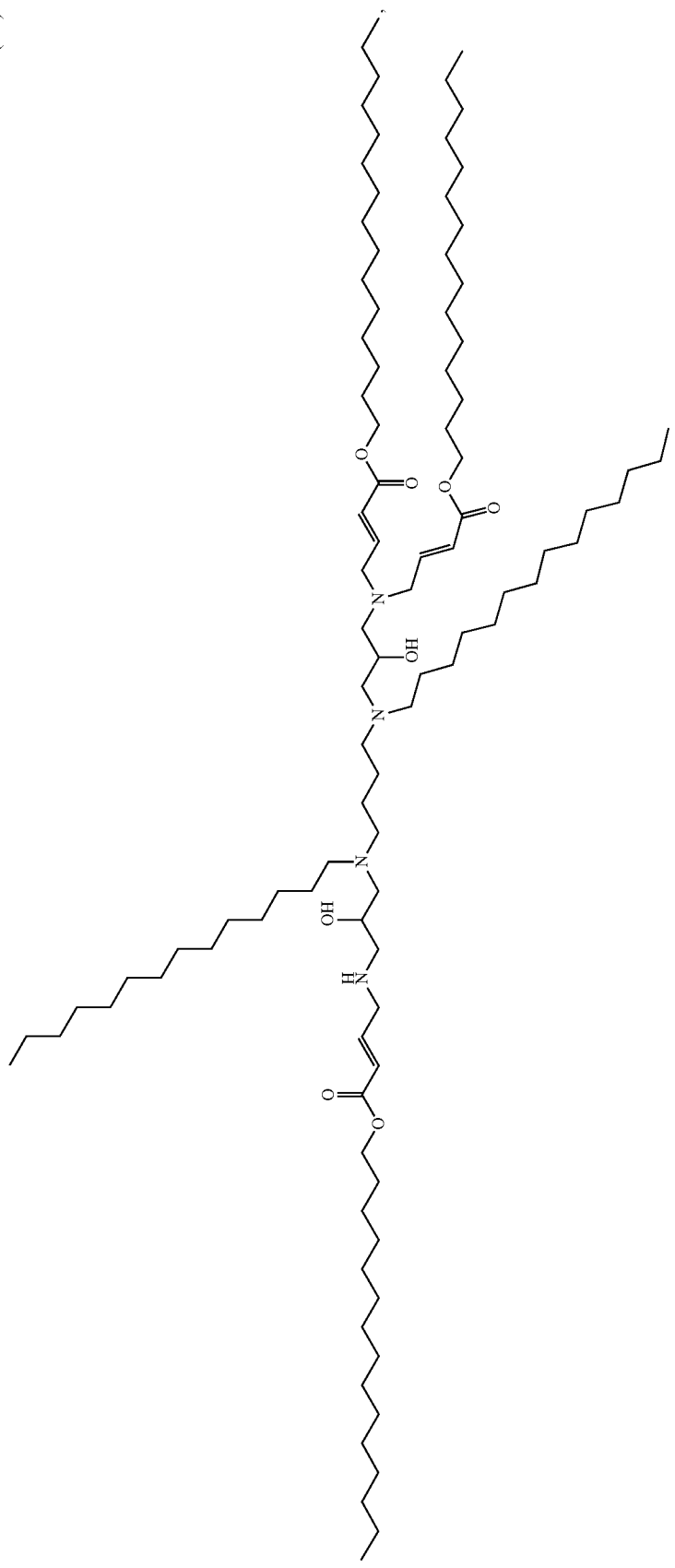

-continued
Formula (215)
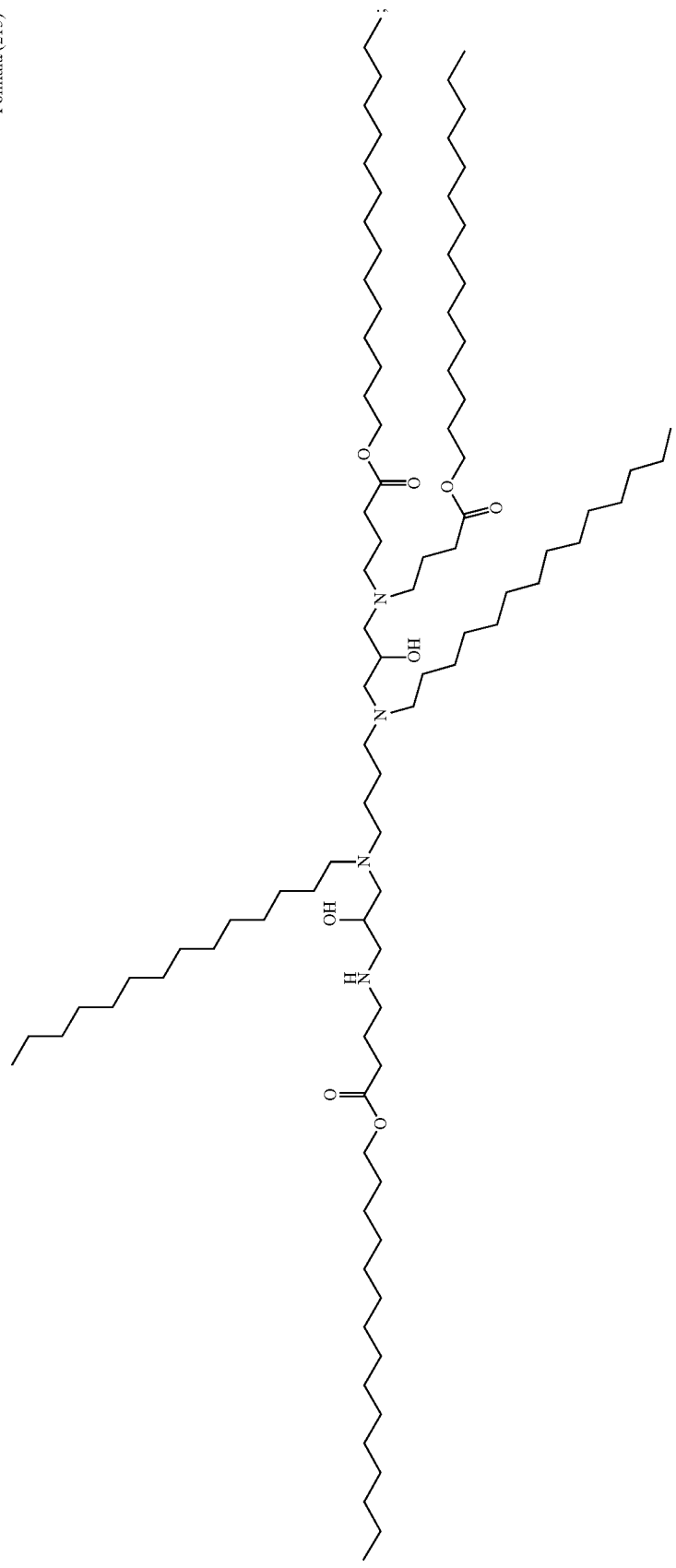

The helper lipid is cholesterol, cholesterol analogs and/or cholesterol derivatives.

The PEGylated lipid is 1,2-dipalmitoyl-sn-glycero-3-phosphatidylethanolamine-N-[methoxy(polyethylene glycol)]-2000.

In some embodiments, the molar ratio among the organic amine, the helper lipid, and the PEGylated lipid in the pharmaceutical composition is (19.7-80):(19.7-80):(0.3-50), for example, the molar ratio may be (50-70):(20-40):(3-20).

In some embodiments, the pharmaceutical composition particles formed by the siRNA of the present disclosure and the above amine-containing transfection reagents have an average diameter from about 30 nm to about 200 nm, typically from about 40 nm to about 135 nm, and more typically, the average diameter of the liposome particles is from about 50 nm to about 120 nm, from about 50 nm to about 100 nm, from about 60 nm to about 90 nm, or from about 70 nm to about 90 nm; for example, the average diameter of the liposome particles is about 30, 40, 50, 60, 70, 75, 80, 85, 90, 100, 110, 120, 130, 140, 150 or 160 nm.

In some embodiments, in the pharmaceutical composition formed by the siRNA of the present disclosure and the above amine-containing transfection reagents, the weight ratio (weight/weight ratio) of the siRNA to total lipids, e.g., the organic amines, the helper lipids and/or the PEGylated lipids, ranges from about 1:1 to about 1:50, from about 1:1 to about 1:30, from about 1:3 to about 1:20, from about 1:4 to about 1:18, from about 1:5 to about 1:17, from about 1:5 to about 1:15, from about 1:5 to about 1:12, from about 1:6 to about 1:12, or from about 1:6 to about 1:10. For example, the weight ratio of the siRNA of the present disclosure to total lipids is about 1:5, 1:6, 1:7, 1:8, 1:9, 1:10, 1:11, 1:12, 1:13, 1:14, 1:15, 1:16, 1:17, or 1:18.

In some embodiments, the pharmaceutical composition may be marketed with each component being separate, and used in the form of a liquid formulation. In some embodiments, the pharmaceutical composition formed by the siRNA of the present disclosure and the above pharmaceutically acceptable carrier may be prepared by various known processes, except for replacing the existing siRNA with the siRNA of the present disclosure. In some specific embodiments, the pharmaceutical composition may be prepared according to the following process:

The organic amines, helper lipids and PEGylated lipids are suspended in alcohol at a molar ratio as described above and mixed homogeneously to yield a lipid solution; the alcohol is used in an amount such that the resultant lipid solution is present at a total mass concentration of 2 to 25 mg/mL (e.g., 8 to 18 mg/mL). The alcohol is a pharmaceutically acceptable alcohol, such as an alcohol that is in liquid form at about room temperature, for example, one or more of ethanol, propylene glycol, benzyl alcohol, glycerol, PEG 200, PEG 300, and PEG 400, such as ethanol.

The siRNA of the present disclosure is dissolved in a buffered salt solution to produce an aqueous solution of the siRNA. The buffered salt solution has a concentration of 0.05 to 0.5 M, such as 0.1 to 0.2 M. The pH of the buffered salt solution is adjusted to 4.0 to 5.5, such as 5.0 to 5.2. The buffered salt solution is used in an amount such that the siRNA is present at a concentration of less than 0.6 mg/ml, such as 0.2 to 0.4 mg/mL. The buffered salt may be one or more selected from the group consisting of soluble acetate and soluble citrate, such as sodium acetate and/or potassium acetate.

The lipid solution and the aqueous solution of the siRNA are mixed. The product obtained by mixing is incubated at a temperature of 40 to 60° C. for at least 2 minutes (e.g., 5 to 30 minutes) to produce an incubated lipid formulation. The volume ratio of the lipid solution to the aqueous solution of the siRNA is 1:(2-5).

The incubated lipid formulation is concentrated or diluted, purified to remove impurities, and then sterilized to afford the pharmaceutical composition of the present disclosure, which has the following physicochemical parameters: a pH of 6.5 to 8, an encapsulation percentage of more than 80%, a particle size of 40 to 200 nm, a polydispersity index of less than 0.30, and an osmotic pressure of 250 to 400 mOsm/kg. For example, the physicochemical parameters may be as follows: a pH of 7.2 to 7.6, an encapsulation percentage of more than 90%, a particle size of 60 to 100 nm, a polydispersity index of less than 0.20, and an osmotic pressure of 300 to 400 mOsm/kg.

Therein, the concentration or dilution step may be performed before, after or simultaneously with removal of the impurities. The method for removing impurities may be any of various existing methods, for example, ultrafiltration with 100 kDa hollow fiber column and PBS at pH 7.4 as ultrafiltration exchange solution using tangential flow system. The method for sterilization may be any of various existing methods, such as filtration sterilization on a 0.22 μm filter.

siRNA Conjugate

The present disclosure provides an siRNA conjugate comprising the above siRNA and a conjugation group conjugatively linked to the siRNA.

Generally speaking, the conjugation group comprises at least one pharmaceutically acceptable targeting group and an optional linker. Moreover, the siRNA, the linker and the targeting group are sequentialy linked. In some embodiments, the nubmer of the targeting groups is 1 to 6. In some embodiments, the number of traget groups is 2 to 4. The siRNA molecule may be non-covalently or covalently conjugated to the conjugation group, for example the siRNA molecule may be covalently conjugated to the conjugation group. The conjugation site between the siRNA and the conjugation group can be at 3' terminal or 5' terminal of the sense strand of the siRNA, or at 5' terminal of the antisense strand of the siRNA, and can be within the internal sequence of the siRNA. In some embodiments, the conjugation site between the siRNA and the conjugation group is at 3' terminal of the sense strand of the siRNA.

In some embodiments, the conjugation group may be linked to the phosphate group, the 2'-hydroxy or the base of a nucleotide. The conjugation group may also be linked to the 3'-hydroxy group when the nucleotides are linked via a 2'-5'-phosphodiester bond. When the conjugation group is linked to a terminal of the siRNA, the conjugation group is typically linked to the phosphate group of a nucleotide; when the conjugation group is linked to an internal sequence of the siRNA, the conjugation group is typically linked to a ribose ring or a base. For variou linking modes, reference may be made to: Muthiah Manoharan et. al. siRNA conjugates carrying sequentially assembled trivalent N-acetylgalactosamine linked through nucleosides elicit robust gene silencing in vivo in hepatocytes. ACS Chemical biology, 2015, 10(5): 1181-7.

In some embodiments, the siRNA and the conjugation group can be linked by an acid-labile or reducible chemical bond, and these chemical bonds can be degraded under the acidic environment of cell endosomes, thereby making the siRNA be in free state. For non-degradable conjugation modes, the conjugation group can be linked to the sense strand of the siRNA, thereby minimizing the effect of conjugation on the activity of the siRNA.

In some embodiments, the pharmaceutically acceptable targeting group may be a conventional ligand in the field of siRNA administration, for example, various ligands as described in WO2009082607A2, which is incorporated herein by reference in its entirety.

In some embodiments, the pharmaceutically acceptable targeting group may be one or more selected from the ligands fromed by the following targeting molecules or derivatives thereof: lipophilic molecules, such as cholesterol, bile acids, vitamins (such as vitamin E), lipid molecules with different chain lengths; polymers, such as polyethylene glycol; polypeptides, such as cell-penetrating peptide; aptamers; antibodies; quantum dots; saccharides, such as lactose, polylactose, mannose, galactose, N-acetylgalactosamine (GalNAc); folate; or receptor ligands expressed in hepatic parenchymal cells, such as asialoglycoprotein, asialo-sugar residue, lipoproteins (such as high density lipoprotein, low density lipoprotein and the like), glucagon, neurotransmitters (such as adrenaline), growth factors, transferrin and the like.

In some embodiments, each ligand is independently selected from a ligand capable of binding to a cell surface receptor. In some embodiments, at least one ligand is a ligand capable of binding to a surface receptor of a hepatocyte. In some embodiments, at least one ligand is a ligand capable of binding to a surface receptor of a mammalian hepatocyte. In some embodiments, at least one ligand is a ligand capable of binding to a surface receptor of a human hepatocyte. In some embodiments, at least one ligand is a ligand capable of binding to an asialoglycoprotein receptor (ASGPR) on the surface of hepatocytes. The types of these ligands are well-known to those skilled in the art and they typically serve the function of binding to specific receptor on the surface of the target cell, thereby mediating delivery of the siRNA linked to the ligand into the target cell.

In some embodiments, the pharmaceutically acceptable targeting group may be any ligand that binds to the asialoglycoprotein receptors (ASGPR) on the surface of mammalian hepatocytes. In some embodiments, each ligand is independently an asialoglycoprotein, such as asialooroso-mucoid (ASOR) or asialofetuin (ASF). In some embodiments, the ligand is a saccharide or its derivatives.

In some embodiments, at least one ligand is a saccharide. In some embodiments, each ligand is a saccharide. In some embodiments, at least one ligand is a monosaccharide, polysaccharide, modified monosaccharide, modified polysaccharide, or saccharide derivative. In some embodiments, at least one ligand may be a monosaccharide, disaccharide or trisaccharide. In some embodiments, at least one ligand is a modified saccharide. In some embodiments, each ligand is a modified saccharide. In some embodiments, each ligand is independently selected from a polysaccharide, modified polysaccharide, monosaccharide, modified monosaccharide, polysaccharide derivative, and monosaccharide derivative. In some embodiments, each ligand or at least one ligand may be independently selected from the group consisting of glucose and its derivatives, mannose and its derivatives, galactose and its derivatives, xylose and its derivatives, ribose and its derivatives, fucose and its derivatives, lactose and its derivatives, maltose and its derivatives, arabinose and its derivatives, fructose and its derivatives, and sialic acid.

In some embodiments, each ligand may be independently selected from the group consisting of D-mannopyranose, L-mannopyranose, D-arabinose, D-xylofuranose, L-xylofuranose, D-glucose, L-glucose, D-galactose, L-galactose, α-D-mannofuranose, β-D-mannofuranose, α-D-mannopyranose, β-D-mannopyranose, α-D-glucopyranose, β-D-glucopyranose, α-D-glucofuranose, β-D-glucofuranose, α-D-fructofuranose, α-D-fructopyranose, α-D-galactopyranose, β-D-galactopyranose, α-D-galactofuranose, β-D-galactofuranose, glucosamine, sialic acid, galactosamine, N-acetylgalactosamine, N-trifluoroacetylgalactosamine, N-propionylgalactosamine, N-n-butyrylgalactosamine, N-isobutyrylgalactosamine, 2-amino-3-O—[(R)-1-carboxyethyl]-2-deoxy-β-D-glucopyranose, 2-deoxy-2-methylamino-L-glucopyranose, 4,6-dideoxy-4-formamido-2,3-di-O-methyl-D-mannopyranose, 2-deoxy-2-sulfoamino-D-glucopyranose, N-glycolyl-α-neuraminic acid, 5-thio-β-D-glucopyranose, methyl 2,3,4-tris-O-acetyl-1-thio-6-O-trityl-α-D-glucopyranoside, 4-thio-β-D-galactopyranose, ethyl 3,4,6,7-tetra-O-acetyl-2-deoxy-1,5-dithio-α-D-glucoheptopyranoside, 2,5-anhydro-D-allononitrile, ribose, D-ribose, D-4-thioribose, L-ribose, L-4-thioribose. Other options of the ligand may be found, for example, in the disclosure of CN105378082A, which is incorporated herein by reference in its entirety.

In some embodiments, the pharmaceutically acceptable targeting group in the siRNA conjugate may be galactose or N-acetylgalactosamine, wherein the galactose or N-acetylgalactosamine molecules may be mono-, bi-, tri-, or tetravalent. It should be understood that the terms mono-, bi-, tri-, or tetra-valent described herein respectively mean that the molar ratio of the siRNA molecule to the galactose or N-acetylgalactosamine molecule in the siRNA conjugate is 1:1, 1:2, 1:3 or 1:4, wherein the siRNA conjugate is formed from the siRNA molecule and the conjugation group containing galactose or N-acetylgalactosamine molecule as the targeting group. In some embodiments, the pharmaceutically acceptable targeting group is N-acetylgalactosamine. In some embodiments, when the double-stranded oligonucleotide of the present disclosure is conjugated to a conjugation group comprising N-acetylgalactosamine, the N-acetylgalactosamine molecule is trivalent or tetravalent. In some embodiments, when the siRNA of the present disclosure is conjugated to a conjugation group containing N-acetylgalactosamine, the N-acetylgalactosamine molecule is trivalent.

The targeting group can be linked to the siRNA molecule via an appropriate linker, and the appropriate linker can be selected by those skilled in the art according to the specific type of the targeting group. The types of these linkers and targeting groups and the linking modes with the siRNA may be found in the disclosure of WO2015006740A2, which is incorporated herein by reference in its entirety.

In some embodiments, when the targeting group is N-acetylgalactosamine, a suitable linker may have the following structure as shown by Formula (301):

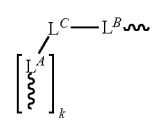

Formula (301)

wherein, k is an integer of 1-3;

$L^A$ is an amide bond-comprising chain moiety that has a structure as shown by Formula (302), and two terminals of each $L^A$ are respectively linked to the targeting group and the $L^C$ moiety through an ether bond:

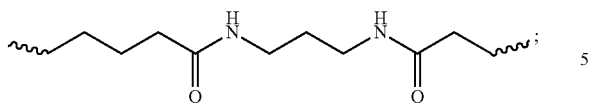

Formula (302)

$L^B$ is a N-acylpyrrolidine-comprising chain moiety that has a structure as shown by Formula (303), wherein the chain moity has a carbonyl group at one terminal and is linked to the $L^C$ moiety through an amide bond, and has an oxy group at the other terminal and is linked to the siRNA via a phosphoester bond:

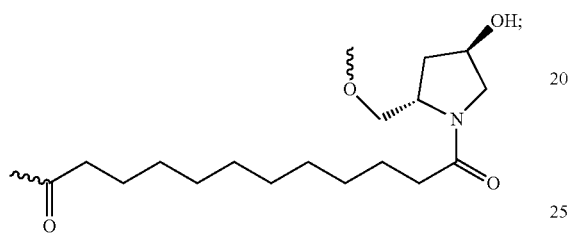

Formula (303)

$L^C$ is a bivalent to tetravalent linking group based on hydroxymethyl aminomethane, dihydroxymethyl aminomethane or trihydroxymethyl aminomethane, and $L^C$ is linked to $L^A$ moieties through an ether bond via an oxygen atom, and is linked to $L^B$ moiety through an amide bond via a nitrogen atom.

In some embodiments, when n=3 and $L^C$ is a tetravalent linking group based on trihydroxymethyl aminomethane, the siRNA conjugate formed by linking N-acetylgalactosamine molecules with an siRNA molecule via -$(L^A)_3$-trihydroxymethyl aminomethane-$L^B$- as a linker has a structure as shown by Formula (304):

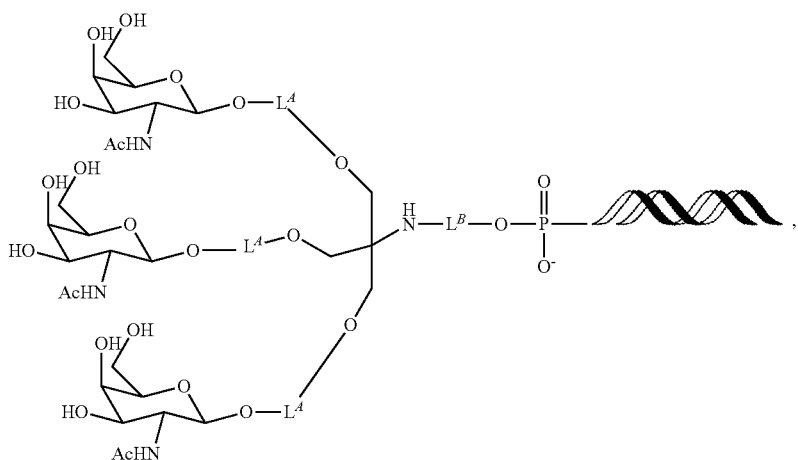

Formula (304)

wherein the double helix structure represents an siRNA.

Likewise, the conjugation site between the siRNA and the conjugation group can be at 3'-terminal or 5'-terminal of the sense strand of the siRNA, or at 5'-terminal of the antisense strand, or within the internal sequence of the siRNA.

In some embodiments, the 3'-terminal of the sense strand of the siRNA of the present disclosure is covalently conjugated to three N-acetylgalactosamine (GalNAc) molecules via a linker -($L^A$)$_3$-trihydroxymethyl aminomethane-$L^B$-, to afford an siRNA conjugate in which the molar ratio of the siRNA molecule to the GalNAc molecule is 1:3 (hereinafter also referred to as (GalNAc)$_3$-siRNA), and this conjugate has a structure as shown by Formula (305):

Formula (305)

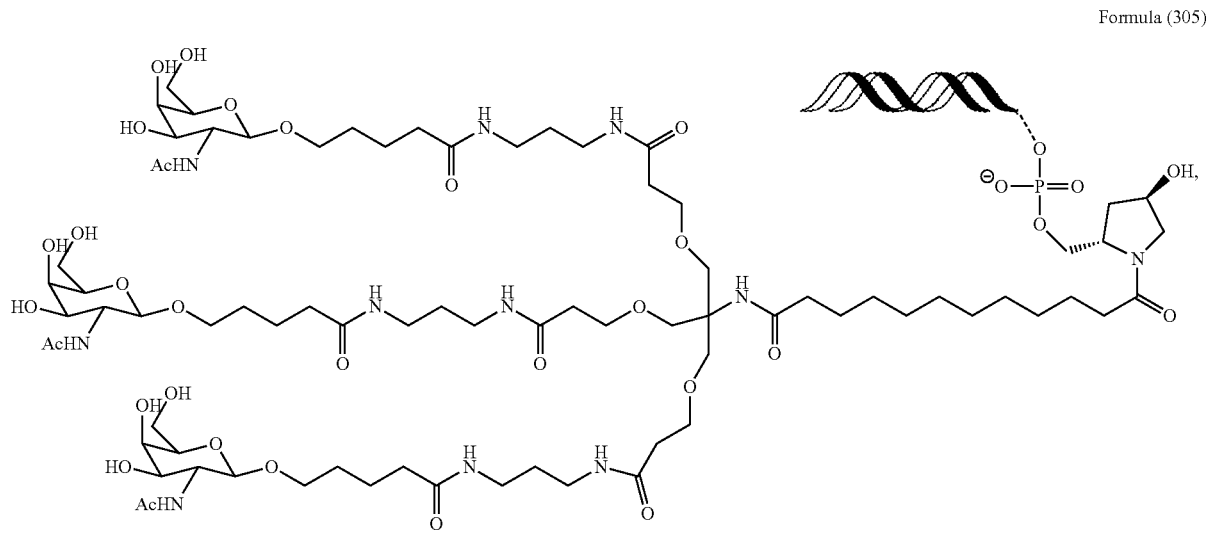

wherein the double helix structure represents an siRNA; and the linker is linked to 3'-terminal of the sense strand of the siRNA.

In some embodiments, when the targeting group is N-acetylgalactosamine, a suitable linker may have a structure as shown by Formula (306):

Formula (306)

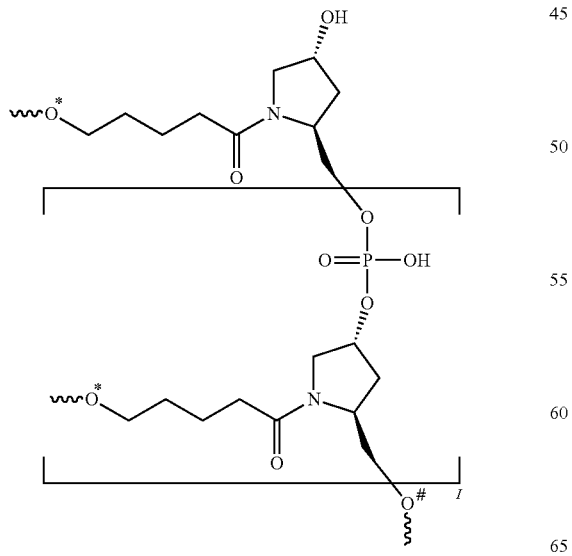

wherein,
l is an integer of 0-3;
* represents a site on the linker linked to the targeting group via an ether bond; and
represents a site on the linker linked to the siRNA via a phosphoester bond.

In some specific embodiments, when l=2, the siRNA conjugate has a structure as shown by Formula (307):

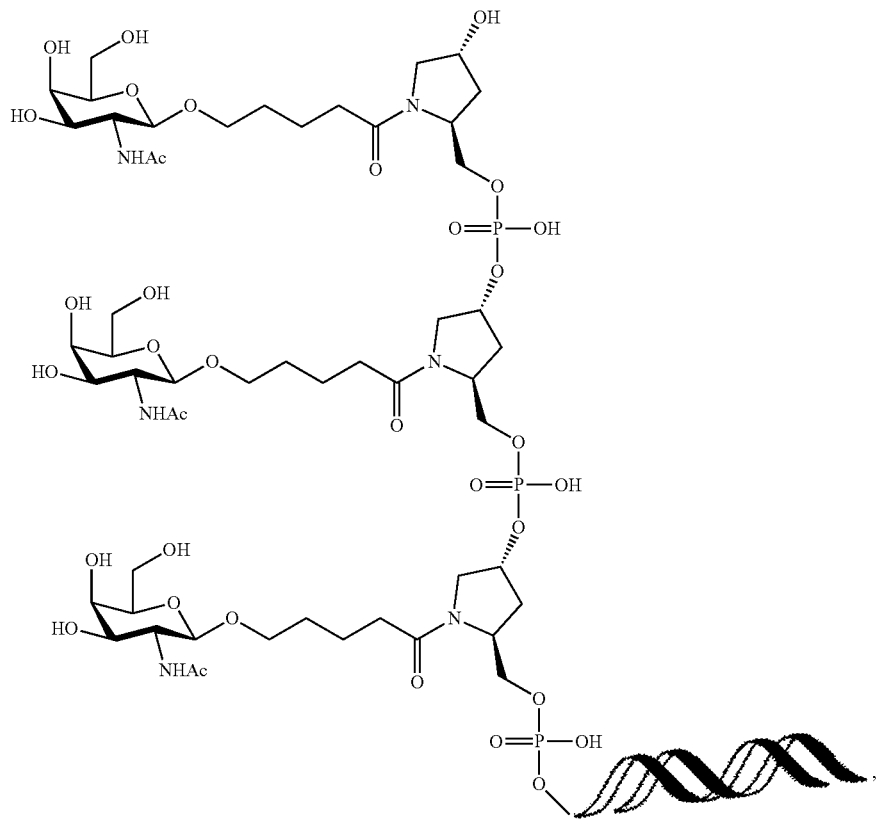

Formula (307)

wherein, the double helix structure denotes an siRNA; and the linker is linked to 3'-terminal of the sense strand of the siRNA.

The above conjugates can be synthesized according to the method described in detail in the prior art. For example, WO2015006740 A2 describes in detail the preparation methods of various conjugates. The siRNA conjugate of the present disclosure may be obtained by the methods well-known to those skilled in the art. For example, WO2014025805A1 describes the preparation method of the conjugate having the structure as shown by Formula (305). Rajeev et al., ChemBioChem 2015, 16, 903-908 describes the preparation method of the conjugate having the structure as shown by Formula (307).

In some embodiments, the siRNA conjugate has a structure as shown by Formula (308):

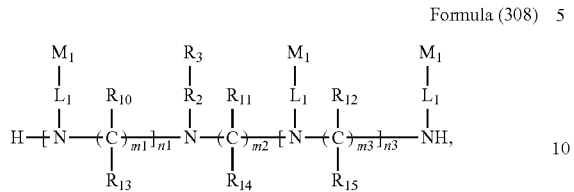

Formula (308)

wherein,
n1 is an integer of 1-3, and n3 is an integer of 0-4;
each m1, m2, or m3 independently of one another is an integer of 2-10;
$R_{10}$, $R_{11}$, $R_{12}$, $R_{13}$, $R_{14}$, or $R_{15}$ independently of one another is H, or selected from the group consisting of $C_1$-$C_{10}$ alkyl, $C_1$-$C_{10}$ haloalkyl, and $C_1$-$C_{10}$ alkoxy,
$R_3$ is a group having a structure as shown by Formula (A59):

(A59)

wherein $E_1$ is OH, SH or $BH_2$; and Nu is the siRNA of the present disclosure;
$R_2$ is a linear alkylene of 1 to 20 carbon atoms in length, wherein one or more carbon atoms are optionally replaced with any one or more groups selected from the group consisting of: C(O), NH, O, S, CH=N, S(O)$_2$, $C_2$-$C_{10}$ alkenylene, $C_2$-$C_{10}$ alkynylene, $C_6$-$C_{10}$ arylene, $C_3$-$C_{18}$ heterocyclylene, and $C_5$-$C_{10}$ heteroarylene, and wherein $R_2$ optionally has any one or more substituents selected from the group consisting of: $C_1$-$C_{10}$ alkyl, $C_6$-$C_{10}$ aryl, $C_5$-$C_{10}$ heteroaryl, $C_1$-$C_{10}$ haloalkyl, —O$C_1$-$C_{10}$ alkyl, —O$C_1$-$C_{10}$ alkylphenyl, —$C_1$-$C_{10}$ alkyl-OH, —O$C_1$-$C_{10}$ haloalkyl, —S$C_1$-$C_{10}$ alkyl, —S$C_1$-$C_{10}$ alkylphenyl, —$C_1$-$C_{10}$ alkyl-SH, —S$C_1$-$C_{10}$ haloalkyl, halo, —OH, —SH, —NH$_2$, —$C_1$-$C_{10}$ alkyl-NH$_2$, —N($C_1$-$C_{10}$ alkyl)($C_1$-$C_{10}$ alkyl), —NH($C_1$-$C_{10}$ alkyl), N($C_1$-$C_{10}$ alkyl)($C_1$-$C_{10}$ alkylphenyl), NH($C_1$-$C_{10}$ alkylphenyl), cyano, nitro, —CO$_2$H, —C(O)O$C_1$-$C_{10}$ alkyl, —CON($C_1$-$C_{10}$ alkyl)($C_1$-$C_{10}$ alkyl), —CONH($C_1$-$C_{10}$ alkyl), —CONH$_2$, —NHC(O)($C_1$-$C_{10}$ alkyl), —NHC(O)(phenyl), —N($C_1$-$C_{10}$ alkyl)C(O)($C_1$-$C_{10}$ alkyl), —N($C_1$-$C_{10}$ alkyl)C(O)(phenyl), —C(O)$C_1$-$C_{10}$ alkyl, —C(O)$C_1$-$C_{10}$ alkylphenyl, —C(O)$C_1$-$C_{10}$ haloalkyl, —OC(O)$C_1$-$C_{10}$ alkyl, —SO$_2$($C_1$-$C_{10}$ alkyl), —SO$_2$(phenyl), —SO$_2$($C_1$-$C_{10}$ haloalkyl), —SO$_2$NH$_2$, —SO$_2$NH($C_1$-$C_{10}$ alkyl), —SO$_2$NH(phenyl), —NHSO$_2$($C_1$-$C_{10}$ alkyl), —NHSO$_2$(phenyl), and —NHSO$_2$($C_1$-$C_{10}$ haloalkyl);
each $L_1$ is independently a linear alkylene of 1 to 70 carbon atoms in length, wherein one or more carbon atoms are optionally replaced with any one or more groups selected from the group consisting of: C(O), NH, O, S, CH=N, S(O)$_2$, $C_2$-$C_{10}$ alkenylene, $C_2$-$C_{10}$ alkynylene, $C_6$-$C_{10}$ arylene, $C_3$-$C_{18}$ heterocyclylene, and $C_5$-$C_{10}$ heteroarylene, and wherein $L_1$ optionally has any one or more substituents selected from the group consisting of: $C_1$-$C_{10}$ alkyl, $C_6$-$C_{10}$ aryl, $C_5$-$C_{10}$ heteroaryl, $C_1$-$C_{10}$ haloalkyl, —O$C_1$-$C_{10}$ alkyl, —O$C_1$-$C_{10}$ alkylphenyl, —$C_1$-$C_{10}$ alkyl-OH, —O$C_1$-$C_{10}$ haloalkyl, —S$C_1$-$C_{10}$ alkyl, —S$C_1$-$C_{10}$ alkylphenyl, —$C_1$-$C_{10}$ alkyl-SH, —S$C_1$-$C_{10}$ haloalkyl, halo, —OH, —SH, —NH$_2$, —$C_1$-$C_{10}$ alkyl-NH$_2$, —N($C_1$-$C_{10}$ alkyl)($C_1$-$C_{10}$ alkyl), —NH($C_1$-$C_{10}$ alkyl), N($C_1$-$C_{10}$ alkyl)($C_1$-$C_{10}$ alkylphenyl), NH($C_1$-$C_{10}$ alkylphenyl), cyano, nitro, —CO$_2$H, —C(O)O$C_1$-$C_{10}$ alkyl, —CON($C_1$-$C_{10}$ alkyl)($C_1$-$C_{10}$ alkyl), —CONH($C_1$-$C_{10}$ alkyl), —CONH$_2$, —NHC(O)($C_1$-$C_{10}$ alkyl), —NHC(O)(phenyl), —N($C_1$-$C_{10}$ alkyl)C(O)($C_1$-$C_{10}$ alkyl), —N($C_1$-$C_{10}$ alkyl)C(O)(phenyl), —C(O)$C_1$-$C_{10}$ alkyl, —C(O)$C_1$-$C_{10}$ alkylphenyl, —C(O)$C_1$-$C_{10}$ haloalkyl, —OC(O)$C_1$-$C_{10}$ alkyl, —SO$_2$($C_1$-$C_{10}$ alkyl), —SO$_2$(phenyl), —SO$_2$($C_1$-$C_{10}$ haloalkyl), —SO$_2$NH$_2$, —SO$_2$NH($C_1$-$C_{10}$ alkyl), —SO$_2$NH(phenyl), —NHSO$_2$($C_1$-$C_{10}$ alkyl), —NHSO$_2$(phenyl), and —NHSO$_2$($C_1$-$C_{10}$ haloalkyl).

In some embodiments, $L_1$ may be selected from the group consisting of the groups of Formulae (A1)-(A26) and any combination thereof, wherein the structures and definitions of A1-A26 are as follows:

(A1)

(A2)

(A3)

(A4)

(A5)

(A6)

(A7)

(A8)

(A9)

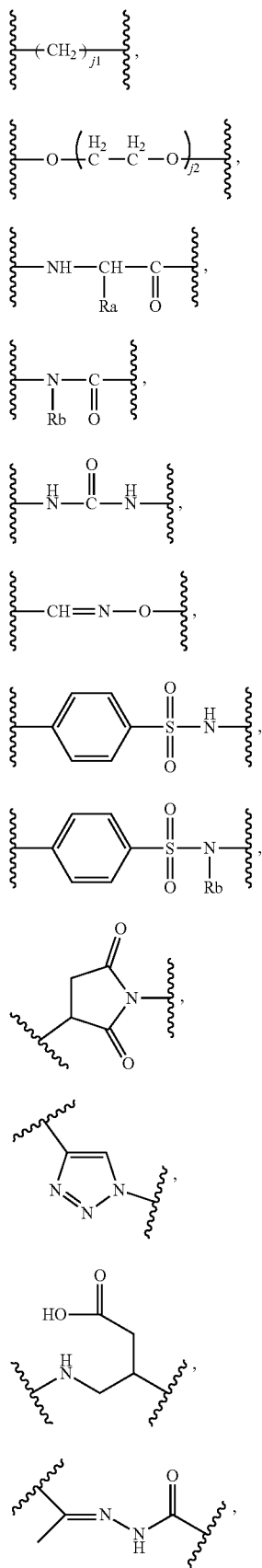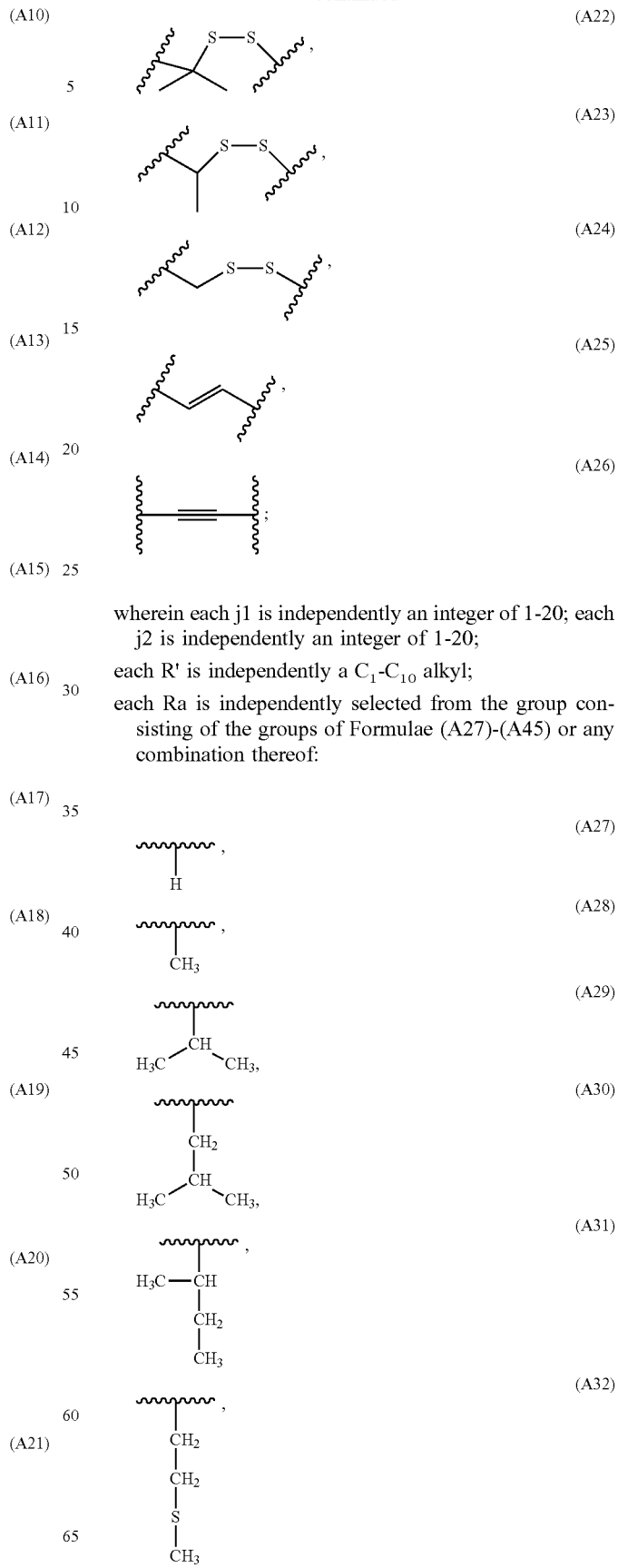
wherein each j1 is independently an integer of 1-20; each j2 is independently an integer of 1-20;
each R' is independently a $C_1$-$C_{10}$ alkyl;
each Ra is independently selected from the group consisting of the groups of Formulae (A27)-(A45) or any combination thereof:

(A33) 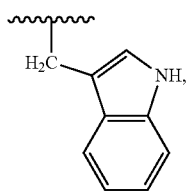

(A34) 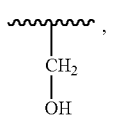

(A35) 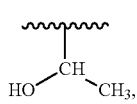

(A36) 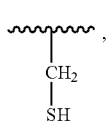

(A37) 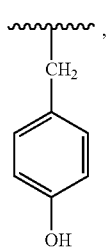

(A38) 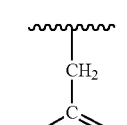

(A39) 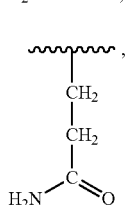

(A40) 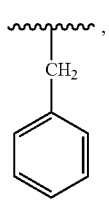

(A41) 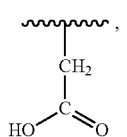

(A42) 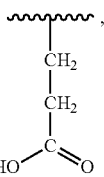

(A43) 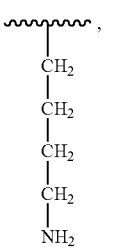

(A44) 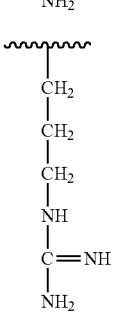 or (A45) 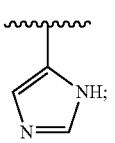

each Rb is independently a $C_1$-$C_{10}$ alkyl; and

〰️ represents the site where a group is covalently linked.

Those skilled in the art would understand that, though $L_1$ is defined as a linear alkyl for convenience, but it may not be a linear group or be named differently, such as an amine or alkenyl produced by the above replacement and/or substitution. For the purpose of the present disclosure, the length of $L_1$ is the number of the atoms in the chain linking the two attachment points. For this purpose, a ring obtained by replacing a carbon atom in the linear alkylene, such as a heterocyclylene or heteroarylene, is counted as one atom.

$M_1$ represents a targeting group, of which the definitions and options are the same as those of the above targeting groups. In some embodiments, each $M_1$ is independently one selected from the ligands that have affinity to the asialoglycoprotein receptor on the surface of mammalian hepatocytes.

When $M_1$ is a ligand that has affinity to the asialoglycoprotein receptor on the surface of mammalian hepatocyte, in some embodiments, n1 may be an integer of 1-3, and n3 may be an integer of 0-4 to ensure that the number of the $M_1$ targeting group in the conjugate may be at least 2. In some embodiments, n1+n3 f 2, such that the number of the $M_1$ targeting group is at least 3, thereby rendering the $M_1$ targeting group to more easily bind to the asialoglycoprotein receptor on the surface of hepatocytes, which may facilitates the endocytosis of the conjugate into cells. Experiments have shown that when the number of the $M_1$ ligand is greater than 3, the ease of the binding between the $M_1$ ligand and the asialoglycoprotein receptor on the surface of hepatocytes is not significantly increased. Therefore, in view of various aspects such as synthesis convenience, structure/process costs and delivery efficiency, in some embodiments, n1 is an integer of 1-2, n3 is an integer of 0-1, and n1+n3=2-3.

In some embodiments, when each m1, m2, or m3 independently of one another is an integer selected from 2-10, the steric positions among many $M_1$ ligands may be suitable for the binding between the $M_1$ ligands and the asialoglycoprotein receptor on the surface of hepatocytes. In order to make the conjugate of the present disclosure have simpler structure, easier synthesis and/or reduced cost, in some embodiments, each m1, m2 or m3 independently of one another is an integer of 2-5; in some embodiments, m1=m2=m3.

Those skilled in the art would understand that when $R_{10}$, $R_{11}$, $R_{12}$, $R_{13}$, $R_{14}$, or $R_{15}$ independently of one another is one selected from H, $C_1$-$C_{10}$alkyl, $C_1$-$C_{10}$haloalkyl, and $C_1$-$C_{10}$alkoxy, they would not change the properties of the siRNA conjugate of the present disclosure and could all achieve the purpose of the present disclosure. In some embodiments, $R_{10}$, $R_{11}$, $R_{12}$, $R_{13}$, $R_{14}$, or $R_{15}$ independently of one another is selected from H, methyl or ethyl. In some embodiments, $R_{10}$, $R_{11}$, $R_{12}$, $R_{13}$, $R_{14}$, and $R_{15}$ are H.

$R_3$ is a group having the structure as shown by Formula (A59), wherein $E_1$ is OH, SH or $BH_2$, and considering the easy availability of the starting materials, in some embodiments, $E_1$ is OH or SH.

$R_2$ is selected to achieve the linkage between the group as shown by Formula (A59) and the N atom on a nitrogenous backbone. In the context of the present disclosure, a "nitrogenous backbone" refers to a chain structure in which the N atom are coadjacently linked to the carbon atoms to which $R_{10}$, $R_{11}$, $R_{12}$, $R_{13}$, $R_{14}$, and $R_{15}$ are attached. Therefore, $R_2$ may be any linking group capable of linking the group as shown by Formula (A59) to the N atom on the nitrogenous backbone by suitable means. In some embodiments, in the case where the siRNA conjugate as shown by Formula (308) is prepared by a solid phase synthesis process, $R_2$ group needs to have both a site linking to the N atom on the nitrogenous backbone and a site linking to the P atom in $R_3$. In some embodiments, in $R_2$, the site linking to the N atom on the nitrogenous backbone forms an amide bond with the N atom, and the site linking to the P atom in $R_3$ forms a phosphoester bond with the P atom. In some embodiments, $R_2$ may be B5, B6, B5', or B6':

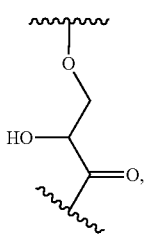

(B5)

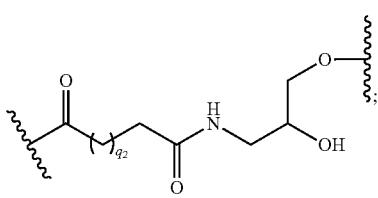

(B6)

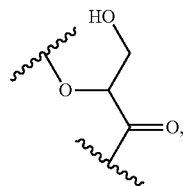

(B5')

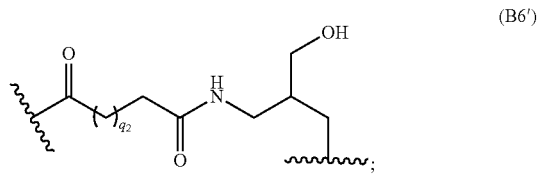

(B6')

wherein ∿∿∿ represents the site where the group is linked via a covalent bond;

$q_2$ is an integer of 1-10; in some embodiments, $q_2$ is an integer of 1-5.

$L_1$ is used to link the $M_1$ targeting group to the N atom on the nitrogenous backbone, thereby providing liver targeting function for the siRNA conjugate as shown by Formula (308). In some embodiments, $L_1$ is selected from the connection combinations of one or more of Formulae (A1)-(A26). In some embodiments, $L_1$ is selected from the connection combinations of one or more of Formulae (A1), (A4), (A5), (A6), (A8), (A10), (A11), and (A13). In some embodiments, $L_1$ is selected from the connection combinations of at least two of Formulae (A1), (A4), (A8), (A10), and (A11). In some embodiments, $L_1$ is selected from the connection combinations of at least two of Formulae (A1), (A8) and (A10).

In some embodiments, $L_1$ may have a length of 3 to 25, 3 to 20, 4 to 15 or 5 to 12 atoms. In some embodiments, $L_1$ has a length of 3, 4, 5, 6, 7, 8, 9, 10, 11, 12, 13, 14, 15, 16, 17, 18, 19, 20, 21, 22, 23, 24, 25, 30, 35, 40, 45, 50, 55, or 60 atoms.

In some embodiments, j1 is an integer of 2-10, and in some embodiments, j1 is an integer of 3-5. In some embodiments, j2 is an integer of 2-10, and in some embodiments, j2 is an integer of 3-5. R' is a $C_1$-$C_4$ alkyl, and in some embodiments, R' is one of methyl, ethyl and isopropyl. Ra is one of Formulae (A27), (A28), (A29), (A30), and (A31), and in some embodiments, Ra is Formula (A27) or (A28). Rb is a $C_1$-$C_5$ alkyl, and in some embodiments, is one of methyl, ethyl, isopropyl, and butyl. In some embodiments, j1, j2, R', Ra, and Rb in Formulae (A1)-(A26) are respectively selected to achieve the linkage between the $M_1$ targeting groups and the N atom on the nitrogenous backbone, and to make the steric position among the $M_1$ targeting groups more suitable for binding between the $M_1$ targeting groups and the asialoglycoprotein receptor on the surface of hepatocytes.

In some embodiments, the siRNA conjugate has a structure as shown by Formula (403), (404), (405), (406), (407), (408), (409), (410), (411), (412), (413), (414), (415), (416), (417), (418), (419), (420), (421) or (422):

Formula (403)
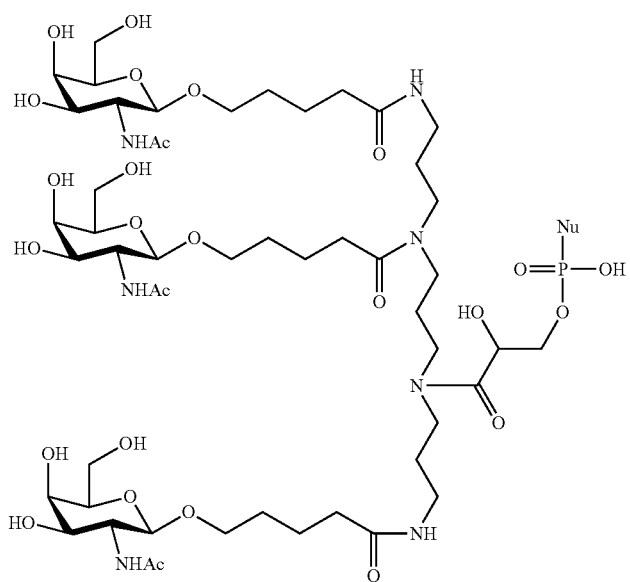
Formula (404)
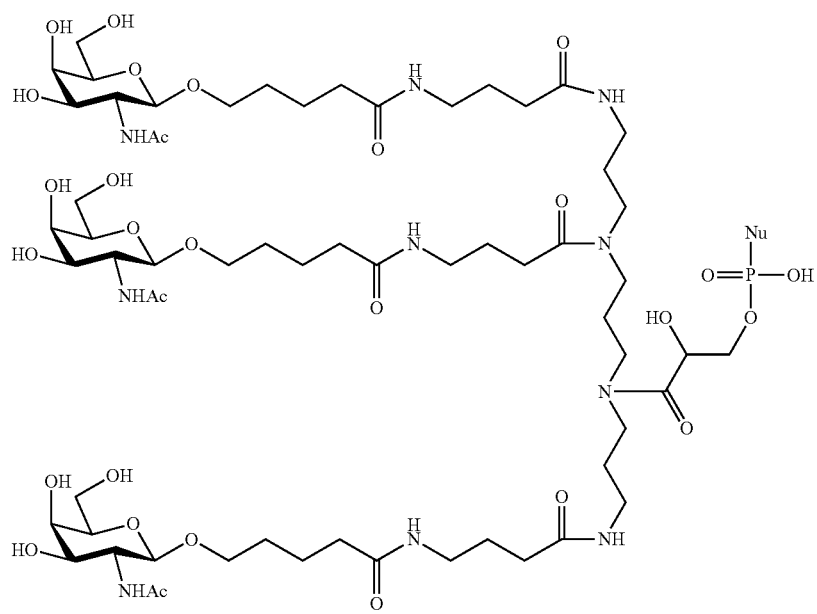

Formula (405)
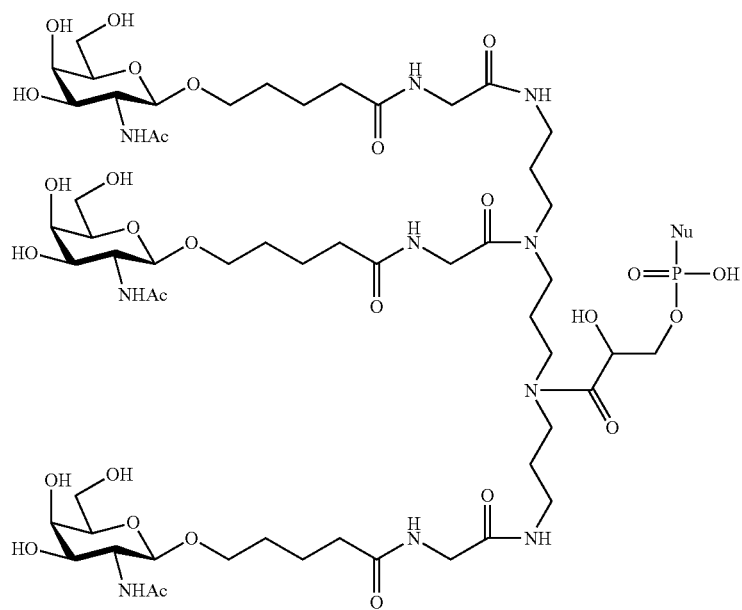
Formula (406)
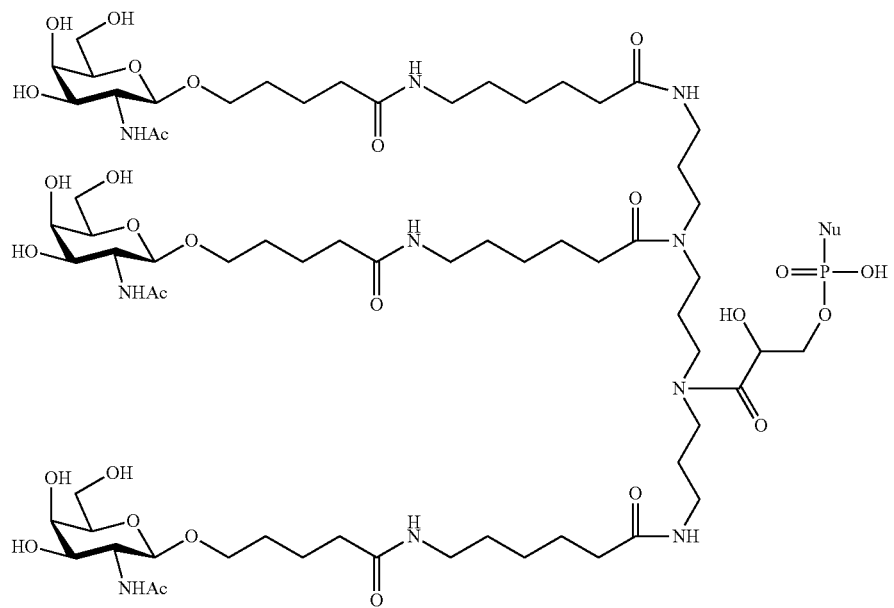

Formula (407)
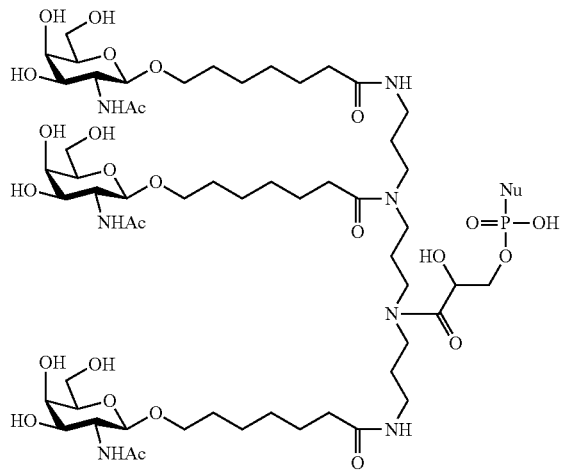
Formula (408)
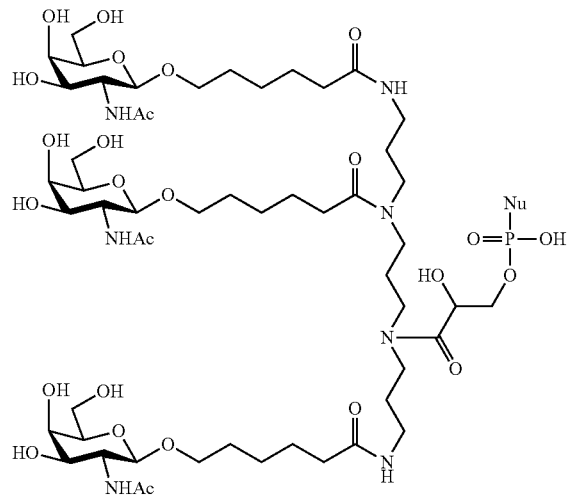
Formula (409)
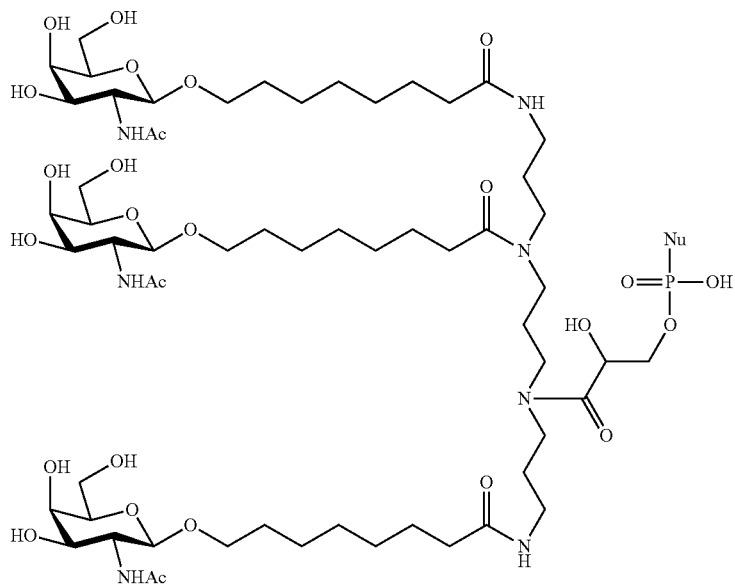

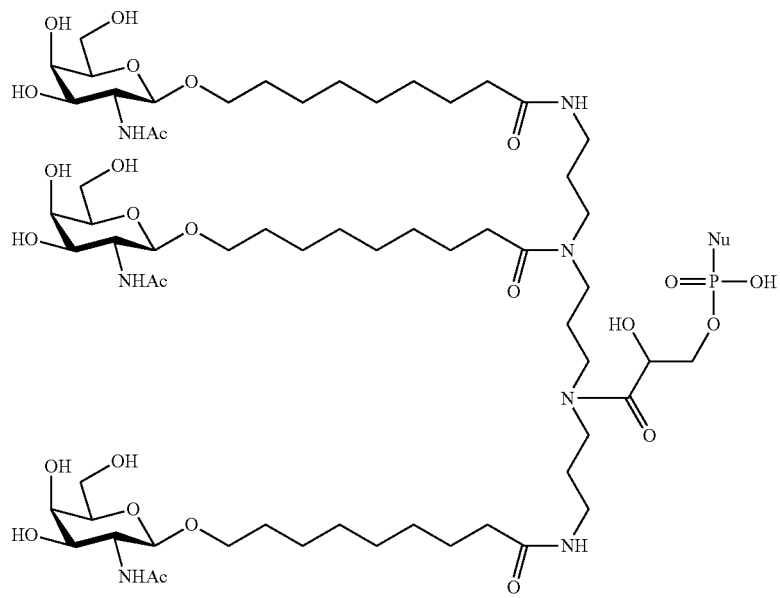
Formula (410)
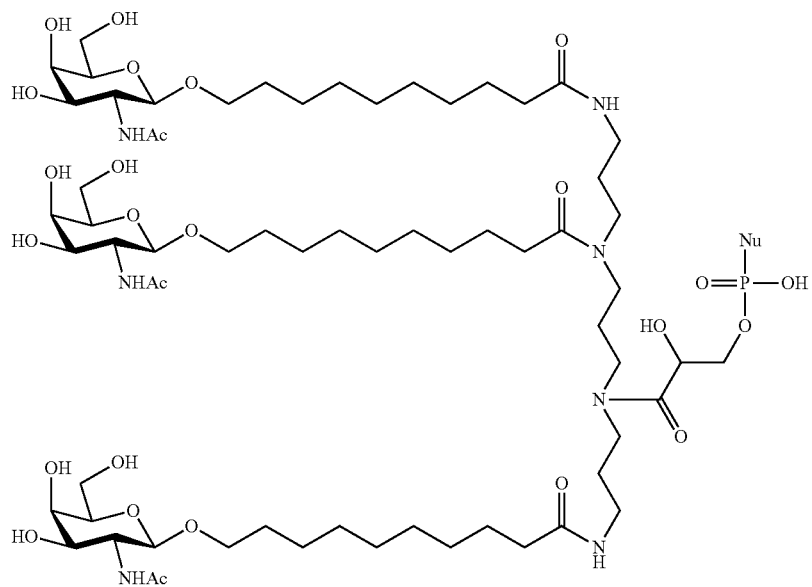
Formula (411)

Formula (412)
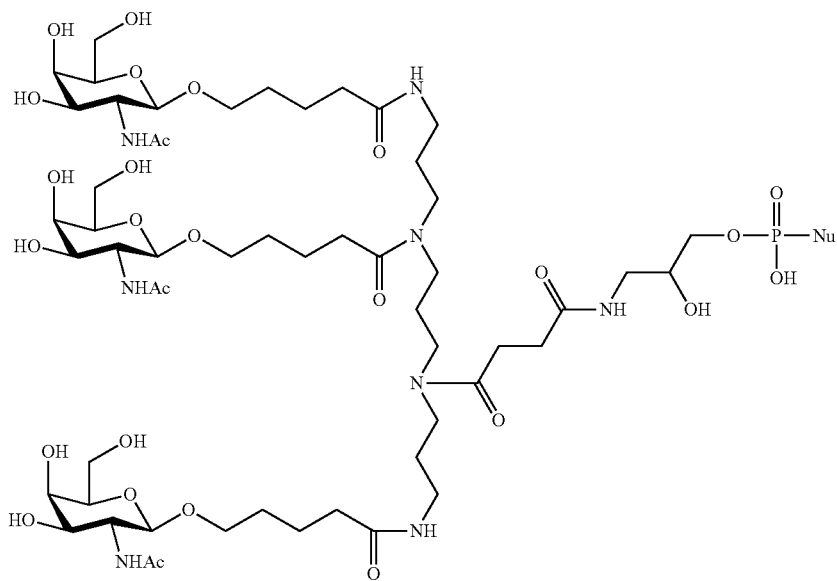
Formula (413)
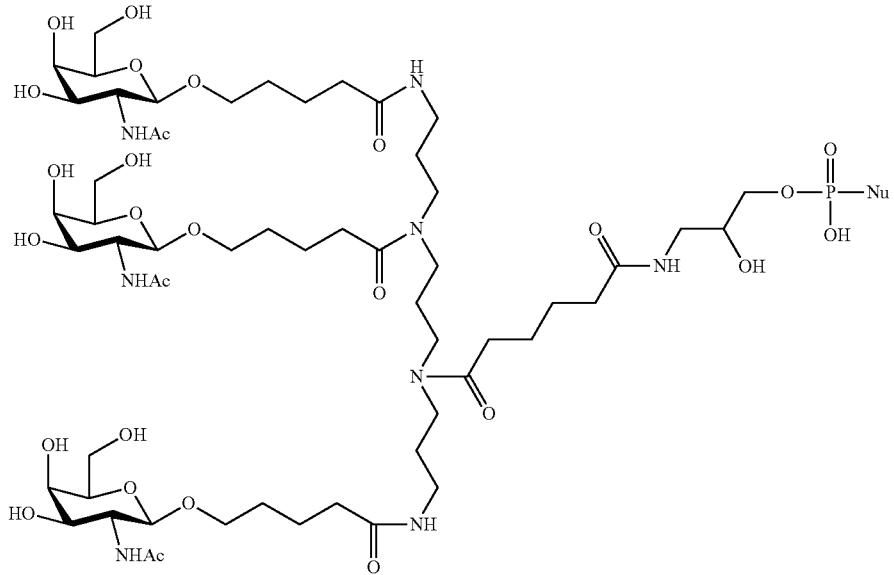

-continued
Formula (414)
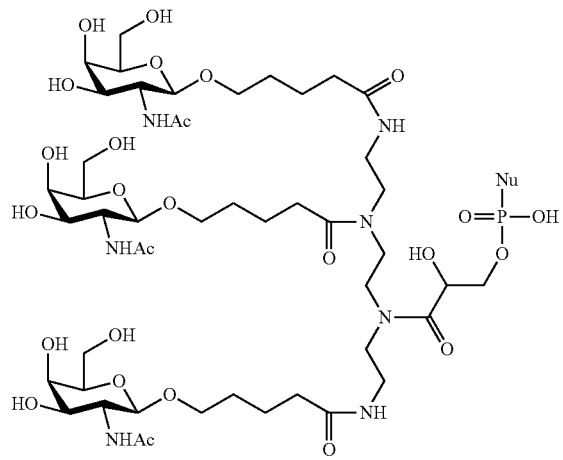
Formula (415)
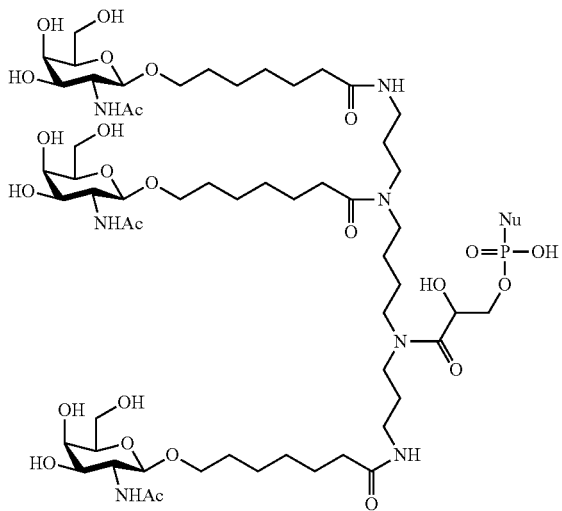
Formula (416)
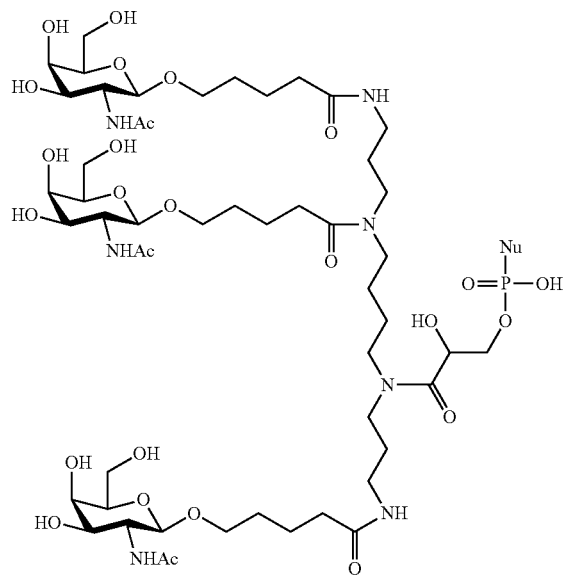
Formula (417)
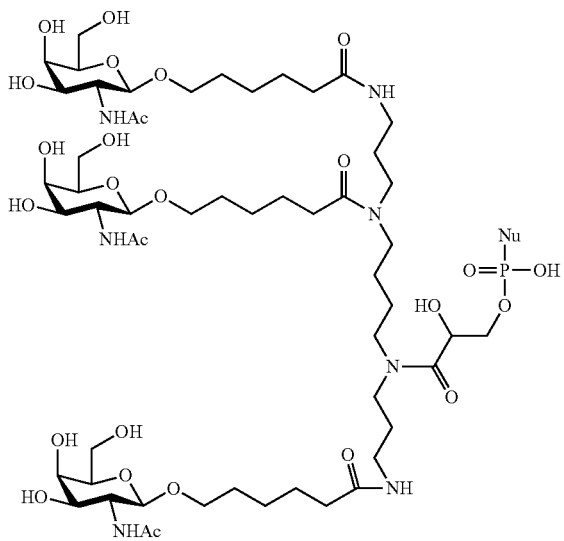

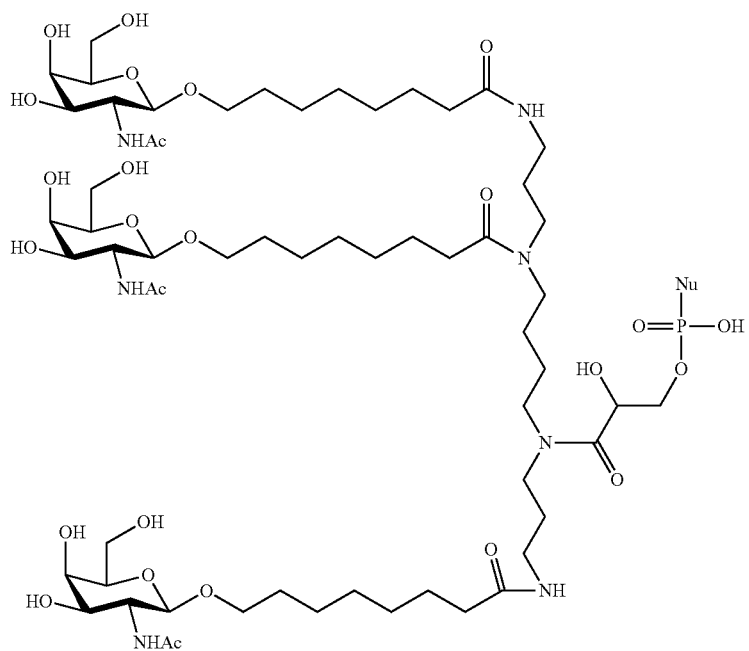
Formula (418)
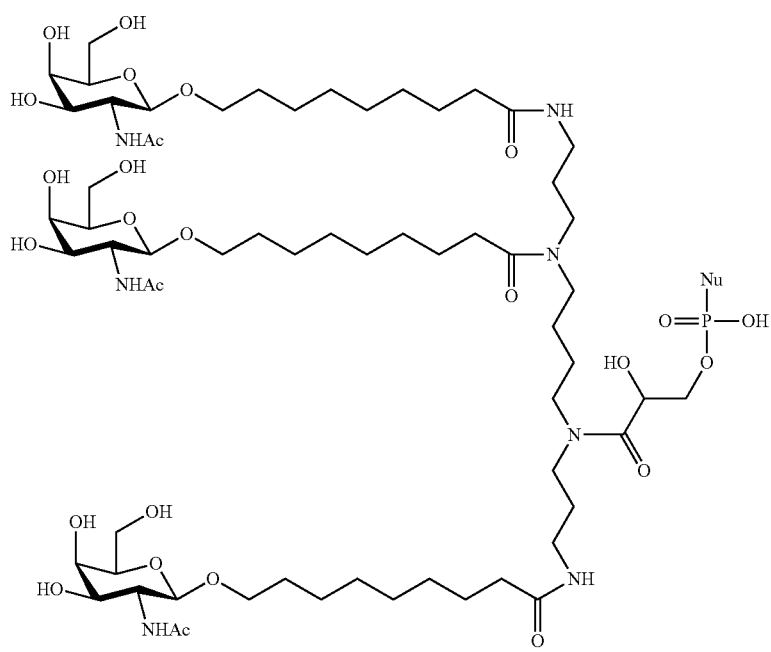
Formula (419)

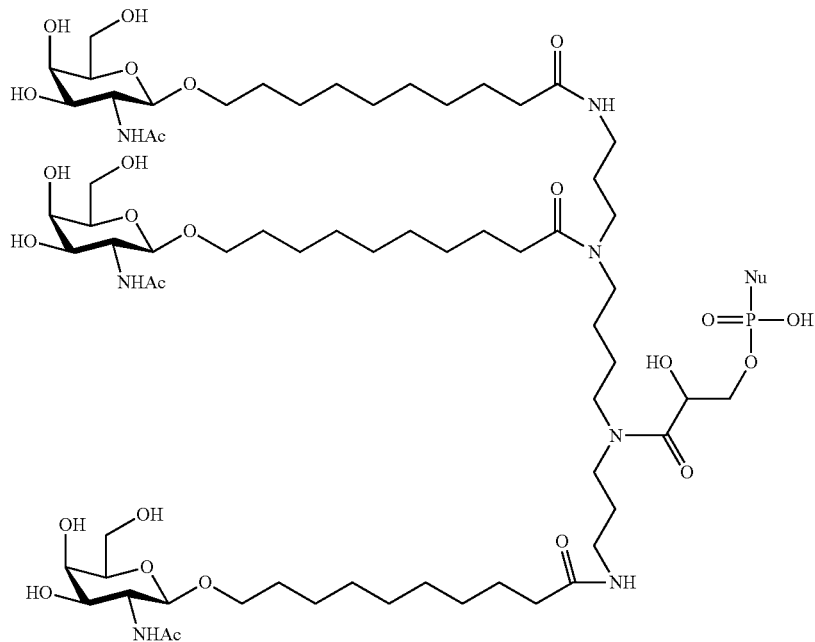

Formula (420)

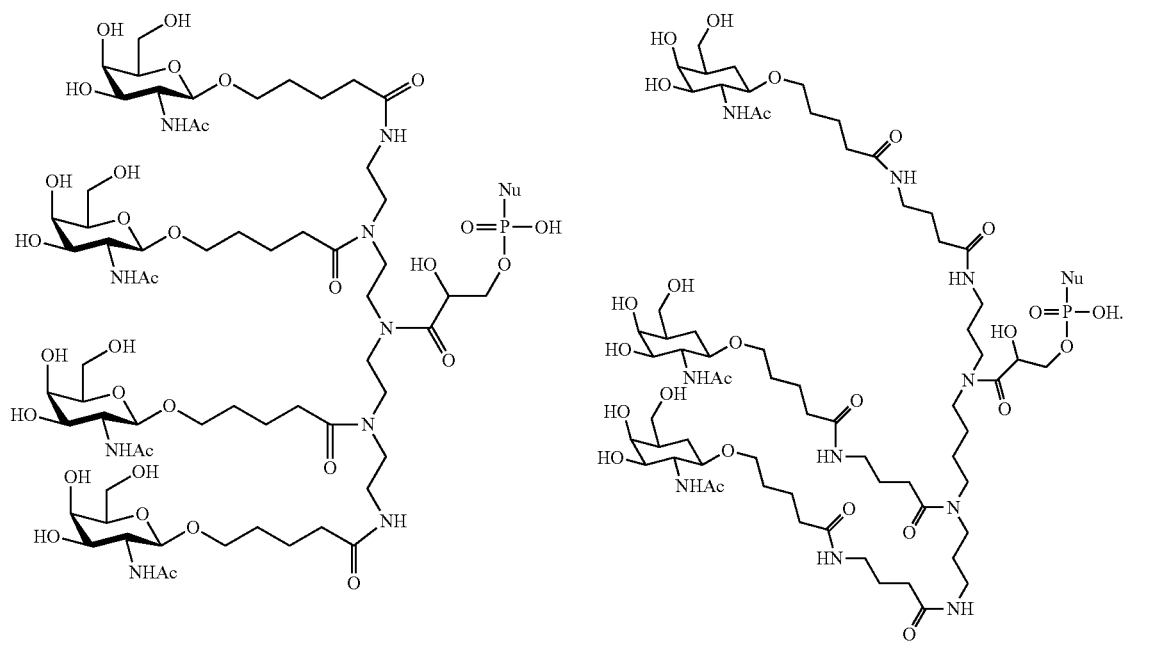

Formula (421)

Formula (422)

In some embodiments, the P atom in Formula (A59) may be linked to any possible position in the siRNA sequence. For example, the P atom in Formula (A59) may be linked to any nucleotide in the sense or antisense strand of the siRNA. In some embodiments, the P atom in Formula (A59) is linked to any nucleotide in the sense strand of the siRNA. In some embodiments, the P atom in Formula (A59) may be linked to a terminal region of the sense or antisense strand of the siRNA. In some embodiments, the P atom in Formula (A59) is linked to a terminal region of the sense strand of the siRNA. Said terminal region refers to the first 4 nucleotides counted from one terminal of the sense or antisense strand. In some embodiments, the P atom in Formula (A59) is linked to either terminal of the sense or antisense strand of the siRNA. In some embodiments, the P atom in Formula (A59) is linked to 3' terminal of the sense strand of the siRNA. In the case where the P atom in Formula (A59) is linked to the above position of the sense strand of the siRNA, after having entered into cells, the siRNA conjugate as shown by Formula (308) can release a separate antisense strand of the siRNA during unwinding, thereby blocking the translation of the PCSK9 mRNA into a protein and inhibiting the expression of PCSK9 gene.

In some embodiments, the P atom in Formula (A59) may be linked to any possible position of a nucleotide in the siRNA, for example, position 5', position 2', position 3', or the base of the nucleotide. In some embodiments, the P atom in Formula (A59) may be linked to position 2', 3', or 5' of a nucleotide in the siRNA by forming a phosphodiester bond. In some embodiments, the P atom in Formula (A59) is linked to an oxygen atom formed by dehydrogenation of 3'-hydroxy of the nucleotide at 3' terminal of the sense strand in the siRNA (in this case, the P atom in Formula (A59) may be also regarded as the P atom in the phosphate group of the siRNA), or the P atom in Formula (A59) is linked to a nucleotide by substituting a hydrogen atom in 2'-hydroxy of a nucleotide of the sense strand in the siRNA, or the P atom in Formula (A59) is linked to a nucleotide by substituting a hydrogen atom in 5'-hydroxy of the nucleotide at 5' terminal of the sense strand in the siRNA.

The inventors of the present disclosure have surprisingly found that the siRNA conjugate of the present disclosure exhibits significantly improved stability in plasma and low off-target effect, and exhibits realtively high silencing activity against PCSK9 mRNA, and further shows higher inhibitory effect on blood lipid. In some embodiments, the siRNA of the present disclosure can be any one of the siRNAs shown in Tables 1a-1g. The conjugates comprising these siRNAs exhibit higher silencing activity against PCSK9 mRNA.

TABLE 1a

The sequences of first siRNAs of the present disclosure

| siRNA NO. | SEQ ID NO: | Sequence direction 5'-3' |
|---|---|---|
| siPCSKa1 | 9 | AAGCAAGCAGACAUUUAUC |
|  | 10 | GAUAAAUGUCUGCUUGCUUGG |
| siPCSKa2 | 11 | CCAAGCAAGCAGACAUUUAUC |
|  | 12 | GAUAAAUGUCUGCUUGCUUGGGU |
| siPCSKa1-M1 | 13 | AmAmGmCmAmAmGfCfAfGmAmCmAmUmUmUmAmUmCm |
|  | 14 | GmAfUmAmAmAfUmGmUmCmUmGmCmUfUmGfCmUmUmGmGm |
| siPCSKa1-M2 | 15 | AmAmGmCmAfAmGfCfAfGmAmCmAmUmUmUmAmUmCm |
|  | 16 | GmAfUmAmAmAfUmGfUfCmUmGmCmUfUmGfCmUmUmGmGm |
| siPCSKa1-M3 | 17 | AmAmGmCmAfAmGfCfAfGmAmCmAmUmUmUmAmUmCm |
|  | 18 | GmAfUmAmAmAfUmGmUmCmUmGmCmUfUmGfCmUmUmGmGm |
| siPCSKa2-M1 | 19 | CmCmAmAmGmCmAmAmGfCfAfGmAmCmAmUmUmUmAmUmCm |
|  | 20 | GmAfUmAmAmAfUmGmUmCmUmGmCmUfUmGfCmUmUmGmGmGmUm |
| siPCSKa2-M2 | 21 | CmCmAmAmGmCmAfAmGfCfAfGmAmCmAmUmUmUmAmUmCm |
|  | 22 | GmAfUmAmAmAfUmGfUfCmUmGmCmUfUmGfCmUmUmGmGmGmUm |
| siPCSKa2-M3 | 23 | CmCmAmAmGmCmAfAmGfCfAfGmAmCmAmUmUmUmAmUmCm |
|  | 24 | GmAfUmAmAmAfUmGmUmCmUmGmCmUfUmGfCmUmUmGmGmGmUm |
| siPCSKa1-M1S | 25 | AmsAmsGmCmAmAmGfCfAfGmAmCmAmUmUmUmAmUmCm |
|  | 26 | GmsAfsUmAmAmAfUmGmUmCmUmGmCmUfUmGfCmUmUmsGmsGm |
| siPCSKa1-M2S | 27 | AmsAmsGmCmAfAmGfCfAfGmAmCmAmUmUmUmAmUmCm |
|  | 28 | GmsAfsUmAmAmAfUmGfUfCmUmGmCmUfUmGfCmUmUmsGmsGm |
| siPCSKa1-M3S | 29 | AmsAmsGmCmAfAmGfCfAfGmAmCmAmUmUmUmAmUmCm |
|  | 30 | GmsAfsUmAmAmAfUmGmUmCmUmGmCmUfUmGfCmUmUmsGmsGm |
| siPCSKa2-M1S | 31 | CmsCmsAmAmGmCmAmAmGfCfAfGmAmCmAmUmUmUmAmUmCm |
|  | 32 | GmsAfsUmAmAmAfUmGmUmCmUmGmCmUfUmGfCmUmUmGmGmsGmsUm |
| siPCSKa2-M2S | 33 | CmsCmsAmAmGmCmAfAmGfCfAfGmAmCmAmUmUmUmAmUmCm |
|  | 34 | GmsAfsUmAmAmAfUmGfUfCmUmGmCmUfUmGfCmUmUmGmGmsGmsUm |
| siPCSKa2-M3S | 35 | CmsCmsAmAmGmCmAfAmGfCfAfGmAmCmAmUmUmUmAmUmCm |
|  | 36 | GmsAfsUmAmAmAfUmGmUmCmUmGmCmUfUmGfCmUmUmGmGmsGmsUm |
| siPCSKa1-M1P1 | 37 | AmAmGmCmAmAmGfCfAfGmAmCmAmUmUmUmAmUmCm |
|  | 38 | P1GmAfUmAmAmAfUmGmUmCmUmGmCmUfUmGfCmUmUmGmGm |
| siPCSKa1-M2P1 | 39 | AmAmGmCmAfAmGfCfAfGmAmCmAmUmUmUmAmUmCm |
|  | 40 | P1GmAfUmAmAmAfUmGfUfCmUmGmCmUfUmGfCmUmUmGmGm |
| siPCSKa1-M3P1 | 41 | AmAmGmCmAfAmGfCfAfGmAmCmAmUmUmUmAmUmCm |
|  | 42 | P1GmAfUmAmAmAfUmGmUmCmUmGmCmUfUmGfCmUmUmGmGm |
| siPCSKa2-M1P1 | 43 | CmCmAmAmGmCmAmAmGfCfAfGmAmCmAmUmUmUmAmUmCm |
|  | 44 | P1GmAfUmAmAmAfUmGmUmCmUmGmCmUfUmGfCmUmUmGmGmGmUm |

TABLE 1a-continued

The sequences of first siRNAs of the present disclosure

| siRNA NO. | SEQ ID NO: | Sequence direction 5'-3' |
|---|---|---|
| siPCSKa2-M2P1 | 45 | CmCmAmAmGmCmAfAmGfCfAfGmAmCmAmUmUmUmAmUmCm |
|  | 46 | P1GmAfUmAmAmAfUmGfUfCmUmGmCmUfUmGfCmUmUmGmGmUm |
| siPCSKa2-M3P1 | 47 | CmCmAmAmGmCmAfAmGfCfAfGmAmCmAmUmUmUmAmUmCm |
|  | 48 | P1GmAfUmAmAmAfUmGmUmCmUmGmCmUfUmGfCmUmUmGmGmUm |
| siPCSKa1-M1SP1 | 49 | AmsAmsGmCmAmAmGfCfAfGmAmCmAmUmUmUmAmUmCm |
|  | 50 | P1GmsAfsUmAmAmAfUmGmUmCmUmGmCmUfUmGfCmUmUmsGmsGm |
| siPCSKa1-M2SP1 | 51 | AmsAmsGmCmAfAmGfCfAfGmAmCmAmUmUmUmAmUmCm |
|  | 52 | P1GmsAfsUmAmAmAfUmGfUfCmUmGmCmUfUmGfCmUmUmsGmsGm |
| siPCSKa1-M3SP1 | 53 | AmsAmsGmCmAfAmGfCfAfGmAmCmAmUmUmUmAmUmCm |
|  | 54 | P1GmsAfsUmAmAmAfUmGmUmCmUmGmCmUfUmGfCmUmUmsGmsGm |
| siPCSKa2-M1SP1 | 55 | CmsCmsAmAmGmCmAmAmGfCfAfGmAmCmAmUmUmUmAmUmCm |
|  | 56 | P1GmsAfsUmAmAmAfUmGmUmCmUmGmCmUfUmGfCmUmUmGmGmsGmsUm |
| siPCSKa2-M2SP1 | 57 | CmsCmsAmAmGmCmAfAmGfCfAfGmAmCmAmUmUmUmAmUmCm |
|  | 58 | P1GmsAfsUmAmAmAfUmGfUfCmUmGmCmUfUmGfCmUmUmGmGmsGmsUm |
| siPCSKa2-M3SP1 | 59 | CmsCmsAmAmGmCmAfAmGfCfAfGmAmCmAmUmUmUmAmUmCm |
|  | 60 | P1GmsAfsUmAmAmAfUmGmUmCmUmGmCmUfUmGfCmUmUmGmGmsGmsUm |

TABLE 1b

The sequences of second siRNAs of the present disclosure

| siRNA NO. | SEQ ID NO: | Sequence direction 5'-3' |
|---|---|---|
| siPCSKb1 | 69 | UUUGUAGCAUUUUUAUUAA |
|  | 70 | UUAAUAAAAAUGCUACAAAAC |
| siPCSKb2 | 71 | GUUUUGUAGCAUUUUUAUUAA |
|  | 72 | UUAAUAAAAAUGCUACAAAACCC |
| siPCSKb1-M1 | 73 | UmUmUmGmUmAmGfCfAfUmUmUmUmUmAmUmUmAmAm |
|  | 74 | UmUfAmAmUmAfAmAmAmAmUmGfCmUfAmCmAmAmAmAmCm |
| siPCSKb1-M2 | 75 | UmUmUmGmUfAmGfCfAfUmUmUmUmUmAmUmUmAmAm |
|  | 76 | UmUfAmAmUmAfAmAfAfAmUmGfCmUfAmCmAmAmAmAmCm |
| siPCSKb1-M3 | 77 | UmUmUmGmUfAmGfCfAfUmUmUmUmUmAmUmUmAmAm |
|  | 78 | UmUfAmAmUmAfAmAmAmAmUmGfCmUfAmCmAmAmAmAmCm |
| siPCSKb2-M1 | 79 | GmUmUmUmUmGmUmAmGfCfAfUmUmUmUmUmAmUmUmAmAm |
|  | 80 | UmUfAmAmUmAfAmAmAmAmUmGfCmUfAmCmAmAmAmAmCmCmCm |
| siPCSKb2-M2 | 81 | GmUmUmUmUmGmUfAmGfCfAfUmUmUmUmUmAmUmUmAmAm |
|  | 82 | UmUfAmAmUmAfAmAfAfAmUmGfCmUfAmCmAmAmAmAmCmCmCm |
| siPCSKb2-M3 | 83 | GmUmUmUmUmGmUfAmGfCfAfUmUmUmUmUmAmUmUmAmAm |
|  | 84 | UmUfAmAmUmAfAmAmAmAmUmGfCmUfAmCmAmAmAmAmCmCmCm |
| siPCSKb1-M1S | 85 | UmsUmsUmGmUmAmGfCfAfUmUmUmUmUmAmUmUmAmAm |
|  | 86 | UmsUfsAmAmUmAfAmAmAmAmUmGfCmUfAmCmAmAmAmsAmsCm |
| siPCSKb1-M2S | 87 | UmsUmsUmGmUfAmGfCfAfUmUmUmUmUmAmUmUmAmAm |
|  | 88 | UmsUfsAmAmUmAfAmAfAfAmUmGfCmUfAmCmAmAmAmsAmsCm |
| siPCSKb1-M3S | 89 | UmsUmsUmGmUfAmGfCfAfUmUmUmUmUmAmUmUmAmAm |
|  | 90 | UmsUfsAmAmUmAfAmAmAmAmUmGfCmUfAmCmAmAmAmsAmsCm |

TABLE 1b-continued

The sequences of second siRNAs of the present disclosure

| siRNA NO. | SEQ ID NO: | Sequence direction 5'-3' |
|---|---|---|
| siPCSKb2-M1S | 91 | GmsUmsUmUmUmGmUmAmGfCfAfUmUmUmUmAmUmUmAmAm |
|  | 92 | UmsUfsAmAmUmAfAmAmAmAmUmGfCmUfAmCmAmAmAmAmCmsCmsCm |
| siPCSKb2-M2S | 93 | GmsUmsUmUmUmGmUfAmGfCfAfUmUmUmUmAmUmUmAmAm |
|  | 94 | UmsUfsAmAmUmAfAmAfAfAmUmGfCmUfAmCmAmAmAmAmCmsCmsCm |
| siPCSKb2-M3S | 15 | GmsUmsUmUmUmGmUfAmGfCfAfUmUmUmUmAmUmUmAmAm |
|  | 96 | UmsUfsAmAmUmAfAmAmAmAmUmGfCmUfAmCmAmAmAmAmCmsCmsCm |
| siPCSKb1-M1P1 | 97 | UmUmUmGmUmAmGfCfAfUmUmUmUmAmUmUmAmAm |
|  | 98 | P1UmUfAmAmUmAfAmAmAmAmUmGfCmUfAmCmAmAmAmAmCm |
| siPCSKb1-M2P1 | 99 | UmUmUmGmUfAmGfCfAfUmUmUmUmAmUmUmAmAm |
|  | 100 | P1UmUfAmAmUmAfAmAfAfAmUmGfCmUfAmCmAmAmAmAmCm |
| siPCSKb1-M3P1 | 101 | UmUmUmGmUfAmGfCfAfUmUmUmUmAmUmUmAmAm |
|  | 102 | P1UmUfAmAmUmAfAmAmAmAmUmGfCmUfAmCmAmAmAmAmCm |
| siPCSKb2-M1P1 | 103 | GmUmUmUmUmGmUmAmGfCfAfUmUmUmUmAmUmUmAmAm |
|  | 104 | P1UmUfAmAmUmAfAmAmAmAmUmGfCmUfAmCmAmAmAmAmCmCmCm |
| siPCSKb2-M2P1 | 105 | GmUmUmUmUmGmUfAmGfCfAfUmUmUmUmAmUmUmAmAm |
|  | 106 | P1UmUfAmAmUmAfAmAfAfAmUmGfCmUfAmCmAmAmAmAmCmCmCm |
| siPCSKb2-M3P1 | 107 | GmUmUmUmUmGmUfAmGfCfAfUmUmUmUmAmUmUmAmAm |
|  | 108 | P1UmUfAmAmUmAfAmAmAmAmUmGfCmUfAmCmAmAmAmAmCmCmCm |
| siPCSKb1-M1SP1 | 109 | UmsUmsUmGmUmAmGfCfAfUmUmUmUmAmUmUmAmAm |
|  | 110 | P1UmsUfsAmAmUmAfAmAmAmAmUmGfCmUfAmCmAmAmAmsAmsCm |
| siPCSKb1-M2SP1 | 111 | UmsUmsUmGmUfAmGfCfAfUmUmUmUmAmUmUmAmAm |
|  | 112 | P1UmsUfsAmAmUmAfAmAfAfAmUmGfCmUfAmCmAmAmAmsAmsCm |
| siPCSKb1-M3SP1 | 113 | UmsUmsUmGmUfAmGfCfAfUmUmUmUmAmUmUmAmAm |
|  | 114 | P1UmsUfsAmAmUmAfAmAmAmAmUmGfCmUfAmCmAmAmAmsAmsCm |
| siPCSKb2-M1SP1 | 115 | GmsUmsUmUmUmGmUmAmGfCfAfUmUmUmUmAmUmUmAmAm |
|  | 116 | P1UmsUfsAmAmUmAfAmAmAmAmUmGfCmUfAmCmAmAmAmAmCmsCmsCm |
| siPCSKb2-M2SP1 | 117 | GmsUmsUmUmUmGmUfAmGfCfAfUmUmUmUmAmUmUmAmAm |
|  | 118 | P1UmsUfsAmAmUmAfAmAfAfAmUmGfCmUfAmCmAmAmAmAmCmsCmsCm |
| siPCSKb2-M3SP1 | 119 | GmsUmsUmUmUmGmUfAmGfCfAfUmUmUmUmAmUmUmAmAm |
|  | 120 | P1UmsUfsAmAmUmAfAmAmAmAmUmGfCmUfAmCmAmAmAmAmCmsCmsCm |

TABLE 1c

The sequences of third siRNAs of the present disclosure

| siRNA NO. | SEQ ID NO: | Sequence direction 5'-3' |
|---|---|---|
| siPCSKc1 | 129 | GCCUGGAGUUUAUUCGGAA |
|  | 130 | UUCCGAAUAAACUCCAGGCCU |
| siPCSKc2 | 131 | AGGCCUGGAGUUUAUUCGGAA |
|  | 132 | UUCCGAAUAAACUCCAGGCCUAU |
| siPCSKc1-M1 | 133 | GmCmCmUmGmGmAfGfUfUmUmAmUmUmCmGmGmAmAm |
|  | 134 | UmUfCmCmGmAfAmUmAmAmAmCmUmCfCmAfGmGmCmCmUm |

TABLE 1c-continued

The sequences of third siRNAs of the present disclosure

| siRNA NO. | SEQ ID NO: | Sequence direction 5'-3' |
| --- | --- | --- |
| siPCSKc1-M2 | 135<br>136 | GmCmCmUmGfGmAfGfUfUmUmAmUmCmGmGmAmAm<br>UmUfCmCmGmAfAmUfAfAmAmCmUmCfCmAfGmGmCmCmUm |
| siPCSKc1-M3 | 137<br>138 | GmCmCmUmGfGmAfGfUfUmUmAmUmCmGmGmAmAm<br>UmUfCmCmGmAfAmUmAmAmAmCmUmCfCmAfGmGmCmCmUm |
| siPCSKc2-M1 | 139<br>140 | AmGmCmCmUmGmGmAfGfUfUmUmAmUmUmCmGmGmAmAm<br>UmUfCmCmGmAfAmUmAmAmAmCmUmCfCmAfGmGmCmCmUmAmUm |
| siPCSKc2-M2 | 141<br>142 | AmGmCmCmUmGfGmAfGfUfUmUmAmUmUmCmGmGmAmAm<br>UmUfCmCmGmAfAmUfAfAmAmCmUmCfCmAfGmGmCmCmUmAmUm |
| siPCSKc2-M3 | 143<br>144 | AmGmCmCmUmGfGmAfGfUfUmUmAmUmUmCmGmGmAmAm<br>UmUfCmCmGmAfAmUmAmAmAmCmUmCfCmAfGmGmCmCmUmAmUm |
| siPCSKc1-M1S | 145<br>146 | GmsCmsCmUmGmGmAfGfUfUmUmAmUmUmCmGmGmAmAm<br>UmsUfsCmCmGmAfAmUmAmAmAmCmUmCfCmAfGmGmCmsCmsUm |
| siPCSKc1-M2S | 147<br>148 | GmsCmsCmUmGfGmAfGfUfUmUmAmUmUmCmGmGmAmAm<br>UmsUfsCmCmGmAfAmUfAfAmAmCmUmCfCmAfGmGmCmsCmsUm |
| siPCSKc1-M3S | 149<br>150 | GmsCmsCmUmGfGmAfGfUfUmUmAmUmUmCmGmGmAmAm<br>UmsUfsCmCmGmAfAmUmAmAmAmCmUmCfCmAfGmGmCmsCmsUm |
| siPCSKc2-M1S | 151<br>152 | AmsGmsCmCmUmGmGmAfGfUfUmUmAmUmUmCmGmGmAmAm<br>UmsUfsCmCmGmAfAmUmAmAmAmCmUmCfCmAfGmGmCmCmUmsAmsUm |
| siPCSKc2-M2S | 153<br>154 | AmsGmsCmCmUmGfGmAfGfUfUmUmAmUmUmCmGmGmAmAm<br>UmsUfsCmCmGmAfAmUfAfAmAmCmUmCfCmAfGmGmCmCmUmsAmsUm |
| siPCSKc2-M3S | 155<br>156 | AmsGmsCmCmUmGfGmAfGfUfUmUmAmUmUmCmGmGmAmAm<br>UmsUfsCmCmGmAfAmUmAmAmAmCmUmCfCmAfGmGmCmCmUmsAmsUm |
| siPCSKc1-M1P1 | 157<br>158 | GmCmCmUmGmGmAfGfUfUmUmAmUmUmCmGmGmAmAm<br>P1UmUfCmCmGmAfAmUmAmAmAmCmUmCfCmAfGmGmCmCmUm |
| siPCSKc1-M2P1 | 159<br>160 | GmCmCmUmGfGmAfGfUfUmUmAmUmUmCmGmGmAmAm<br>P1UmUfCmCmGmAfAmUfAfAmAmCmUmCfCmAfGmGmCmCmUm |
| siPCSKc1-M3P1 | 161<br>162 | GmCmCmUmGfGmAfGfUfUmUmAmUmUmCmGmGmAmAm<br>P1UmUfCmCmGmAfAmUmAmAmAmCmUmCfCmAfGmGmCmCmUm |
| siPCSKc2-M1P1 | 163<br>164 | AmGmCmCmUmGmGmAfGfUfUmUmAmUmUmCmGmGmAmAm<br>P1UmUfCmCmGmAfAmUmAmAmAmCmUmCfCmAfGmGmCmCmUmAmUm |
| siPCSKc2-M2P1 | 165<br>166 | AmGmCmCmUmGfGmAfGfUfUmUmAmUmUmCmGmGmAmAm<br>P1UmUfCmCmGmAfAmUfAfAmAmCmUmCfCmAfGmGmCmCmUmAmUm |
| siPCSKc2-M3P1 | 167<br>168 | AmGmCmCmUmGfGmAfGfUfUmUmAmUmUmCmGmGmAmAm<br>P1UmUfCmCmGmAfAmUmAmAmAmCmUmCfCmAfGmGmCmCmUmAmUm |
| siPCSKc1-M1SP1 | 169<br>170 | GmsCmsCmUmGmGmAfGfUfUmUmAmUmUmCmGmGmAmAm<br>P1UmsUfsCmCmGmAfAmUmAmAmAmCmUmCfCmAfGmGmCmsCmsUm |
| siPCSKc1-M2SP1 | 171<br>172 | GmsCmsCmUmGfGmAfGfUfUmUmAmUmUmCmGmGmAmAm<br>P1UmsUfsCmCmGmAfAmUfAfAmAmCmUmCfCmAfGmGmCmsCmsUm |
| siPCSKc1-M3SP1 | 173<br>174 | GmsCmsCmUmGfGmAfGfUfUmUmAmUmUmCmGmGmAmAm<br>P1UmsUfsCmCmGmAfAmUmAmAmAmCmUmCfCmAfGmGmCmsCmsUm |
| siPCSKc2-M1SP1 | 175<br>176 | AmsGmsCmCmUmGmGmAfGfUfUmUmAmUmUmCmGmGmAmAm<br>P1UmsUfsCmCmGmAfAmUmAmAmAmCmUmCfCmAfGmGmCmCmUmsAmsUm |
| siPCSKc2-M2SP1 | 177<br>178 | AmsGmsCmCmUmGfGmAfGfUfUmUmAmUmUmCmGmGmAmAm<br>P1UmsUfsCmCmGmAfAmUfAfAmAmCmUmCfCmAfGmGmCmCmUmsAmsUm |

TABLE 1c-continued

The sequences of third siRNAs of the present disclosure

| siRNA NO. | SEQ ID NO: | Sequence direction 5'-3' |
|---|---|---|
| siPCSKc2-M3SP1 | 179 | AmsGmsGmCmCmUmGfGmAfGfUfUmUmAmUmCmGmGmAmAm |
| | 180 | P1UmsUfsCmCmGmAfAmUmAmAmAmCmUmCfCmAfGmGmCmCmUmsAmsUm |

TABLE 1d

The sequences of fourth siRNAs of the present disclosure

| siRNA NO. | SEQ ID NO: | Sequence direction 5'-3' |
|---|---|---|
| siPCSKd1 | 189 | CUGUUUUGCUUUUGUAACU |
| | 190 | AGUUACAAAAGCAAAACAGGU |
| siPCSKd2 | 191 | ACCUGUUUUGCUUUUGUAACU |
| | 192 | AGUUACAAAAGCAAAACAGGUCU |
| siPCSKd1-M1 | 193 | CmUmGmUmUmUmUfGfCfUmUmUmUmGmUmAmAmCmUm |
| | 194 | AmGfUmUmAmCfAmAmAmAmGmCmAmAmAfAmCfAmGmGmUm |
| siPCSKd1-M2 | 195 | CmUmGmUmUfUmUfGfCfUmUmUmUmGmUmAmAmCmUm |
| | 196 | AmGfUmUmAmCfAmAfAfAmGmCmAmAmAfAmCfAmGmGmUm |
| siPCSKd1-M3 | 197 | CmUmGmUmUfUmUfGfCfUmUmUmUmGmUmAmAmCmUm |
| | 198 | AmGfUmUmAmCfAmAmAmAmGmCmAmAmAfAmCfAmGmGmUm |
| siPCSKd2-M1 | 199 | AmCmCmUmGmUmUmUfGfCfUmUmUmUmGmUmAmAmCmUm |
| | 200 | AmGfUmUmAmCfAmAmAmAmGmCmAmAmAfAmCfAmGmGmUmCmUm |
| siPCSKd2-M2 | 201 | AmCmCmUmGmUfUmUfGfCfUmUmUmUmGmUmAmAmCmUm |
| | 202 | AmGfUmUmAmCfAmAfAfAmGmCmAmAmAfAmCfAmGmGmUmCmUm |
| siPCSKd2-M3 | 203 | AmCmCmUmGmUfUmUfGfCfUmUmUmUmGmUmAmAmCmUm |
| | 204 | AmGfUmUmAmCfAmAmAmAmGmCmAmAmAfAmCfAmGmGmUmCmUm |
| siPCSKd1-M1S | 205 | CmsUmsGmUmUmUmUfGfCfUmUmUmUmGmUmAmAmCmUm |
| | 206 | AmsGfsUmUmAmCfAmAmAmAmGmCmAmAmAfAmCfAmGmsGmsUm |
| siPCSKd1-M2S | 207 | CmsUmsGmUmUfUmUfGfCfUmUmUmUmGmUmAmAmCmUm |
| | 208 | AmsGfsUmUmAmCfAmAfAfAmGmCmAmAmAfAmCfAmGmsGmsUm |
| siPCSKd1-M3S | 209 | CmsUmsGmUmUfUmUfGfCfUmUmUmUmGmUmAmAmCmUm |
| | 210 | AmsGfsUmUmAmCfAmAmAmAmGmCmAmAmAfAmCfAmGmsGmsUm |
| siPCSKd2-M1S | 211 | AmsCmsCmUmGmUmUmUfGfCfUmUmUmUmGmUmAmAmCmUm |
| | 212 | AmsGfsUmUmAmCfAmAmAmAmGmCmAmAmAfAmCfAmGmGmUmsCmsUm |
| siPCSKd2-M2S | 213 | AmsCmsCmUmGmUfUmUfGfCfUmUmUmUmGmUmAmAmCmUm |
| | 214 | AmsGfsUmUmAmCfAmAfAfAmGmCmAmAmAfAmCfAmGmGmUmsCmsUm |
| siPCSKd2-M3S | 215 | AmsCmsCmUmGmUfUmUfGfCfUmUmUmUmGmUmAmAmCmUm |
| | 216 | AmsGfsUmUmAmCfAmAmAmAmGmCmAmAmAfAmCfAmGmGmUmsCmsUm |
| siPCSKd1-M1P1 | 217 | CmUmGmUmUmUmUfGfCfUmUmUmUmGmUmAmAmCmUm |
| | 218 | P1AmGfUmUmAmCfAmAmAmAmGmCmAmAmAfAmCfAmGmGmUm |
| siPCSKd1-M2P1 | 219 | CmUmGmUmUfUmUfGfCfUmUmUmUmGmUmAmAmCmUm |
| | 220 | P1AmGfUmUmAmCfAmAfAfAmGmCmAmAmAfAmCfAmGmGmUm |
| siPCSKd1-M3P1 | 221 | CmUmGmUmUfUmUfGfCfUmUmUmUmGmUmAmAmCmUm |
| | 222 | P1AmGfUmUmAmCfAmAmAmAmGmCmAmAmAfAmCfAmGmGmUm |
| siPCSKd2-M1P1 | 223 | AmCmCmUmGmUmUmUfGfCfUmUmUmUmGmUmAmAmCmUm |
| | 224 | P1AmGfUmUmAmCfAmAmAmAmGmCmAmAmAfAmCfAmGmGmUmCmUm |

TABLE 1d-continued

The sequences of fourth siRNAs of the present disclosure

| siRNA NO. | SEQ ID NO: | Sequence direction 5'-3' |
|---|---|---|
| siPCSKd2-M2P1 | 225 | AmCmCmUmGmUmUfUmUfGfCfUmUmUmUmGmUmAmAmCmUm |
|  | 226 | P1AmGfUmUmAmCfAmAfAfAmGmCmAmAfAmAfCmAmGmGmUmCmUm |
| siPCSKd2-M3P1 | 227 | AmCmCmUmGmUmUfUmUfGfCfUmUmUmUmGmUmAmAmCmUm |
|  | 228 | P1AmGfUmUmAmCfAmAmAmAmGmCmAmAfAmAfCmAmGmGmUmCmUm |
| siPCSKd1-M1SP1 | 229 | CmsUmsGmUmUmUmUfGfCfUmUmUmUmGmUmAmAmCmUm |
|  | 230 | P1AmsGfsUmUmAmCfAmAmAmAmGmCmAmAfAmAfCmAmGmsGmsUm |
| siPCSKd1-M2SP1 | 231 | CmsUmsGmUmUfUmUfGfCfUmUmUmUmGmUmAmAmCmUm |
|  | 232 | P1AmsGfsUmUmAmCfAmAfAfAmGmCmAmAfAmAfCmAmGmsGmsUm |
| siPCSKd1-M3SP1 | 233 | CmsUmsGmUmUfUmUfGfCfUmUmUmUmGmUmAmAmCmUm |
|  | 234 | P1AmsGfsUmUmAmCfAmAmAmAmGmCmAmAfAmAfCmAmGmsGmsUm |
| siPCSKd2-M1SP1 | 235 | AmsCmsCmUmGmUmUmUfGfCfUmUmUmUmGmUmAmAmCmUm |
|  | 236 | P1AmsGfsUmUmAmCfAmAmAmAmGmCmAmAfAmAfCmAmGmGmUmsCmsUm |
| siPCSKd2-M2SP1 | 237 | AmsCmsCmUmGmUmUfUmUfGfCfUmUmUmUmGmUmAmAmCmUm |
|  | 238 | P1AmsGfsUmUmAmCfAmAfAfAmGmCmAmAfAmAfCmAmGmGmUmsCmsUm |
| siPCSKd2-M3SP1 | 239 | AmsCmsCmUmGmUmUfUmUfGfCfUmUmUmUmGmUmAmAmCmUm |
|  | 240 | P1AmsGfsUmUmAmCfAmAmAmAmGmCmAmAfAmAfCmAmGmGmUmsCmsUm |

TABLE 1e

The sequences of fifth siRNAs of the present disclosure

| siRNA NO. | SEQ ID NO: | Sequence direction 5'-3' |
|---|---|---|
| siPCSKe1 | 249 | GGUUUUGUAGCAUUUUUAU |
|  | 250 | AUAAAAAUGCUACAAAACCCA |
| siPCSKe2 | 251 | UGGGUUUUGUAGCAUUUUUAU |
|  | 252 | AUAAAAAUGCUACAAAACCCAGA |
| siPCSKe1-M1 | 253 | GmGmUmUmUmGfUfAfGmCmAmUmUmUmUmUmAmUm |
|  | 254 | AmUfAmAmAmAfAmUmGmCmUmAmCmAfAmAfAmCmCmCmAm |
| siPCSKe1-M2 | 255 | GmGmUmUfUmGfUfAfGmCmAmUmUmUmUmUmAmUm |
|  | 256 | AmUfAmAmAmAfAmUfGfCmUmAmCmAfAmAfAmCmCmCmAm |
| siPCSKe1-M3 | 257 | GmGmUmUfUmGfUfAfGmCmAmUmUmUmUmUmAmUm |
|  | 258 | AmUfAmAmAmAfAmUmGmCmUmAmCmAfAmAfAmCmCmCmAm |
| siPCSKe2-M1 | 259 | UmGmGmGmUmUmUmGfUfAfGmCmAmUmUmUmUmUmAmUm |
|  | 260 | AmUfAmAmAmAfAmUmGmCmUmAmCmAfAmAfAmCmCmCmAmGmAm |
| siPCSKe2-M2 | 261 | UmGmGmGmUmUfUmGfUfAfGmCmAmUmUmUmUmUmAmUm |
|  | 262 | AmUfAmAmAmAfAmUfGfCmUmAmCmAfAmAfAmCmCmCmAmGmAm |
| siPCSKe2-M3 | 263 | UmGmGmGmUmUfUmGfUfAfGmCmAmUmUmUmUmUmAmUm |
|  | 264 | AmUfAmAmAmAfAmUmGmCmUmAmCmAfAmAfAmCmCmCmAmGmAm |
| siPCSKe1-M1S | 265 | GmsGmsUmUmUmGfUfAfGmCmAmUmUmUmUmUmAmUm |
|  | 266 | AmsUfsAmAmAmAfAmUmGmCmUmAmCmAfAmAfAmCmCmsCmsAm |
| siPCSKe1-M2S | 267 | GmsGmsUmUfUmGfUfAfGmCmAmUmUmUmUmUmAmUm |
|  | 268 | AmsUfsAmAmAmAfAmUfGfCmUmAmCmAfAmAfAmCmCmsCmsAm |
| siPCSKe1-M3S | 269 | GmsGmsUmUfUmGfUfAfGmCmAmUmUmUmUmUmAmUm |
|  | 270 | AmsUfsAmAmAmAfAmUmGmCmUmAmCmAfAmAfAmCmCmsCmsAm |

TABLE 1e-continued

The sequences of fifth siRNAs of the present disclosure

| siRNA NO. | SEQ ID NO: | Sequence direction 5'-3' |
|---|---|---|
| siPCSKe2-M1S | 271<br>272 | UmsGmsGmGmUmUmUmUmGfUfAfGmCmAmUmUmUmUmAmUm<br>AmsUfsAmAmAmAfAmUmGmCmUmAmCmAfAmAfAmCmCmCmAmsGmsAm |
| siPCSKe2-M2S | 273<br>274 | UmsGmsGmGmUmUmUfUmGfUfAfGmCmAmUmUmUmUmUmAmUm<br>AmsUfsAmAmAmAfAmUfGfCmUmAmCmAfAmAfAmCmCmCmAmsGmsAm |
| siPCSKe2-M3S | 275<br>276 | UmsGmsGmGmUmUmUfUmGfUfAfGmCmAmUmUmUmUmUmAmUm<br>AmsUfsAmAmAmAfAmUmGmCmUmAmCmAfAmAfAmCmCmCmAmsGmsAm |
| siPCSKe1-M1P1 | 277<br>278 | GmGmUmUmUmUmGfUfAfGmCmAmUmUmUmUmUmAmUm<br>P1AmUfAmAmAmAfAmUmGmCmUmAmCmAfAmAfAmCmCmCmAm |
| siPCSKe1-M2P1 | 279<br>280 | GmGmUmUmUfUmGfUfAfGmCmAmUmUmUmUmUmAmUm<br>P1AmUfAmAmAmAfAmUfGfCmUmAmCmAfAmAfAmCmCmCmAm |
| siPCSKe1-M3P1 | 281<br>282 | GmGmUmUmUfUmGfUfAfGmCmAmUmUmUmUmUmAmUm<br>P1AmUfAmAmAmAfAmUmGmCmUmAmCmAfAmAfAmCmCmCmAm |
| siPCSKe2-M1P1 | 283<br>284 | UmGmGmUmUmUmUmGfUfAfGmCmAmUmUmUmUmUmAmUm<br>P1AmUfAmAmAmAfAmUmGmCmUmAmCmAfAmAfAmCmCmCmAmGmAm |
| siPCSKe2-M2P1 | 285<br>286 | UmGmGmUmUmUfUmGfUfAfGmCmAmUmUmUmUmUmAmUm<br>P1AmUfAmAmAmAfAmUfGfCmUmAmCmAfAmAfAmCmCmCmAmGmAm |
| siPCSKe2-M3P1 | 287<br>288 | UmGmGmUmUmUfUmGfUfAfGmCmAmUmUmUmUmUmAmUm<br>P1AmUfAmAmAmAfAmUmGmCmUmAmCmAfAmAfAmCmCmCmAmGmAm |
| siPCSKe1-M1SP1 | 289<br>290 | GmsGmsUmUmUmUmGfUfAfGmCmAmUmUmUmUmUmAmUm<br>P1AmsUfsAmAmAmAfAmUmGmCmUmAmCmAfAmAfAmCmCmsCmsAm |
| siPCSKe1-M2SP1 | 291<br>292 | GmsGmsUmUmUfUmGfUfAfGmCmAmUmUmUmUmUmAmUm<br>P1AmsUfsAmAmAmAfAmUfGfCmUmAmCmAfAmAfAmCmCmsCmsAm |
| siPCSKe1-M3SP1 | 293<br>294 | GmsGmsUmUmUfUmGfUfAfGmCmAmUmUmUmUmUmAmUm<br>P1AmsUfsAmAmAmAfAmUmGmCmUmAmCmAfAmAfAmCmCmsCmsAm |
| siPCSKe2-M1SP1 | 295<br>296 | UmsGmsGmGmUmUmUmUmGfUfAfGmCmAmUmUmUmUmUmAmUm<br>P1AmsUfsAmAmAmAfAmUmGmCmUmAmCmAfAmAfAmCmCmCmAmsGmsAm |
| siPCSKe2-M2SP1 | 297<br>298 | UmsGmsGmGmUmUmUfUmGfUfAfGmCmAmUmUmUmUmUmAmUm<br>P1AmsUfsAmAmAmAfAmUfGfCmUmAmCmAfAmAfAmCmCmCmAmsGmsAm |
| siPCSKe2-M3SP1 | 299<br>300 | UmsGmsGmGmUmUmUfUmGfUfAfGmCmAmUmUmUmUmUmAmUm<br>P1AmsUfsAmAmAmAfAmUmGmCmUmAmCmAfAmAfAmCmCmCmAmsGmsAm |

TABLE 1f

The sequences of sixth siRNAs of the present disclosure

| siRNA NO. | SEQ ID NO: | Sequence direction 5'-3' |
|---|---|---|
| siPCSKf1 | 309<br>310 | GUGACUUUUUAAAAUAAAA<br>UUUUAUUUUAAAAAGUCACCA |
| siPCSKf2 | 311<br>312 | UGGUGACUUUUUAAAAUAAAA<br>UUUUAUUUUAAAAAGUCACCAUA |
| siPCSKf1-M1 | 313<br>314 | GmUmGmAmCmUmUfUfUfUmAmAmAmAmUmAmAmAmAm<br>UmUfUmUmAmUfUmUmUmAmAmAmAmAfGmUfCmAmCmCmAm |

TABLE 1f-continued

The sequences of sixth siRNAs of the present disclosure

| siRNA NO. | SEQ ID NO: | Sequence direction 5'-3' |
|---|---|---|
| siPCSKf1-M2 | 315 | GmUmGmAmCfUmUfUfUfUmAmAmAmAmUmAmAmAm |
|  | 316 | UmUfUmUmAmUfUmUfUfAmAmAmAmAfGmUfCmAmCmCmAm |
| siPCSKf1-M3 | 317 | GmUmGmAmCfUmUfUfUfUmAmAmAmAmUmAmAmAm |
|  | 318 | UmUfUmUmAmUfUmUmUmAmAmAmAmAfGmUfCmAmCmCmAm |
| siPCSKf2-M1 | 319 | UmGmUmGmAmCmUmUfUfUfUmAmAmAmAmUmAmAmAmAm |
|  | 320 | UmUfUmUmAmUfUmUmUmAmAmAmAmAfGmUfCmAmCmCmAmUmAm |
| siPCSKf2-M2 | 321 | UmGmUmGmAmCfUmUfUfUfUmAmAmAmAmUmAmAmAmAm |
|  | 322 | UmUfUmUmAmUfUmUfUfAmAmAmAmAfGmUfCmAmCmCmAmUmAm |
| siPCSKf2-M3 | 323 | UmGmUmGmAmCfUmUfUfUfUmAmAmAmAmUmAmAmAm |
|  | 324 | UmUfUmUmAmUfUmUmUmAmAmAmAmAfGmUfCmAmCmCmAmUmAm |
| siPCSKf1-M1S | 325 | GmsUmsGmAmCmUmUfUfUfUmAmAmAmAmUmAmAmAm |
|  | 326 | UmsUfsUmUmAmUfUmUmUmAmAmAmAmAfGmUfCmAmCmsCmsAm |
| siPCSKf1-M2S | 327 | GmsUmsGmAmCfUmUfUfUfUmAmAmAmAmUmAmAmAm |
|  | 328 | UmsUfsUmUmAmUfUmUfUfAmAmAmAmAfGmUfCmAmCmsCmsAm |
| siPCSKf1-M3S | 329 | GmsUmsGmAmCfUmUfUfUfUmAmAmAmAmUmAmAmAm |
|  | 330 | UmsUfsUmUmAmUfUmUmUmAmAmAmAmAfGmUfCmAmCmsCmsAm |
| siPCSKf2-M1S | 331 | UmsGmsGmUmGmAmCmUmUfUfUfUmAmAmAmAmUmAmAmAmAm |
|  | 332 | UmsUfsUmUmAmUfUmUmUmAmAmAmAmAfGmUfCmAmCmCmAmsUmsAm |
|  | 333 | UmsGmsGmUmGmAmCfUmUfUfUfUmAmAmAmAmUmAmAmAm |
| siPCSKf2-M2S | 334 | UmsUfsUmUmAmUfUmUfUfAmAmAmAmAfGmUfCmAmCmCmAmsUmsAm |
| siPCSKf2-M3S | 335 | UmsGmsGmUmGmAmCfUmUfUfUfUmAmAmAmAmUmAmAmAm |
|  | 336 | UmsUfsUmUmAmUfUmUmUmAmAmAmAmAfGmUfCmAmCmCmAmsUmsAm |
| siPCSKf1-M1P1 | 337 | GmUmGmAmCmUmUfUfUfUmAmAmAmAmUmAmAmAm |
|  | 338 | P1UmUfUmUmAmUfUmUmUmAmAmAmAmAfGmUfCmAmCmCmAm |
| siPCSKf1-M2P1 | 339 | GmUmGmAmCfUmUfUfUfUmAmAmAmAmUmAmAmAm |
|  | 340 | P1UmUfUmUmAmUfUmUfUfAmAmAmAmAfGmUfCmAmCmCmAm |
| siPCSKf1-M3P1 | 341 | GmUmGmAmCfUmUfUfUfUmAmAmAmAmUmAmAmAm |
|  | 342 | P1UmUfUmUmAmUfUmUmUmAmAmAmAmAfGmUfCmAmCmCmAm |
| siPCSKf2-M1P1 | 343 | UmGmUmGmAmCmUmUfUfUfUmAmAmAmAmUmAmAmAmAm |
|  | 344 | P1UmUfUmUmAmUfUmUmUmAmAmAmAmAfGmUfCmAmCmCmAmUmAm |
| siPCSKf2-M2P1 | 345 | UmGmUmGmAmCfUmUfUfUfUmAmAmAmAmUmAmAmAmAm |
|  | 346 | P1UmUfUmUmAmUfUmUfUfAmAmAmAmAfGmUfCmAmCmCmAmUmAm |
| siPCSKf2-M3P1 | 347 | UmGmUmGmAmCfUmUfUfUfUmAmAmAmAmUmAmAmAmAm |
|  | 348 | P1UmUfUmUmAmUfUmUmUmAmAmAmAmAfGmUfCmAmCmCmAmUmAm |
| siPCSKf1-M1SP1 | 349 | GmsUmsGmAmCmUmUfUfUfUmAmAmAmAmUmAmAmAm |
|  | 350 | P1UmsUfsUmUmAmUfUmUmUmAmAmAmAmAfGmUfCmAmCmsCmsAm |
| siPCSKf1-M2SP1 | 351 | GmsUmsGmAmCfUmUfUfUfUmAmAmAmAmUmAmAmAm |
|  | 352 | P1UmsUfsUmUmAmUfUmUfUfAmAmAmAmAfGmUfCmAmCmsCmsAm |
| siPCSKf1-M3SP1 | 353 | GmsUmsGmAmCfUmUfUfUfUmAmAmAmAmUmAmAmAm |
|  | 354 | P1UmsUfsUmUmAmUfUmUmUmAmAmAmAmAfGmUfCmAmCmsCmsAm |
| siPCSKf2-M1SP1 | 355 | UmsGmsGmUmGmAmCmUmUfUfUfUmAmAmAmAmUmAmAmAmAm |
|  | 356 | P1UmsUfsUmUmAmUfUmUmUmAmAmAmAmAfGmUfCmAmCmCmAmsUmsAm |

TABLE 1f-continued

The sequences of sixth siRNAs of the present disclosure

| siRNA NO. | SEQ ID NO: | Sequence direction 5'-3' |
|---|---|---|
| siPCSKf2-M2SP1 | 357<br>358 | UmsGmsGmUmGmAmCfUmUfUfUfUmAmAmAmAmUmAmAmAmAm<br>P1UmsUfsUmUmAmUfUmUfUfAmAmAmAmAfGmUfCmAmCmCmAmsUmsAm |
| siPCSKf2-M3SP1 | 359<br>360 | UmsGmsGmUmGmAmCfUmUfUfUfUmAmAmAmAmUmAmAmAmAm<br>P1UmsUfsUmUmAmUfUmUmUmAmAmAmAmAfGmUfCmAmCmCmAmsUmsAm |

TABLE 1g

The sequences of seventh siRNAs of the present disclosure

| siRNA NO. | SEQ ID NO: | Sequence direction 5'-3' |
|---|---|---|
| siPCSKg3 | 407<br>408 | AGACCUGUdTUUGCUUUUGU<br>ACAAAAGCAAAACAGGUCUAG |
| siPCSKg4 | 409<br>410 | CUAGACCUGUdTUUGCUUUUGU<br>ACAAAAGCAAAACAGGUCUAGAA |
| siPCSKg3-M4 | 411<br>412 | AmGmAmCmCfUmGfUmdTUmUmGmCmUmUmUmUmGmUm<br>AmCfAmAfAfAfGmCfAmAfAmAmCmAfGmGfUmCfUmAmGm |
| siPCSKg4-M5 | 413<br>414 | CmUmAmGmAmCmCfUmGfUmdTUmUmGmCmUmUmUmUmGmUm<br>AmCfAmAfAfAfGmCfAmAfAmAmCmAfGmGfUmCfUmAmGmAmAm |
| siPCSKg3-M4S | 415<br>416 | AmsGmsAmCmCfUmGfUmdTUmUmGmCmUmUmUmUmGmUm<br>AmsCfsAmAfAfAfGmCfAmAfAmAmCmAfGmGfUmCfUmsAmsGm |
| siPCSKg4-M5S | 417<br>418 | CmsUmsAmGmAmCmCfUmGfUmdTUmUmGmCmUmUmUmUmGmUm<br>AmsCfsAmAfAfAfGmCfAmAfAmAmCmAfGmGfUmCfUmAmGmsAmsAm |
| siPCSKg3-M4P1 | 419<br>420 | AmGmAmCmCfUmGfUmdTUmUmGmCmUmUmUmUmGmUm<br>P1AmCfAmAfAfAfGmCfAmAfAmAmCmAfGmGfUmCfUmAmGm |
| siPCSKg4-M5P1 | 421<br>422 | CmUmAmGmAmCmCfUmGfUmdTUmUmGmCmUmUmUmUmGmUm<br>P1AmCfAmAfAfAfGmCfAmAfAmAmCmAfGmGfUmCfUmAmGmAmAm |
| siPCSKg3-M4SP1 | 423<br>424 | AmsGmsAmCmCfUmGfUmdTUmUmGmCmUmUmUmUmGmUm<br>P1AmsCfsAmAfAfAfGmCfAmAfAmAmCmAfGmGfUmCfUmsAmsGm |
| siPCSKg4-M5SP1 | 425<br>426 | CmsUmsAmGmAmCmCfUmGfUmdTUmUmGmCmUmUmUmUmGmUm<br>P1AmsCfsAmAfAfAfGmCfAmAfAmAmCmAfGmGfUmCfUmAmGmsAmsAm |

In the siRNA or siRNA conjugate of the present disclosure, each pair of adjacent nucleotides is linked via a phosphodiester bond or phosphorothioate diester bond. The non-bridging oxygen or sulfur atom in the phosphodiester bond or phosphorothioate diester bond is negatively charged, and may be present in the form of hydroxy or sulfhydryl. Moreover, the hydrogen ion in the hydroxy or sulfhydryl may be partially or completely substituted with a cation. The cation may be any cation, such as a metal cation, an ammonium cation $NH_4^+$ or an organic ammonium cation. In order to increase solubility, in one embodiment, the cation is one or more selected from an alkali metal cation, an ammonium cation formed by a tertiary amine and a quaternary ammonium cation. The alkali metal ion may be $K^+$ and/or $Na^+$, and the cation formed by a tertiary amine may be an ammonium cation formed by triethylamine and/or an ammonium cation formed by N,N-diisopropylethylamine. Thus, the siRNA and the siRNA conjugate of the present disclosure can be at least partially present in the form of salt. In one embodiment, the non-bridging oxygen atom or sulfur atom in the phosphodiester bond or phosphorothioate diester bond at least partly binds to sodium ion, and thus the siRNA and the siRNA conjugate of the present disclosure are present or partially present in the form of sodium salt.

Those skilled in the art clearly know that a modified nucleotide group can be introduced into the siRNA of the present disclosure by a nucleoside monomer with a corresponding modification. The methods for preparing a nucleoside monomer having the corresponding modification and the methods for introducing a modified nucleotide into an siRNA are also well-known to those skilled in the art. All modified nucleoside monomers may be either commercially available or prepared by known methods.

Preparation of the siRNA Conjugate as Shown by Formula (308)

The siRNA conjugate as shown by Formula (308) can be prepared by any appropriate synthetic routes.

In some embodiments, the siRNA conjugate as shown by Formula (308) can be prepared by the following method, comprising: sequentially linking nucleoside monomers in 3' to 5' direction according to the type and sequence of the nucleotides in the sense strand and antisense strands of the siRNA respectively, under the condition for phosphoramidite solid phase synthesis, wherein the step of linking each nucleoside monomer includes a four-step reaction of deprotection, coupling, capping, and oxidation or sulfurization; isolating the sense strand and the antisense strand of the siRNA; and annealing; wherein the siRNA is the above siRNA of the present disclosure.

Moreover, the method further comprises: contacting the compound as shown by Formula (321) with a nucleoside monomer or a nucleotide sequence attached to a solid phase support under coupling reaction condition and in the presence of a coupling agent, thereby linking the compound as shown by Formula (321) to the nucleotide sequence via a coupling reaction. Hereinafter, the compound as shown by Formula (321) is also referred to as a conjugation molecule.

Formula (321)

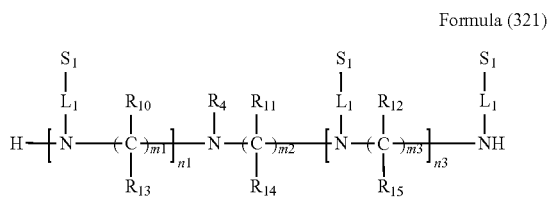

wherein, $R_4$ is a group capable of binding to the siRNA represented by Nu in the compound as shown by Formula (308). In some embodiments, $R_4$ is a group capable of binding to the siRNA represented by Nu via a covalent bond. In some embodiments, $R_4$ is a group comprising any functional group that may be conjugated to the siRNA represented by Nu via a phosphodiester bond by a reaction;

each $S_1$ is independently a group formed by substituting all active hydroxyls in $M_1$ with the group YCOO—, wherein each Y is independently one selected from the group consisting of methyl, trifluoromethyl, difluoromethyl, monofluoromethyl, trichloromethyl, dichloromethyl, monochloromethyl, ethyl, n-propyl, isopropyl, phenyl, halophenyl, and alkylphenyl; in some embodiments, Y is methyl.

The definitions and options of n1, n3, m1, m2, m3, $R_{10}$, $R_{11}$, $R_{12}$, $R_{13}$, $R_{14}$, $R_{15}$, $L_1$, and $M_1$ are respectively as described above.

$R_4$ is selected to achieve the linkage to the N atom on a nitrogenous backbone and to provide a suitable reaction site for synthesizing the siRNA conjugate as shown by Formula (308). In some embodiments, $R_4$ comprises a $R_2$ linking group or a protected $R_2$ linking group, and a functional group than can react with an siRNA to form a structure as shown by Formula (A59).

In some embodiments, $R_4$ comprises a first functional group that can react with a group on the siRNA represented by Nu or a nucleoside monomer to form a phosphite ester, and a second functional group that can react with a hydroxy group or an amino group to form a covalent bond with, or comprises a solid phase support linked by the covalent bond. In some embodiments, the first functional group is a phosphoramidite, a hydroxy or a protected hydroxy. In some embodiments, the second functional group is a phosphoramidite, a carboxyl or a carboxylate salt. In some embodiments, the second functional group is a solid phase support linked to the rest of the molecule via a covalent bond which is formed by a hydroxy group or an amino group. In some embodiments, the solid phase support is linked via a phosphoester bond, a carboxyl ester bond or an amide bond. In some embodiments, the solid phase support is a resin.

In some embodiments, the first functional group comprises hydroxy, —$OR_k$ or a group as shown by Formula (C3); the second functional group comprises a group as shown by Formula (C1), (C2), (C3), (C1'), or (C3'):

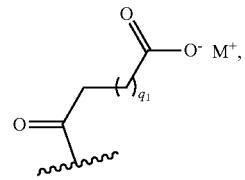
(C1)

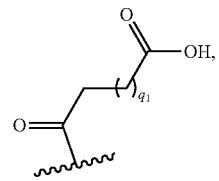
(C2)

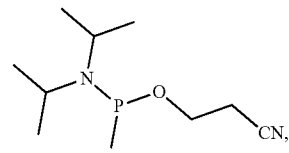
(C3)

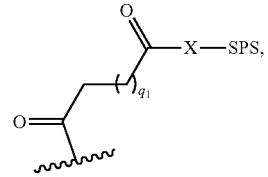
(C1')

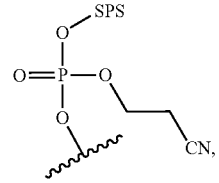
(C3')

wherein $q_1$ is an integer of 1-4, X is O or NH, $M^+$ is a cation, $R_k$ is a hydroxy protecting group, SPS represents a solid phase support, and ⁓⁓⁓ represents the site where a group is covalently attached.

In some embodiments, the first functional group comprises a phosphoramidite group, such as the group as shown by Formula (C3). The phosphoramidite group can form a phosphite ester with a hydroxy at any position on a nucleotide (such as a 2'-hydroxy or 3'-hydroxy) by a coupling reaction, and the phosphite ester can form a phosphodiester bond or phosphorothioate ester bond as shown by Formula (A59) via oxidation or sulfurization, so as to conjugate the conjugation molecule to an siRNA. Here, even if the second functional group does not exist, the compound as shown by Formula (321) could still be conjugated to the nucleotide, while not affecting the obtaining of the siRNA conjugate as shown by Formula (308). Under such circumstances, after obtaining a sense or antisense strand of the siRNA by a method such as phosphoramidite solid phase synthesis, the compound as shown by Formula (321) is reacted with a hydroxy on the nucleotide at the terminal of the nucleotide sequence, and a phosphodiester bond linkage or a phosphorothioate bond linkage is formed in the subsequent oxidation or sulfurization process, thereby conjugating the compound as shown by Formula (321) to the siRNA.

In some embodiments, the first functional group comprises a protected hydroxy. In some embodiments, the second functional group comprises a group that can react with a solid phase support to provide a conjugation molecule comprising a solid phase support. In some embodiments, the second functional group comprises a carboxyl, a carboxylate salt or a phosphoramidite, such as the functional group as shown by Formula (C1), (C2) or (C3). When the second functional group comprises a carboxyl or a carboxylate salt, the compound of Formula (321) can react with a hydroxy or an amino group on a solid phase support (such as a resin) via esterification or amidation reaction, to form a conjugation molecule comprising a solid phase support linked via a carboxylate ester bond. When the second functional group comprises a phosphoramidite functional group, the compound of Formula (321) can couple with a hydroxy group on a universal solid phase support (such as a resin), and form a conjugation molecule comprising a solid phase support linked via a phosphodiester bond by oxidation. Next, starting from the above product linked to a solid phase support, the nucleoside monomers are linked sequentially through a phosphoramidite solid phase synthesis method, so as to obtain a sense strand or an antisense strand of the siRNA linked to a conjugation group. In the process of phosphoramidite solid phase synthesis, the first functional group is deprotected, and then coupled with a phosphoramidite group on a nucleoside monomer under coupling reaction condition.

In some embodiments, the first functional group comprises a hydroxy or a protected hydroxy group; the second functional group comprises a solid phase support linked via a carboxylate ester bond, an amide bond, or a phosphoester bond, as shown by Formula (C1') or (C3'). In this case, starting from the compound of Formula (321) in place of a solid phase support, the nucleoside monomers are linked sequentially through a phosphoramidite solid phase synthesis method, so as to obtain a sense strand or an antisense strand of the siRNA linked to a conjugation group.

In some embodiments, the carboxylate may be expressed as —COO$^-$M$^+$, wherein M$^+$ is a cation such as one selected from a metal cation, an ammonium cation NH$_4^+$ and an organic ammonium cation. In one embodiment, the metal cation may be an alkali metal cation, such as K$^+$ or Na$^+$. In order to increase solubility and facilitate the reaction, in some embodiments, the organic ammonium cation is an ammonium cation formed by a tertiary amine or a quaternary ammonium cation, such as an ammonium cation formed by triethylamine or an ammonium cation formed by N,N-diisopropylethylamine. In some embodiments, the carboxylate is a triethylamine carboxylate or an N,N-diisopropylethylamine carboxylate.

In some embodiments, R$_4$ comprises the structure as shown by Formula (B9), (B10), (B9'), (B10'), (B11), (B12), (B11'), or B(12'):

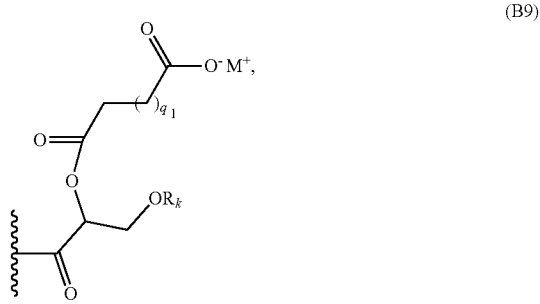
(B9)

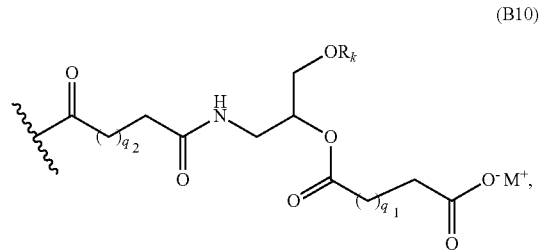
(B10)

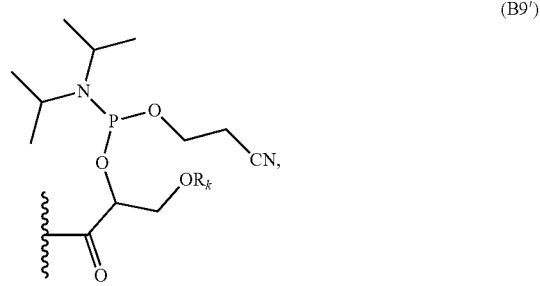
(B9')

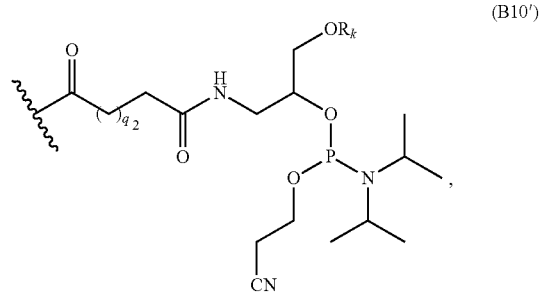
(B10')

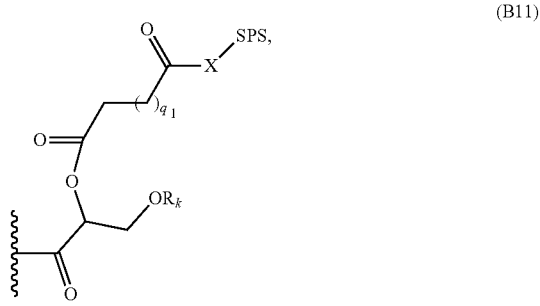
(B11)

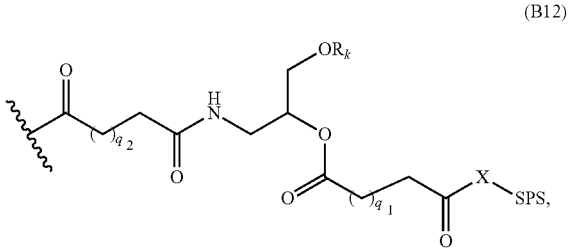
(B12)

-continued

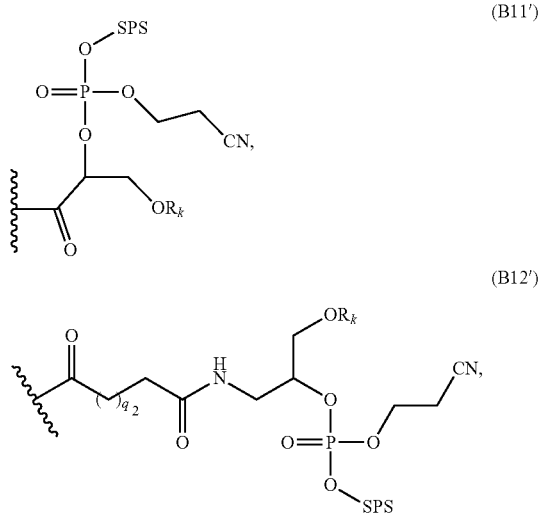

(B11')

(B12')

wherein $q_1$ is an integer of 1-4, $q_2$ is an integer of 1-10, X is O or NH, $M^+$ is a cation, $R_k$ is a hydroxy protecting group, SPS represents a solid phase support, and ⌇⌇⌇⌇ represents the site where the group is covalently linked. In some embodiments, $q_1$ is 1 or 2. In some embodiments, $q_2$ is an integer of 1-5. In some embodiments, $R_4$ comprises a structure as shown by Formula (B9) or (B10). In some embodiments, $R_4$ comprises a structure as shown by Formula (B11) or (B12).

In some embodiments, $R_k$ is one or more of Tr (trityl), MMTr (4-methoxytrityl), DMTr (4,4'-dimethoxytrityl), and TMTr (4,4',4"-trimethoxytrityl). In some embodiments, $R_k$ may be DMTr, i.e., 4,4'-dimethoxytrityl.

The definition of $L_1$ is as described above.

In some embodiments, $L_1$ is used to link the $M_1$ targeting group to the N atom on the nitrogenous backbone, thereby providing liver targeting function for the siRNA conjugate as shown by Formula (308). In some embodiments, $L_1$ comprises any one of Formulae (A1)-(A26), and any combination thereof.

According to the above description, those skilled in the art that would easily understand that as compared with the well-known phosphoramidite solid phase synthesis method in the art, the siRNA conjugate as shown by Formula (308) in which the conjugation molecule is linked to any possible position of the nucleotide sequence can be obtained by using the above first functional group and an optional second functional group. For example, the conjugation molecule is linked to a terminal region of the nucleotide sequence, or to a terminal of the nucleotide sequence. Correspondingly, unless otherwise specified, in the following description regarding preparation of the conjugate and/or the conjugation molecule, when referring to the reactions such as "deprotection", "coupling", "capping", "oxidation", "sulfurization", it will be understood that the reaction conditions and agents involved in the well-known phosphoramidite solid phase synthesis method in the art would also apply to these reactions. Exemplary reaction conditions and agents will be described in detail hereinafter.

In some embodiments, each $S_1$ is independently a $M_1$. In some embodiments, each $S_1$ is independently a group formed by protecting at least one active hydroxyl group in $M_1$ with a hydroxyl protecting group. In some embodiments, each $S_1$ is independently a group formed by protecting all existing active hydroxyl groups in $M_1$ with hydroxyl protecting groups. In some embodiments, any hydroxyl protecting group known to a skilled one may be used to protect the active hydroxyl group in $M_1$. In some embodiments, the protected hydroxy is expressed as the Formula YCOO—, wherein each Y is independently selected from the group consisting of $C_1$-$C_{10}$ alkyl and $C_6$-$C_{10}$ aryl, which is optionally substituted with one or more substituents selected from the group consisting of halo and $C_1$-$C_6$ alkyl. In some embodiments, each Y is independently selected from the group consisting of methyl, trifluoromethyl, difluoromethyl, monofluoromethyl, trichloromethyl, dichloromethyl, monochloromethyl, ethyl, n-propyl, isopropyl, phenyl, halophenyl, and $C_1$-$C_6$ alkylphenyl.

In some embodiments, each $S_1$ is independently selected from the group consisting of Formulae (A46)-(A54):

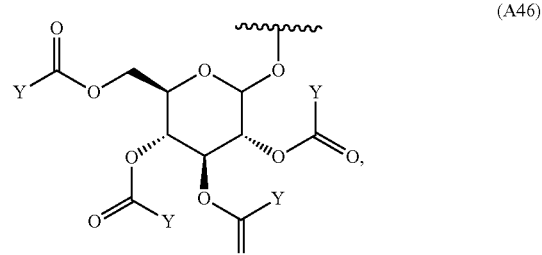

(A46)

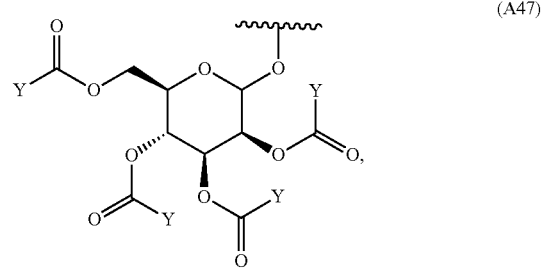

(A47)

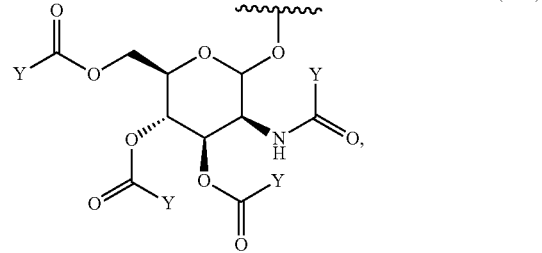

(A48)

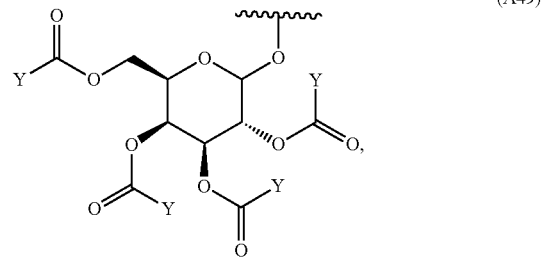

(A49)

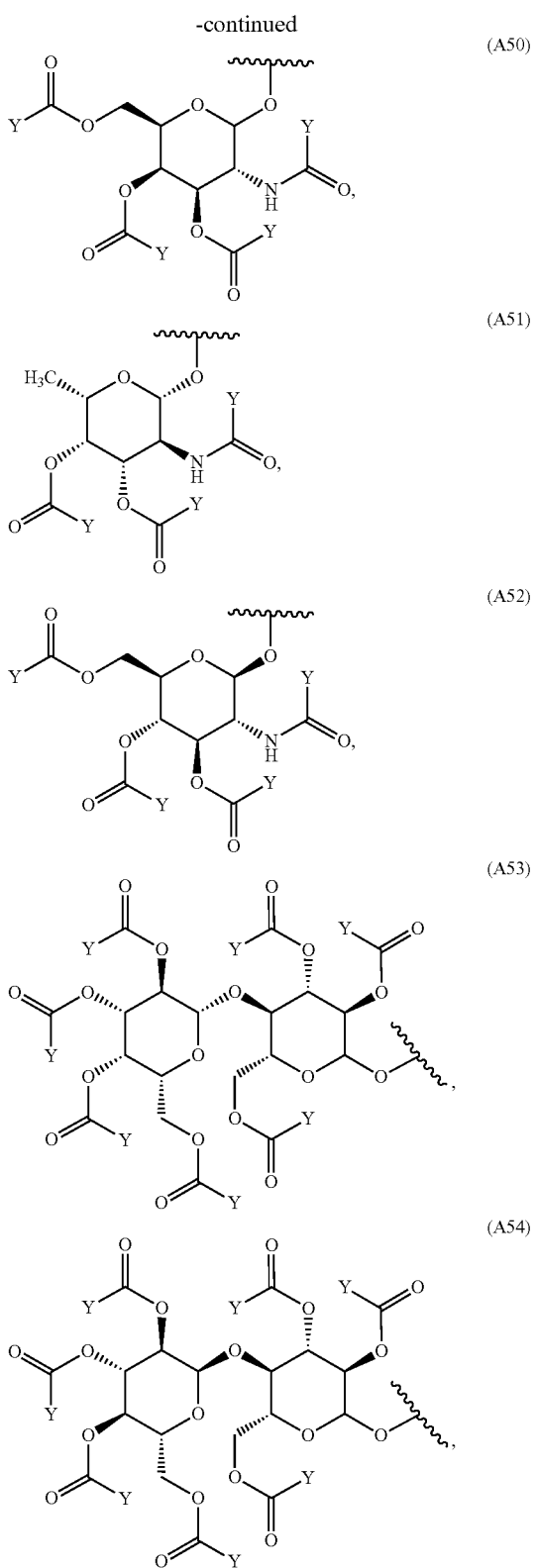

(A50)

(A51)

(A52)

(A53)

(A54)

In some embodiments, $S_1$ is A49 or A50.

In some embodiments, each Y is independently one selected from methyl, trifluoromethyl, difluoromethyl, monofluoromethyl, trichloromethyl, dichloromethyl, monochloromethyl, ethyl, n-propyl, isopropyl, phenyl, halophenyl, and alkylphenyl. In some embodiments, Y is methyl.

As mentioned above, the method for preparing the siRNA conjugate as shown by Formula (308) further comprises the following steps: synthesizing the other strand of the siRNA (for example, when a sense strand of the siRNA linked to a conjugation group is synthesized in the above step, the method further comprises synthesizing an antisense strand of the siRNA according to the solid phase synthesis method, vice versa), isolating the sense strand and the antisense strand, and annealing. In particular, in the step of isolating, the solid phase support linked to the nucleotide sequence and/or the conjugation molecule is cleaved, and the necessary protecting group is removed (in this case, each $S_1$ group in the compound of Formula (321) is converted to the corresponding $M_1$ targeting group), to afford a sense strand (or an antisense strand) of the siRNA linked to a conjugation group and the corresponding antisense strand (or sense strand). The sense strand and the antisense strand are annealed to form a double-strand RNA structure, thereby affording the siRNA conjugate as shown by Formula (308).

In some embodiments, the method for preparing the siRNA conjugate as shown by Formula (308) comprises the following steps: contacting the compound as shown by Formula (321) with the first nucleoside monomer at 3' terminal of the sense strand or the antisense strand under coupling reaction condition in the presence of a coupling agent, thereby linking the compound as shown by Formula (321) to the first nucleotide in the sequence; sequentially linking nucleoside monomers in 3' to 5' direction to synthesize a sense or antisense strand of the siRNA according to the type and sequence of the nucleotides in the desired sense or antisense strand under the condition for phosphoramidite solid phase synthesis, wherein the compound of Formula (321) is a compound in which $R_4$ comprises a first functional group and a second functional group, wherein the first functional group comprises a protected hydroxyl and the second functional group has a structure as shown by Formula (C1') or (C3'), and the compound of (321) is deprotected before being linked to the first nucleoside monomer; and the linking of each nucleoside monomer comprises a four-step reaction of deprotection, coupling, capping, and oxidation or sulfurization; thus obtaining a sense or antisense strand of the nucleic acid linked to a conjugation group; sequentially linking nucleoside monomers in 3' to 5' direction to synthesize an antisense or sense strand of the nucleic acid according to the type and sequence of the nucleotides in the sense or antisense strand under the condition for phosphoramidite solid phase synthesis; wherein the linking of each nucleoside monomer includes a four-step reaction of deprotection, coupling, capping, and oxidation or sulfurization; removing the protecting group and cleaving the solid phase support; isolating and purifying the sense strand and the antisense strand; and annealing.

In some embodiments, the method for preparing the siRNA conjugate as shown by Formula (308) comprises the following steps: according to the type and sequence of the nucleotides in the sense or antisense strand of the double-strand siRNA, sequentially linking nucleoside monomers in 3' to 5' direction to synthesize the antisense and sense strand; wherein the linking of each nucleoside monomer includes a four-step reaction of deprotection, coupling, capping, and oxidation or sulfurization, to obtain the sense strand linked to the solid phase support and the antisense strand linked to the solid phase support; contacting the compound as shown by Formula (321) with the sense strand linked to the solid phase support or the antisense strand linked to the solid phase support under coupling reaction condition in the presence of a coupling agent, thereby linking the compound as shown by Formula (321) to the sense strand or antisense strand; wherein the compound as shown by Formula (321) is a compound in which $R_4$ comprises a first functional group which is a phosphoramidite group; removing the protecting group and cleaving the solid phase support; respectively isolating and purifying the sense strand or the antisense strand of the siRNA; and annealing, wherein the sense or antisense strand of the siRNA is linked to a conjugation group.

In some embodiments, the P atom in the Formula (A59) is linked to the 3' terminal of the sense strand of the siRNA, and the method for preparing the siRNA conjugate as shown by Formula (308) comprises:
  (1) removing the hydroxyl protecting group $P_k$ in the compound of Formula (321), wherein the compound of Formula (321) is a compound in which $R_4$ comprises a first functional group comprising a protected hydroxyl $OR_k$, and a second functional group having a structure as shown by Formulas (C1') or (C3'); contacting the deprotected product with a nucleoside monomer to afford a nucleoside monomer linked to a solid phase support via a conjugation molecule under coupling reaction condition in the presence of a coupling agent;
  (2) starting from the nucleoside monomer linked to a solid phase support via the conjugation molecule, synthesizing a sense strand of the siRNA in 3' to 5' direction by a phosphoramidite solid phase synthesis method;
  (3) synthesizing an antisense strand of the siRNA by a phosphoramidite solid phase synthesis method; and
  (4) isolating the sense strand and the antisense strand of the siRNA and annealing the same to afford the siRNA conjugate as shown by Formula (308).

Therein, in step (1), the method for removing the protecting group $R_k$ in the above compound of Formula (321) comprises contacting the compound of Formula (321) with a deprotection agent under deprotection condition. The deprotection condition comprises a temperature of 0-50° C., and in some embodiments, 15-35° C., and a reaction time of 30-300 seconds, and in some embodiments, 50-150 seconds. The deprotection agent may be one or more selected from trifluoroacetic acid, trichloroacetic acid, dichloroacetic acid, and monochloroacetic acid, and in some embodiments, dichloroacetic acid. The molar ratio of the deprotection agent to the compound as shown by Formula (321) is 10:1 to 1000:1, and in some embodiments, 50:1 to 500:1.

The coupling reaction condition and the coupling agent may be any condition and agent suitable for the above coupling reaction. In some embodiments, the same condition and agent as those of the coupling reaction in the solid phase synthesis method can be used.

In some embodiments, the coupling reaction condition comprises a reaction temperature of 0-50° C., and in some embodiments, 15-35° C. The molar ratio of the compound of Formula (321) to the nucleoside monomer is 1:1 to 1:50, and in some embodiments, 1:2 to 1:5. The molar ratio of the compound of Formula (321) to the coupling agent may be 1:1 to 1:50, and in some embodiments, 1:3 to 1:10. The reaction time is 200-3,000 seconds, and in some embodiments, 500-1,500 seconds. The coupling agent is one or more selected from 1H-tetrazole, 5-ethylthio-1H-tetrazole and 5-benzylthio-1H-tetrazole, and in some embodiments, is 5-ethylthio-1H-tetrazole. The coupling reaction may be performed in an organic solvent. The organic solvent is one or more selected from anhydrous acetonitrile, anhydrous DMF and anhydrous dichloromethane, and in some embodiments, is anhydrous acetonitrile. With respect to the compound as shown by Formula (321), the amount of the organic solvent is 3-50 L/mol, and in some embodiments, 5-20 L/mol.

In step (2), starting from the nucleoside monomer linked to a solid phase support via a conjugation molecule prepared in the above steps, a sense strand SS of the siRNA conjugate is synthesized in 3' to 5' direction by the phosphoramidite solid phase synthesis method. In this case, the conjugation molecule is linked to 3' terminal of the resultant sense strand.

Other conditions for the solid phase synthesis in steps (2) and (3), including the deprotection condition for the nucleoside monomer, the type and amount of the deprotection agent, the coupling reaction condition, the type and amount of the coupling agent, the capping reaction condition, the type and amount of the capping agent, the oxidation reaction condition, the type and amount of the oxidation agent, the sulfurization reaction condition, and the type and amount of the sulfurization agent, adopt various conventional agents, amounts, and conditions in the art.

In some embodiments, for example, the solid phase synthesis in steps (2) and (3) can use the following conditions:

The deprotection condition for the nucleoside monomer comprises a reaction temperature of 0-50° C., and in some embodiments, 15-35° C., and a reaction time of 30-300 seconds, and in some embodiments, 50-150 seconds. The deprotection agent may be one or more selected from trifluoroacetic acid, trichloroacetic acid, dichloroacetic acid, and monochloroacetic acid, and in some embodiments, is dichloroacetic acid. The molar ratio of the deprotection agent to the protecting group 4,4'-dimethoxytrityl on the solid phase support is 2:1 to 100:1, and in some embodiments, 3:1 to 50:1.

The coupling reaction condition comprises a reaction temperature of 0-50° C., and in some embodiments, 15-35° C. The molar ratio of the nucleic acid sequence linked to the solid phase support to the nucleoside monomer is 1:1 to 1:50, and in some embodiments, 1:5 to 1:15. The molar ratio of the nucleic acid sequence linked to the solid phase support to the coupling agent is 1:1 to 1:100, and in some embodiments, 1:50 to 1:80. The selection of the reaction time and the coupling agent is the same as above.

The capping reaction condition comprises a reaction temperature of 0-50° C., and in some embodiments, 15-35° C., and a reaction time of 5-500 seconds, and in some embodiments, 10-100 seconds. The selection of the capping agent is the same as above. The molar ratio of the total amount of the capping agent to the nucleic acid sequence linked to the solid phase support is 1:100 to 100:1, and in some embodiments, is 1:10 to 10:1. In the case where the capping agent uses equimolar acetic anhydride and N-methylimidazole, the molar ratio of acetic anhydride, N-methylimidazole, and the nucleic acid sequence linked to the solid phase support may be 1:1:10-10:10:1, and in some embodiments, is 1:1:2-2:2:1.

The oxidation reaction condition comprises a reaction temperature of 0-50° C., and in some embodiments, 15-35° C., and a reaction time of 1-100 seconds, and in some embodiments, 5-50 seconds. In some embodiments, the oxidation agent is iodine (in some embodiments provided as iodine water). The molar ratio of the oxidation agent to the nucleic acid sequence linked to the solid phase support in the coupling step may be 1:1 to 100:1, and in some embodiments, is 5:1 to 50:1. In some embodiments, the oxidation reaction is performed in a mixed solvent in which the ratio of tetrahydrofuran:water:pyridine is 3:1:1-1:1:3. The sulfurization reaction condition comprises a reaction temperature of 0-50° C., and in some embodiments, 15-35° C., and a reaction time of 50-2,000 seconds, and in some embodiments, 100-1,000 seconds. in some embodiments, the sulfurization agent is xanthane hydride. The molar ratio of the sulfurization agent to the nucleic acid sequence linked to the solid phase support in the coupling step is 10:1 to 1,000:1, and in some embodiments, is 10:1 to 500:1. In some embodiments, the sulfurization reaction is performed in a mixed solvent in which the ratio of acetonitrile:pyridine is 1:3-3:1.

The method further comprises isolating the sense strand and the antisense strand of the siRNA after linking all nucleoside monomers and before the annealing. Methods for isolation are well-known to those skilled in the art and generally comprise cleaving the synthesized nucleotide sequence from the solid phase support, removing the protecting groups on the bases, phosphate groups and ligands, purifying, and desalting.

The conventional cleavage and deprotection methods in the synthesis of siRNAs can be used to cleave the synthesized nucleotide sequence from the solid phase support, and remove the protecting groups on the bases, phosphate groups and ligands. For example, the resultant nucleotide sequence linked to the solid phase support is contacted with concentrated aqueous ammonia; during deprotection, the protecting group YCOO— in groups A46-A54 is converted to a hydroxyl group, and thus the $S_1$ groups are converted to corresponding $M_1$ groups, providing the siRNA conjugate as shown by Formula (308); wherein the concentrated aqueous ammonia may be aqueous ammonia of a concentration of 25-30 wt %. With respect to the target siRNA sequence, the amount of the concentrated aqueous ammonia may be 0.2 ml/μmol-0.8 ml/μmol.

When there is at least one 2'-TBDMS protection on the synthesized nucleotide sequence, the method further comprises contacting the nucleotide sequence removed from the solid phase support with triethylamine trihydrofluoride to remove the 2'-TBDMS protection. Here, the corresponding nucleotide in the resultant target siRNA sequence has free 2'-hydroxy. With respect to the target siRNA sequence, the amount of pure triethylamine trihydrofluoride is 0.4 ml/μmol-1.0 ml/μmol. As such, the siRNA conjugate as shown by Formula (308) can be obtained.

Methods for purification and desalination are well-known to those skilled in the art. For example, nucleic acid purification may be performed using a preparative ion chromatography purification column with a gradient elution of NaBr or NaCl; after collection and combination of the product, the desalination may be performed using a reverse phase chromatography purification column.

In the resultant siRNA conjugate as shown by Formula (308), the non-bridging oxygen or sulfur atom in the phosphodiester bond or phosphorothioate diester bond between the nucleotides substantially binds to sodium ion, and the siRNA conjugate as shown by Formula (308) is substantially present in the form of a sodium salt. The well-known ion-exchange methods may be used, in which the sodium ion may be replaced with hydrogen ion and/or other cations, thereby providing other forms of siRNA conjugates as shown by Formula (308). The cations are as described above.

During synthesis, the purity and molecular weight of the nucleic acid sequence may be determined at any time, in order to better control the synthesis quality. Such determination methods are well-known to those skilled in the art. For example, the purity of the nucleic acid may be determined by ion exchange chromatography, and the molecular weight may be determined by liquid chromatography-mass spectrometry (LC-MS).

Methods for annealing are also well-known to those skilled in the art. For example, the synthesized sense strand (SS strand) and the antisense strand (AS strand) may be simply mixed in water for injection at an equimolar ratio, heated to 70-95° C., and then cooled at room temperature to form a double-stranded structure via hydrogen bond. Hence, the siRNA conjugate as shown by Formula (308) can be obtained.

After having obtained the conjugate, in some embodiments, the synthesized siRNA conjugate as shown by Formula (308) can also be characterized by the means such as molecular weight detection using the methods such as liquid chromatography-mass spectrometry, to confirm that the synthesized siRNA conjugate is the designed siRNA conjugate as shown by Formula (308) of interest, and the sequence of the synthesized siRNA is the sequence of the desired siRNA sequence, for example, one of the sequences listed in Tables 1a-1g.

The compound as shown by Formula (321) may be obtained by the following preparation method, comprising: contacting a compound as shown by Formula (313) with a cyclic anhydride in an organic solvent under esterification reaction condition in the presence of a base and an esterification catalyst; isolating the compound as shown by Formula (321) by ion exchange:

Formula (313)

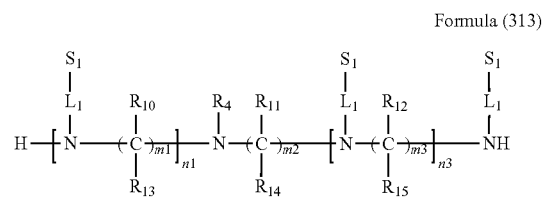

wherein the definitions and options of n1, n3, m1, m2, m3, $R_{10}$, $R_{11}$, $R_{12}$, $R_{13}$, $R_{14}$, $R_{15}$, $L_1$, and $S_1$ are respectively as described above;

$R_6$ is a group for providing $R_4$ of Formula (321); in some embodiments, $R_6$ has a structure as shown by Formula (A61):

(A61)

wherein $R_i$ is any group capable of linking to the N atom on the nitrogenous backbone, linking to $R_kO$ and linking to a free hydroxy group; $R_k$ is a hydroxy protecting group. In this case, a compound as shown by Formula (321) is obtained, wherein $R_4$ comprises a first functional group which comprises a hydroxy protecting group and a second functional group which comprises a structure as shown by Formula (C1) or (C2).

The esterification reaction condition includes a reaction temperature of 0-100° C. and a reaction time of 8-48 hours. In some embodiments, the esterification reaction condition comprises a reaction temperature of 10-40° C. and a reaction time of 20-30 hours.

In some embodiments, the organic solvent comprises one or more of an epoxy solvent, an ether solvent, an haloalkane solvent, dimethyl sulfoxide, N,N-dimethylformamide, and N,N-diisopropylethylamine. In some embodiments, the epoxy solvent is dioxane and/or tetrahydrofuran, the ether solvent is diethyl ether and/or methyl tertbutyl ether, and the haloalkane solvent is one or more of dichloromethane, trichloromethane and 1,2-dichloroethane. In some embodiments, the organic solvent is dichloromethane. With respect to the compound as shown by Formula (313), the amount of the organic solvent is 3-50 L/mol, and in some embodiments, 5-20 L/mol.

In some embodiments, the cyclic anhydride is one of succinic anhydride, glutaric anhydride, adipic anhydride or pimelic anhydride, and in some embodiments, the cyclic anhydride is succinic anhydride. The molar ratio of the cyclic anhydride to the compound as shown by Formula (313) is 1:1 to 10:1, and in some embodiments, 2:1 to 5:1.

The esterification catalyst may be any catalyst capable of catalyzing esterification reaction, such as 4-dimethylaminopyridine. The molar ratio of the catalyst to the compound as shown by Formula (313) is 1:1 to 10:1, and in some embodiments, is 2:1 to 5:1.

In some embodiments, the base may be any inorganic base, organic base or combination thereof. Considering solubility and product stability, the base may be, for example, tertiary amine. In some embodiments, the tertiary amine is triethylamine or N,N-diisopropylethylamine. The molar ratio of the tertiary amine to the compound as shown by Formula (313) is 1:1 to 20:1, and in some embodiments, 3:1 to 10:1.

The ion exchange serves the function of converting the compound as shown by Formula (321) into a desired form of carboxylic acid or carboxylic salt and the methods of ion exchange are well-known to those skilled in the art. The conjugation molecule having a $M^+$ cation may be obtained by using suitable ion exchange solution and ion exchange condition, which are omitted herein. In some embodiments, the ion exchange reaction is performed using a triethylamine phosphate solution, and the concentration of the triethylamine phosphate solution is 0.2-0.8 M. In some embodiments, the concentration of the triethylamine phosphate solution is 0.4-0.6 M, and with respect to the compound as shown by Formula (313), the amount of the triethylamine phosphate solution is 3-6 L/mol, and in further embodiments, 4-5 L/mol.

The compound of Formula (321) may be isolated from the reaction mixture using any suitable isolation methods. In some embodiments, the compound of Formula (321) may be isolated by removal of solvent via evaporation followed by chromatography. For example, the following two chromatographic conditions can be used for isolation: (1) normal phase purification of silica gel: 200-300 mesh silica gel filler, gradient elution of 1 wt‰ triethylamine in dichloromethane: methanol=100:18-100:20; or (2) reverse phase purification: C18 and C8 reverse phase filler, gradient elution of methanol:acetonitrile=0.1:1-1:0.1. In some embodiments, the solvent may be directly removed to obtain a crude product of the compound of Formula (321), which may be directly used in subsequent reactions.

In some embodiments, the method for preparing the compound of Formula (321) further comprises: further contacting the product obtained by the above ion exchanging reaction with a solid phase support with amino or hydroxy groups in an organic solvent under condensation reaction condition in the presence of a condensation agent, a condensation catalyst and a tertiary amine. In this case, a compound as shown by Formula (321) is obtained, wherein $R_4$ comprises a first functional group which comprises a hydroxy protecting group and a second functional group which comprises a structure as shown by Formula (C1').

The solid phase support is one of the supports used in solid phase synthesis of siRNA, some of which are well-known to those skilled in the art. For example, the solid phase support may be selected from the solid phase supports containing active hydroxy or amino functional group(s), and in some embodiments, is an amino or hydroxy resin. In some embodiments, the amino or hydroxy resin has the following parameters: particle size of 100-400 mesh, and surface amino or hydroxy loading of 0.2-0.5 mmol/g. The ratio of the compound as shown by Formula (321) to the solid phase support is 10-400 mol compound/g solid phase support. In some embodiments, the ratio of the compound of Formula (321) to the solid phase support is 50 μmol/g to 200 μmol/g.

The organic solvent may be any suitable solvent or mixed solvent known to those skilled in the art. In some embodiments, the organic solvent is one or more of acetonitrile, an epoxy solvent, an ether solvent, an haloalkane solvent, dimethyl sulfoxide, N,N-dimethylformamide, and N,N-diisopropylethylamine. In some embodiments, the epoxy solvent is dioxane and/or tetrahydrofuran; the ether solvent is diethyl ether and/or methyl tertbutyl ether; the haloalkane solvent is one or more of dichloromethane, trichloromethane and 1,2-dichloroethane. In some embodiments, the organic solvent is acetonitrile. With respect to the compound of Formula (321), the amount of the organic solvent is 20-200 L/mol, and in some embodiments, 50-100 L/mol.

In some embodiments, the condensation agent may be benzotriazol-1-yl-oxytripyrrolidino phosphonium hexafluorophosphate (PyBop), 3-diethoxyphosphoryl-1,2,3-benzotrizin-4(3H)-one (DEPBT) and/or O-benzotriazol-tetramethyluronium hexafluorophosphate. In some embodiments, the condensation agent is O-benzotriazol-tetramethyluronium hexafluorophosphate. The molar ratio of the condensation agent to the compound as shown by Formula (321) is 1:1 to 20:1, and in other embodiments, 1:1 to 5:1.

In some embodiments, the tertiary amine is triethylamine and/or N,N-diisopropylethylamine, and in some embodiments, N,N-diisopropylethylamine. The molar ratio of the tertiary amine to the compound as shown by Formula (321) is 1:1 to 20:1, and in some embodiments, 1:1 to 5:1.

In some embodiments, the method for preparing the compound of Formula (321) further comprises: contacting the resultant condensation product with a capping agent and an acylation catalyst in an organic solvent under capping reaction condition, and isolating the compound of Formula (321). The capping reaction is used to remove any active functional group that does not completely react, so as to avoid producing unnecessary by-products in subsequent reactions. The capping reaction condition comprises a reaction temperature of 0-50° C., and in some embodiments, 15-35° C., and a reaction time of 1-10 hours, and in some embodiments, 3-6 hours. The capping agent may be the capping agent used in solid phase synthesis of siRNA, which are well-known to those skilled in the art.

In some embodiments, the capping agent is composed of a capping agent 1 (cap1) and a capping agent 2 (cap2). The cap1 is N-methylimidazole, and in some embodiments, provided as a mixed solution of N-methylimidazole in pyridine/acetonitrile, wherein the volume ratio of pyridine to acetonitrile is 1:10 to 1:1, and in some embodiments, 1:3 to 1:1. In some embodiments, the ratio of the total volume of pyridine and acetonitrile to the volume of N-methylimidazole is 1:1 to 10:1, and in some embodiments, 3:1 to 7:1. The cap2 is acetic anhydride, and in some embodiments, provided as a solution of acetic anhydride in acetonitrile, wherein the volume ratio of acetic anhydride to acetonitrile is 1:1 to 1:10, and in further embodiments, 1:2 to 1:6.

In some embodiments, the ratio of the volume of the mixed solution of N-methylimidazole in pyridine/acetonitrile to the weight of the compound of Formula (321) is 5 ml/g-50 ml/g, and in some embodiments, 15 ml/g-30 ml/g. The ratio of the volume of the solution of acetic anhydride in acetonitrile to the weight of the compound of Formula (321) is 0.5 ml/g-10 ml/g, and in some embodiments, 1 ml/g-5 ml/g.

In some embodiments, the capping agent comprises equimolar acetic anhydride and N-methylimidazole. The organic solvent is one or more of acetonitrile, an epoxy solvent, an ether solvent, an haloalkane solvent, dimethyl sulfoxide, N,N-dimethylformamide, and N,N-diisopropylethylamine. In some embodiments, the organic solvent is acetonitrile. With respect to the compound of Formula (321), the amount of the organic solvent is 10-50 L/mol, and in some embodiments, 5-30 L/mol.

In some embodiments, the acylation catalyst may be selected from any catalyst that may be used for esterification condensation or amidation condensation, such as alkaline heterocyclic compounds. In some embodiments, the acylation catalyst is 4-dimethylaminopyridine. The weight ratio of the catalyst to the compound as shown by Formula (321) may be 0.001:1 to 1:1, and in some embodiments, 0.01:1 to 0.1:1.

In some embodiments, the compound of Formula (321) may be isolated from the reaction mixture by any suitable separation methods. In some embodiments, the compound of Formula (321) may be obtained by thoroughly washing with an organic solvent and filtering to remove unreacted reactants, excess capping agent and other impurities, wherein the organic solvent is selected from acetonitrile, dichloromethane and methanol. In some embodiments, the organic solvent is acetonitrile.

In some embodiments, the preparation method of the conjugation molecule as shown by Formula (321) comprises contacting a compound as shown by Formula (313) with a phosphorodiamidite in an organic solvent under coupling reaction condition in the presence of a coupling agent, and isolating the compound as shown by Formula (321). In this case, a compound as shown by Formula (321) is obtained, wherein $R_4$ comprises a first functional group comprising a hydroxy protecting group and a second functional group comprising a structure as shown by Formula (C3).

In some embodiments, the coupling reaction condition comprises: a reaction temperature of 0-50° C., such as 15-35° C.; the molar ratio of the compound of Formula (313) to the phosphorodiamidite of 1:1 to 1:50, such as 1:5 to 1:15; the molar ratio of the compound of Formula (313) to the coupling agent of 1:1 to 1:100, such as 1:50 to 1:80; and a reaction time of 200-3,000 seconds, such as 500-1,500 seconds. The phosphorodiamidite may be, for example, bis(diisopropylamino)(2-cyanoethoxy)phosphine, which may be commercially available or synthesized according to the methods well-known in the art. The coupling agent is one or more selected from 1H-tetrazole, 5-ethylthio-1H-tetrazole and 5-benzylthio-1H-tetrazole, such as 5-ethylthio-1H-tetrazole. The coupling reaction may be performed in an organic solvent. The organic solvent is one or more selected from anhydrous acetonitrile, anhydrous DMF and anhydrous dichloromethane, such as anhydrous acetonitrile. With respect to the compound of Formula (313), the amount of the organic solvent is 3-50 L/mol, such as 5-20 L/mol. By coupling reaction, the hydroxy group in the compound of Formula (313) reacts with the phosphorodiamidite to form a phosphoramidite group. In some embodiments, the solvent may be directly removed to afford a crude product of the compound of Formula (321), which may be directly used in subsequent reactions.

In some embodiments, the preparation method of the compound of Formula (321) further comprises the following steps: further contacting the isolated product with a solid phase support with hydroxy groups in an organic solvent under coupling reaction condition in the presence of a coupling agent, followed by capping, oxidation, and isolation, to afford the compound of Formula (321), wherein $R_4$ comprises a first functional group comprising a hydroxy protecting group and a second functional group comprising a structure as shown by Formula (C3').

In some embodiments, the solid phase support is a solid support well-known in the art for solid phase synthesis of nucleic acid, such as, a deprotected commercially available universal solid phase support (NittoPhase® HL UnyLinker™ 300 Oligonucleotide Synthesis Support, Kinovate Life Sciences, as shown by Formula (B80)):

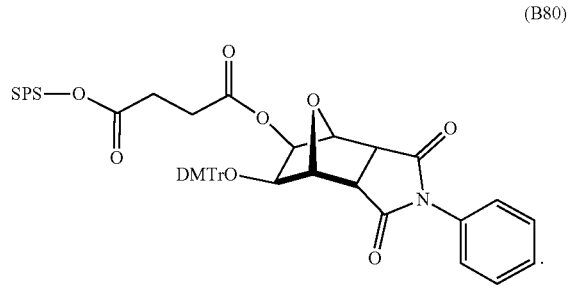

(B80)

A deprotection reaction is well-known to those skilled in the art. In some embodiments, the deprotection condition comprises a temperature of 0-50° C., such as 15-35° C., and a reaction time of 30-300 seconds, such as 50-150 seconds. The deprotection agent may be one or more selected from of trifluoroacetic acid, trichloroacetic acid, dichloroacetic acid, and monochloroacetic acid. In some embodiments, the deprotection agent is dichloroacetic acid. The molar ratio of the deprotection agent to the protecting group -DMTr (4,4'-dimethoxytrityl) on the solid phase support is 2:1 to 100:1, such as 3:1 to 50:1. Through such deprotection, reactive free hydroxy groups are obtained on the surface of the solid phase support, for facilitating the subsequent coupling reaction.

The coupling reaction condition and the coupling agent may be selected as above. Through the coupling reaction, the free hydroxy groups formed in the deprotection react with the phosphoramidite groups, so as to form a phosphite ester linkage.

In some embodiments, the capping reaction condition comprises a temperature of 0-50° C., such as 15-35° C., and a reaction time of 5-500 seconds, such as 10-100 seconds. The capping reaction is carried out in the presence of a capping agent. The selection and amount of the capping agent are as described above.

The oxidation reaction condition comprises a temperature of 0-50° C., such as 15-35° C., and a reaction time of 1-100 seconds, such as 5-50 seconds. The oxidation agent may be, for example, iodine (in some embodiments, provided as iodine water). The molar ratio of the oxidation agent to the nucleic acid sequence linked to the solid phase support is 1:1 to 100:1, such as, may be 5:1 to 50:1. In some embodiments, the oxidation reaction is performed in a mixed solvent in which the ratio of tetrahydrofuran:water:pyridine=3:1:1-1:1:3.

In some embodiments, $R_6$ is one of the groups of Formula (B7) or (B8):

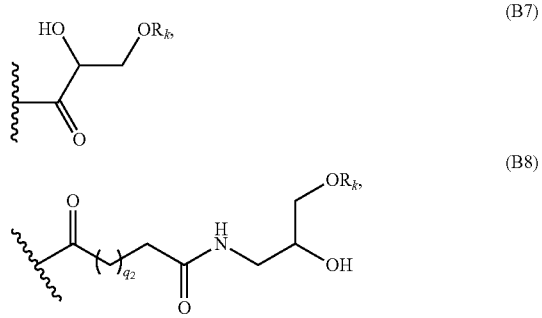

wherein the definitions of $q_2$ and $R_k$ are as described above.

In this case, the compound as shown by Formula (313) may be obtained by the following preparation method, comprising: contacting the compound as shown by Formula (314) with a compound as shown by Formula (A-1) or (A-2) in an organic solvent under amidation reaction condition in the presence of a condensation agent for amidation reaction and an tertiary amine, followed by isolation:

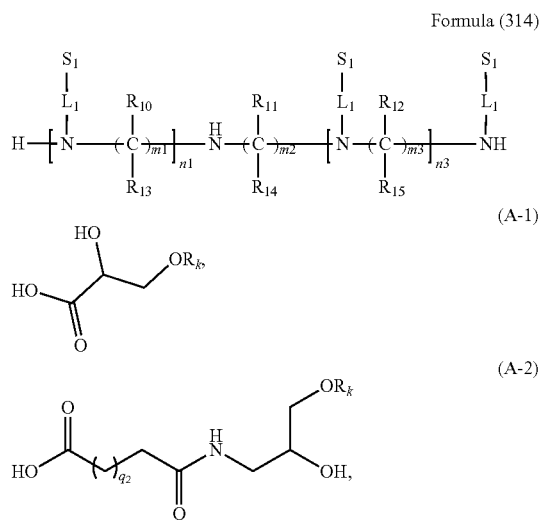

wherein the definitions and options of n1, n3, m1, m2, m3, $R_{10}$, $R_{11}$, $R_{12}$, $R_{13}$, $R_{14}$, $R_{15}$, $L_1$, $S_1$, $q_2$, and $R_k$ are respectively as described above.

The amidation reaction condition comprises a reaction temperature of 0-100° C. and a reaction time of 1-48 hours. In some embodiments, the amidation reaction condition comprises a reaction temperature of 10-40° C. and a reaction time of 2-16 hours.

In some embodiments, the organic solvent is one or more of an alcohol solvent, an epoxy solvent, an ether solvent, an haloalkane solvent, dimethyl sulfoxide, N,N-dimethylformamide, and N,N-diisopropylethylamine. In some embodiments, the alcohol solvent is one or more of methanol, ethanol and propanol, and in some embodiments, ethanol. In some embodiments, the epoxy solvent is dioxane and/or tetrahydrofuran. In some embodiments, the ether solvent is diethyl ether and/or methyl tert-butyl ether. In some embodiments, the haloalkane solvent is one or more of dichloromethane, trichloromethane and 1,2-dichloroethane. In some embodiments, the organic solvent is dichloromethane. With respect to the compound of Formula (314), the amount of the organic solvent is 3-50 L/mol, and in some embodiments, 3-20 L/mol.

In some embodiments, the condensation agent for amidation reaction is benzotriazol-1-yl-oxytripyrrolidinophosphonium hexafluorophosphate, 3-diethoxyphosphoryl-1,2,3-benzotrizin-4(3H)-one, 4-(4,6-dimethoxytriazin-2-yl)-4-methylmorpholine hydrochloride, 2-ethoxy-1-ethoxycarbonyl-1,2-dihydroquinoline (EEDQ), or O-benzotriazol-tetramethyluronium hexafluorophosphate, and in further embodiments, 3-diethoxyphosphoryl-1,2,3-benzotrizin-4(3H)-one. The molar ratio of the condensation agent for amidation reaction to the compound as shown by Formula (314) is 1:1 to 10:1, and in some embodiments, 2.5:1 to 5:1.

In some embodiments, the tertiary amine is triethylamine or N,N-diisopropylethylamine, and in some embodiments, N,N-diisopropylethylamine. The molar ratio of the tertiary amine to the compound as shown by Formula (314) is 3:1 to 20:1, and in some embodiments, 5:1 to 10:1.

The compounds of Formula (A-1) and (A-2) may be prepared by any suitable means. For example, when $R_k$ is a DMTr group, the compound of Formula (A-1) may be prepared by reacting calcium glycerate with DMTrCl. Similarly, the compound of Formula (A-2) may be prepared by firstly contacting 3-amino-1,2-propanediol with a cyclic anhydride and then reacting with DMTrCl, wherein the cyclic anhydride may have 4-13 carbon atoms, and in some embodiments, 4-8 carbon atoms. Those skilled in the art would easily understand that the selections of different cyclic anhydrides correspond to different values for $q_2$ in the compound of Formula (A-2). For example, when the cyclic anhydride is succinic anhydride, $q_2$=1; when the cyclic anhydride is glutaric anhydride, $q_2$=2, and so on.

In some variations, the compound of Formula (313) can also be prepared by sequentially reacting the compound as shown by Formula (314) with the cyclic anhydride, 3-amino-1,2-propanediol and DMTrCl. Those skilled in the art would easily understand that these variations would not affect the structure and function of the compound of Formula (313), and these variations are readily realized by those skilled in the art on the basis of the above methods.

Similarly, the compound of Formula (313) may be isolated from the reaction mixture by any suitable isolation methods. In some embodiments, the compound of Formula (313) may be isolated by removal of solvent via evaporation followed by chromatography. For example, the following chromatographic conditions may be used for isolation: (1) normal phase purification of silica gel: 200-300 mesh silica gel filler, with gradient elution of petroleum ether:ethyl acetate:dichloromethane:N,N-dimethylformamide=1:1:1:0.5-1:1:1:0.6; and (2) reverse phase purification: C18 and C8 reverse phase fillers, with gradient elution of methanol:acetonitrile=0.1:1-1:0.1. In some embodiments, the solvent may be directly removed to afford a crude product of the compound of Formula (313), which may be directly used in subsequent reactions.

In some embodiments, the compound as shown by Formula (314) may be obtained by the following preparation method, comprising: contacting the compound as shown by Formula (320) with the compound as shown by Formula (316) in an organic solvent under condensation reaction condition in the presence of a condensation agent for amidation reaction and a tertiary amine, followed by isolation:

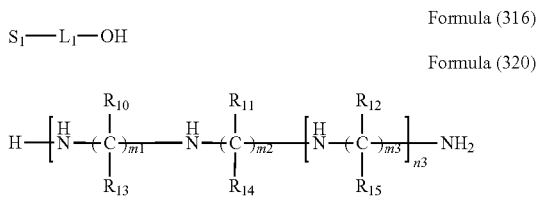

Formula (316)

Formula (320)

wherein the definitions and options of n1, n3, m1, m2, m3, $R_{10}$, $R_{11}$, $R_{12}$, $R_{13}$, $R_{14}$, and $R_{15}$ are respectively as described above.

The compound of Formula (316) can be, such as, those disclosed in J. Am. Chem. Soc. 2014, 136, 16958-16961. Alternatively, the compounds of Formula (316) may be prepared by those skilled in the art via various methods. For example, some compounds of Formula (316) may be prepared according to the method disclosed in Example 1 of the U.S. Pat. No. 8,106,022B2, which is incorporated herein by reference in its entirety.

In some embodiments, the condensation reaction condition comprises a reaction temperature of 0-100° C. and a reaction time of 0.1-24 hours, and in some embodiments, a reaction temperature of 10-40° C. and a reaction time of 0.5-16 hours.

Considering the structure of the desired product compound of Formula (314), the molar ratio of the compound as shown by Formula (316) to the compound as shown by Formula (320) should be determined based on the sum of n1 and n3 in Formula (320). In some embodiments, for example, when n1+n3=3, to ensure complete reaction without any excess, the molar ratio of the compound as shown by Formula (316) to the compound as shown by Formula (320) may be 3:1 to 3.5:1, and in some embodiments, 3.01:1 to 3.15:1.

In some embodiments, the organic solvent is one or more of acetonitrile, an epoxy solvent, an ether solvent, an haloalkane solvent, dimethyl sulfoxide, N,N-dimethylformamide, and N,N-diisopropylethylamine. In some embodiments, the epoxy solvent is dioxane and/or tetrahydrofuran. In some embodiments, the ether solvent is diethyl ether and/or methyl tert-butyl ether. In some embodiments, the haloalkane solvent is one or more of dichloromethane, trichloromethane and 1,2-dichloroethane. In some embodiments, the organic solvent is dichloromethane. With respect to the compound of Formula (320), the amount of the organic solvent may be 3-50 L/mol, and in some embodiments, 5-20 L/mol.

In some embodiments, the condensing agent for amidation reaction is benzotriazol-1-yl-oxytripyrrolidinophosphonium hexafluorophosphate, 3-diethoxyphosphoryloxy-1,2,3-benzotrizin-4(3H)-one (DEPBT), O-benzotriazol-tetramethyluronium hexafluorophosphate, 4-(4,6-dimethoxytriazin-2-yl)-4-methylmorpholine hydrochloride, or 1-hydroxybenzotriazole, and in further embodiments, is a mixture of benzotriazol-1-yl-oxytripyrrolidinophosphonium hexafluorophosphate and 1-hydroxybenzotriazole, wherein benzotriazol-1-yl-oxytripyrrolidinophosphonium hexafluorophosphate and 1-hydroxybenzotriazole are used in equimolar amounts. The molar ratio of the total condensing agent for amidation reaction to the compound as shown by Formula (316) may be 1:1 to 3:1, and in some embodiments, 1.05:1 to 1.5:1.

The tertiary amine may be N-methylmorpholine, triethylamine or N,N-diisopropylethylamine, and in some embodiments, N-methylmorpholine. The molar ratio of the tertiary amine to the compound as shown by Formula (316) may be 2:1 to 10:1, and in some embodiments, 2:1 to 5:1.

Similarly, the compound as shown by Formula (314) may be isolated from the reaction mixture by any suitable isolation method. In some embodiments, the compound as shown by Formula (314) may be isolated by removal of solvent via evaporation followed by chromatography, for example, using the following two chromatographic conditions for isolation: (1) normal phase purification of silica gel: 200-300 mesh silica gel filler, with gradient elution of dichloromethane:methanol=100:5-100:7; and (2) reverse phase purification: $C_{18}$ and $C_8$ reverse phase fillers, with gradient elution of methanol:acetonitrile=0.1:1-1:0.1. In some embodiments, the solvent may be directly removed to afford a crude product of the compound of Formula (314), which may be directly used in subsequent reactions.

The compound of Formula (320) may be commercially available, or prepared by those skilled in the art via known methods. For example, in the case where m1=m2=m3=3, n1=1, n3=2, and each of $R_{10}$, $R_{11}$, $R_{12}$, $R_{13}$, $R_{14}$, and $R_{15}$ is H, the compound of Formula (320) may be commercially available from Alfa Aesar Inc.

The siRNA conjugate of the present disclosure may also be used in combination with other pharmaceutically acceptable excipients, which may be one or more of various conventional formulations or compounds in the art. For details, please refer to the above description of the pharmaceutical compositions of the present disclosure.

Use of the siRNA, the Pharmaceutical Composition and the Conjugate of the Present Disclosure In some embodiments, the present disclosure provides the use of the siRNA and/or the pharmaceutical composition and/or the siRNA conjugate of the present disclosure in the manufacture of a medicament for treating and/or preventing diseases or physiological conditions caused by abnormal expression of PCSK9 gene.

In some embodiments, the present disclosure provides a method for preventing and/or treating diseases or physiological conditions caused by abnormal expression of PCSK9 gene, comprising administering an effective amount of the siRNA and/or the pharmaceutical composition and/or the siRNA conjugate of the present disclosure to a subject in need thereof.

The purpose of preventing and/or treating diseases or physiological conditions caused by abnormal expression of PCSK9 gene may be achieved through the mechanism of RNA interference by administering the siRNA active ingredient of the present disclosure to a subject in need thereof. Therefore, the siRNA and/or the pharmaceutical composition and/or the siRNA conjugate of the present disclosure may be used for preventing and/or treating diseases or physiological conditions caused by abnormal expression of PCSK9 gene, or for preparing a medicament for preventing and/or treating diseases or physiological conditions caused by abnormal expression of PCSK9 gene.

In some embodiments, the diseases or physiological conditions caused by abnormal expression of PCSK9 gene refer to hypercholesteremia, and resulting cardiovascular diseases including atherosclerosis, coronary heart disease and hypertension.

As used herein, the term "administration/administer" refers to the delivery of the siRNA and/or the pharmaceutical composition and/or the siRNA conjugate of the present disclosure into a subject's body by a method or a route that at least partly locates the siRNA and/or the pharmaceutical composition and/or the siRNA conjugate of the present disclosure at a desired site to produce a desired effect. Suitable administration routes for the methods of the present disclosure include topical administration and systemic administration. In general, topical administration results in the delivery of more siRNA conjugates to a particular site as compared with the systemic circulation of the subject; whereas systemic administration results in the delivery of the siRNA and/or the pharmaceutical composition and/or the siRNA conjugate of the present disclosure to the basic systemic circulation of the subject. Considering that the present disclosure is intended to provide a means for preventing and/or treating hypercholesteremia, in some embodiments, an administration mode capable of delivering a medicament to the liver is used.

The administration to a subject may be achieved by any suitable routes known in the art, including but not limited to, oral and parenteral routes, such as intravenous administration, intramuscular administration, subcutaneous administration, transdermal administration, intratracheal administration (aerosol), pulmonary administration, nasal administration, rectal administration, and topical administration (including buccal administration and sublingual administration). The administration frequency may be once or more times daily, weekly, biweekly, triweekly, monthly, bimonthly, quarterly, semiannually, or yearly.

The dose of the siRNA or the pharmaceutical composition or the siRNA conjugate of the present disclosure may be a conventional dose in the art, which may be determined according to various parameters, especially age, weight and gender of a subject. Toxicity and efficacy may be determined in cell cultures or experimental animals by standard pharmaceutical procedures, for example, by determining $LD_{50}$ (the lethal dose that causes 50% population death), $ED_{50}$ (the dose that can cause 50% of the maximum response intensity in a graded response, and that can cause 50% of the experimental subjects to have a positive response in a qualitative response), or $IC_{50}$ (the concentration of an inhibitor/a drug where the graded response is inhibited by half). The dose range for human may be derived based on data obtained from cell culture analysis and animal studies.

When the siRNA, the pharmaceutical composition and/or the siRNA conjugate of the present disclosure is administered, for example, to male or female, 3-5 year old cynomolgus monkeys weighing 2 to 6 kg, (i) for the siRNA conjugate, the amount of the siRNA thereof may be 0.001 to 100 mg/kg body weight, in some embodiments 0.01 to 50 mg/kg body weight, in some embodiments 0.05 to 20 mg/kg body weight, in other embodiments 0.1 to 15 mg/kg body weight, and in other embodiments 0.1 to 10 mg/kg body weight; (ii) for a pharmaceutical composition formed from the siRNA and the pharmaceutically acceptable carrier, the amount of the siRNA thereof may be 0.001 to 50 mg/kg body weight, in some embodiments 0.01 to 10 mg/kg body weight, in some embodiments 0.05 to 5 mg/kg body weight, and in some embodiments 0.1 to 3 mg/kg body weight, based on the amount of the siRNA.

In some embodiments, the present disclosure provides a method of inhibiting the expression of PCSK9 gene in hepatocytes, comprising contacting an effective amount of the siRNA and/or the pharmaceutical composition and/or the siRNA conjugate of the present disclosure with the hepatocytes, and introducing the siRNA and/or the pharmaceutical composition and/or the siRNA conjugate of the present disclosure into the hepatocytes, so as to realize the purpose of inhibiting the expression of PCSK9 gene in hepatocytes through the mechanism of RNA interference. The hepatocytes may be selected from hepatoma cell lines (such as SMMC-7721, HepG2 and Huh7), and isolated primary hepatocytes. In some embodiments, the hepatocytes are HepG2 hepatoma cells.

In the case where the expression of PCSK9 gene in a cell is inhibited by the method of the present disclosure, the amount of the siRNA in the modified siRNA and/or the pharmaceutical composition and/or the siRNA conjugate of the present disclosure is generally such an amount that is sufficient to reduce the expression of the target gene and results in an extracellular concentration of 1 pM to 1 µM, or 0.01 nM to 100 nM, or 0.05 nM to 50 nM, or 0.05 nM to about 5 nM on the surface of the target cells. The amount required to achieve this topical concentration will vary with various factors, including the delivery method, the delivery site, the number of cell layers between the delivery site and the target cells or tissues, the delivery route (topical or systemic), etc. The concentration at the delivery site may be significantly higher than that on the surface of the target cells or tissues.

Kit

The present disclosure provides a kit comprising an effective amount of at least one of the modified siRNA, the pharmaceutical composition, and the siRNA conjugate of the present disclosure.

In some embodiments, the kit of the present disclosure may provide the modified siRNA in a container. In some embodiments, the kit of the present disclosure may comprise a container containing a pharmaceutically acceptable excipient. In some embodiments, the kit may further comprise other ingredients, such as stabilizers or preservatives. In some embodiments, the kit of the present disclosure may comprise at least one additional therapeutic agent in other container different from the container for providing the modified siRNA of the present disclosure. In some embodiments, the kit may comprise an instruction for mixing the modified siRNA with pharmaceutically acceptable carriers and/or excipients or other ingredients (if present).

In the kit of the present disclosure, the modified siRNA and the pharmaceutically acceptable carrier and/or excipient, as well as the modified siRNA, the pharmaceutical composition, and/or the siRNA conjugate and/or the conjugate, and/or the pharmaceutically acceptable exceipient may be provided in any form, such as in a liquid form, a dry form or a lyophilized form. In some embodiments, the modified siRNA and the pharmaceutically acceptable carrier and/or excipient, and the pharmaceutical composition and/or conjugate and optional pharmaceutically acceptable excipient(s) are substantially pure and/or sterilized. In some embodiments, the kit of the present disclosure may provide sterilized water.

Hereinafter, the present disclosure will be further illustrated by way of examples, but will not be limited thereto in any respect.

EXAMPLES

Unless otherwise specified, the reagents and culture media used in following examples are all commercially available, and the procedures used such as nucleic acid electrophoresis and real-time PCR are all performed according to the methods described in Molecular Cloning (Cold Spring Harbor Laboratory Press (1989)).

When the siRNA or the siRNA conjugate against PCSK9 gene synthesized in the present disclosure or the siRNA or the siRNA conjugate as negative control was used to transfect cells, Lipofectamine™ 2000 (Invitrogen) was used as a transfection reagent. The specific procedures could refer to the instruction provided by the manufacturer.

Unless otherwise specified, ratios of reagents provided below are all calculated by volume ratio (v/v).

All the experimental data are expressed as $\overline{X}\pm SEM$ (mean±standard error), and the data are analyzed using Graphpad prism 6.0 statistical analysis software. One-way ANOVA is used for analysis and Tukey is used as the analytical method to compare groups to determine whether the difference between the groups is significant. If no significant difference is found using the one-way ANOVA method, where the overall P<0.05, a T-test is used for a two-tailed test; where p<0.05, there is a significant difference between the two groups.

Preparation Example 1: The Preparation of Conjugate 1

In this preparation example, Conjugate 1 shown in Table 3 was synthesized and its number was L10-siPCSKa1M1S. The conjugated siRNA in this conjugate has the sense strand and antisense strand sequences of Conjugate 1 in Table 3.

(1-1) Synthesis of Compound L-10

Compound L-10 was synthesized according to the following method:

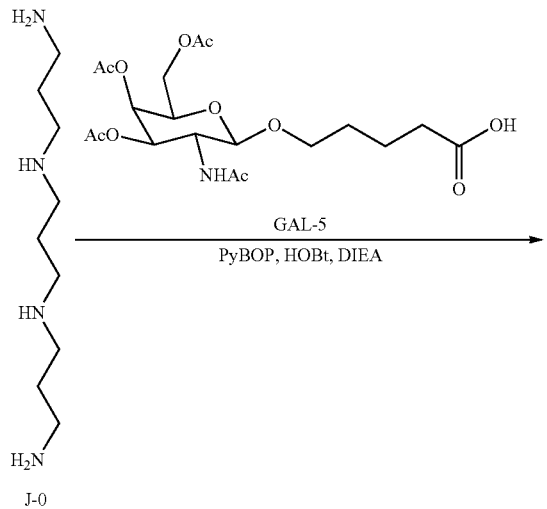

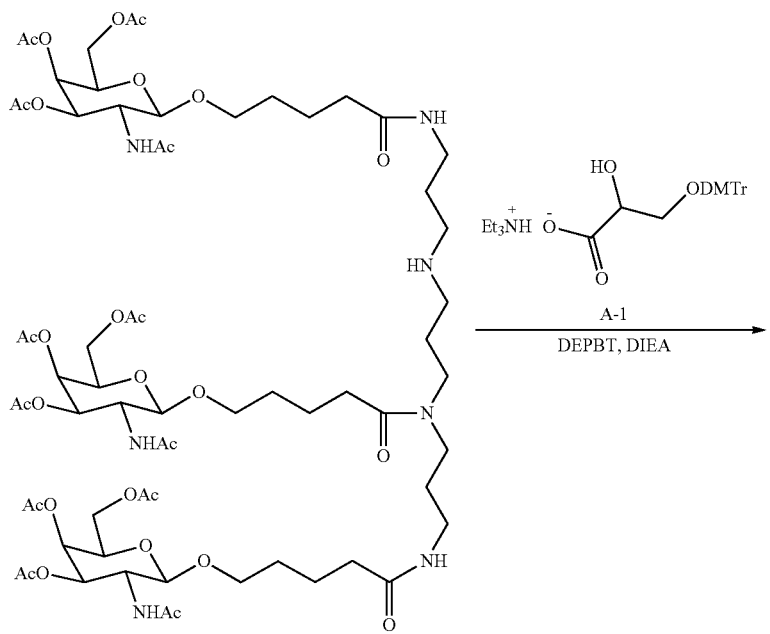

-continued
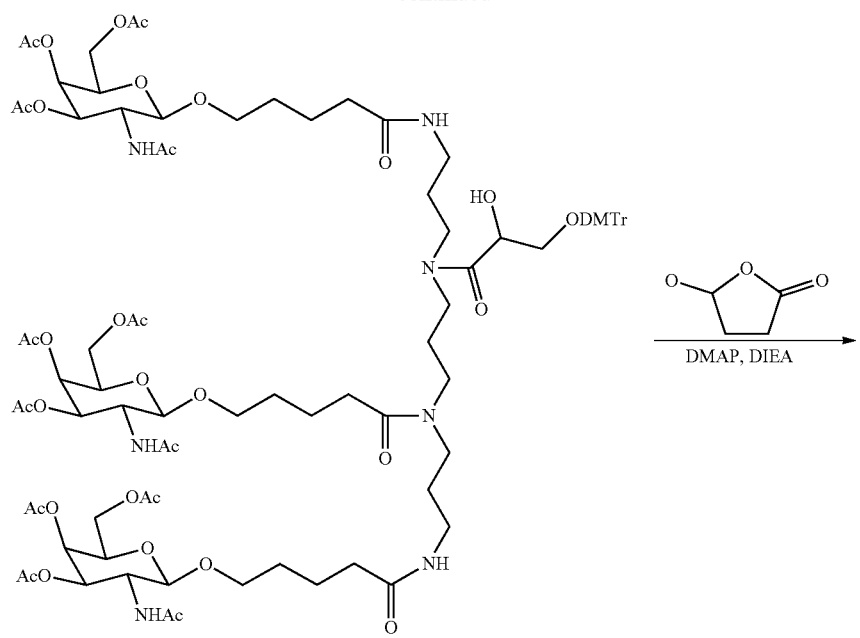
L-7
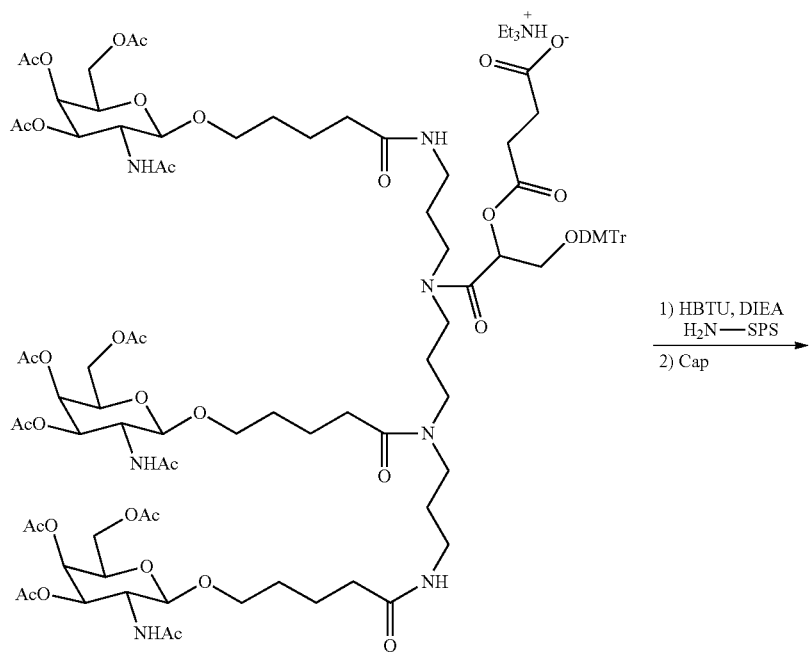
L-9

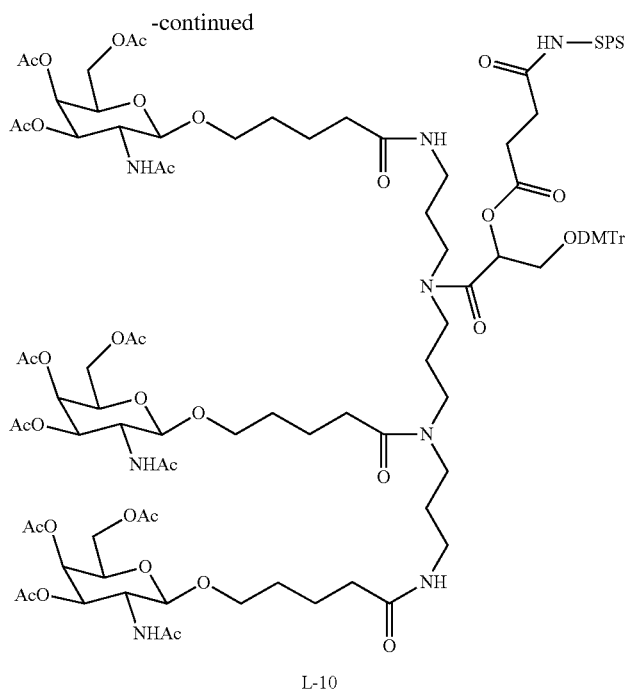

L-10

(1-1-1) Synthesis of GAL-5 (a Terminal Segment of the Conjugation Molecule)

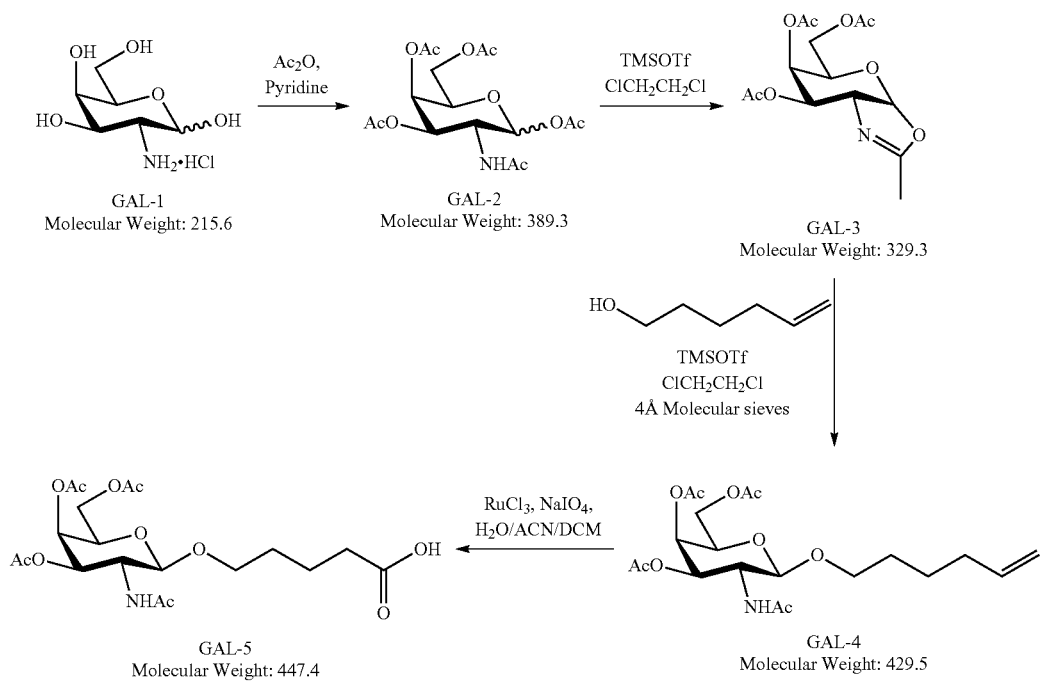

(1-1-1a) Synthesis of GAL-2

100.0 g of GAL-1 (N-acetyl-D-galactosamine hydrochloride, CAS No.: 1772-03-8, purchased from NingBo hongxiang bio-chem Co., Ltd., 463.8 mmol) was dissolved in 1000 ml of anhydrous pyridine, to which 540 ml of acetic anhydride (purchased from Enox Inc., 5565.6 mmol) was added in an ice water bath to react under stirring at room temperature for 1.5 hours. The resultant reaction solution was poured into 10 L of ice water and subjected to suction filtration under reduced pressure. The residue was washed with 2 L of ice water, and then added with a mixed solvent of acetonitrile/toluene (v/v ratio of acetonitrile:toluene=1:1) until completely dissolved. The solvent was removed by evaporation to give 130.0 g of product GAL-2 as a white solid.

(1-1-1b) Synthesis of GAL-3

GAL-2 (35.1 g, 90.0 mmol) obtained in step (1-1-1a) was dissolved in 213 ml of anhydrous 1,2-dichloroethane, to which 24.0 g of trimethylsilyl trifluoromethanesulfonate (TMSOTf, CAS No.: 27607-77-8, purchased from Macklin Inc., 108.0 mmol) was added in an ice water bath under nitrogen atmosphere to react at room temperature overnight.

The reaction solution was added with 400 ml dichloromethane for dilution, filtered with diatomite, and then added with 1 L saturated aqueous sodium bicarbonate solution and stirred evenly. An organic phase was isolated. The aqueous phase remained was extracted twice, each with 300 ml of dichloroethane. The organic phases were combined and washed with 300 ml of saturated aqueous sodium bicarbonate solution and 300 ml of saturated brine, respectively. The organic phase was isolated and dried with anhydrous sodium sulfate. The solvent was removed by evaporation to dryness under reduced pressure to give 26.9 g of product GAL-3 as a light yellow viscous syrup.

(1-1-1c) Synthesis of GAL-4

GAL-3 (26.9 g, 81.7 mmol) obtained in step (1-1-1b) was dissolved in 136 ml of anhydrous 1,2-dichloroethane, added with 30 g of dry 4 Å molecular sieve powder followed by 9.0 g of 5-hexen-1-ol (CAS No.: 821-41-0, purchased from Adamas-beta Inc., 89.9 mmol), and stirred at room temperature for 30 minutes. 9.08 g of TMSOTf (40.9 mmol) was added in an ice bath under nitrogen atmosphere to react under stirring at room temperature overnight. The 4 Å molecular sieve powder was removed by filtration. The filtrate was added with 300 ml dichloroethane for dilution, filtered with diatomite, and then added with 500 ml of saturated aqueous sodium bicarbonate solution and stirred for 10 minutes for washing. An organic phase was isolated. The aqueous phase was extracted once with 300 ml of dichloroethane. The organic phases were combined and washed with 300 ml of saturated aqueous sodium bicarbonate solution and 300 ml of saturated brine, respectively. The organic phase was isolated and dried with anhydrous sodium sulfate. The solvent was removed by evaporation to dryness under reduced pressure to give 41.3g of product GAL-4 as a yellow syrup, which was directly used in the next oxidation reaction without purification.

(1-1-1d) Synthesis of GAL-5

GAL-4 (14.9 g, 34.7 mmol) obtained according to the method described in step (1-1-1c) was dissolved in a mixed solvent of 77 ml of dichloromethane and 77 ml of acetonitrile, added with 103 ml of deionized water and 29.7 g of sodium periodate (CAS No.: 7790-28-5, purchased from Aladdin Inc., 138.8 mmol) respectively, and stirred in an ice bath for 10 minutes. Ruthenium trichloride (CAS No.: 14898-67-0, available from Energy Chemical, 238 mg, 1.145 mmol) was added to react at room temperature overnight. The resultant reaction solution was diluted by adding 300 ml of water under stirring, and adjusted to a pH of about 7.5 by adding saturated sodium bicarbonate. The organic phase was isolated and discarded. The aqueous phase was extracted three times, each with 200 ml of dichloromethane, and the organic phase was discarded. The aqueous phase was adjusted to a pH of about 3 with citric acid solids and extracted three times, each with 200 ml of dichloromethane, and the resultant organic phases were combined and dried with anhydrous sodium sulfate. The solvent was removed by evaporation to dryness under reduced pressure to give 6.85 g of product GAL-5 as a white foamy solid. $^1$H NMR (400 MHz, DMSO) δ 12.01 (br, 1H), 7.83 (d, J=9.2 Hz, 1H), 5.21 (d, J=3.2 Hz, 1H), 4.96 (dd, J=11.2, 3.2 Hz, 1H), 4.49 (d, J=8.4 Hz, 1H), 4.07-3.95 (m, 3H), 3.92-3.85 (m, 1H), 3.74-3.67 (m, 1H), 3.48-3.39 (m, 1H), 2.20 (t, J=6.8 Hz, 2H), 2.11 (s, 3H), 2.00 (s, 3H), 1.90 (s, 3H), 1.77 (s, 3H), 1.55-1.45 (m, 4H).

(1-1-2) Synthesis of L-8

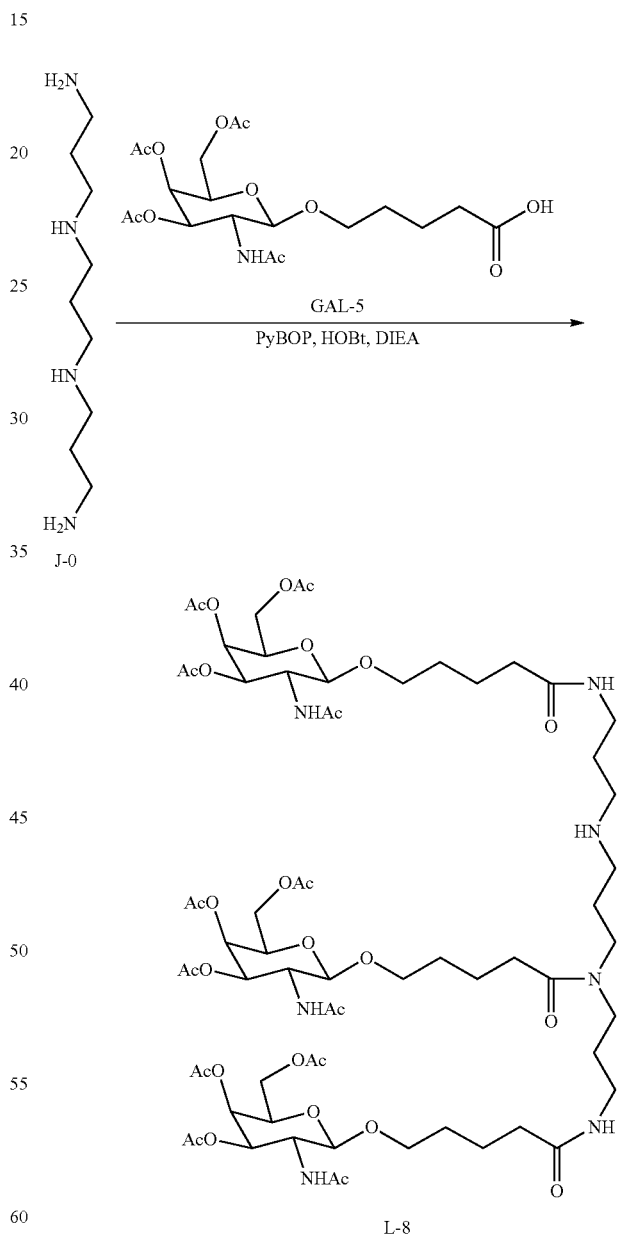

J-0 (9.886 g, 52.5 mmol, purchased from Alfa Aesar Inc.) and GAL-5 (72.819 g, 162.75 mmol, obtained by combining several batches of products) obtained in step (1-1-1) were dissolved in 525 ml of dichloromethane, and added with diisopropylethylamine (DIEA, 44.782 g, 346.50 mmol), benzotriazol-1-yl-oxytripyrrolidino phosphonium hexafluorophosphate (PyBOP, 90.158 g, 173.25 mmol) and hydroxybenzotriazole (HOBt, 23.410 g, 173.25 mmol) to react at room temperature for 4 hours. The resultant reaction solution was washed by adding 20 ml of saturated sodium bicarbonate solution and 200 ml of saturated brine. The aqueous phase was extracted twice, each with 100 ml of dichloromethane. The organic phases were combined, dried with anhydrous sodium sulfate, and filtered. Then the solvent was removed by evaporation to dryness under reduced pressure to give a crude product. The crude product was purified by using a normal phase silica gel column (200-300 mesh). The column was added with 10 wt % triethylamine for neutralizing the acidity of silica gel, equilibrated with 1 wt‰ triethylamine, and eluted with a gradient elution of dichloromethane:methanol=100:25-100:40. The eluate was collected, and the solvent was removed by evaporation to dryness under reduced pressure to give 38.8 g of pure product L-8. $^1$H NMR (400 MHz, DMSO) δ 7.84 (d, J=9.0 Hz, 3H), 7.27-7.23 (m, 1H), 7.13-7.18 (m, 1H), 5.22 (d, J=3.1 Hz, 3H), 4.97 (dd, J=11.3, 3.1 Hz, 3H), 4.48 (d, J=8.4 Hz, 3H), 4.09-3.98 (m, 9H), 3.88 (dd, J=19.3, 9.3 Hz, 3H), 3.75-3.66 (m, 3H), 3.44-3.38 (m, 3H), 3.17-3.30 (m, 4H), 3.10-2.97 (m, 4H), 2.35-2.20 (m, 6H), 2.15-2.08 (m, 9H), 2.07-1.98 (m, 13H), 1.94-1.87 (m, 9H), 1.81-1.74 (m, 9H), 1.65-1.42 (m, 18H). MS m/z: $C_{85}H_{119}N_7O_{30}$, [M+H]$^+$, calculated: 1477.59, measured: 1477.23.

(1-1-3a) Synthesis of A-1

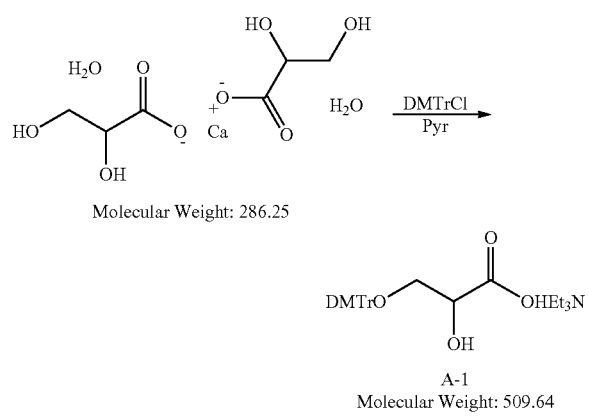

DMTrCl (4,4'-dimethoxytrityl chloride, 101.65 g, 300 mmol) was dissolved in 1000 ml of anhydrous pyridine, and added with calcium DL-glycerate hydrate (28.63 g, 100 mmol) to react at 45° C. for 20 hours. The resultant reaction solution was filtered. The residue was rinsed with 200 ml of DCM, and the filtrate was concentrated to dryness under reduced pressure. The residue was redissolved in 500 ml of dichloromethane and washed twice, each with 200 ml of 0.5 M triethylamine phosphate (pH=7-8). The aqueous phase was extracted twice, each with 200 ml of dichloromethane. The organic phases were combined, dried with anhydrous sodium sulfate, and filtered. The solvent was removed by evaporation to dryness under reduced pressure, and the residue was purified by using a normal phase silica gel column (200-300 mesh). The column was eluted with a gradient elution of petroleum ether:ethyl acetate:dichloromethane:methanol=1:1:1:0.35-1:1:1:0.55. The eluate was collected, and the solvent was removed by evaporation to dryness under reduced pressure. The residue was redissolved in 600 ml of dichloromethane, and washed once with 200 ml of 0.5 M triethylamine phosphate. The aqueous phase was extracted once with 200 ml of dichloromethane. The organic phases were combined, dried with anhydrous sodium sulfate, and filtered. The solvent was removed by evaporation to dryness under reduced pressure, and the residue was dried under reduced pressure in a vacuum oil pump overnight to give 50.7 g of product A-1 as a white solid. $^1$H NMR (400 MHz, DMSO-d6) δ 7.46 (ddd, J=6.5, 2.3, 1.1 Hz, 1H), 7.40-7.28 (m, 7H), 6.89-6.81 (m, 4H), 4.84 (d, J=5.0 Hz, 1H), 4.36-4.24 (m, 1H), 4.29 (s, 6H), 3.92 (dd, J=12.4, 7.0 Hz, 1H), 3.67 (dd, J=12.3, 7.0 Hz, 1H), 2.52 (q, J=6.3 Hz, 6H), 1.03 (t, J=6.3 Hz, 9H). MS m/z: $C_{24}H_{23}O_6$, [M−H]$^-$, calculated: 407.15, measured: 406.92.

(1-1-3b) Synthesis of L-7

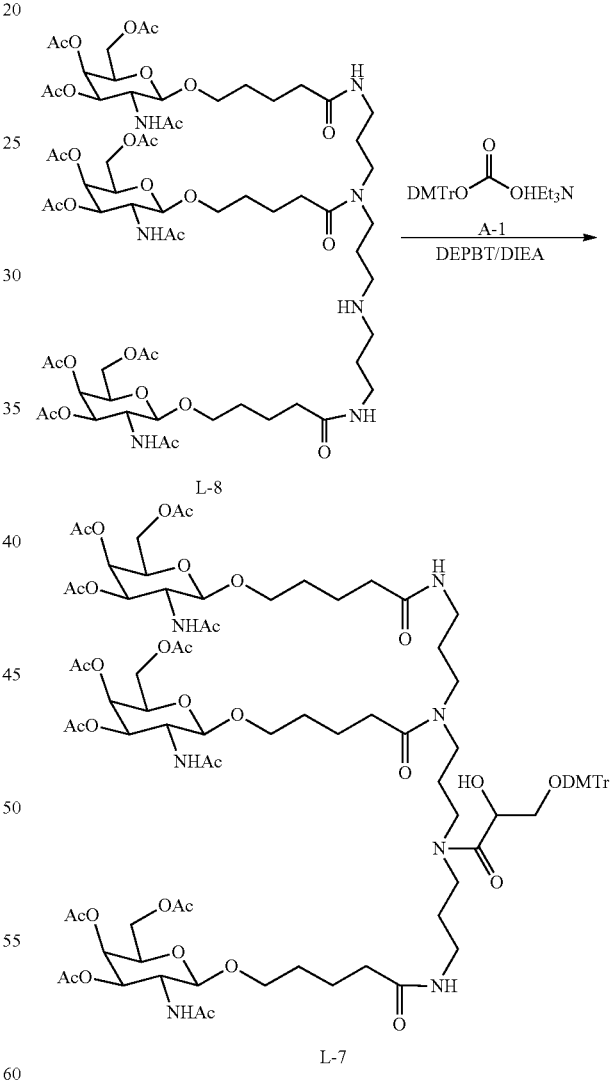

L-8 (40 g, 27.09 mmol, obtained by combining several batches of products) obtained in step (1-1-2) and A-1 (41.418 g, 81.27 mmol) obtained in step (1-1-3a) were mixed and dissolved in 271 ml of dichloromethane, added with 3-diethoxyphosphoryl-1,2,3-benzotrizin-4(3H)-one (DEPBT) (24.318 g, 81.37 mmol), and further added with diisopropylethylamine (21.007 g, 162.54 mmol) to react under stirring at 25° C. for 1.5 hours. The organic phase was washed with 800 ml of saturated sodium bicarbonate. The aqueous phase was extracted three times, each with 50 ml of dichloromethane. The organic phase was washed with 150 ml of saturated brine, and the aqueous phase was extracted once with 50 ml of dichloromethane, and the organic phases were combined, dried with anhydrous sodium sulfate and filtered. The solvent was removed by evaporation to dryness under reduced pressure, and the residue was foam-dried in a vacuum oil pump overnight to give a crude product. The crude product was subjected to a column purification. The column was filled with 2 kg normal phase silica gel (200-300 mesh), added with 200 ml triethylamine for neutralizing the acidity of silica gel, equilibrated with petroleum ether containing 1 wt % triethylamine, and eluted with a gradient elution of petroleum ether:ethyl acetate:dichloromethane:N,N-dimethylformamide=1:1:1:0.5-1:1:1:0.6. The eluate was collected, and the solvent was removed by evaporation to dryness under reduced pressure to give 40.4 g of pure product L-7. $^1$H NMR (400 MHz, DMSO) δ7.90-7.78 (m, 4H), 7.75-7.64 (m, 1H), 7.38-7.18 (m, 9H), 6.91-6.83 (m, 4H), 5.25-5.10 (m, 4H), 4.97 (dd, J=11.2, 3.2 Hz, 3H), 4.48-4.30 (m, 4H), 4.02 (s, 9H), 3.93-3.84 (m, 3H), 3.76-3.66 (m, 9H), 3.45-3.35 (m, 3H), 3.24-2.98 (m, 10H), 2.30-2.20 (m, 2H), 2.11-1.88 (m, 31H), 1.80-1.40 (m, 28H). MS m/z: $C_{90}H_{128}N_7O_{35}$, [M-DMTr]$^+$, calculated: 1564.65, measured: 1564.88.

(1-1-4) Synthesis of L-9

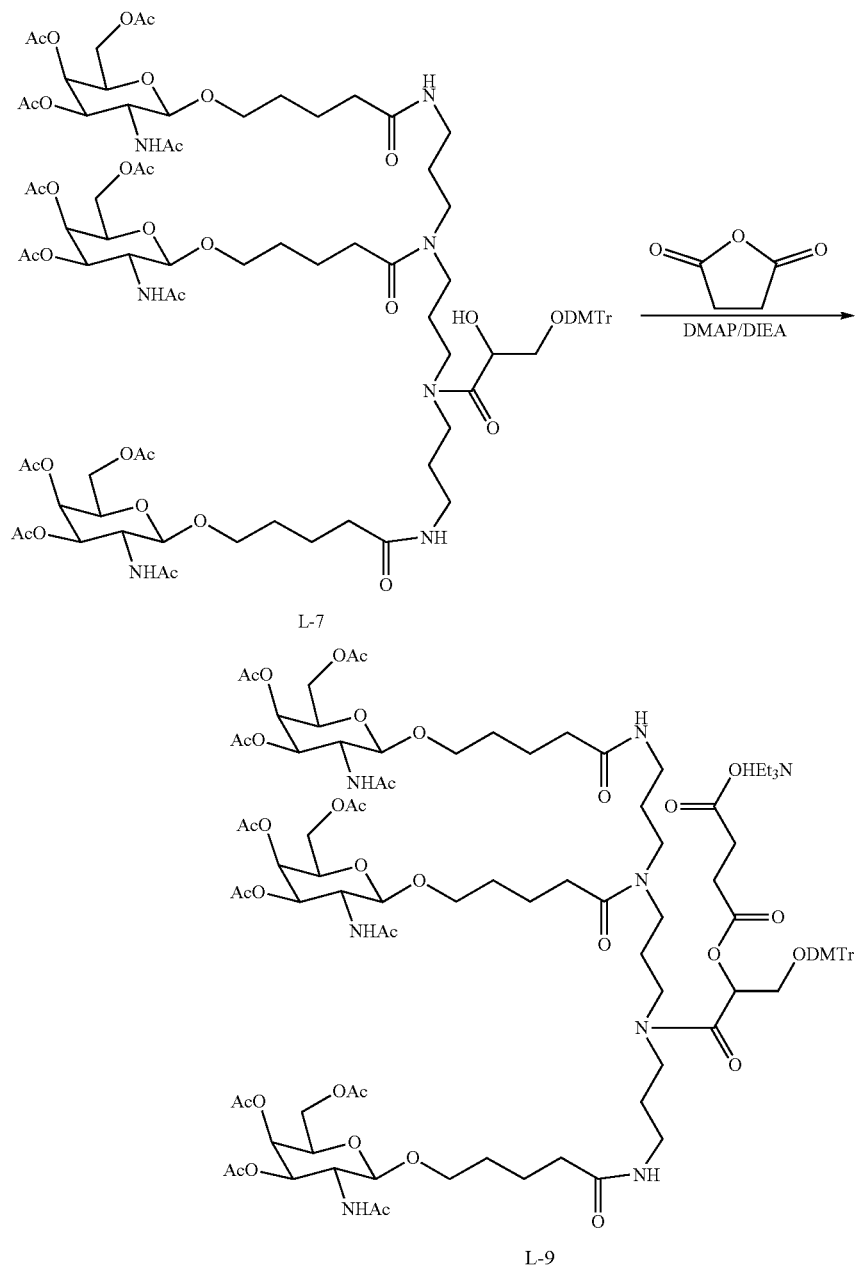

L-7 (40g, 21.4247 mmol) obtained in step (1-1-3b), succinic anhydride (4.288g, 42.8494 mmol) and 4-dimethylaminopyridine (DMAP, 5.235g, 42.8494 mmol) were mixed and dissolved in 215 ml of dichloromethane, further added with diisopropylethylamine (DIEA, 13.845g, 107.1235 mmol), and stirred at 25° C. for 24 hours. The resultant reaction solution was washed with 800 ml of 0.5 M triethylamine phosphate. The aqueous phase was extracted three times, each with 5 ml of dichloromethane. The organic phases were combined and evaporated to dryness under reduced pressure to give a crude product. The crude product was subjected to a column purification. The columan was filled with 1 kg normal phase silica gel (200-300 mesh), added with 1 wt % triethylamine for neutralizing the acidity of silica gel, equilibrated with dichloromethane, and eluted with a gradient elution of 1 wt‰ triethylamine in dichloromethane:methanol=100:18-100:20. The eluate was collected, and the solvent was removed by evaporation to dryness under reduced pressure to give 31.0 g of pure product L-9 conjugation molecule. $^1$H NMR (400 MHz, DMSO) δ 8.58 (d, J=4.2 Hz, 1H), 7.94-7.82 (m, 3H), 7.41-7.29 (m, 5H), 7.22 (d, J=8.1 Hz, 5H), 6.89 (d, J=8.3 Hz, 4H), 5.49-5.37 (m, 1H), 5.21 (d, J=3.0 Hz, 3H), 4.97 (d, J=11.1 Hz, 3H), 4.49 (d, J=8.2 Hz, 3H), 4.02 (s, 9H), 3.88 (dd, J=19.4, 9.4 Hz, 3H), 3.77-3.65 (m, 9H), 3.50-3.39 (m, 6H), 3.11-2.90 (m, 5H), 2.61-2.54 (m, 4H), 2.47-2.41 (m, 2H), 2.26-2.17 (m, 2H), 2.15-1.95 (m, 22H), 1.92-1.84 (m, 9H), 1.80-1.70 (m, 10H), 1.65-1.35 (m, 17H), 1.31-1.19 (m, 4H), 0.96 (t, J=7.1 Hz, 9H). MS m/z: $C_{94}H_{13}2N_7O_{38}$, [M-DMTr]$^+$, calculated: 1664.72, measured: 1665.03.

(1-1-5) Synthesis of Compound L-10

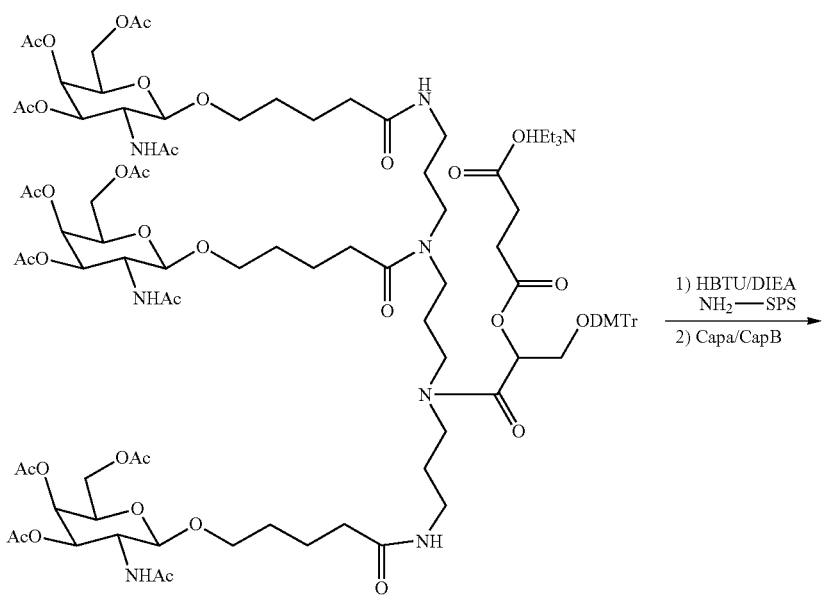

L-9

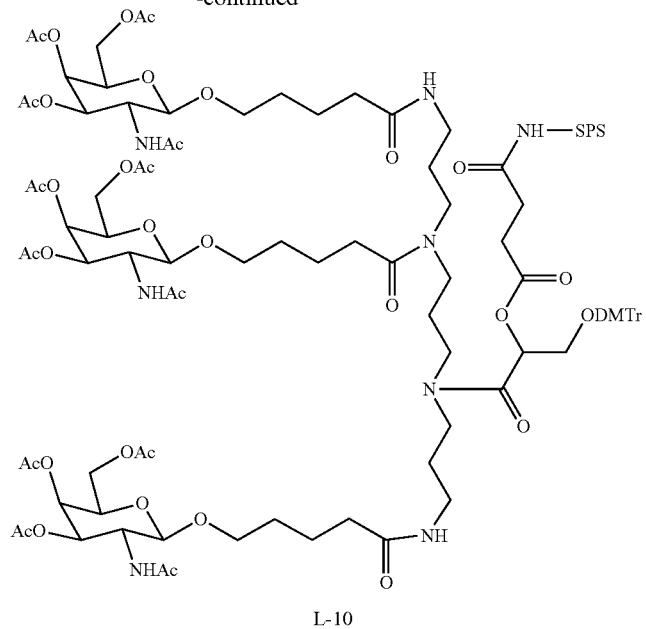

L-10

In this step, Compound L-10 was prepared by linking the L-9 conjugation molecule to a solid phase support. The L-9 conjugation molecule (22.751 g, 11 mmol) obtained in step (1-1-4), 0-benzotriazol-tetramethyluronium hexafluorophosphate (HBTU, 6.257 g, 16.5 mmol) and diisopropylethylamine (DIEA, 2.843 g, 22 mmol) were mixed and dissolved in 900 ml of acetonitrile, and stirred at room temperature for 5 minutes. The resultant reaction solution was added with Aminomethyl resin ($H_2$NResin, 88 g, 100-200 mesh, amino loading: 400 μmol/g, purchased from Tianjin Nankai HECHENG S&T Co., Ltd.). A reaction was performed on a shaker at 25° C. and at a rotation speed of 150 rpm/min for 18 hours, followed by filtration. The residue was rinsed twice (each with 300 ml of DCM) and three times (each with 300 ml of acetonitrile), and dried in a vacuum oil pump for 18 hours. Then starting materials (CapA, CapB, 4-dimethylaminopyridine (DMAP) and acetonitrile) were added according to the charge ratio as shown in Table 2 for a capping reaction. The reaction was performed on a shaker at 25° C. and at a rotation speed of 150 rpm/min for 5 hours. The reaction liquid was filtered. The residue was rinsed three times, each with 300 ml of acetonitrile. The solvent was removed by evaporation to dryness under reduced pressure, and the residue was dried under reduced pressure in a vacuum oil pump overnight to give 102 g of Compound L-10 (i.e., the L-9 conjugation molecule linked to a solid phase support), with a loading of 90.8 μmol/g.

TABLE 2

The charge ratio of capping reaction

| Starting Materials | Amount | Specs | Lot No. | Manufacturer |
|---|---|---|---|---|
| CapA | 1980 ml | — | — | — |
| CapB | 220 ml | — | — | — |
| DMAP | 1.100 g | analytical pure | I1422139 | Aladdin |

TABLE 2-continued

The charge ratio of capping reaction

| Starting Materials | Amount | Specs | Lot No. | Manufacturer |
|---|---|---|---|---|
| Acetonitrile | 220 ml | spectroscopic pure | O15161001 | CINC (Shanghai) Co., Ltd |

In the above table, Cap A and Cap B are solutions of capping agents. Cap A is a mixed solution of 20% by volume of N-methylimidazole in pyridine/acetonitrile, wherein the volume ratio of pyridine to acetonitrile is 3:5. Cap B is a solution of 20% by volume of acetic anhydride in acetonitrile.

(1-2) Synthesis of a Sense Strand of Conjugate 1

A sense strand of siRNA Conjugate 1 in Table 3 was synthesized by linking nucleoside monomers one by one in 3' to 5' direction according to the arrangement sequence of nucleotides in the sense strand by the phosphoramidite solid phase synthesis method, starting the cycles from the Compound L-10 prepared in the above step. The linking of each nucleoside monomer included a four-step reaction of deprotection, coupling, capping, and oxidation or sulfurization. Therein, when two nucleotides are linked via a phosphoester bond, a four-step reaction of deprotection, coupling, capping, and oxidation was included during linking of the later nucleoside monomer; and when two nucleotides is linked via a phosphorothioate linkage, a four-step reaction of deprotection, coupling, capping, and sulfurization was included during linking of the later nucleoside monomer. The synthesis conditions are as follows.

The nucleoside monomers are provided in a 0.1 M acetonitrile solution. The condition for deprotection reaction in each step is identical, i.e., a temperature of 25° C., a reaction time of 70 seconds, a solution of dichloroacetic acid in dichloromethane (3% v/v) as a deprotection reagent, and a molar ratio of dichloroacetic acid to the protecting group 4,4'-dimethoxytrityl on the solid phase support of 5:1.

The condition for coupling reaction in each step is identical, including a temperature of 25° C., a molar ratio of the nucleic acid sequence linked to the solid phase support to nucleoside monomers of 1:10, a molar ratio of the nucleic acid sequence linked to the solid phase support to a coupling reagent of 1:65, a reaction time of 600 seconds, and 0.5 M acetonitrile solution of 5-ethylthio-1H-tetrazole (ETT) as a coupling reagent.

The condition for capping reaction in each step is identical, including a temperature of 25° C., a reaction time of seconds, a mixed solution of Cap A and Cap B in a molar ratio of 1:1 as a solution of capping agent, and a molar ratio of the capping agent to the nucleic acid sequence linked to the solid phase support of 1:1:1 (acetic anhydride:N-methylimidazole:the nucleic acid sequence linked to the solid phase support).

The condition for oxidation reaction in each step is identical, including a temperature of 25° C., a reaction time of 15 seconds, and 0.05 M iodine water as an oxidation reagent; and a molar ratio of iodine to the nucleic acid sequence linked to the solid phase support in the coupling step of 30:1. The reaction is carried out in a mixed solvent of tetrahydrofuran:water:pyridine (3:1:1).

The condition for sulfurization reaction in each step is identical, including a temperature of 25° C., a reaction time of 300 seconds, and xanthane hydride as a sulfurization reagent; and a molar ratio of the sulfurization reagent to the nucleic acid sequence linked to the solid phase support in the coupling step of 120:1. The reaction is carried out in a mixed solvent of acetonitrile:pyridine (1:1).

After the linking of the last nucleoside monomer was completed, the nucleic acid sequence linked to the solid phase support was cleaved, deprotected, purified, desalted, and then lyophilized to obtain the sense strand, wherein, The conditions for cleavage and deprotection are as follows: adding the synthesized nucleotide sequence linked to the support into 25 wt % aqueous ammonia to react at 55° C. for 16 hours, wherein the amount of the aqueous ammonia is 0.5 ml/μmol. The remaining support was removed by filtration, and the supernatant was concentrated to dryness in vacuum.

The conditions for purification and desalination are as follows: purification of the nucleic acid is achieved by using a preparative ion chromatography purification column (Source 15Q) with a gradient elution of NaCl. Specifically, eluent A is 20 mM sodium phosphate (pH 8.1), solvent is water/acetonitrile in 9:1 (v/v); eluent B is 1.5 M sodium chloride, 20 mM sodium phosphate (pH 8.1), solvent is water/acetonitrile in 9:1 (v/v); elution gradient: the ratio of eluent A:eluent B=100:0-50:50. The eluate is collected, combined and desalted by using a reverse phase chromatography purification column. The specific condition includes: using a Sephadex column for desalination (filler: Sephadex G25) and eluting with deionized water.

The detection method is as follows: the purity of the aforementioned sense strand was determined by ion exchange chromatography (IEX-HPLC); and the molecular weight was analyzed by Liquid Chromatography-Mass Spectrometry (LC-MS). The fact that the measured values were in conformity with the calculated values indicates that the sense strand SS of which 3' terminal was conjugated to the L-9 conjugation molecule was synthesized.

(1-3) Synthesis of an Antisense Strand of Conjugate 1

An antisense strand of Conjugate 1 in Table 3 was synthesized by the phosphoramidite solid phase synthesis method, starting the cycles from a universal solid phase support (UnyLinker™ loaded NittoPhase®HL Solid Supports, Kinovate Life Sciences Inc.). The reaction conditions of deprotection, coupling, capping, oxidation or sulfurization, cleavage and deprotection, and purification and desalting in the solid phase synthesis method were the same as those used for the synthesis of the sense strand. Then, lyophilization was performed to obtain an antisense strand. The purity of the antisense strand was detected by ion exchange chromatography (IEX-HPLC); and the molecular weight was analyzed by liquid chromatography-mass spectrometry (LC-MS). The result that the measured values were in conformity with the calculated values indicates that the antisense strands AS having the target sequences were synthesized.

(1-4) Synthesis of Conjugate 1

For Conjugate 1, the sense strand and antisense strand were respectively dissolved in water for injection to give a solution of 40 mg/mL. They were mixed in an equimolar ratio, heated at 50° C. for 15 min, cooled at room temperature to produce an annealed product, and then lyophilized to give a lyophilized powder. After the conjugate was diluted to a concentration of 0.2 mg/mL with ultra-pure water (Milli-Q ultra-pure water instrument, with resistivity of 18.2MΩ*cm (25° C.)), the molecular weight was determined by a liquid chromatography-mass spectrometry (LC-MS) instrument (purchased from Waters Corp., model: LCT Premier). The fact that the measured values were in conformity with the calculated values indicates that the synthesized Conjugate 1 was the designed target double-stranded nucleic acid sequence with the L-9 conjugation molecule. Conjugate 1 has the structure as shown by Formula (403). The conjugated siRNA in this conjugate has the sequences of Conjugate 1 (also referred to as L10-siPCSKa1M1S) as shown in Table 3.

Preparation Example 2: The Preparations of Conjugates 2-7

Conjugates 2-7 as shown in Table 3 were prepared by the same method as in Preparation Example 1 except that the sense strand and antisense strand sequences involved in the synthesis were the sequences of the sense strand and antisense strand of the conjugated siRNA in Conjugate 2, Conjugate 3, Conjugate 4, Conjugate 5, Conjugate 6, or Conjugate 7 as shown in Table 3. Thus, Conjugates 2-7 were obtained respectively. The molecular weights of conjugates 2-7 were determined.

Table 3 lists the numbers and the siRNA sequences of the conjugates.

TABLE 3 siRNA conjugates

| Conjugates | No. | Sequence direction 5'-3' | | SEQ ID NO |
|---|---|---|---|---|
| Conjugate 1 | L10-siPCSKa1MIS | Sense strand | AmsAmsGmCmAmAmGfCfAfGmAmCm AmUmUmUmAmUmCm | 25 |
| | | Antisense strand | GmsAfsUmAmAmAfUmGmUmCmUmG mCmUfUmGfCmUmUmsGmsGm | 26 |
| Conjugate 2 | L10-siPCSKb1MIS | Sense strand | UmsUmsUmGmUmAmGfCfAfUmUmU mUmUmAmUmUmAmAm | 85 |
| | | Antisense strand | UmsUfsAmAmUmAfAmAmAmAmUmG fCmUfAmCmAmAmsAmsCm | 86 |
| Conjugate 3 | L10-siPCSKc1M1S | Sense strand | GmsCmsCmUmGmGmAfGfUfUmUmA mUmUmCmGmGmAmAm | 145 |
| | | Antisense strand | UmsUfsCmCmGmAfAmUmAmAmAmC mUmCfCmAfGmGmCmsCmsUm | 146 |
| Conjugate 4 | L10-siPCSKd1M1S | Sense strand | CmsUmsGmUmUmUfGfCfUmUmU mUmGmUmAmAmCmUm | 205 |
| | | Antisense strand | AmsGfsUmUmAmCfAmAmAmAmGmC mAmAfAmAfCmAmGmsGmsUm | 206 |
| Conjugate 5 | L10-siPCSKe1MIS | Sense strand | GmsGmsUmUmUmGfUfAfGmCmA mUmUmUmUmAmUm | 265 |
| | | Antisense strand | AmsUfsAmAmAmAfAmUmGmCmUmA mCmAfAmAfCmCmsCmsAm | 266 |
| Conjugate 6 | L10-siPCSKf1M1S | Sense strand | GmsUmsGmAmCmUmUfUfUfUmAmA mAmAmUmAmAmAmAm | 325 |
| | | Antisense strand | UmsUfsUmAmUmUfUmUmUmAmAmA mAmAfGmUfCmAmCmsCmsAm | 326 |
| Conjugate 7 | L10-siPCSKg4M5S | Sense strand | CmsUmsAmGmAmCmCfUmGfUmdTU mUmGmCmUmUmUmUmGmUm | 397 |
| | | Antisense strand | AmsCfsAmAfAfAfGmCfAmAfAmAmC mAfGmGfUmCfUmAmGmsAmsAm | 398 |

Preparation Example 3: The Synthesis of the siRNA Sequences

SiRNA 1 as shown in Table 3 was synthsized by the same method as in Preparation Example 1 except that

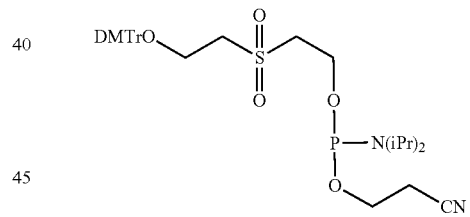

(CPR-I)

1) as to the sense strand, the cycles was started from a universal solid phase support (UnyLinker™ loaded NittoPhase®HL Solid Supports, Kinovate Life Sciences Inc.);

2) as to the antisense strand, the sequence of siRNA 1 differed from that of the antisense strand of the conjugated siRNA in Conjugate 1 in that the antisense strand of siRNA 1 had 5'-phosphate at the first nucleotide at 5' terminal. Therefore, during preparation of the antisense strands according to the phosphoramidite solid phase synthesis method, after the linking of the last nucleoside monomer of the antisense strand, the monomer of Formula (CPR-J) (purchased from Suzhou GenePharma Inc. as Cat #13-2601-XX) was linked to 5' terminal of the antisense strand by a four-step reaction of deprotection, coupling, capping, and oxidation, so as to form a 5'-phosphate modification.

During the linking, the conditions of deprotection, coupling, capping, oxidation, cleavage and deprotection, purification and desalting used were the same as those used in the synthesis of the sense strand.

SiRNA 2 was prepared by using the same method as that for preparing siRNA 1 except that the nucleic acid sequences of the sense strand and antisense strand of the siRNA involved in the synthesis of siRNA 2 were the sense strand and antisense strand sequences of siRNA 2 as shown in Table 4.

SIRNAs 3-6 were prepared by using the same method as that for preparing siRNA 1 except that the nucleic acid sequences of the sense strand and antisense strand of the siRNA involved in the synthesis were the sense strand and antisense strand sequences of siRNA 3, siRNA 4, siRNA 5 or siRNA 6 as shown in Table 4, wherein the antisense strands of these siRNAs had a 5'-phosphate modification at the first nucleotide at 5' terminal. Therefore, an antisense strand with a 5'-phosphorothioate modification can be prepared by replacing the oxidation reaction condition with a sulfurization reaction condition in the linking of the CPR-J monomer. Thus, siRNA 3, siRNA 4, siRNA 5 or siRNA 6 was obtained respectively.

Table 4 lists the numbers and the sequences of the siRNAs.

(1) GSCM, used for detecting the on-target activity of the antisense strand of the siRNA, contains a target sequence which contains a region which is completely complementary to the sequence of the antisense strand of the siRNA to be detected, wherein the target sequence in GSCM corresponding to siRNAs 1, 2, 4, 5 and 6 is shown by SEQ ID NO: 373:

TABLE 4 siRNA sequences

| siRNA | No. | | Sequence direction 5'-3' | SEQ ID NO |
|---|---|---|---|---|
| siRNA 1 | siPCSKa1MISP | Sense strand | AmsAmsGmCmAmAmGfCfAfGmAmCmAmUmUmUmAmUmCm | 361 |
| | | Antisense strand | PGmsAfsUmAmAmAfUmGmUmCmUmGmCmUfUmGfCmUmUmsGmsGm | 362 |
| siRNA 2 | siPCSKb1MISP | Sense strand | UmsUmsUmGmUmAmGfCfAfUmUmUmUmUmAmUmUmAm | 363 |
| | | Antisense strand | PUmsUfsAmAmUmAfAmAmAmAmUmGfCmUfAmCmAmAmsAmsCm | 364 |
| siRNA 3 | siPCSKc1MISPs | Sense strand | GmsCmsCmUmGmGmAfGfUfUmUmAmUmUmCmGmGmAmAm | 365 |
| | | Antisense strand | PsUmsUfsCmCmGmAfAmUmAmAmAmCmUmCfCmAfGmGmCmsCmsUm | 366 |
| siRNA 4 | siPCSKd1M1SPs | Sense strand | CmsUmsGmUmUmUmUfGfCfUmUmUmUmGmUmAmAmCmUm | 367 |
| | | Antisense strand | PsAmsGfsUmUmAmCfAmAmAmAmGmCmAmAfAmAfCmAmGmsGmsUm | 368 |
| siRNA 5 | siPCSKe1M1SPs | Sense strand | GmsGmsUmUmUmUmGfUfAfGmCmAmUmUmUmUmAmUm | 369 |
| | | Antisense strand | PsAmsUfsAmAmAmAfAmUmGmCmUmAmCmAfAmAfCmCmsCmsAm | 370 |
| siRNA 6 | siPCSKf1M1SPs | Sense strand | GmsUmsGmAmCmUmUfUfUfUmAmAmAmAmUmAmAmAmAm | 371 |
| | | Antisense strand | PsUmsUfsUmUmAmUfUmUmUmAmAmAmAmAfGmUfCmAmCmsCmsAm | 372 |

Experimental Example 1 the Inhibitory Activity and Off-Target Effect of the siRNA in In Vitro psiCHECK System In this experimental example, the on-target activity and off-target effect of the siRNAs of the present disclosure were evaluated by detecting the inhibition of each antisense strand of siRNAs 1-6 against the expression of the on-target plasmid, and the inhibition of each sense strand, seed region of the antisense strand or seed region of the sense strand of the siRNAs against the expression of the off-target plasmid in in vitro psiCHECK system.

According to the method described in Kumico Ui-Tei et. al., Functional dissection of siRNA sequence by systematic DNA substitution: modified siRNA with a DNA seed arm is a powerful tool for mammalian gene silencing with significantly reduced off-target effect. Nucleic Acids Research, 2008.36(7), 2136-2151, plasmids for detection were constructed and co-transfected with the siRNA to be detected into HEK293A cells; and the expression levels of the dual luciferase reporter gene reflect the on-target activity and off-target effect of the siRNAs. Specific steps are as follows:
[1] Construction of Plasmids for Detection
Four types of plasmids for detection were constructed using psiCHECK™-2 (Promega™) plasmid, in which GSCM represents the on-target plasmid; and PSCM, GSSM and PSSM represent the off-target plasmids:

(SEQ ID NO: 373)
5'-GGCGTGCCTGCCAAGCTCACACAGCAGGAACTGAGCCAGAAACG

CAGATTGGGCTGGCTCTGAAGCCAAGCCTCTTCTTACTTCACCCGGC

TGGGCTCCTCATTTTTACGGGTAACAGTGAGGCTGGGAAGGGGAACA

CAGACCAGGAAGCTCGGTGAGTGATGGCAGAACGATGCCTGCAGGCA

TGGAACTTTTTCCGTTATCACCCAGGCCTGATTCACTGGCCTGGCGG

AGATGCTTCTAAGGCATGGTCGGGGGAGAGGGCCAACAACTGTCCCT

CCTTGAGCACCAGCCCCACCCAAGCAAGCAGACATTTATCTTTTGGG

TCTGTCCTCTCTGTTGCCTTTTTACAGCCAACTTTTCTAGACCTGTT

TTGCTTTTGTAACTTGAAGATATTTATTCTGGGTTTTGTAGCATTTT

TATTAATATGGTGACTTTTTAAAATAAAAACAAACAAACGTTGTCCT

AACAAAAAAAAAAAAAAAAAAAAAA-3';

and the target sequence in GSCM corresponding to siRNA 3 is shown in SEQ ID NO: 374:

(SEQ ID NO: 374)
5'GCGTGGCCAAGGGTGCCAGCATGCGCAGCCTGCGCGTGCTCAACT

GCCAAGGGAAGGGCACGGTTAGCGGCACCCTCATAGGCCTGGAGTTT

ATTCGGAAAAGCCAGCTGGTCCAGCCTGTGGGGCCACTGGTGGTGCT

GCTGCCCCTGGCGGGTGGGTACAGCCGCGTCCTCAACGCCGCCTGCC

AGCGCCTGGCGAGGGCTGGGGTCGTGCTGGTCACCGCTGCCGGCAAC

TTCCGGGACGATGCCTGCCTCTACTCCCCAGCCTCAGCTCCCGAGGT

CATCACAGTTGGGGCCACCAATGCCCAAGACCAGCCGGTGACCCTGG

GGACTTTGGGGACCAACTTTGGCCGCTGTGTGGACCTCTTTGCCCCA

GGGGAGGACATCATTGGTGCCTCCAGCGACTGCAGCACCTGCTTTGT

GTCACAGAGTGGGACATCACAGGCTGCTGCCCACGTGGCTGGCATTG

CAGCCATGATGCTGTCTGCCGAGCCGGAGCTCACCCTGGCCGAGTTG

AGGCAGAGACTGATCCACTTCTCTGCCAAAGATGTCATCAATGAGGC

CTGGTTCCCTGAGGACCAGCGGGTACTG-3'.

(2) PSCM, used for detecting the off-target effect of the sense strand, contains a target sequence that is exactly the same as the sequence of the antisense strand of the siRNA to be detected, wherein the target sequence in PSCM corresponding to each siRNA is shown in Table 5a:

TABLE 5a

| | The target sequences in PSCM corresponding to the siRNAs | |
|---|---|---|
| siRNA | Target sequences in PSCM (Sequence direction 5'-3') | SEQ ID NO |
| siRNA 1 | GATAAATGTCTGCTTGCTTGG | 375 |
| siRNA 2 | TTAATAAAAATGCTACAAAAC | 376 |
| siRNA 3 | TTCCGAATAAACTCCAGGCCT | 377 |
| siRNA 4 | AGTTACAAAAGCAAAACAGGT | 378 |
| siRNA 5 | ATAAAAATGCTACAAAACCCA | 379 |
| siRNA 6 | TTTTATTTTAAAAAGTCACCA | 380 |

(3) GSSM is used for detecting the off-target effect of the seed region of the antisense strand, wherein the target sequence in GSSM corresponding to each siRNA is shown in Table 5b:

TABLE 5b

| | The target sequences in PSCM corresponding to the siRNAs | |
|---|---|---|
| SIRNA | Target sequences in GSSM (Sequence direction 5'-3') | SEQ ID NO |
| siRNA 1 | AACCTACCTACTCCATTTATC | 381 |
| siRNA 2 | TGGGGTGCTACGGTTTATTAA | 382 |
| siRNA 3 | CTTAAGTTCTGGGATTCGGAA | 383 |

TABLE 5b-continued

| | The target sequences in PSCM corresponding to the siRNAs | |
|---|---|---|
| SIRNA | Target sequences in GSSM (Sequence direction 5'-3') | SEQ ID NO |
| siRNA 4 | CAAGTGGGGTAGGTTGTAACT | 384 |
| siRNA 5 | GTTTGGGGTGCTAATTTTTAT | 385 |
| siRNA 6 | GTTGTCAGGGGGCAAATAAAA | 386 |

(4) PSSM is used for detecting the off-target effect of the seed region of the sense strand, wherein the target sequence in PSSM corresponding to each siRNA is shown in Table 5c:

TABLE 5c

| | The target sequences in PSSM corresponding to the siRNAs | |
|---|---|---|
| siRNA | Target sequences in PSSM (Sequence direction 5'-3') | SEQ ID NO |
| siRNA 1 | TCGCCCGTGAGGCTTGCTTTT | 387 |
| siRNA 2 | GGCCGCCCCCGGCTACAAACA | 388 |
| siRNA 3 | GGAATCCGCCCCTCCAGGCAG | 389 |
| siRNA 4 | CTGGCACCCCTCAAAACAGTG | 390 |
| siRNA 5 | CGCCCCCGTAGACAAAACCAC | 391 |
| siRNA 6 | GGGGCGGGGCCAAAGTCACAC | 392 |

A single copy of the aforementioned target sequences was cloned into the Xho I/Not I site of the psiCHECK™-2 plasmid respectively.

[2] Cell Culture and Transfection (1) Co-Transfection of GSCM and siRNA 1

HEK293A cells (purchased from Nanjing Cobioer Biosciences Co., LTD) were cultured in H-DMEM complete media (Hyclone company) containing 10% fetal bovine serum (FBS, Hyclone company), and 0.2 vol % Penicillin-Streptomycin (Hyclone company) at 37° C. in an incubator containing 5% $CO_2$/95% air.

HEK293A cells were inoculated in a 96-well plate at $8 \times 10^3$ cells/well. After 16 hours, the cell growth density reached 70 to 80%. At that time, the H-DMEM complete media in the culture wells were aspirated. An 80 μl Opti-MEM medium (GIBCO company) was added to each well and the culture was continued for 1.5 h.

GSCM detection plasmids were diluted with DEPC water to give a 200 ng/μl detection plasmid working solution; siRNA 1 was prepared with DEPC water into siRNA working solutions at 11 different concentrations of 1000 nM, 333 nM, 111 nM, 37.0 nM, 12.3 nM, 4.12 nM, 1.37 nM, 0.46 nM, 0.15 nM, 0.05 nM and 0.017 nM, respectively.

A1-A11 solutions were prepared respectively. Each portion of the A1-A11 solutions contains, in turn, 1 W of siRNA working solution at one of the aforementioned 11 concentrations, 0.05 μl of detection plasmid working solution (containing 10 ng of detection plasmid) and 10 μl of Opti-MEM medium.

B solutions were prepared. Each portion of B solution contains 0.2 μl of Lipofectamine™ 2000 and 10 μl of Opti-MEM medium.

C solutions were prepared. Each portion of C solution contains 0.05 µl of detection plasmid working solution (containing 10 ng of detection plasmid) and 10 µl of Opti-MEM medium One portion of B solution was sequentially mixed with one portion of each of the A1-A11 solutions and one portion of C solution respectively. The mixtures were incubated for 20 min at room temperature to obtain 12 transfection complexes X1-X12. Each transfection complex was prepared in triplicate.

The transfection complexes X1-X11 were added respectively to the culture wells in the amount of 20 µl/well and mixed evenly, and three aliquots of the transfection complex at the same siRNA concentration were added respectively to three different culture wells to give co-transfection mixtures at final siRNA concentrations of 10 nM, 3.33 nM, 1.11 nM, 0.37 nM, 0.123 nM, 0.0412 nM, 0.0137 nM, 0.0046 nM, 0.0015 nM, 0.0005 nM and 0.00017 nM (recorded as test groups 1-11).

The transfection complexes X12 were added respectively to three other culture wells in the amount of 20 µl/well to obtain transfection mixtures without siRNA (recorded as the control groups).

After the co-transfection mixtures containing siRNA and the transfection mixtures without siRNA were transfected in the culture wells for 4 hours, each well was supplemented with 100 W of H-DMEM complete medium containing 20% FBS. The 96-well plate was placed in a $CO_2$ incubator and the incubation was continued for 24 hours.

(2) Co-Transfection of Other siRNAs and Plasmids.

GSCM and siRNAs 2-6 were co-transfected in the same way as GSCM and siRNA 1, except that siRNA1 was replaced successively by siRNAs 2-6.

PSCM and siRNAs 1-6 were co-transfected in the same way as GSCM and siRNAs 1-6, except that GSCM was replaced successively by PSCM.

GSSM and siRNAs 1-6 were co-transfected in the same way as GSCM and siRNAs 1-6, except that GSCM was replaced successively by GSSM.

PSSM and siRNAs 1-6 were co-transfected in the same way as GSCM and siRNAs 1-6, except that GSCM was replaced successively by PSSM.

[3] Detection

The media in the culture wells were aspirated. 150 µl of mixed solution of Dual-Glo® Luciferase reagent and H-DMEM (in a volume ratio of 1:1) was added to each well, and thoroughly blended. After incubation was performed for 10 minutes at room temperature, 120 µl of the mixed solution was transfered to a 96-well ELISA plate. The chemiluminescence value of Firefly (Fir) in each well of the ELISA plate was read using a Synergy II multimode microplate reader (BioTek company). Then, 60 µl of Dual-Glo® Stop & Glo® reagent was added to each well of the ELISA plate, and thoroughly blended. After incubation was performed at room temperature for 10 minutes, the chemiluminescence value of Renilla (Ren) in each well of the ELISA plate was read using the microplate reader according to the arrangement for reading Fir.

The luminescence ratio (Ratio=Ren/Fir) of each well of the ELISA plate was caculated, and the luminescence ratio (Ratio (test) or Ratio (control)) of each test group or control group was the average of the Ratios of the three culture wells. Using the luminescence ratio of the control group as reference, the luminescence ratio of each test group was normalized to obtain the ratio R of Ratio (test)/Ratio (control), which represents the expression level, i.e., the relative residual activity, of the reporter gene Renilla. The inhibition rate of siRNA was $(1-R) \times 100\%$.

The log (inhibitor) vs. response-Variable slope (four parameters) dose-effect curves were fitted using the nonlinear regression analysis of Graphpad 5.0 software, according to the relative residual activities of the reporter gene Renilla in the psiCHECK system after transfection with different siRNAs (siRNA 1, siRNA 2, siRNA 3, siRNA 4, siRNA 5 or siRNA 6). FIGS. 1A-1F are the dose-effect curves of siRNAs 1-6 respectively, wherein the abscissa represents the logarithm of the concentration of siRNAs (lg nM), the ordinate represents the relative residual activity (%) of Renilla, and each dot represents the average of the relative residual activities of Renilla in the 3 culture wells of the test group relative to the control group.

The IC50 value of the siRNA to be tested targeting GSCM was calculated based on the function corresponding to the fitted dose-effect curve. The function is as follows:

$$Y = Bot + \frac{Top - Bot}{1 + 10^{(X'-X) \times HillSlope}}$$

wherein:

Y is the ratio R, i.e., the relative residual activity (%) of Renilla,

X is the logarithm of the concentration of transfected siRNAs,

Bot is the Y value at the bottom of the steady-state stage,

Top is the Y value at the top of the steady-state stage,

X' is the X value at which Y is the median value between the bottom and the top, and HillSlope is the slope of the curve at X'.

When Y=50% the corresponding $X_{50}$ value was determined based on the dose-effect curve and the corresponding function. The $IC_{50}$ value of each siRNA was calculated (The $IC_{50}$ value=$10^{\wedge}X_{50}$ (nM)). The $IC_{50}$ values and $R^2$ values are listed in Table 6.

TABLE 6

$IC_{50}$ and $R^2$ values of siRNAs against GSCM

| siRNA | No. | $IC_{50}$ | $R^2$ |
|---|---|---|---|
| siRNA 1 | siPCSKa1M1SP | 0.0544 nM | 0.9993 |
| siRNA 2 | siPCSKb1M1SP | 0.0291 nM | 0.9979 |
| siRNA 3 | siPCSKc1M1SPs | 0.0341 nM | 0.9995 |
| siRNA 4 | siPCSKd1M1SPs | 0.0194 nM | 0.9974 |
| siRNA 5 | siPCSKe1M1SPs | 0.0561 nM | 0.9956 |
| siRNA 6 | siPCSKf1M1SPs | 0.0400 nM | 0.9927 |

Table 6 and FIGS. 1A-1F show that the siRNAs of the present disclosure exhibited relatively high inhibitory activity in in vitro HEK293A cells, with the $IC_{50}$ values ranging from 0.0194 nM to 0.0561 nM.

The dose-effect curves of siRNAs 1-6 against their corresponding PSCM, GSSM and PSSM were obtained one by one using the same method as above except that GSCM was replaced by PSCM, GSSM and PSSM respectively. The results show that each siRNA at each concentration has no inhibitory effect on its corresponding off-target plasmids PSCM, GSSM and PSSM.

The above results indicate that the siRNAs of the present disclosure have good targeting specificity, and none of the sense strand, the seed region of the antisense strand and the seed region of the sense strand has obvious off-target effect.

Experimental Example 2 Evaluation of the Efficacy of siRNA Conjugates in Non-Human Primates (NHP)

Common cynomolgus monkeys (weighing 2.4-3.1 kg) aged 3 to 4 years old were divided into 2 groups according to their body weights. Each group of 4 cynomolgus monkeys, half of which were male, was injected with a single subcutaneous injection of Conjugate 4 or 5 respectively.

Common cynomolgus monkeys (weighing 4.0-5.5 kg) aged 4 to 5 years old were divided into 3 groups according to their body weights. Each group of 3 cynomolgus monkeys, all of which were male, was injected with a single subcutaneous injection of Conjugate 1, 2 or 7 respectively.

Each conjugate was prepared with a sterile sodium chloride injection into a 9 mg/ml (based on siRNA; the same applies hereinafter) solution. The volume administered to each animal was 1 ml/kg, and the administration dose was 9 mg/kg. The n days before administration was defined as D-n, the day of administration was defined as D1, and the nth day after administration was defined as Dn.

(2-1) Detection of PCSK9 mRNA in Liver Tissue

On D-7 and D15, liver puncture was performed respectively on the cynomolgus monkeys to which Conjugate 1, Conjugate 2, Conjugate 4, Conjugate 5 or Conjugate 7 was administered in each group. Each time, liver tissue measuring about 2×2×8 mm$^3$ was collected, and stored in a 1.5 mL sterile EP tube containing 1 ml of RNAlater preservation solution (Sigma Aldrich company). After placed in a refrigerator at 4° C. for 24 hours, it was transferred to −80° C. for storage.

After that, the liver tissue was homogenized with a tissue homogenizer. Then the total RNA of the liver tissue was extracted and obtained by Trizol (Thermo Fisher company) according to the procedures for total RNA extraction in the instruction.

For the total RNA extracted from the liver tissue of each animal, 1 μg of the total RNA was taken as the template for reverse transcription, and the reagent provided in the reverse transcription kit Goldenstar™ RT6 cDNA Synthesis Kit (purchased from Beijing Tsingke Biotechnology Co., Ltd., Cat No. TSK301M), in which Goldenstar™ Oligo (dT)$_{17}$ was selected as the primer, was used to prepare 20 μl of a reverse transcription reaction system according to the precedures for reverse transcription in the instruction of the kit. The total RNA of each of the aforementioned liver tissue was reverse transcribed. Conditions for reverse transcription were as follows: each reverse transcription reaction system was placed and incubated at 50° C. for 50 minutes, then incubated at 85° C. for 5 minutes, and finally incubated at 4° C. for 30 seconds; after the reaction was complete, 80 μl of DEPC water was added to each reverse transcription reaction system to obtain a cDNA-containing solution.

For each reverse transcription reaction system, 5 W of the aforementioned cDNA-containing solution was taken as the template for qPCR, and the reagent provided in the Novo-Start® SYBR qPCR SuperMix Plus kit (purchased from Novoprotein Scientific Co., Ltd., Cat No. E096-01B) was used to prepare 20 μl of a qPCR reaction system, wherein the sequences of PCR primers used for amplifying the target gene PCSK9 and the internal control gene GAPDH are shown in Table 7, and the final concentration of each primer is 0.25 M. Each qPCR reaction system was placed on an ABI StepOnePlus Real-Time PCR instrument, and was amplified using the three-step method. The amplification procedures consisted of pre-denaturation at 95° C. for 10 minutes, denaturation at 95° C. for 30 s, and annealing at 60° C. for 30 s, followed by extension at 72° C. for 30 s. After repeating the aforementioned process of denaturation, annealing, and extension 40 times, a product W containing the amplified target gene PCSK9 and the amplified internal control gene GAPDH was obtained. The product W was then incubated at 95° C. for 15 s, 60° C. for 1 min, and 95° C. for 15 s. The melting curves of the target gene PCSK9 and the internal control gene GAPDH in the product W were respectively collected using a real-time fluorescent quantitative PCR instrument, and the Ct values of the target gene PCSK9 and the internal control gene GAPDH were obtained.

TABLE 7

The sequences of the primers

| Genes | Upstream Primers (in 5' to 3' direction) | Downstream Primers (in 5' to 3' direction) |
|---|---|---|
| Monkey PCSK9 | GAAGGGGAACACAGACCAGG (SEQ ID NO: 393) | CTCCATCAGGCCACAG TGAA (SEQ ID NO: 394) |
| Monkey GAPDH | GGGAGCCAAAAGGGTCATCA (SEQ ID NO: 395) | CGTGGACTGTGGTCATGAGT (SEQ ID NO: 396) |

The relative quantitative calculation of the expression level of the D15 and D-7 target gene PCSK9 was carried out using the comparative Ct (ΔΔCt) method. The calculation method is as follows:

ΔCt(D15)=Ct(D15 target gene)−Ct(D15 internal control gene)

ΔCt(D-7)=Ct(D-7 target gene)−Ct(D-7 internal control gene)

ΔΔCt(D15)=ΔCt(D15)−ΔCt(D-7 average)

ΔΔCt(D-7)=ΔCt(D-7)−ΔCt(D-7 average)

wherein the ΔCt (D-7 average) is the arithmetic mean of the ΔCt (D-7) of each animal before administration.

Thus, each animal corresponds to a ΔΔCt (D15) and a ΔΔCt (D-7).

The expression level of PCSK9 mRNA of D15 in an animal was normalized based on D-7 of this animal, wherein the expression level of PCSK9 mRNA of D-7 was defined as 100%;

the relative expression level of PCSK9 mRNA=2^(−ΔΔCt(D15))×100%;

the inhibition rate of the conjugate against PCSK9 mRNA=(1−2^(−ΔΔCt(D15)))×100%.

For the group whose animals were given the same conjugate, the inhibition rate of the conjugate against PCSK9 mRNA was the arithmetic mean of the inhibition rates in all the animals of this group.

Table 8 shows the inhibition rate of each conjugate against liver PCSK9 mRNA.

TABLE 8

Inhibition rate of conjugates against PCSK9 mRNA

| Conjugates | No. | inhibition rate % |
|---|---|---|
| Conjugate 1 | L10-siPCSKa1M1S | 79 ± 4 |
| Conjugate 2 | L10-siPCSKb1M1S | 68 ± 11 |
| Conjugate 4 | L10-siPCSKd1M1S | 81 ± 6 |

TABLE 8-continued

Inhibition rate of conjugates against PCSK9 mRNA

| Conjugates | No. | inhibition rate % |
|---|---|---|
| Conjugate 5 | L10-siPCSKe1M1S | 65 ± 18 |
| Conjugate 7 | L10-siPCSKg4M5S | 56 ± 22 |

As can be seen from Table 8, after single administration of 9 mg/kg, all the siRNA conjugates exhibited an inhibition rate of more than 56% against PCSK9 mRNA on day 15 after the administration relative to day 7 before the administration, wherein Conjugate 1 and Conjugate 4 showed the inhibition rates of up to 79% and 81% against PCSK9 mRNA in NHP liver tissue respectively.

(2-2) Detection of PCSK9 Protein Content in Serum

For the NHP to which Conjugate 4 was administered, a venous blood collection was performed on D-15, and D-9 and D1 respectively before the administration, and a venous blood collection was performed on D3, D8, D14, D22, and D29 respectively after the administration. A blood collection was performed weekly thereafter for 18 weeks until D127.

For the NHP to which Conjugate 1 or 7 was administered, a venous blood collection was performed on D-14, and D-7 and D1 respectively before the administration, and a venous blood collection was performed was collected on D4, D8, D15, D22, and D29 respectively after the administration. A blood collection was performed weekly thereafter for 12 weeks until D85.

Serum was separated from each of the collected blood samples at room temperature.

(2-2-1) Detection of PCSK9 Protein Content in Serum of Cynomolgus Monkeys to which Conjugate 4 was Administered The serum collected on D-9, D8, D14, D85, D92, D99, D106 and D120 after administration of Conjugate 4 was selected, the aforementioned serum obtained at each time point was diluted by 25 times with the Calibrator Diluent RD5P (1:5 dilution) reagent in the Human Proprotein Convertase 9/PCSK9 Quantikine ELISA Kit (R&D Systems company, U.S., Cat No. DPC900), and the absorbance of each diluted serum at 450 nm was detected using the full-automatic microplate reader (SYNERGY™ MX, Biotek company) according to the procedures in the instruction of the kit. According to each dilution concentration of the standard in the kit and its corresponding absorbance value, a standard curve was plotted using the linear regression function of Graphpad 5.0 software, and the corresponding linear equation was obtained: Y=aX+b, wherein a is the slope of the fitted straight line, and b is the corresponding Y value (intercept) when X=0. The PCSK9 protein content in the diluted serum can be calculated by bringing the measured absorbance value of each diluted serum into the above equation. The PCSK9 protein content in the serum obtained at each time point can be obtained according to the dilution times.

Normalized PCSK9 protein level=(PCSK9 protein content after administration/PCSK9 protein content before administration)

Inhibition rate against the expression of PCSK9 protein=(1−PCSK9 protein content after administration/PCSK9 protein content before administration)×100%;

wherein the PCSK9 protein content before administration is the PCSK9 protein content of D-9.

Figure 2:
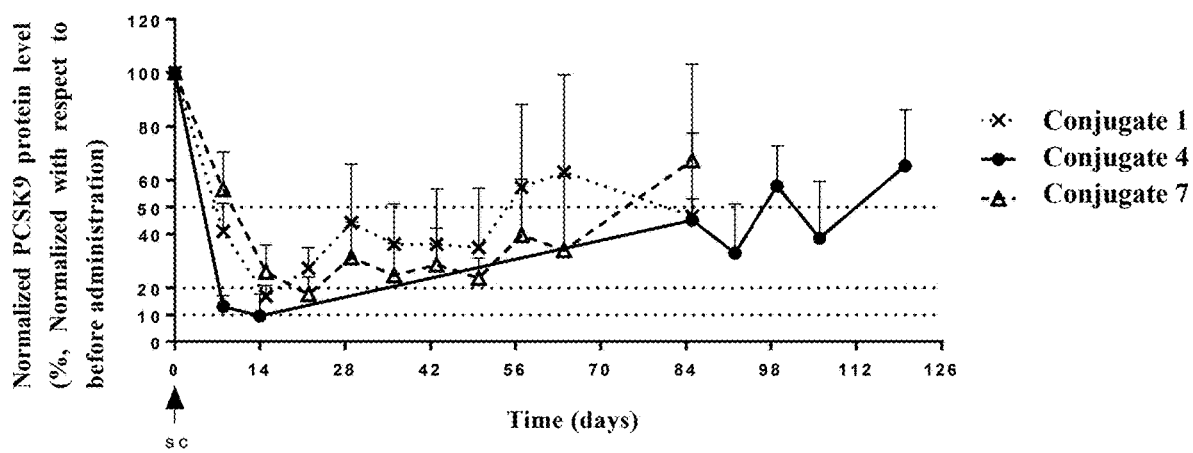
FIG. 2 shows the normalized PCSK9 protein levels in serum at different time points after a single subcutaneous injection of 9 mg/kg of Conjugate 1, 4 or 7 was given to cynomolgus monkeys.

The PCSK9 protein content at each time point after administration was normalized based on the PCSK9 protein content before administration; the PCSK9 protein level before administration was defined as 100%, and is represented by DO in FIG. 2; after cynomolgus monkey were given a single subcutaneous injection of 9 mg/kg of Conjugate 4, the normalized PCSK9 protein levels in serum at different time points are shown in FIG. 2.

(2-2-2) Detection of PCSK9 Protein Content in the Serum of Cynomolgus Monkeys to which Conjugate 1 or 7 was Administered The content of PCSK9 protein in the serum of cynomolgus monkeys which were given Conjugate 1 or 7 was detected using the same method as in (2-2-1) except that (1) the serum of D-14, D-7, D8, D15, D22, D29, D36, D43, D50, D57, D64 and D85 were selected; and (2) the PCSK9 protein content before administration was the arithmetic mean of the two PCSK9 protein contents of D-14 and D-7. After cynomolgus monkeys were given a single subcutaneous injection of 9 mg/kg of Conjugate 1 or 7, the normalized PCSK9 protein levels in serum obtained at different time points are shown in FIG. 2.

As can be seen from FIG. 2, on day 14 after single administration, Conjugate 4 showed an inhibition rate of more than 90% against the expression of PCSK9 protein in NHP serum, and maintained an inhibition rate of more than 50% against the expression of PCSK9 protein until week 12 after administration.

For Conjugate 7, on day 22 after single administration, it showed an inhibition rate of 82% against the expression of PCSK9 protein in NHP serum, and maintained an inhibition rate of more than 66% against the expression of PCSK9 protein until week 9 after administration.

For Conjugate 1, on day 15 after single administration, it showed an inhibition rate of 83% against the expression of PCSK9 protein in NHP serum, and maintained an inhibition rate of more than 65% against the expression of PCSK9 protein until week 7 after administration.

(2-3) Detection of Blood Lipid (LDL-c and CHO) Content in Serum (2-3-1) Detection of Blood Lipid (LDL-c and CHO) Content in Serum of Cynomolgus Monkeys to which Conjugate 4 was Administered The serum obtained at each time point after the administration of Conjugate 4 in (2-2) was selected, and the blood lipid (LDL-c or CHO) content in serum obtained at each time point was measured by a full-automatic biochemical analyzer (Hitachi 7060) using the LDL-C assay kit (DENUO CH7538, Shanghai Zhicheng Biotechnology Co., Ltd.) or the CHOL assay kit (DENUO CH7532, Shanghai Zhicheng Biotechnology Co., Ltd.) according to the procedures in its instruction.

The normalized blood lipid level=(the blood lipid content after administration/the blood lipid content before administration)×100%.

The inhibition rate against blood lipid=(1−the blood lipid content after administration/the blood lipid content before administration)×100%.

Therein, the blood lipid content before administration is the arithmetic mean of the three blood lipid contents of D-15, D-9 and D1 before administration; and blood lipid refers to LDL-c or CHO.

Figure 3:
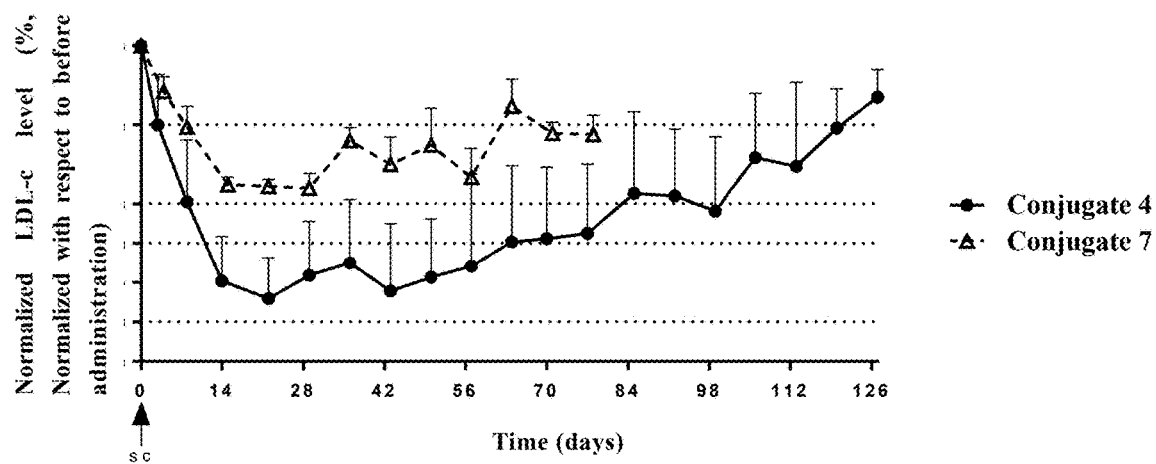
FIG. 3 shows the normalized LDL-c levels in serum at different time points after a single subcutaneous injection of 9 mg/kg of Conjugate 4 or 7 was given to cynomolgus monkeys.
Figure 4:
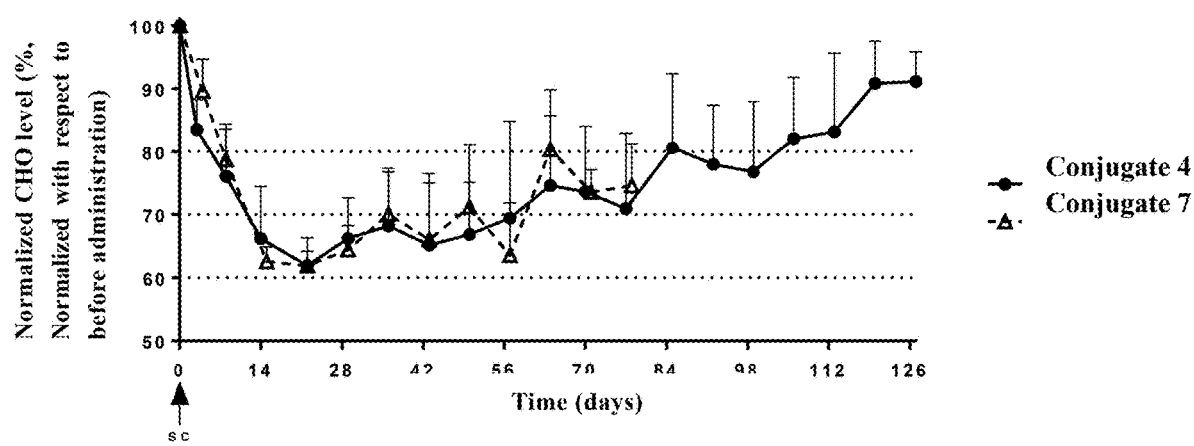
FIG. 4 shows the normalized CHO levels in serum at different time points after a single subcutaneous injection of 9 mg/kg of Conjugate 4 or 7 was given to cynomolgus monkeys.

The blood lipid content at each time point after administration was normalized based on the blood lipid content before administration; the blood lipid level before administration was defined as 100%, and is represented by D0 in FIG. 3 and FIG. 4.

After cynomolgus monkeys was given a single subcutaneous injection of 9 mg/kg of Conjugate 4, the normalized LDL-c levels and normalized CHO levels in serum at different time points are shown in FIG. 3 and FIG. 4 respectively.

(2-3-2) Detection of Blood Lipid (LDL-c and CHO) Content in the Serum of Cynomolgus Monkeys to which Conjugate 7 was Administered The content of blood lipid (LDL-c and CHO) in the serum of cynomolgus monkeys to which Conjugate 7 was administered was detected using the same method as in (2-3-1) except that (1) the serum obtained at each time point after the administration of Conjugate 7 in (2-2) was selected for detection of blood lipid; and (2) the content of blood lipid before administration was the arithmetic mean of the three blood lipid contents of D-14, D-7 and D1 before administration. After cynomolgus monkeys were given a single subcutaneous injection of 9 mg/kg of Conjugate 7, the normalized LDL-c levels and normalized CHO levels in serum obtained at different time points are shown in FIG. 3 and FIG. 4 respectively.

As shown in FIG. 3, from the $14^{th}$ day after single administration, Conjugate 4 exhibited a significant inhibitory effect on LDL-c. On day 22 after administration, Conjugate 4 showed an inhibition rate of up to 64% against LDL-c. Conjugate 4 maintained an inhibition rate of more than 50% against LDL-c from week 2 to week 11 after administration. The LDL-c level in the serum of NHP to which Conjugate 4 was administered was continuously lower than that before administration over the observation period of 127 days.

As to Conjugate 7, on day 22 after single administration, Conjugate 7 showed an inhibition rate of 36% against LDL-c. Conjugate 7 maintained an inhibition rate of about 30% against LDL-c from week 2 to week 4 after administration. The LDL-c level in the serum of NHP to which Conjugate 7 was administered was continuously lower than that before administration over the observation period of 11 weeks.

As shown in FIG. 4, from the $14^{th}$ day after single administration, Conjugate 4 also exhibited a significant inhibitory effect on CHO. On day 22 after administration, Conjugate 4 showed an inhibition rate of up to 38% against CHO. Conjugate 4 maintained an inhibition rate of more than 30% against CHO from week 2 to week 8 after administration. The CHO level in the serum of NHP to which Conjugate 4 was administered was continuously lower than that before administration over the observation period of 127 days.

As to Conjugate 7, on day 22 after single administration, Conjugate 7 showed an inhibition rate of 38% against CHO. Conjugate 7 maintained an inhibition rate of basically more than 30% against CHO from week 2 to week 8 after administration. The CHO level in the serum of NHP to which Conjugate 7 was administered was continuously lower than that before administration over the observation period of 11 weeks.

(2-4) Blood Routine and Coagulation Function Tests Before and After Liver Puncture Before and after the liver puncture, the animals to which Conjugate 4 or 5 was administered were subjected to intravenous blood sampling. Blood routine and coagulation function were detected using the full-automatic five classification hematology analyzer (ADVIA 2120/ADVIA 2120i, Siemens company, Germany) and the full-automatic blood coagulation analyzer (CA-7000/CS-2000i, Sysmex company, Japan) respectively. The results show that administration of each conjugate has no significant effect on the blood routine and coagulation function, as compared with before administration, showing that the siRNA conjugates of the present disclosure have good biological safety.

Experimental Example 3 Evaluation of Toxicity of siRNA Conjugates in Rats and Mice In this experimental example, the toxic reactions to the siRNA conjugates of the present disclosure in small animals were evaluated by observing the clinical toxic reactions in rats or mice which were given Conjugate 1, 4 or 7, detecting the liver weight, blood routine, blood biochemistry, blood lipid and other indicators, and performing gross anatomy and histopathological examinations.

(3-1) Evaluation of Toxicity in Rats
(3-1-1) Toxicity Test in SD Rats to which Conjugate 1 or 4 was Administered SPF grade SD rats aged 6-9 weeks and weighing 210-250 g (purchased from Beijing Vital River Laboratory Animal Technology Co., Ltd., production license number: SCXK (Beijing) 2016-0011 or SCXK (Beijing) 2016-0006), all of which were males, were divided into 3 groups according to their body weights, with 5 rats in each group. The rats were subcutaneously injected with Conjugate 1, Conjugate 4 or a 1×PBS (pH 7.4) control separately. The dosage of the conjugate was calculated based on body weight. Each conjugate was prepared with 1×PBS (pH 7.4) into a 60 mg/ml solution, the administration volume was 5 ml/kg, and the administration dose was 300 mg/kg.

After single subcutaneous administration, the following indicators were detected:

(1) Observation of general status: observation of general status was performed twice per day;
(2) Body weight: body weight was measured on D1 before administration, D3, D6, D10 and D14 after administration, and D15 (when dissection was performed);
(3) Food intake: food intake was measured on D2-3, D6-7 and D12-13 respectively;
(4) Hematology: On D15 before dissection, 1.9 ml blood was collected from the abdominal aorta of the rat, wherein 1.0 ml blood sample was anticoagulated with EDTA-K2, and the whole blood was directly injected to detect the following blood cytological indicators: red blood cell count (RBC), white blood cell count (WBC), platelet count (PLT), hemoglobin (HGB), hematocrit (HCT), mean corpuscular volume (MCV), mean corpuscular hemoglobin (MCH), mean corpuscular hemoglobin concentration (MCHC), reticulocyte count (RET), the percentage of reticulocytes (RET %), the count and percentage of neutrophils (NEU), the count and percentage of lymphocytes (LYM), the count and percentage of monocytes (MONO), the count and percentage of eosinophils (EOS), and the count and percentage of basophils (BASO); and the remaining 0.9 ml blood sample was anticoagulated with sodium citrate and centrifuged at 1800×g at 15° C. to 25° C. for 10 minutes to separate plasma used for detecting blood coagulation time (prothrombin time (PT) and activated partial thrombin time (APTT));
(5) Blood biochemistry: after administration, 0.6 ml of blood was collected from the jugular vein of the rat on D2, and 3 ml of blood was collected from the abdominal aorta of the rat on D15 before dissection; the blood samples, none of which was anticoagulated, were centrifuged at 1800×g at 15° C. to 25° C. for 10 minutes and serum was separated for measuring blood biochemical indicators of alkaline phosphatase (ALP), alanine aminotransferase (ALT), aspartate aminotransferase (AST), creatine kinase (CK), lactate dehydrogenase (LDH), γ-glutamyl transpeptidase (GGT), urea (Urea), creatinine (Crea), sodium ion concentration ($Na^+$), potassium ion concentration ($K^+$), chloride ion ($Cl^-$), blood glucose (GLU), total bilirubin (TBIL), total protein (TP), albumin (ALB) and albumin/globulin ratio (A/G).

(6) Gross anatomy and histopathological examination: animals were dissected on D15, each organ was weighed, and histopathological examination was performed.

(3-1-2) Toxicity Test in SD Rats to which Conjugate 7 was Administered

The toxicity in SD rats to which Conjugate 7 was administered was detected using the same method as in (3-1-1) except that Conjugate 4 was replaced by Conjugate 7; Conjugate 7 was prepared with 1×PBS (pH 7.4) into a 20 mg/ml solution and a 6 mg/ml solution respectively; the administration volume was 5 ml/kg, and the administration dose was 100 mg/kg and 30 mg/kg respectively. For indicator (5) of blood biochemistry, blood was collected on D8 and D15 respectively before dissection after administration.

The results show that none of the conjugates showed obvious toxicity in rats.

(3-2) Evaluation of Toxicity in Mice

Each group of 10 SPF grade ICR mice aged 5-6 weeks (purchased from SPF (Beijing) biotechnology co., LTD.), half of which were males, were injected with Conjugate 1, Conjugate 4 or Conjugate 7 subcutaneously. The administration was performed once a week for 2 consecutive weeks, 3 times in total (on D1, D8 and D15 respectively). The dosage of the conjugate was calculated based on body weight. Each conjugate was prepared with 1×PBS (pH 7.4) into a 30 mg/ml solution, the administration volume was 10 ml/kg, and the administration dose was 300 mg/kg.

After administration was performed 3 times, the following indicators were detected:

(1) Observation of general status: observation of general status was performed once per day;
(2) Body weight: body weight was measured on D1, D8 and D15, and before administration and D16 (when the dissection was performed) respectively;
(3) Food intake: food intake was measured every week;
(4) Blood biochemistry: On D16 when dissection was performed, 1 ml of blood was collected by eyeball removal, and was not anticoagulated; the blood was first incubated at 37° C. for 60 min, and then centrifuged at 4° C. at 3000 rpm for 15 min to obtain serum for blood biochemical measurement; the test indicators were the same as the blood biochemical indicators in the rat toxicity test.
(6) Gross anatomy and histopathological examination: animals were dissected on D16, each organ was weighed, and histopathological examination was performed.

The results show that none of the conjugates showed obvious toxicity in mice.

The above results show that the conjugates of the present disclosure have good biological safety.

Some embodiments of the present disclosure are described in detail above, but the present disclosure is not limited to the specific details of the above embodiments. Various simple variations to the technical solutions of the present disclosure can be made within the scope of the technical concept of the present disclosure, and these simple variations are also within the scope of the present disclosure.

It is to be noted that each of the specific technical features described in the above embodiments can be combined in any suitable manner provided that no contradiction is caused. In order to avoid unnecessary repetition, various possible combination manners are no longer described in the present disclosure.

In addition, various different embodiments of the present disclosure may also be combined as long as it does not deviate from the idea of the present disclosure, which should also be regarded as the disclosure of the present disclosure.

The invention claimed is:

1. An siRNA conjugate having a structure as shown by Formula (308):

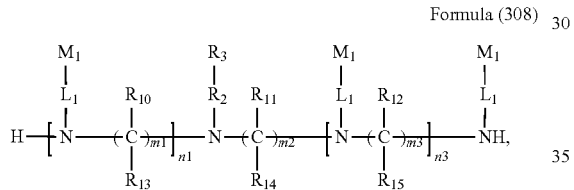

Formula (308)

wherein n1 is an integer of 1-2, n3 is an integer of 0-1, and n1+n3=2-3;

each m1, m2, or m3 independently of one another is an integer of 2-10;

$R_{10}$, $R_{11}$, $R_{12}$, $R_{13}$, $R_{14}$, or $R_{15}$ independently of one another is H, or selected from the group consisting of $C_1$-$C_{10}$ alkyl, $C_1$-$C_{10}$ haloalkyl, and $C_1$-$C_{10}$ alkoxy;

$R_3$ is a group having a structure as shown by Formula (A59):

(A59)

wherein, $E_1$ is OH, SH or $BH_2$;

Nu is an siRNA;

the siRNA comprises a sense strand and an antisense strand; each nucleotide in the siRNA is independently a modified or unmodified nucleotide; wherein the sense strand comprises a nucleotide sequence I, and the antisense strand comprises a nucleotide sequence II; the nucleotide sequence I and the nucleotide sequence II are at least partly reverse complementary to form a double-stranded region; the nucleotide sequence I and the nucleotide sequence II are the sequences selected from one of the following groups i)-vi):

i) the nucleotide sequence I and the nucleotide sequence as shown by SEQ ID NO: 1 have an equal length and no more than 3 nucleotide differences, and the nucleotide sequence II and the nucleotide sequence as shown by SEQ ID NO: 2 have an equal length and no more than 3 nucleotide differences:

(SEQ ID NO: 1)
5'-AAGCAAGCAGACAUUUAUZ$_1$-3';

(SEQ ID NO: 2)
5'-Z$_2$AUAAAUGUCUGCUUGCUU-3', wherein, $Z_1$ is C and $Z_2$ is G, and the nucleotide sequence I comprises a nucleotide $Z_3$ at the position corresponding to $Z_1$; the nucleotide sequence II comprises a nucleotide $Z_4$ at the position corresponding to $Z_2$, wherein $Z_4$ is the first nucleotide at 5' terminal of the antisense strand;

ii) the nucleotide sequence I and the nucleotide sequence as shown by SEQ ID NO: 61 have an equal length and no more than 3 nucleotide differences, and the nucleotide sequence II and the nucleotide sequence as shown by SEQ ID NO: 62 have an equal length and no more than 3 nucleotide differences:

(SEQ ID NO: 61)
5'-UUUGUAGCAUUUUUAUUAZ$_5$-3';

(SEQ ID NO: 62)
5'-Z$_6$UAAUAAAAAUGCUACAAA-3', wherein, $Z_5$ is A and $Z_6$ is U, and the nucleotide sequence I comprises a nucleotide $Z_7$ at the position corresponding to $Z_5$; the nucleotide sequence II comprises a nucleotide $Z_8$ at the position corresponding to $Z_6$, wherein $Z_8$ is the first nucleotide at 5' terminal of the antisense strand;

iii) the nucleotide sequence I and the nucleotide sequence as shown by SEQ ID NO: 121 have an equal length and no more than 3 nucleotide differences, and the nucleotide sequence II and the nucleotide sequence as shown by SEQ ID NO: 122 have an equal length and no more than 3 nucleotide differences:

5'-GCCUGGAGUUUAUUCGGAZ$_9$-3'; (SEQ ID NO: 121)

5'-Z$_{10}$UCCGAAUAAACUCCAGGC-3', (SEQ ID NO: 122)

wherein, $Z_9$ is A and $Z_{10}$ is U, and
the nucleotide sequence I comprises a nucleotide $Z_{11}$ at the position corresponding to $Z_9$; the nucleotide sequence II comprises a nucleotide $Z_{12}$ at the position corresponding to $Z_{10}$, wherein $Z_{12}$ is the first nucleotide at 5' terminal of the antisense strand;

iv) the nucleotide sequence I and the nucleotide sequence as shown by SEQ ID NO: 181 have an equal length and no more than 3 nucleotide differences, and the nucleotide sequence II and the nucleotide sequence as shown by SEQ ID NO: 182 have an equal length and no more than 3 nucleotide differences:

5'-CUGUUUUGCUUUUGUAACZ$_{13}$-3'; (SEQ ID NO: 181)

5'-Z$_{14}$GUUACAAAAGCAAAACAG-3', (SEQ ID NO: 182)

wherein, $Z_{13}$ is U and $Z_{14}$ is A, and
the nucleotide sequence I comprises a nucleotide $Z_{15}$ at the position corresponding to $Z_{13}$; the nucleotide sequence II comprises a nucleotide $Z_{16}$ at the position corresponding to $Z_{14}$, wherein $Z_{16}$ is the first nucleotide at 5' terminal of the antisense strand;

v) the nucleotide sequence I and the nucleotide sequence as shown by SEQ ID NO: 241 have an equal length and no more than 3 nucleotide differences, and the nucleotide sequence II and the nucleotide sequence as shown by SEQ ID NO: 242 have an equal length and no more than 3 nucleotide differences:

5'-GGUUUUGUAGCAUUUUUAZ$_{17}$-3'; (SEQ ID NO: 241)

5'-Z$_{18}$UAAAAAUGCUACAAAACC-3', (SEQ ID NO: 242)

wherein, $Z_{17}$ is U and $Z_{18}$ is A, and
the nucleotide sequence I comprises a nucleotide $Z_{19}$ at the position corresponding to $Z_{17}$; the nucleotide sequence II comprises a nucleotide $Z_{20}$ at the position corresponding to $Z_{18}$, wherein $Z_{20}$ is the first nucleotide at 5' terminal of the antisense strand; and vi) the nucleotide sequence I and the nucleotide sequence as shown by SEQ ID NO: 301 have an equal length and no more than 3 nucleotide differences, and the nucleotide sequence II and the nucleotide sequence as shown by SEQ ID NO: 302 have an equal length and no more than 3 nucleotide differences:

5'-GUGACUUUUUAAAAUAAAZ$_{21}$-3'; (SEQ ID NO: 301)

5'-Z$_{22}$UUUAUUUUAAAAAGUCAC-3', (SEQ ID NO: 302)

wherein, $Z_{21}$ is A and $Z_{22}$ is U, and
the nucleotide sequence I comprises a nucleotide $Z_{23}$ at the position corresponding to $Z_{21}$; the nucleotide sequence II comprises a nucleotide $Z_{24}$ at the position corresponding to $Z_{22}$, wherein $Z_{24}$ is the first nucleotide at 5' terminal of the antisense strand;

"corresponding position" refers to a same position in a nucleotide sequence when counting from a same terminal of the nucleotide sequence;

$R_2$ is a linear alkylene of 1 to 20 carbon atoms in length, wherein one or more carbon atoms are optionally replaced with any one or more groups selected from the group consisting of: C(O), NH, O, S, CH=N, S(O)$_2$, $C_2$-$C_{10}$ alkenylene, $C_2$-$C_{10}$ alkynylene, $C_6$-$C_{10}$ arylene, $C_3$-$C_{18}$ heterocyclylene, and $C_5$-$C_{10}$ heteroarylene; and wherein $R_2$ optionally has any one or more substituents selected from the group consisting of: $C_1$-$C_{10}$ alkyl, $C_6$-$C_{10}$ aryl, $C_5$-$C_{10}$ heteroaryl, $C_1$-$C_{10}$ haloalkyl, —O$C_1$-$C_{10}$ alkyl, —O$C_1$-$C_{10}$ alkylphenyl, —$C_1$-$C_{10}$ alkyl-OH, —O$C_1$-$C_{10}$ haloalkyl, —S$C_1$-$C_{10}$ alkyl, —S$C_1$-$C_{10}$ alkylphenyl, —$C_1$-$C_{10}$ alkyl-SH, —S$C_1$-$C_{10}$ haloalkyl, halo, —OH, —SH, —NH$_2$, —$C_1$-$C_{10}$ alkyl-NH$_2$, —N($C_1$-$C_{10}$ alkyl)($C_1$-$C_{10}$ alkyl), —NH ($C_1$-$C_{10}$ alkyl), —N($C_1$-$C_{10}$ alkyl) ($C_1$-$C_{10}$ alkylphenyl), —NH($C_1$-$C_{10}$ alkylphenyl), cyano, nitro, —CO$_2$H, —C(O)O($C_1$-$C_{10}$ alkyl), —CON($C_1$-$C_{10}$ alkyl)($C_1$-$C_{10}$ alkyl), —CONH($C_1$-$C_{10}$ alkyl), —CONH$_2$, —NHC(O)($C_1$-$C_{10}$ alkyl), —NHC(O)(phenyl), —N($C_1$-$C_{10}$ alkyl)C(O)($C_1$-$C_{10}$ alkyl), —N($C_1$-$C_{10}$ alkyl)C(O)(phenyl), —C(O)$C_1$-$C_{10}$ alkyl, —C(O)$C_1$-$C_{10}$ alkylphenyl, —C(O)$C_1$-$C_{10}$ haloalkyl, —OC(O)$C_1$-$C_{10}$ alkyl, —SO$_2$($C_1$-$C_{10}$ alkyl), —SO$_2$(phenyl), —SO$_2$($C_1$-$C_{10}$ haloalkyl), —SO$_2$NH$_2$, —SO$_2$NH($C_1$-$C_{10}$ alkyl), —SO$_2$NH(phenyl), —NHSO$_2$($C_1$-$C_{10}$ alkyl), —NHSO$_2$ (phenyl), and —NHSO$_2$($C_1$-$C_{10}$ haloalkyl);

each $L_1$ independently is a linear alkylene of 1 to 70 carbon atoms in length, wherein one or more carbon atoms are optionally replaced with any one or more groups selected from the group consisting of: C(O), NH, O, S, CH=N, S(O)$_2$, $C_2$-$C_{10}$ alkenylene, $C_2$-$C_{10}$ alkynylene, $C_6$-$C_{10}$ arylene, $C_3$-$C_{18}$ heterocyclylene, and $C_5$-$C_{10}$ heteroarylene; and wherein $L_1$ optionally has any one or more substituents selected from the group consisting of: $C_1$-$C_{10}$ alkyl, $C_6$-$C_{10}$ aryl, $C_5$-$C_{10}$ heteroaryl, $C_1$-$C_{10}$ haloalkyl, —O$C_1$-$C_{10}$ alkyl, —O$C_1$-$C_{10}$ alkylphenyl, —$C_1$-$C_{10}$ alkyl-OH, —O$C_1$-$C_{10}$ haloalkyl, —S$C_1$-$C_{10}$ alkyl, —S$C_1$-$C_{10}$ alkylphenyl, —$C_1$-$C_{10}$ alkyl-SH, —S$C_1$-$C_{10}$ haloalkyl, halo, —OH, —SH, —NH$_2$, —$C_1$-$C_{10}$ alkyl-NH$_2$, —N($C_1$-$C_{10}$ alkyl) ($C_1$-$C_{10}$ alkyl), —NH($C_1$-$C_{10}$ alkyl), —N($C_1$-$C_{10}$ alkyl)($C_1$-$C_{10}$ alkylphenyl), —NH($C_1$-$C_{10}$ alkylphenyl), cyano, nitro, —CO$_2$H, —C(O)O($C_1$-$C_{10}$ alkyl), —CON($C_1$-$C_{10}$ alkyl)($C_1$-$C_{10}$ alkyl), —CONH($C_1$-$C_{10}$ alkyl), —CONH$_2$, —NHC(O)($C_1$-$C_{10}$ alkyl), —NHC (O)(phenyl), —N($C_1$-$C_{10}$ alkyl)C(O)($C_1$-$C_{10}$ alkyl), —N($C_1$-$C_{10}$ alkyl)C(O)(phenyl), —C(O)$C_1$-$C_{10}$ alkyl, —C(O)$C_1$-$C_{10}$ alkylphenyl, —C(O)$C_1$-$C_{10}$ haloalkyl, —OC(O)$C_1$-$C_{10}$ alkyl, —SO$_2$($C_1$-$C_{10}$ alkyl), —SO$_2$ (phenyl), —SO$_2$($C_1$-$C_{10}$ haloalkyl), —SO$_2$NH$_2$, —SO$_2$NH($C_1$-$C_{10}$ alkyl), —SO$_2$NH(phenyl), —NHSO$_2$($C_1$-$C_{10}$ alkyl), —NHSO$_2$ (phenyl), and —NHSO$_2$($C_1$-$C_{10}$ haloalkyl);

⁓⁓⁓ represents the site where a group is covalently linked; and M1 represents a targeting group.

2. The siRNA conjugate according to claim 1, wherein each $L_1$ is independently selected from the group consisting of the groups of Formulae (A1)-(A26) and any combination thereof:
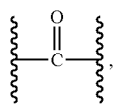 (A1)
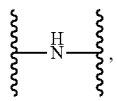 (A2)
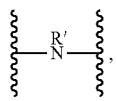 (A3)
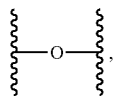 (A4)
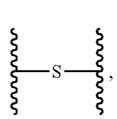 (A5)
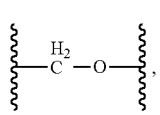 (A6)
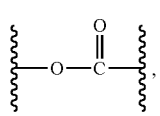 (A7)
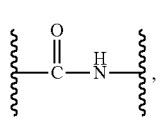 (A8)
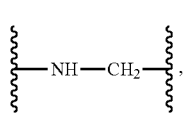 (A9)
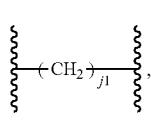 (A10)
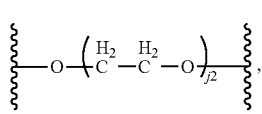 (A11)
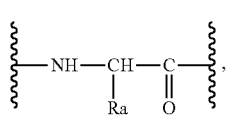 (A12)
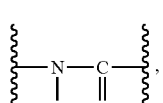 (A13)
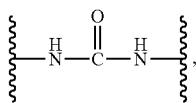 (A14)
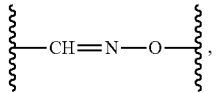 (A15)
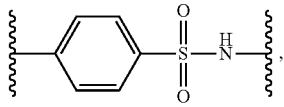 (A16)
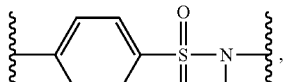 (A17)
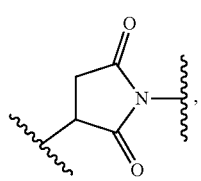 (A18)
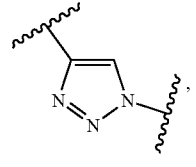 (A19)
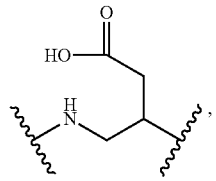 (A20)
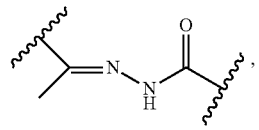 (A21)
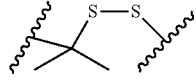 (A22)
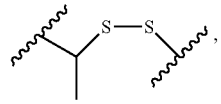 (A23)
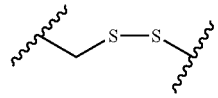 (A24)
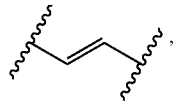 (A25)

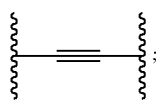
(A26)
wherein,
each j1 is independently an integer of 1-20; each j2 is independently an integer of 1-20;
each R' is independently a $C_1$-$C_{10}$ alkyl;
each Ra is independently selected from the group consisting of the groups of Formulae (A27)-(A45) or any combination thereof:
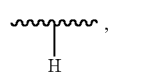 (A27)
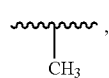 (A28)
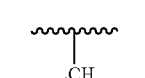 (A29)
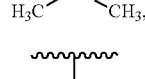 (A30)
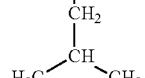 (A31)
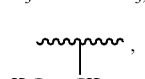 (A32)
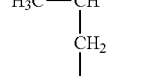 (A33)
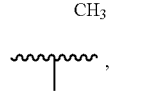 (A34)
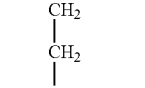 (A35)
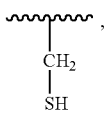 (A36)
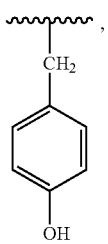 (A37)
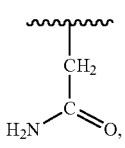 (A38)
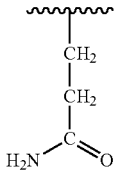 (A39)
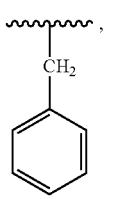 (A40)
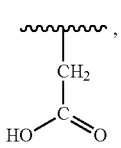 (A41)
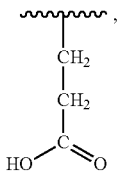 (A42)
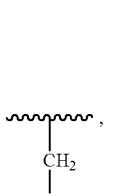 (A43)

-continued

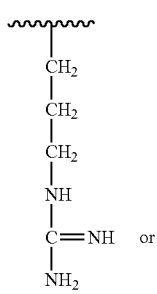
(A44)

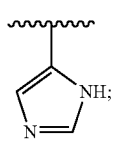
(A45)

each Rb is independently a $C_1$-$C_{10}$ alkyl;

or $L_1$ is selected from the connection combinations of one or more of Formulae (A1), (A4), (A5), (A6), (A8), (A10), (A11), and (A13);

or $L_1$ is selected from the connection combinations of at least two of Formulae (A1), (A4), (A8), (A10), and (A11);

or $L_1$ is selected from the connection combinations of at least two of Formulae (A1), (A8) and (A10);

or $L_1$ has a length of 3 to 25 atoms;

or $L_1$ has a length of 4 to 15 atoms;

⌇⌇⌇ represents the site where a group is covalently linked.

3. The siRNA conjugate according to claim 1, wherein each m1, m2 or m3 independently of one another is an integer of 2-5, and/or m1=m2=m3.

4. The siRNA conjugate according to claim 1, wherein each of the targeting groups is independently a ligand that has affinity to the asialoglycoprotein receptor on the surface of mammalian hepatocyte; or each of the targeting groups is independently an asialoglycoprotein or a saccharide; or each of the targeting groups is independently selected from the group consisting of D-mannopyranose, L-mannopyranose, D-arabinose, D-xylofuranose, L-xylofuranose, D-glucose, L-glucose, D-galactose, L-galactose, α-D-mannofuranose, β-D-mannofuranose, α-D-mannopyranose, β-D-mannopyranose, α-D-glucopyranose, β-D-glucopyranose, α-D-glucofuranose, β-D-glucofuranose, α-D-fructofuranose, α-D-fructopyranose, α-D-galactopyranose, β-D-galactopyranose, α-D-galactofuranose, β-D-galactofuranose, glucosamine, sialic acid, galactosamine, N-acetylgalactosamine, N-trifluoroacetylgalactosamine, N-propionylgalactosamine, N-n-butyrylgalactosamine, N-isobutyrylgalactosamine, 2-amino-3-O—[(R)-1-carboxyethyl]-2-deoxy-β-D-glucopyranose, 2-deoxy-2-methylamino-L-glucopyranose, 4,6-dideoxy-4-formamido-2,3-di-O-methyl-D-mannopyranose, 2-deoxy-2-sulfoamino-D-glucopyranose, N-glycolyl-α-neuraminic acid, 5-thio-β-D-glucopyranose, methyl 2,3,4-tris-O-acetyl-1-thio-6-O-trityl-α-D-glucopyranoside, 4-thio-β-D-galactopyranose, ethyl 3,4,6,7-tetra-O-acetyl-2-deoxy-1,5-dithio-α-D-glucoheptopyranoside, 2,5-anhydro-D-allononitrile, ribose, D-ribose, D-4-thioribose, L-ribose, L-4-thioribose; or at least one or each of the targeting groups is galactose or N-acetylgalactosamine.

5. The siRNA conjugate according to claim 1, wherein the conjugate has a structure as shown by Formula (403), (404), (405), (406), (407), (408), (409), (410), (411), (412), (413), (414), (415), (416), (417), (418), (419), (420), (421), or (422):

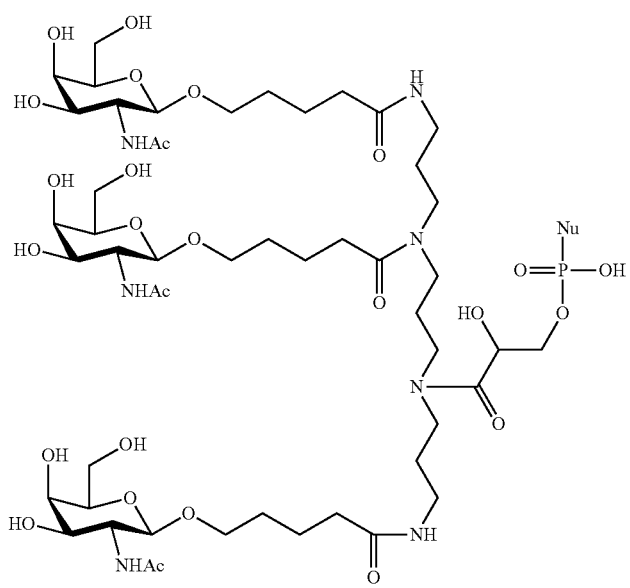

Formula (403)

Formula (404)
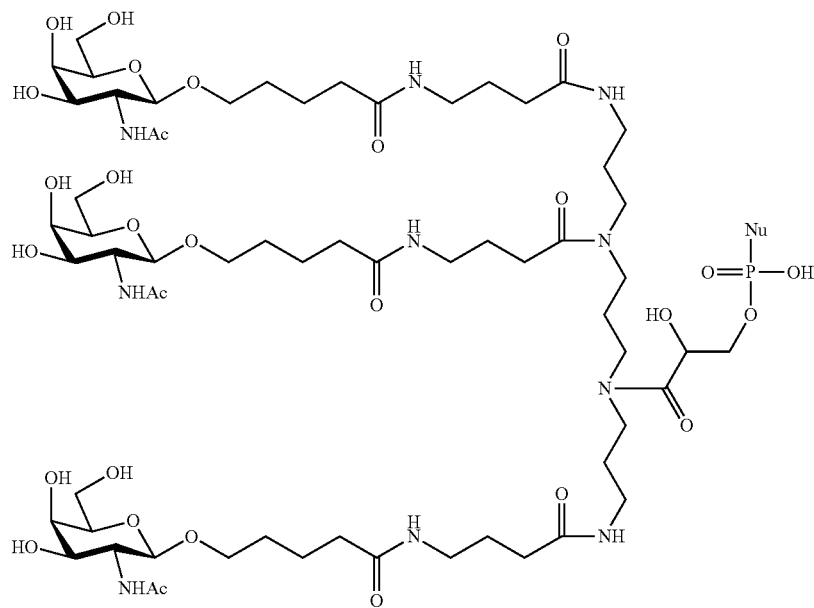
Formula (405)
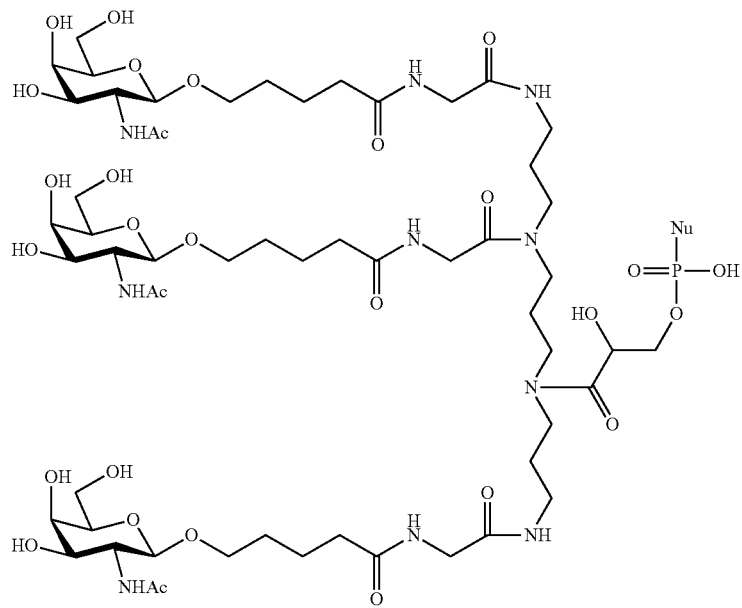

-continued
Formula (406)
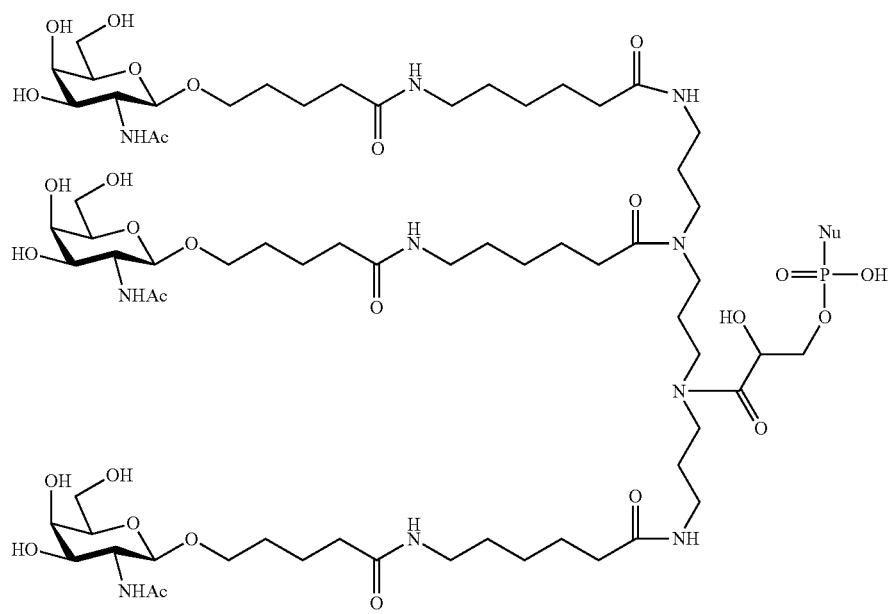
Formula (407)
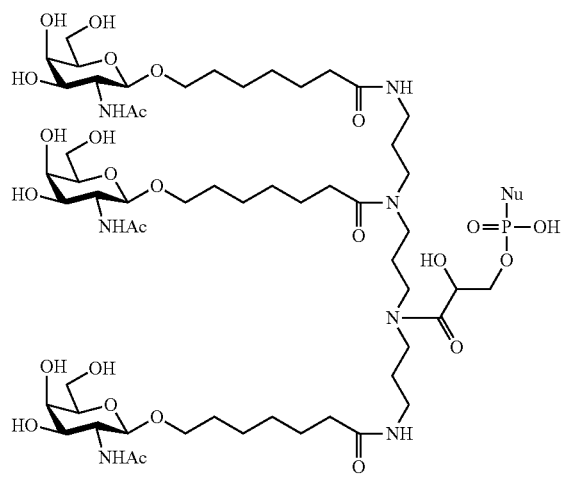
Formula (408)
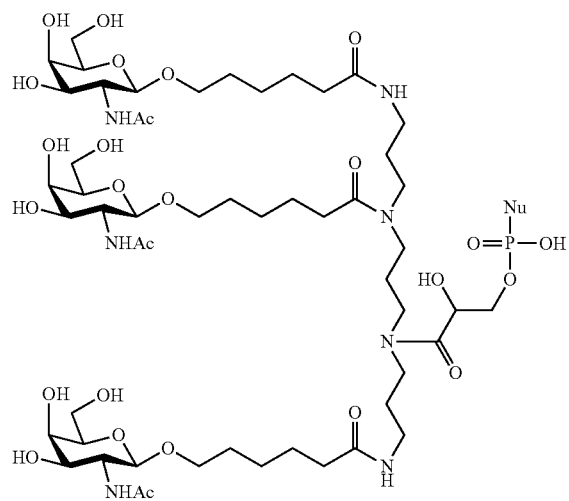

Formula (409)
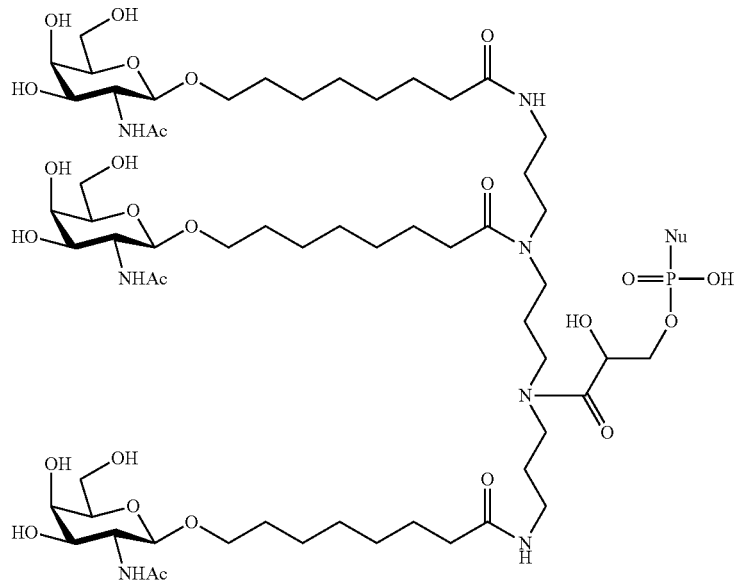
Formula (410)
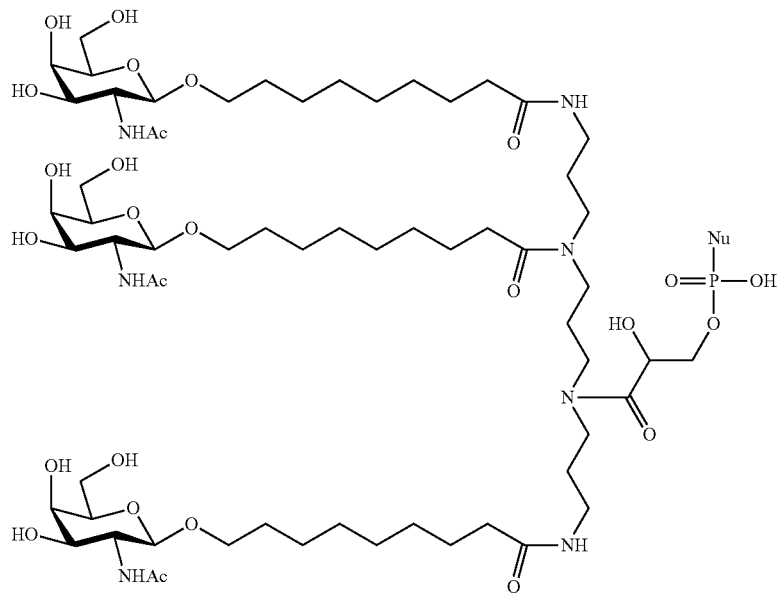

-continued
Formula (411)
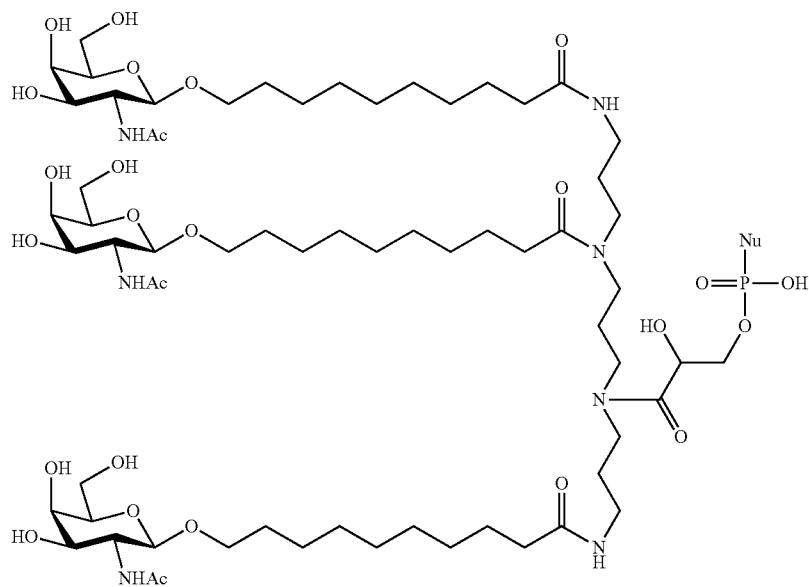
Formula (412)
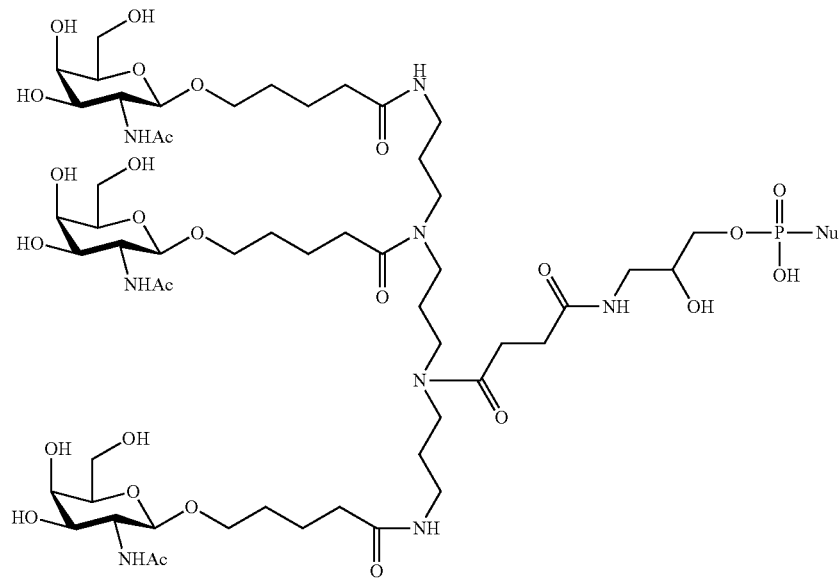

Formula (413)
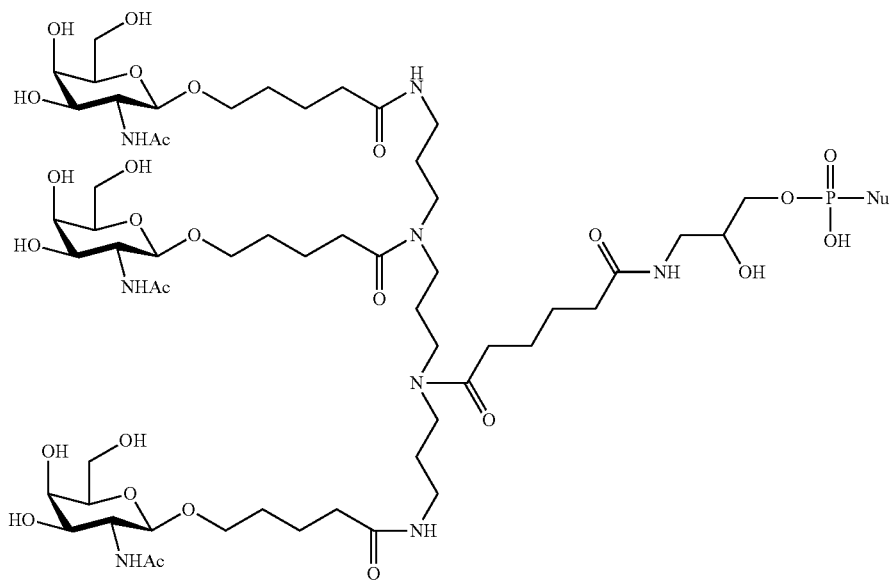
Formula (414)
Formula (415)
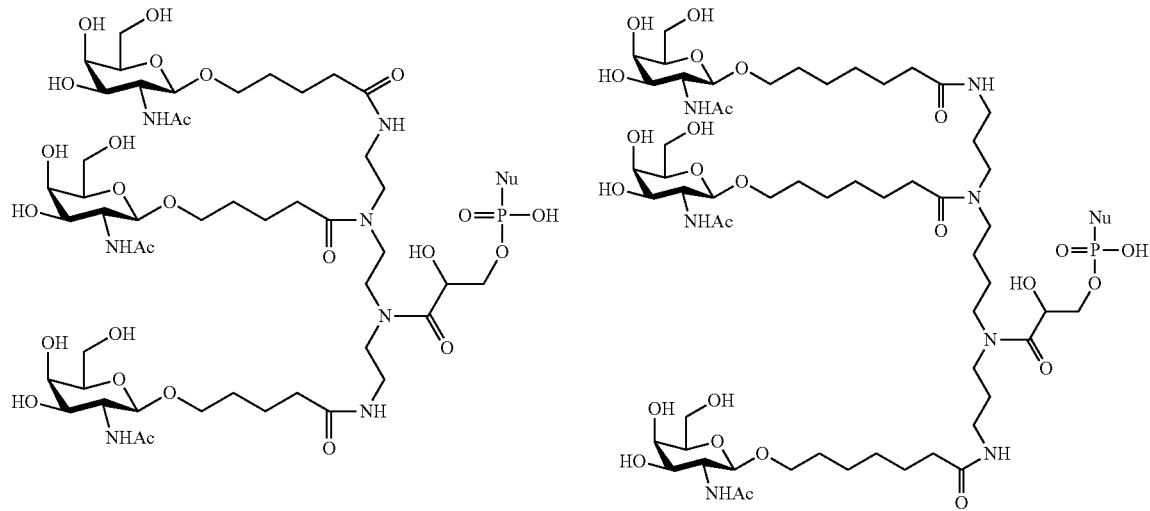

307                                                                308
-continued
Formula (416)
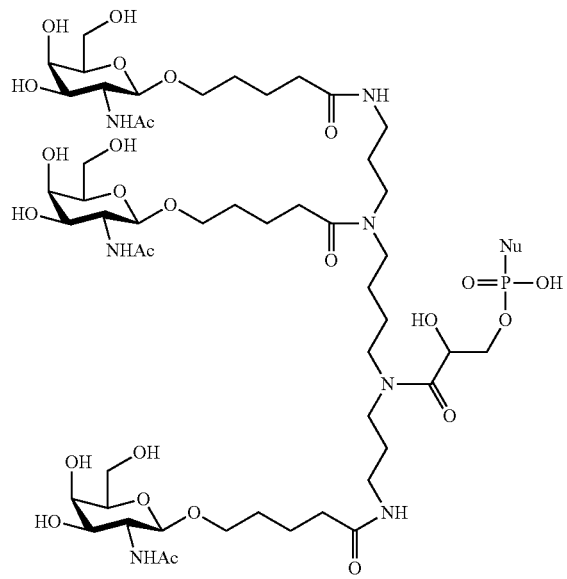
Formula (417)
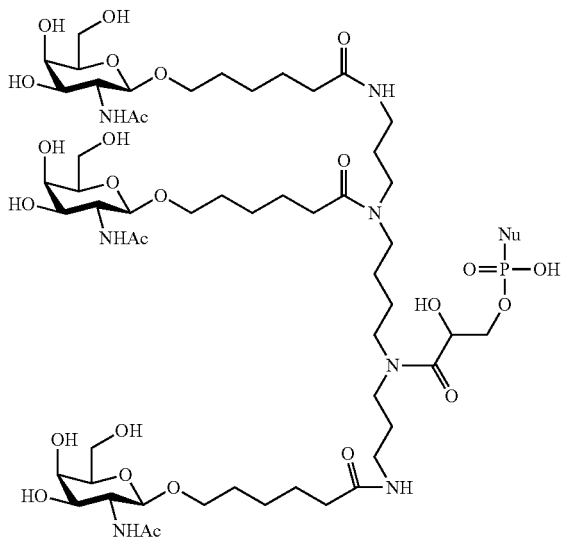
Formula (418)
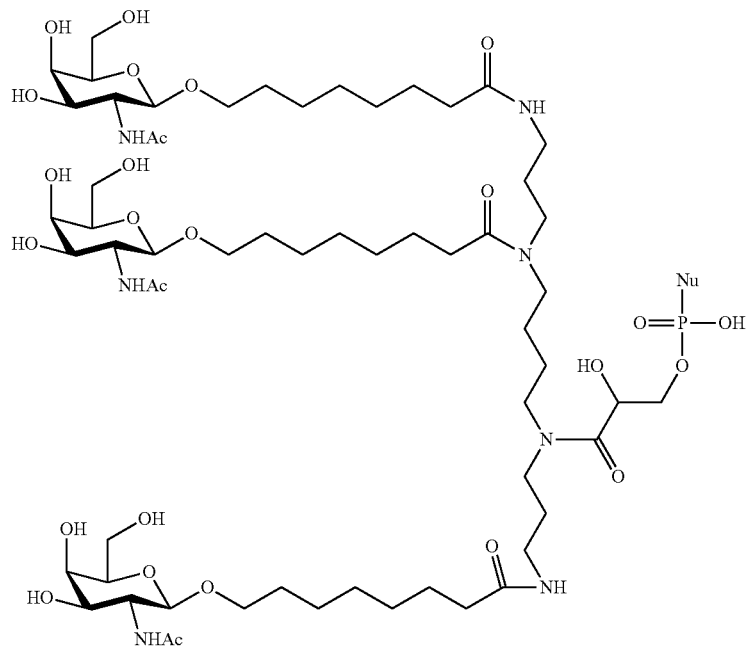

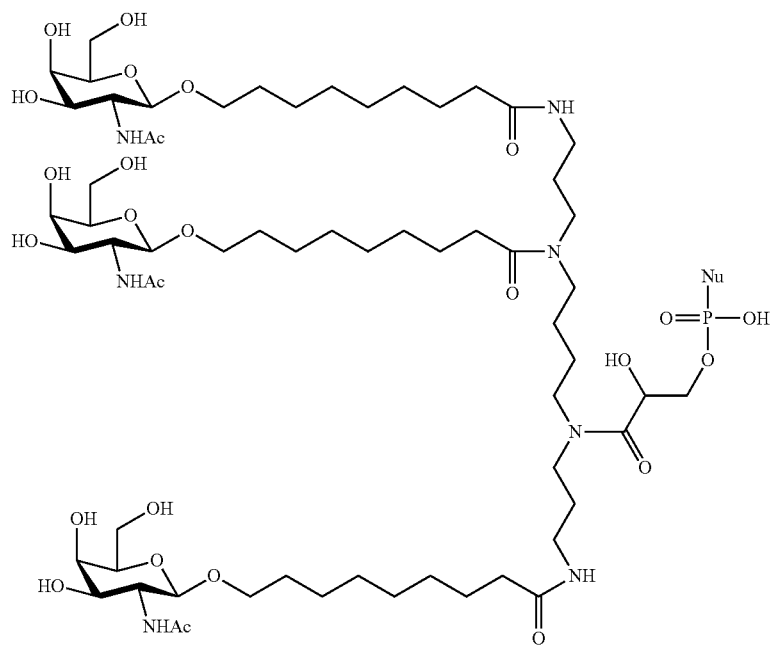
Formula (419)
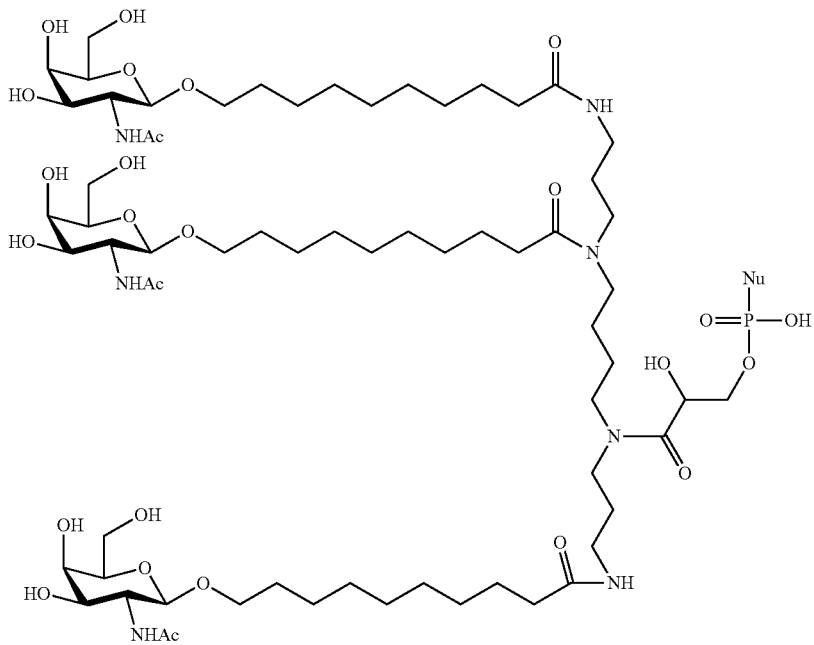
Formula (420)

Formula (421)

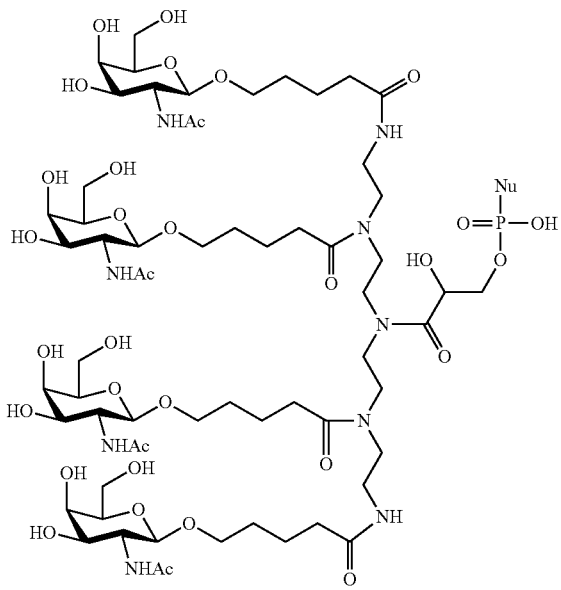

Formula (422)

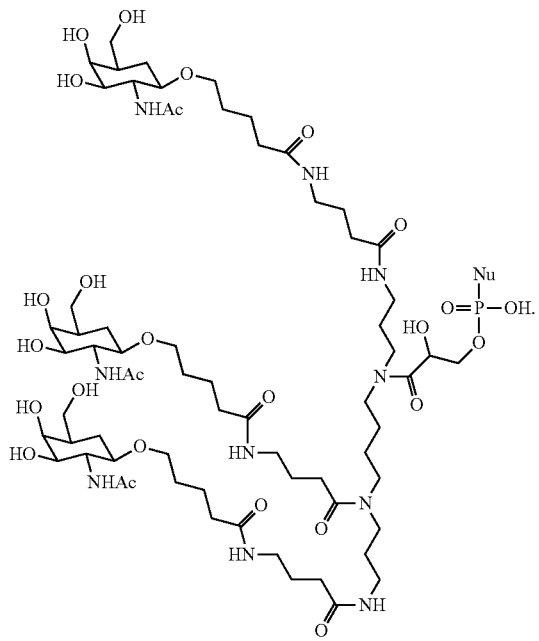

6. The siRNA conjugate according to claim 1, wherein the P atom in Formula (A59) is linked to a terminal region of the sense or antisense strand of the siRNA, and the terminal region refers to the first 4 nucleotides counted from one terminal of the sense or antisense strand; or
the P atom in Formula (A59) is linked to one terminal of the sense or antisense strand of the siRNA; or
the P atom in Formula (A59) is linked to 3' terminal of the sense strand of the siRNA; or
the P atom in Formula (A59) is linked to position 2', 3', or 5' of a nucleotide in the siRNA by a phosphodiester bond.

7. The siRNA conjugate according to claim 1, wherein the sense strand further comprises a nucleotide sequence III, the antisense strand further comprises a nucleotide sequence IV; and the nucleotide sequence III and the nucleotide sequence IV independently of one another have a length of 1 to 4 nucleotides; the nucleotide sequence III is linked to 5' terminal of the nucleotide sequence I, the nucleotide sequence IV is linked to 3' terminal of the nucleotide sequence II; the nucleotide sequence III and the nucleotide sequence IV have an equal length, and are substantially reverse complementary or completely reverse complementary to each other; the "substantially reverse complementary" means that there is no more than 1 base mispairing between two nucleotide sequences; and the "completely reverse complementary" means that there is no mispairing between two nucleotide sequences.

8. The siRNA conjugate according to claim 7, wherein i) the nucleotide sequence I is the nucleotide sequence as shown by SEQ ID NO: 3; the nucleotide sequence II is the nucleotide sequence as shown by SEQ ID NO: 4; and the nucleotide sequence III and the nucleotide sequence IV both have a length of 1 nucleotide, and the base of the nucleotide sequence III is C; or
the nucleotide sequence III and the nucleotide sequence IV both have a length of 2 nucleotides, and in the direction from 5' terminal to 3' terminal, the base composition of the nucleotide sequence III is CC; or
the nucleotide sequence III and the nucleotide sequence IV both have a length of 3 nucleotides, and in the direction from 5' terminal to 3' terminal, the base composition of the nucleotide sequence III is CCC; or
the nucleotide sequence III and the nucleotide sequence IV both have a length of 4 nucleotides, and in the direction from 5' terminal to 3' terminal, the base composition of the nucleotide sequence III is ACCC; or
ii) the nucleotide sequence I is the nucleotide sequence as shown by SEQ ID NO: 63; the nucleotide sequence II is the nucleotide sequence as shown by SEQ ID NO: 64; and the nucleotide sequence III and the nucleotide sequence IV both have a length of 1 nucleotide, and the base of the nucleotide sequence III is U; or
the nucleotide sequence III and the nucleotide sequence IV both have a length of 2 nucleotides, and in the direction from 5' terminal to 3' terminal, the base composition of the nucleotide sequence III is GU; or
the nucleotide sequence III and the nucleotide sequence IV both have a length of 3 nucleotides, and in the direction from 5' terminal to 3' terminal, the base composition of the nucleotide sequence III is GGU; or
the nucleotide sequence III and the nucleotide sequence IV both have a length of 4 nucleotides, and in the direction from 5' terminal to 3' terminal, the base composition of the nucleotide sequence III is GGGU; or
iii) the nucleotide sequence I is the nucleotide sequence as shown by SEQ ID NO: 123; the nucleotide sequence II is the nucleotide sequence as shown by SEQ ID NO: 124; and the nucleotide sequence III and the nucleotide sequence IV both have a length of 1 nucleotide, and the base of the nucleotide sequence III is G; or
the nucleotide sequence III and the nucleotide sequence IV both have a length of 2 nucleotides, and in the direction from 5' terminal to 3' terminal, the base composition of the nucleotide sequence III is AG; or the nucleotide sequence III and the nucleotide sequence IV both have a length of 3 nucleotides, and in the direction from 5' terminal to 3' terminal, the base composition of the nucleotide sequence III is UAG; or the nucleotide sequence III and the nucleotide sequence IV both have a length of 4 nucleotides, and in the direction from 5' terminal to 3' terminal, the base composition of the nucleotide sequence III is AUAG; or iv) the nucleotide sequence I is the nucleotide sequence as shown by SEQ ID NO: 183; the nucleotide sequence II is the nucleotide sequence as shown by SEQ ID NO: 184; and the nucleotide sequence III and the nucleotide sequence IV both have a length of 1 nucleotide, and the base of the nucleotide sequence III is C; or the nucleotide sequence III and the nucleotide sequence IV both have a length of 2 nucleotides, and in the direction from 5' terminal to 3' terminal, the base composition of the nucleotide sequence III is AC; or the nucleotide sequence III and the nucleotide sequence IV both have a length of 3 nucleotides, and in the direction from 5' terminal to 3' terminal, the base composition of the nucleotide sequence III is GAC; or the nucleotide sequence III and the nucleotide sequence IV both have a length of 4 nucleotides, and in the direction from 5' terminal to 3' terminal, the base composition of the nucleotide sequence III is AGAC;

v) the nucleotide sequence I is the nucleotide sequence as shown by SEQ ID NO: 243; the nucleotide sequence II is the nucleotide sequence as shown by SEQ ID NO: 244; and the nucleotide sequence III and the nucleotide sequence IV both have a length of 1 nucleotide, and the base of the nucleotide sequence III is G; or the nucleotide sequence III and the nucleotide sequence IV both have a length of 2 nucleotides, and in the direction from 5' terminal to 3' terminal, the base composition of the nucleotide sequence III is UG; or the nucleotide sequence III and the nucleotide sequence IV both have a length of 3 nucleotides, and in the direction from 5' terminal to 3' terminal, the base composition of the nucleotide sequence III is CUG; or the nucleotide sequence III and the nucleotide sequence IV both have a length of 4 nucleotides, and in the direction from 5' terminal to 3' terminal, the base composition of the nucleotide sequence III is UCUG; or vi) the nucleotide sequence I is the nucleotide sequence as shown by SEQ ID NO: 303; the nucleotide sequence II is the nucleotide sequence as shown by SEQ ID NO: 304; and the nucleotide sequence III and the nucleotide sequence IV both have a length of 1 nucleotide, and the base of the nucleotide sequence III is G; or the nucleotide sequence III and the nucleotide sequence IV both have a length of 2 nucleotides, and in the direction from 5' terminal to 3' terminal, the base composition of the nucleotide sequence III is UG; or the nucleotide sequence III and the nucleotide sequence IV both have a length of 3 nucleotides, and in the direction from 5' terminal to 3' terminal, the base composition of the nucleotide sequence III is AUG; or the nucleotide sequence III and the nucleotide sequence IV both have a length of 4 nucleotides, and in the direction from 5' terminal to 3' terminal, the base composition of the nucleotide sequence III is UAUG.

9. The siRNA conjugate according to claim 1, wherein the antisense strand further comprises a nucleotide sequence V, which has a length of 1 to 3 nucleotides and is linked to 3' terminal of the antisense strand, thereby forming a 3' overhang terminal of the antisense strand; or the nucleotide sequence V has a length of 2 nucleotides; or the nucleotide sequence V is 2 consecutive thymine deoxyribonucleotides or 2 consecutive uracil ribonucleotides; or the nucleotide sequence V is complementary to the nucleotides at the corresponding positions of the target mRNA.

10. The siRNA conjugate according to claim 1, wherein the sense strand of the siRNA comprises the nucleotide sequence as shown by SEQ ID NO: 5, and the antisense strand of the siRNA comprises the nucleotide sequence as shown by SEQ ID NO: 6; or the sense strand of the siRNA comprises the nucleotide sequence as shown by SEQ ID NO: 7, and the antisense strand of the siRNA comprises the nucleotide sequence as shown by SEQ ID NO: 8; or the sense strand of the siRNA comprises the nucleotide sequence as shown by SEQ ID NO: 65, and the antisense strand of the siRNA comprises the nucleotide sequence as shown by SEQ ID NO: 66; or the sense strand of the siRNA comprises the nucleotide sequence as shown by SEQ ID NO: 67, and the antisense strand of the siRNA comprises the nucleotide sequence as shown by SEQ ID NO: 68; or the sense strand of the siRNA comprises the nucleotide sequence as shown by SEQ ID NO: 125, and the antisense strand of the siRNA comprises the nucleotide sequence as shown by SEQ ID NO: 126; or the sense strand of the siRNA comprises the nucleotide sequence as shown by SEQ ID NO: 127, and the antisense strand of the siRNA comprises the nucleotide sequence as shown by SEQ ID NO: 128; or the sense strand of the siRNA comprises the nucleotide sequence as shown by SEQ ID NO: 185, and the antisense strand of the siRNA comprises the nucleotide sequence as shown by SEQ ID NO: 186; or the sense strand of the siRNA comprises the nucleotide sequence as shown by SEQ ID NO: 187, and the antisense strand of the siRNA comprises the nucleotide sequence as shown by SEQ ID NO: 188; or the sense strand of the siRNA comprises the nucleotide sequence as shown by SEQ ID NO: 245, and the antisense strand of the siRNA comprises the nucleotide sequence as shown by SEQ ID NO: 246; or the sense strand of the siRNA comprises the nucleotide sequence as shown by SEQ ID NO: 247, and the antisense strand of the siRNA comprises the nucleotide sequence as shown by SEQ ID NO: 248; or the sense strand of the siRNA comprises the nucleotide sequence as shown by SEQ ID NO: 305, and the antisense strand of the siRNA comprises the nucleotide sequence as shown by SEQ ID NO: 306; or the sense strand of the siRNA comprises the nucleotide sequence as shown by SEQ ID NO: 307, and the antisense strand of the siRNA comprises the nucleotide sequence as shown by SEQ ID NO: 308.

11. The siRNA conjugate according to claim 1, wherein the siRNA has the nucleotide sequence as shown by siPCSKa1, siPCSKa2, siPCSKb1, siPCSKb2, siPCSKc1, siPCSKc2, siPCSKd1, siPCSKd2, siPCSKe1, siPCSKe2, siPCSKf1 or siPCSKf2.

12. The siRNA conjugate according to claim 1, wherein each nucleotide in the sense strand and antisense strand is independently a fluoro modified nucleotide or a non-fluoro modified nucleotide; or the fluoro modified nucleotides are located in the nucleotide sequence I and the nucleotide sequence II; and in the direction from 5' terminal to 3' terminal, the nucleotides at least at positions 7, 8 and 9 of the nucleotide sequence I are fluoro modified nucleotides; and in the direction from 5' terminal to 3' terminal, the nucleotides at least at positions 2, 6, 14, and 16 of the nucleotide sequence II are fluoro modified nucleotides; or in the direction from 5' terminal to 3' terminal, the nucleotides at positions 7, 8 and 9 or at positions 5, 7, 8 and 9 of the nucleotide sequence I in the sense strand are fluoro modified nucleotides, and the nucleotides at the other positions in the sense strand are non-fluoro modified nucleotides; in the direction from 5' terminal to 3' terminal, the nucleotides at positions 2, 6, 14 and 16 or at positions 2, 6, 8, 9, 14, and 16 of the nucleotide sequence II in the antisense strand are fluoro modified nucleotides, and the nucleotides at the other positions in the antisense strand are non-fluoro modified nucleotides.

13. The siRNA conjugate according to claim 12, wherein each non-fluoro modified nucleotide is independently a nucleotide formed by substituting the 2'-hydroxy of the ribose group of a nucleotide with a non-fluoro group, or a nucleotide analogue; or the nucleotide formed by substituting the 2'-hydroxy of the ribose group of a nucleotide with a non-fluoro group is selected from the group consisting of 2'-alkoxy modified nucleotide, 2'-substituted alkoxy modified nucleotide, 2'-alkyl modified nucleotide, 2'-substituted alkyl modified nucleotide, 2'-amino modified nucleotide, 2'-substituted amino modified nucleotide, and 2'-deoxy nucleotide; and the nucleotide analogue is selected from the group consisting of an isonucleotide, LNA, ENA, cET, UNA, and GNA, wherein LNA, ENA, cET, UNA and GNA are represented by Formulae (12), (13), (14), (15) and (16), respectively:

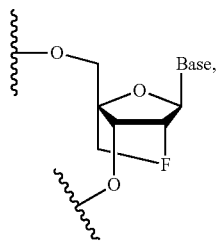

Formula (12)

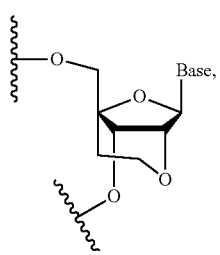

Formula (13)

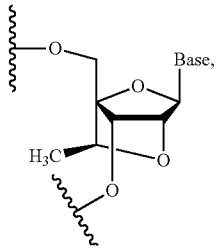

Formula (14)

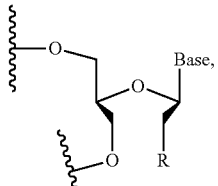

Formula (15)

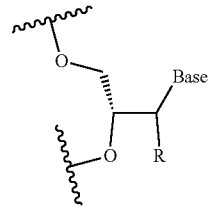

Formula (16)

in the above Formulae (15) and (16), R is selected from H, OH or alkoxy (O-alkyl); or each non-fluoro modified nucleotide is a methoxy modified nucleotide, wherein the methoxy modified nucleotide refers to a nucleotide formed by substituting 2'-hydroxy of the ribose group with a methoxy group.

14. The siRNA conjugate according to claim 1, wherein in the direction from 5' terminal to 3' terminal, the nucleotides at positions 5, 7, 8 and 9 of the nucleotide sequence I in the sense strand of the siRNA are fluoro modified nucleotides, and the nucleotides at the other positions in the sense strand of the siRNA are methoxy modified nucleotides; and in the direction from 5' terminal to 3' terminal, the nucleotides at positions 2, 6, 8, 9, 14 and 16 of the nucleotide sequence II in the antisense strand of the siRNA are fluoro modified nucleotides, and the nucleotides at the other positions in the antisense strand of the siRNA are methoxy modified nucleotides; or in the direction from 5' terminal to 3' terminal, the nucleotides at positions 5, 7, 8 and 9 of the nucleotide sequence I in the sense strand of the siRNA are fluoro modified nucleotides, and the nucleotides at the other positions of the sense strand of the siRNA are methoxy modified nucleotides; and in the direction from 5' terminal to 3' terminal, the nucleotides at positions 2, 6, 14 and 16 of the nucleotide sequence II in the antisense strand of the siRNA are fluoro modified nucleotides, and the nucleotides at the other positions in the antisense strand are methoxy modified nucleotides; or in the direction from 5' terminal to 3' terminal, the nucleotides at positions 7, 8 and 9 of the nucleotide sequence I in the sense strand of the siRNA are fluoro modified nucleotides, and the nucleotides at the other positions in the sense strand of the siRNA are methoxy modified nucleotides; and in the direction from 5' terminal to 3' terminal, the nucleotides at positions 2, 6, 14 and 16 of the nucleotide sequence II in the antisense strand of the siRNA are fluoro modified nucleotides, and the nucleotides at the other positions in the antisense strand of the siRNA are methoxy modified nucleotides.

15. The siRNA conjugate according to claim 1, wherein in the siRNA, at least one phosphate group is a phosphorothioate group, and the phosphorothioate linkage is located in at least one of the group consisting of the following positions:
the position between the first and second nucleotides at 5' terminal of the sense strand;
the position between the second and third nucleotides at 5' terminal of the sense strand;
the position between the first and second nucleotides at 3' terminal of the sense strand;
the position between the second and third nucleotides at 3' terminal of the sense strand;
the position between the first and second nucleotides at 5' terminal of the antisense strand;
the position between the second and third nucleotides at 5' terminal of the antisense strand;
the position between the first and second nucleotides at 3' terminal of the antisense strand; and
the position between the second and third nucleotides at 3' terminal of the antisense strand.

16. The siRNA conjugate according to claim 1, wherein the nucleotide at 5'-terminal of the antisense strand of the siRNA is a 5'-phosphate nucleotide or a 5'-phosphate analogue modified nucleotide; or
the 5'-phosphate nucleotide is a nucleotide having a structure as shown by Formula (2); and the 5'-phosphate analogue modified nucleotide is a nucleotide having a structure as shown by any one of Formulae (3) to (6):

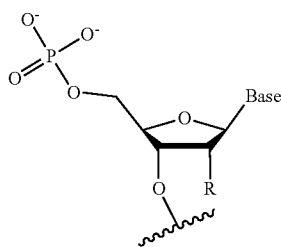

Formula (2)

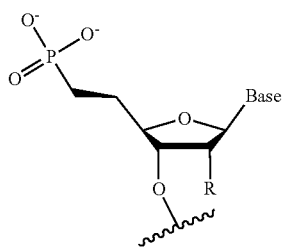

Formula (3)

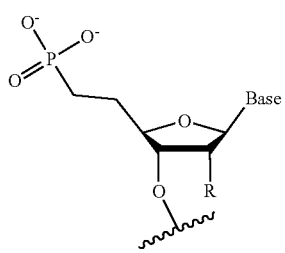

Formula (4)

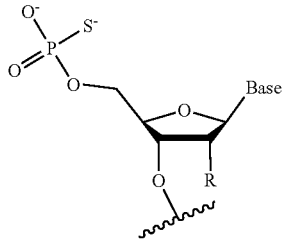

Formula (5)

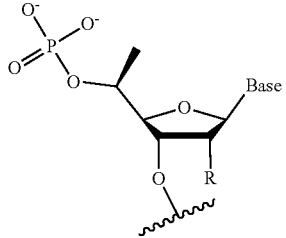

Formula (6)

wherein R is selected from H, OH, methoxy or F;
"Base" represents a base selected from A, U, C, G, or T.

17. The siRNA conjugate according to claim 1, wherein the siRNA is any one of siPCSKa1-M1, siPCSKa1-M2, siPCSKa1-M3, siPCSKa2-M1, siPCSKa2-M2, siPCSKa2-M3, siPCSKb1-M1, siPCSKb1-M2, siPCSKb1-M3, siPCSKb2-M1, siPCSKb2-M2, siPCSKb2-M3, siPCSKc1-M1, siPCSKc1-M2, siPCSKc1-M3, siPCSKc2-M1, siPCSKc2-M2, siPCSKc2-M3, siPCSKd1-M1, siPCSKd1-M2, siPCSKd1-M3, siPCSKd2-M1, siPCSKd2-M2, siPCSKd2-M3, siPCSKe1-M1, siPCSKe1-M2, siPCSKe1-M3, siPCSKe2-M1, siPCSKe2-M2, siPCSKe2-M3, siPCSKf1-M1, siPCSKf1-M2, siPCSKf1-M3, siPCSKf2-M1, siPCSKf2-M2 or siPCSKf2-M3; or
wherein the siRNA is any one of siPCSKa1-MIS, siPCSKa1-M2S, siPCSKa1-M3S, siPCSKa2-MIS, siPCSKa2-M2S, siPCSKa2-M3S, siPCSKb1-MIS, siPCSKb1-M2S, siPCSKb1-M3S, siPCSKb2-M1S, siPCSKb2-M2S, siPCSKb2-M3S, siPCSKc1-MIS, siPCSKc1-M2S, siPCSKc1-M3S, siPCSKc2-MIS, siPCSKc2-M2S, siPCSKc2-M3S, siPCSKd1-MIS, siPCSKd1-M2S, siPCSKd1-M3S, siPCSKd2-MIS, siPCSKd2-M2S, siPCSKd2-M3S, siPCSKe1-MIS, siPCSKe1-M2S, siPCSKe1-M3S, siPCSKe2-MIS, siPCSKe2-M2S, siPCSKe2-M3S, siPCSKf1-MIS, siPCSKf1-M2S, siPCSKf1-M3S, siPCSKf2-M1S, siPCSKf2-M2S or siPCSKf2-M3S; or
wherein the siRNA is any one of siPCSKa1-M1P1, siPCSKa1-M2P1, siPCSKa1-M3P1, siPCSKa2-M1P1, siPCSKa2-M2P1, siPCSKa2-M3P1, siPCSKa1-M1SP1, siPCSKa1-M2SP1, siPCSKa1-M3SP1, siPCSKa2-M1SP1, siPCSKa2-M2SP1, siPCSKa2-M3SP1, siPCSKb1-M1P1, siPCSKb1-M2P1, siPCSKb1-M3P1, siPCSKb2-M1P1, siPCSKb2-M2P1, siPCSKb2-M3P1, siPCSKb1-M1SP1, siPCSKb1-M2SP1, siPCSKb1-M3SP1, siPCSKb2-M1SP1, siPCSKb2-M2SP1, siPCSKb2-M3SP1, siPCSKc1-M1P1, siPCSKc1-M2P1, siPCSKc1-M3P1, siPCSKc2-M1P1, siPCSKc2-M2P1, siPCSKc2-M3P1, siPCSKc1-M1SP1, siPCSKc1-M2SP1, siPCSKc1-M3SP1, siPCSKc2-M1SP1, siPCSKc2-M2SP1, siPCSKc2-M3SP1, siPCSKd1-M1P1, siPCSKd1-M2P1, siPCSKd1-M3P1, siPCSKd2-M1P1, siPCSKd2-M2P1, siPCSKd2-M3P1, siPCSKd1-

M1SP1, siPCSKd1-M2SP1, siPCSKd1-M3SP1, siPCSKd2-M1SP1, siPCSKd2-M2SP1, siPCSKd2-M3SP1, siPCSKe1-M1P1, siPCSKe1-M2P1, siPCSKe1-M3P1, siPCSKe2-M1P1, siPCSKe2-M2P1, siPCSKe2-M3P1, siPCSKe1-M1SP1, siPCSKe1-M2SP1, siPCSKe1-M3SP1, siPCSKe2-M1SP1, siPCSKe2-M2SP1, siPCSKe2-M3SP1, siPCSKf1-M1P1, siPCSKf1-M2P1, siPCSKf1-M3P1, siPCSKf2-M1P1, siPCSKf2-M2P1, siPCSKf2-M3P1, siPCSKf1-M1SP1, siPCSKf1-M2SP1, siPCSKf1-M3SP1, siPCSKf2-M1SP1, siPCSKf2-M2SP1 or siPCSKf2-M3SP1.

18. A method for treating diseases or physiological conditions caused by abnormal expression of PCSK9 gene, comprising administering an effective amount of the siRNA conjugate according to claim 1 to a subject suffering from the diseases or physiological conditions.

19. A method for inhibiting the expression of PCSK9 gene in hepatocytes, comprising contacting an effective amount of the siRNA conjugate according to claim 1 with the hepatocytes.

\* \* \* \* \*

SEQUENCE LISTING

```
<160> NUMBER OF SEQ ID NOS: 426

<210> SEQ ID NO 1
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z1, Z1 is C

<400> SEQUENCE: 1
aagcaagcag acauuuaun                                                 19

<210> SEQ ID NO 2
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
```

```
<222> LOCATION: (1)..(1)
<223> OTHER INFORMATION: n is Z2, Z2 is G

<400> SEQUENCE: 2
nauaaauguc ugcuugcuu                                                    19

<210> SEQ ID NO 3
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z3, Z3 is A, U, G or C

<400> SEQUENCE: 3
aagcaagcag acauuuaun                                                    19

<210> SEQ ID NO 4
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z4, Z4 is a nucleotide complementary to
      Z3, Z3 is selected from A, U, G or C

<400> SEQUENCE: 4
nauaaauguc ugcuugcuu                                                    19

<210> SEQ ID NO 5
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z3, Z3 is A, U, G or C

<400> SEQUENCE: 5
aagcaagcag acauuuaun                                                    19

<210> SEQ ID NO 6
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z4, Z4 is a nucleotide complementary to
      Z3, Z3 is selected from A, U, G or C

<400> SEQUENCE: 6
nauaaauguc ugcuugcuug g                                                 21

<210> SEQ ID NO 7
<211> LENGTH: 21
<212> TYPE: RNA
<213> ORGANISM: Artificial Sequence
<220> FEATURE:
```

```
<223> OTHER INFORMATION: siRNA
<220> FEATURE:
<221> NAME/KEY: misc_feature
<222> LOCATION: (21)..(21)
<223> OTHER INFORMATION: n is Z3, Z3 is A, U, G or C

<400> SEQUENCE: 7
ccaagcaagc agacauuuau n                                              21

<210> SEQ ID NO 8
<211> LENGTH: 23
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z4, Z4 is a nucleotide complementary to
      Z3, Z3 is selected from A, U, G or C

<400> SEQUENCE: 8
nauaaauguc ugcuugcuug ggu                                            23

<210> SEQ ID NO 9
<211> LENGTH: 19
<212> TYPE: RNA
<213> ORGANISM: Artificial Sequence
<220> FEATURE:
<223> OTHER INFORMATION: siRNA

<400> SEQUENCE: 9
aagcaagcag acauuuauc                                                 19

<210> SEQ ID NO 10
<211> LENGTH: 21
<212> TYPE: RNA
<213> ORGANISM: Artificial Sequence
<220> FEATURE:
<223> OTHER INFORMATION: siRNA

<400> SEQUENCE: 10
gauaaauguc ugcuugcuug g                                              21

<210> SEQ ID NO 11
<211> LENGTH: 21
<212> TYPE: RNA
<213> ORGANISM: Artificial Sequence
<220> FEATURE:
<223> OTHER INFORMATION: siRNA

<400> SEQUENCE: 11
ccaagcaagc agacauuuau c                                              21

<210> SEQ ID NO 12
<211> LENGTH: 23
<212> TYPE: RNA
<213> ORGANISM: Artificial Sequence
<220> FEATURE:
<223> OTHER INFORMATION: siRNA

<400> SEQUENCE: 12
gauaaauguc ugcuugcuug ggu                                            23

<210> SEQ ID NO 13
<211> LENGTH: 19
<212> TYPE: RNA
```

```
<213> ORGANISM: Artificial Sequence
<220> FEATURE:
<223> OTHER INFORMATION: siRNA

<400> SEQUENCE: 13
aagcaagcag acauuuauc                                                      19

<210> SEQ ID NO 14
<211> LENGTH: 21
<212> TYPE: RNA
<213> ORGANISM: Artificial Sequence
<220> FEATURE:
<223> OTHER INFORMATION: siRNA

<400> SEQUENCE: 14
gauaaauguc ugcuugcuug g                                                   21

<210> SEQ ID NO 15
<211> LENGTH: 19
<212> TYPE: RNA
<213> ORGANISM: Artificial Sequence
<220> FEATURE:
<223> OTHER INFORMATION: siRNA

<400> SEQUENCE: 15
aagcaagcag acauuuauc                                                      19

<210> SEQ ID NO 16
<211> LENGTH: 21
<212> TYPE: RNA
<213> ORGANISM: Artificial Sequence
<220> FEATURE:
<223> OTHER INFORMATION: siRNA

<400> SEQUENCE: 16
gauaaauguc ugcuugcuug g                                                   21

<210> SEQ ID NO 17
<211> LENGTH: 19
<212> TYPE: RNA
<213> ORGANISM: Artificial Sequence
<220> FEATURE:
<223> OTHER INFORMATION: siRNA

<400> SEQUENCE: 17
aagcaagcag acauuuauc                                                      19

<210> SEQ ID NO 18
<211> LENGTH: 21
<212> TYPE: RNA
<213> ORGANISM: Artificial Sequence
<220> FEATURE:
<223> OTHER INFORMATION: siRNA

<400> SEQUENCE: 18
gauaaauguc ugcuugcuug g                                                   21

<210> SEQ ID NO 19
<211> LENGTH: 21
<212> TYPE: RNA
<213> ORGANISM: Artificial Sequence
<220> FEATURE:
<223> OTHER INFORMATION: siRNA

<400> SEQUENCE: 19
ccaagcaagc agacauuuau c                                                   21
```

```
<210> SEQ ID NO 20
<211> LENGTH: 23
<212> TYPE: RNA
<213> ORGANISM: Artificial Sequence
<220> FEATURE:
<223> OTHER INFORMATION: siRNA

<400> SEQUENCE: 20
gauaaauguc ugcuugcuug ggu                                             23

<210> SEQ ID NO 21
<211> LENGTH: 21
<212> TYPE: RNA
<213> ORGANISM: Artificial Sequence
<220> FEATURE:
<223> OTHER INFORMATION: siRNA

<400> SEQUENCE: 21
ccaagcaagc agacauuuau c                                               21

<210> SEQ ID NO 22
<211> LENGTH: 23
<212> TYPE: RNA
<213> ORGANISM: Artificial Sequence
<220> FEATURE:
<223> OTHER INFORMATION: siRNA

<400> SEQUENCE: 22
gauaaauguc ugcuugcuug ggu                                             23

<210> SEQ ID NO 23
<211> LENGTH: 21
<212> TYPE: RNA
<213> ORGANISM: Artificial Sequence
<220> FEATURE:
<223> OTHER INFORMATION: siRNA

<400> SEQUENCE: 23
ccaagcaagc agacauuuau c                                               21

<210> SEQ ID NO 24
<211> LENGTH: 23
<212> TYPE: RNA
<213> ORGANISM: Artificial Sequence
<220> FEATURE:
<223> OTHER INFORMATION: siRNA

<400> SEQUENCE: 24
gauaaauguc ugcuugcuug ggu                                             23

<210> SEQ ID NO 25
<211> LENGTH: 19
<212> TYPE: RNA
<213> ORGANISM: Artificial Sequence
<220> FEATURE:
<223> OTHER INFORMATION: siRNA

<400> SEQUENCE: 25
aagcaagcag acauuuauc                                                  19

<210> SEQ ID NO 26
<211> LENGTH: 21
<212> TYPE: RNA
<213> ORGANISM: Artificial Sequence
<220> FEATURE:
```

<223> OTHER INFORMATION: siRNA

<400> SEQUENCE: 26
gauaaauguc ugcuugcuug g                                                 21

<210> SEQ ID NO 27
<211> LENGTH: 19
<212> TYPE: RNA
<213> ORGANISM: Artificial Sequence
<220> FEATURE:
<223> OTHER INFORMATION: siRNA

<400> SEQUENCE: 27
aagcaagcag acauuuauc                                                    19

<210> SEQ ID NO 28
<211> LENGTH: 21
<212> TYPE: RNA
<213> ORGANISM: Artificial Sequence
<220> FEATURE:
<223> OTHER INFORMATION: siRNA

<400> SEQUENCE: 28
gauaaauguc ugcuugcuug g                                                 21

<210> SEQ ID NO 29
<211> LENGTH: 19
<212> TYPE: RNA
<213> ORGANISM: Artificial Sequence
<220> FEATURE:
<223> OTHER INFORMATION: siRNA

<400> SEQUENCE: 29
aagcaagcag acauuuauc                                                    19

<210> SEQ ID NO 30
<211> LENGTH: 21
<212> TYPE: RNA
<213> ORGANISM: Artificial Sequence
<220> FEATURE:
<223> OTHER INFORMATION: siRNA

<400> SEQUENCE: 30
gauaaauguc ugcuugcuug g                                                 21

<210> SEQ ID NO 31
<211> LENGTH: 21
<212> TYPE: RNA
<213> ORGANISM: Artificial Sequence
<220> FEATURE:
<223> OTHER INFORMATION: siRNA

<400> SEQUENCE: 31
ccaagcaagc agacauuuau c                                                 21

<210> SEQ ID NO 32
<211> LENGTH: 23
<212> TYPE: RNA
<213> ORGANISM: Artificial Sequence
<220> FEATURE:
<223> OTHER INFORMATION: siRNA

<400> SEQUENCE: 32
gauaaauguc ugcuugcuug ggu                                               23

```
<210> SEQ ID NO 33
<211> LENGTH: 21
<212> TYPE: RNA
<213> ORGANISM: Artificial Sequence
<220> FEATURE:
<223> OTHER INFORMATION: siRNA

<400> SEQUENCE: 33
ccaagcaagc agacauuuau c                                              21

<210> SEQ ID NO 34
<211> LENGTH: 23
<212> TYPE: RNA
<213> ORGANISM: Artificial Sequence
<220> FEATURE:
<223> OTHER INFORMATION: siRNA

<400> SEQUENCE: 34
gauaaauguc ugcuugcuug ggu                                            23

<210> SEQ ID NO 35
<211> LENGTH: 21
<212> TYPE: RNA
<213> ORGANISM: Artificial Sequence
<220> FEATURE:
<223> OTHER INFORMATION: siRNA

<400> SEQUENCE: 35
ccaagcaagc agacauuuau c                                              21

<210> SEQ ID NO 36
<211> LENGTH: 23
<212> TYPE: RNA
<213> ORGANISM: Artificial Sequence
<220> FEATURE:
<223> OTHER INFORMATION: siRNA

<400> SEQUENCE: 36
gauaaauguc ugcuugcuug ggu                                            23

<210> SEQ ID NO 37
<211> LENGTH: 19
<212> TYPE: RNA
<213> ORGANISM: Artificial Sequence
<220> FEATURE:
<223> OTHER INFORMATION: siRNA

<400> SEQUENCE: 37
aagcaagcag acauuuauc                                                 19

<210> SEQ ID NO 38
<211> LENGTH: 21
<212> TYPE: RNA
<213> ORGANISM: Artificial Sequence
<220> FEATURE:
<223> OTHER INFORMATION: siRNA

<400> SEQUENCE: 38
gauaaauguc ugcuugcuug g                                              21

<210> SEQ ID NO 39
<211> LENGTH: 19
<212> TYPE: RNA
<213> ORGANISM: Artificial Sequence
<220> FEATURE:
<223> OTHER INFORMATION: siRNA
```

```
<400> SEQUENCE: 39
aagcaagcag acauuuauc                                                    19

<210> SEQ ID NO 40
<211> LENGTH: 21
<212> TYPE: RNA
<213> ORGANISM: Artificial Sequence
<220> FEATURE:
<223> OTHER INFORMATION: siRNA

<400> SEQUENCE: 40
gauaaauguc ugcuugcuug g                                                 21

<210> SEQ ID NO 41
<211> LENGTH: 19
<212> TYPE: RNA
<213> ORGANISM: Artificial Sequence
<220> FEATURE:
<223> OTHER INFORMATION: siRNA

<400> SEQUENCE: 41
aagcaagcag acauuuauc                                                    19

<210> SEQ ID NO 42
<211> LENGTH: 21
<212> TYPE: RNA
<213> ORGANISM: Artificial Sequence
<220> FEATURE:
<223> OTHER INFORMATION: siRNA

<400> SEQUENCE: 42
gauaaauguc ugcuugcuug g                                                 21

<210> SEQ ID NO 43
<211> LENGTH: 21
<212> TYPE: RNA
<213> ORGANISM: Artificial Sequence
<220> FEATURE:
<223> OTHER INFORMATION: siRNA

<400> SEQUENCE: 43
ccaagcaagc agacauuuau c                                                 21

<210> SEQ ID NO 44
<211> LENGTH: 23
<212> TYPE: RNA
<213> ORGANISM: Artificial Sequence
<220> FEATURE:
<223> OTHER INFORMATION: siRNA

<400> SEQUENCE: 44
gauaaauguc ugcuugcuug ggu                                               23

<210> SEQ ID NO 45
<211> LENGTH: 23
<212> TYPE: RNA
<213> ORGANISM: Artificial Sequence
<220> FEATURE:
<223> OTHER INFORMATION: siRNA

<400> SEQUENCE: 45
gauaaauguc ugcuugcuug ggu                                               23

<210> SEQ ID NO 46
<211> LENGTH: 23
```

```
<212> TYPE: RNA
<213> ORGANISM: Artificial Sequence
<220> FEATURE:
<223> OTHER INFORMATION: siRNA

<400> SEQUENCE: 46
gauaaauguc ugcuugcuug ggu                                             23

<210> SEQ ID NO 47
<211> LENGTH: 21
<212> TYPE: RNA
<213> ORGANISM: Artificial Sequence
<220> FEATURE:
<223> OTHER INFORMATION: siRNA

<400> SEQUENCE: 47
ccaagcaagc agacauuuau c                                               21

<210> SEQ ID NO 48
<211> LENGTH: 23
<212> TYPE: RNA
<213> ORGANISM: Artificial Sequence
<220> FEATURE:
<223> OTHER INFORMATION: siRNA

<400> SEQUENCE: 48
gauaaauguc ugcuugcuug ggu                                             23

<210> SEQ ID NO 49
<211> LENGTH: 19
<212> TYPE: RNA
<213> ORGANISM: Artificial Sequence
<220> FEATURE:
<223> OTHER INFORMATION: siRNA

<400> SEQUENCE: 49
aagcaagcag acauuuauc                                                  19

<210> SEQ ID NO 50
<211> LENGTH: 21
<212> TYPE: RNA
<213> ORGANISM: Artificial Sequence
<220> FEATURE:
<223> OTHER INFORMATION: siRNA

<400> SEQUENCE: 50
gauaaauguc ugcuugcuug g                                               21

<210> SEQ ID NO 51
<211> LENGTH: 19
<212> TYPE: RNA
<213> ORGANISM: Artificial Sequence
<220> FEATURE:
<223> OTHER INFORMATION: siRNA

<400> SEQUENCE: 51
aagcaagcag acauuuauc                                                  19

<210> SEQ ID NO 52
<211> LENGTH: 21
<212> TYPE: RNA
<213> ORGANISM: Artificial Sequence
<220> FEATURE:
<223> OTHER INFORMATION: siRNA

<400> SEQUENCE: 52
```
gauaaauguc ugcuugcuug g                                           21

<210> SEQ ID NO 53
<211> LENGTH: 19
<212> TYPE: RNA
<213> ORGANISM: Artificial Sequence
<220> FEATURE:
<223> OTHER INFORMATION: siRNA

<400> SEQUENCE: 53
aagcaagcag acauuuauc                                              19

<210> SEQ ID NO 54
<211> LENGTH: 21
<212> TYPE: RNA
<213> ORGANISM: Artificial Sequence
<220> FEATURE:
<223> OTHER INFORMATION: siRNA

<400> SEQUENCE: 54
gauaaauguc ugcuugcuug g                                           21

<210> SEQ ID NO 55
<211> LENGTH: 21
<212> TYPE: RNA
<213> ORGANISM: Artificial Sequence
<220> FEATURE:
<223> OTHER INFORMATION: siRNA

<400> SEQUENCE: 55
ccaagcaagc agacauuuau c                                           21

<210> SEQ ID NO 56
<211> LENGTH: 23
<212> TYPE: RNA
<213> ORGANISM: Artificial Sequence
<220> FEATURE:
<223> OTHER INFORMATION: siRNA

<400> SEQUENCE: 56
gauaaauguc ugcuugcuug ggu                                         23

<210> SEQ ID NO 57
<211> LENGTH: 21
<212> TYPE: RNA
<213> ORGANISM: Artificial Sequence
<220> FEATURE:
<223> OTHER INFORMATION: siRNA

<400> SEQUENCE: 57
ccaagcaagc agacauuuau c                                           21

<210> SEQ ID NO 58
<211> LENGTH: 23
<212> TYPE: RNA
<213> ORGANISM: Artificial Sequence
<220> FEATURE:
<223> OTHER INFORMATION: siRNA

<400> SEQUENCE: 58
gauaaauguc ugcuugcuug ggu                                         23

<210> SEQ ID NO 59
<211> LENGTH: 21
<212> TYPE: RNA
<213> ORGANISM: Artificial Sequence

```
<220> FEATURE:
<223> OTHER INFORMATION: siRNA

<400> SEQUENCE: 59
ccaagcaagc agacauuuau c                                              21

<210> SEQ ID NO 60
<211> LENGTH: 23
<212> TYPE: RNA
<213> ORGANISM: Artificial Sequence
<220> FEATURE:
<223> OTHER INFORMATION: siRNA

<400> SEQUENCE: 60
gauaaauguc ugcuugcuug ggu                                            23

<210> SEQ ID NO 61
<211> LENGTH: 19
<212> TYPE: RNA
<213> ORGANISM: Artificial Sequence
<220> FEATURE:
<223> OTHER INFORMATION: siRNA

<400> SEQUENCE: 61
uuuguagcau uuuuauuaa                                                 19

<210> SEQ ID NO 62
<211> LENGTH: 19
<212> TYPE: RNA
<213> ORGANISM: Artificial Sequence
<220> FEATURE:
<223> OTHER INFORMATION: siRNA

<400> SEQUENCE: 62
uuaauaaaaa ugcuacaaa                                                 19

<210> SEQ ID NO 63
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z7, Z7 is A, U,G or C

<400> SEQUENCE: 63
uuuguagcau uuuuauuan                                                 19

<210> SEQ ID NO 64
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z8, Z8 is a nucleotide complementary to
      Z7, Z7 is selected from A, U, G or C

<400> SEQUENCE: 64
nuaauaaaaa ugcuacaaa                                                 19

<210> SEQ ID NO 65
<211> LENGTH: 19
```

```
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z7, Z7 is A, U,G or C

<400> SEQUENCE: 65
uuuguagcau uuuuauuan                                                    19

<210> SEQ ID NO 66
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z8, Z8 is a nucleotide complementary to
     Z7, Z7 is selected from A, U, G or C

<400> SEQUENCE: 66
nuaauaaaaa ugcuacaaaa c                                                 21

<210> SEQ ID NO 67
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (21)..(21)
<223> OTHER INFORMATION: n is Z7, Z7 is A, U,G or C

<400> SEQUENCE: 67 guuuguagc auuuuauua n                                                   21

<210> SEQ ID NO 68
<211> LENGTH: 23
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z8, Z8 is a nucleotide complementary to
     Z7, Z7 is selected from A, U, G or C

<400> SEQUENCE: 68
nuaauaaaaa ugcuacaaaa ccc                                               23

<210> SEQ ID NO 69
<211> LENGTH: 19
<212> TYPE: RNA
<213> ORGANISM: Artificial Sequence
<220> FEATURE:
<223> OTHER INFORMATION: siRNA

<400> SEQUENCE: 69
uuuguagcau uuuuauuaa                                                    19

<210> SEQ ID NO 70
<211> LENGTH: 21
<212> TYPE: RNA
```

```
<213> ORGANISM: Artificial Sequence
<220> FEATURE:
<223> OTHER INFORMATION: siRNA

<400> SEQUENCE: 70
uuaauaaaaa ugcuacaaaa c                                              21

<210> SEQ ID NO 71
<211> LENGTH: 21
<212> TYPE: RNA
<213> ORGANISM: Artificial Sequence
<220> FEATURE:
<223> OTHER INFORMATION: siRNA

<400> SEQUENCE: 71 guuuguagc auuuuauua a                                                21

<210> SEQ ID NO 72
<211> LENGTH: 23
<212> TYPE: RNA
<213> ORGANISM: Artificial Sequence
<220> FEATURE:
<223> OTHER INFORMATION: siRNA

<400> SEQUENCE: 72
uuaauaaaaa ugcuacaaaa ccc                                            23

<210> SEQ ID NO 73
<211> LENGTH: 19
<212> TYPE: RNA
<213> ORGANISM: Artificial Sequence
<220> FEATURE:
<223> OTHER INFORMATION: siRNA

<400> SEQUENCE: 73
uuuguagcau uuuauuaa                                                  19

<210> SEQ ID NO 74
<211> LENGTH: 21
<212> TYPE: RNA
<213> ORGANISM: Artificial Sequence
<220> FEATURE:
<223> OTHER INFORMATION: siRNA

<400> SEQUENCE: 74
uuaauaaaaa ugcuacaaaa c                                              21

<210> SEQ ID NO 75
<211> LENGTH: 19
<212> TYPE: RNA
<213> ORGANISM: Artificial Sequence
<220> FEATURE:
<223> OTHER INFORMATION: siRNA

<400> SEQUENCE: 75
uuuguagcau uuuauuaa                                                  19

<210> SEQ ID NO 76
<211> LENGTH: 21
<212> TYPE: RNA
<213> ORGANISM: Artificial Sequence
<220> FEATURE:
<223> OTHER INFORMATION: siRNA

<400> SEQUENCE: 76
uuaauaaaaa ugcuacaaaa c                                              21
```

<210> SEQ ID NO 77
<211> LENGTH: 19
<212> TYPE: RNA
<213> ORGANISM: Artificial Sequence
<220> FEATURE:
<223> OTHER INFORMATION: siRNA

<400> SEQUENCE: 77
uuuguagcau uuuuauuaa                                                    19

<210> SEQ ID NO 78
<211> LENGTH: 21
<212> TYPE: RNA
<213> ORGANISM: Artificial Sequence
<220> FEATURE:
<223> OTHER INFORMATION: siRNA

<400> SEQUENCE: 78
uuaauaaaaa ugcuacaaaa c                                                 21

<210> SEQ ID NO 79
<211> LENGTH: 21
<212> TYPE: RNA
<213> ORGANISM: Artificial Sequence
<220> FEATURE:
<223> OTHER INFORMATION: siRNA

<400> SEQUENCE: 79 guuuguagc auuuuauua a                                                   21

<210> SEQ ID NO 80
<211> LENGTH: 23
<212> TYPE: RNA
<213> ORGANISM: Artificial Sequence
<220> FEATURE:
<223> OTHER INFORMATION: siRNA

<400> SEQUENCE: 80
uuaauaaaaa ugcuacaaaa ccc                                               23

<210> SEQ ID NO 81
<211> LENGTH: 21
<212> TYPE: RNA
<213> ORGANISM: Artificial Sequence
<220> FEATURE:
<223> OTHER INFORMATION: siRNA

<400> SEQUENCE: 81 guuuguagc auuuuauua a                                                   21

<210> SEQ ID NO 82
<211> LENGTH: 23
<212> TYPE: RNA
<213> ORGANISM: Artificial Sequence
<220> FEATURE:
<223> OTHER INFORMATION: siRNA

<400> SEQUENCE: 82
uuaauaaaaa ugcuacaaaa ccc                                               23

<210> SEQ ID NO 83
<211> LENGTH: 21
<212> TYPE: RNA
<213> ORGANISM: Artificial Sequence
<220> FEATURE:

<223> OTHER INFORMATION: siRNA

<400> SEQUENCE: 83
guuuuguagc auuuuauua a    21

<210> SEQ ID NO 84
<211> LENGTH: 23
<212> TYPE: RNA
<213> ORGANISM: Artificial Sequence
<220> FEATURE:
<223> OTHER INFORMATION: siRNA

<400> SEQUENCE: 84
uuaauaaaaa ugcuacaaaa ccc    23

<210> SEQ ID NO 85
<211> LENGTH: 19
<212> TYPE: RNA
<213> ORGANISM: Artificial Sequence
<220> FEATURE:
<223> OTHER INFORMATION: siRNA

<400> SEQUENCE: 85
uuuguagcau uuuauuaa    19

<210> SEQ ID NO 86
<211> LENGTH: 21
<212> TYPE: RNA
<213> ORGANISM: Artificial Sequence
<220> FEATURE:
<223> OTHER INFORMATION: siRNA

<400> SEQUENCE: 86
uuaauaaaaa ugcuacaaaa c    21

<210> SEQ ID NO 87
<211> LENGTH: 19
<212> TYPE: RNA
<213> ORGANISM: Artificial Sequence
<220> FEATURE:
<223> OTHER INFORMATION: siRNA

<400> SEQUENCE: 87
uuuguagcau uuuauuaa    19

<210> SEQ ID NO 88
<211> LENGTH: 21
<212> TYPE: RNA
<213> ORGANISM: Artificial Sequence
<220> FEATURE:
<223> OTHER INFORMATION: siRNA

<400> SEQUENCE: 88
uuaauaaaaa ugcuacaaaa c    21

<210> SEQ ID NO 89
<211> LENGTH: 19
<212> TYPE: RNA
<213> ORGANISM: Artificial Sequence
<220> FEATURE:
<223> OTHER INFORMATION: siRNA

<400> SEQUENCE: 89
uuuguagcau uuuauuaa    19

```
<210> SEQ ID NO 90
<211> LENGTH: 21
<212> TYPE: RNA
<213> ORGANISM: Artificial Sequence
<220> FEATURE:
<223> OTHER INFORMATION: siRNA

<400> SEQUENCE: 90
uuaauaaaaa ugcuacaaaa c                                             21

<210> SEQ ID NO 91
<211> LENGTH: 21
<212> TYPE: RNA
<213> ORGANISM: Artificial Sequence
<220> FEATURE:
<223> OTHER INFORMATION: siRNA

<400> SEQUENCE: 91
guuuuguagc auuuuauua a                                              21

<210> SEQ ID NO 92
<211> LENGTH: 23
<212> TYPE: RNA
<213> ORGANISM: Artificial Sequence
<220> FEATURE:
<223> OTHER INFORMATION: siRNA

<400> SEQUENCE: 92
uuaauaaaaa ugcuacaaaa ccc                                           23

<210> SEQ ID NO 93
<211> LENGTH: 21
<212> TYPE: RNA
<213> ORGANISM: Artificial Sequence
<220> FEATURE:
<223> OTHER INFORMATION: siRNA

<400> SEQUENCE: 93
guuuuguagc auuuuauua a                                              21

<210> SEQ ID NO 94
<211> LENGTH: 23
<212> TYPE: RNA
<213> ORGANISM: Artificial Sequence
<220> FEATURE:
<223> OTHER INFORMATION: siRNA

<400> SEQUENCE: 94
uuaauaaaaa ugcuacaaaa ccc                                           23

<210> SEQ ID NO 95
<211> LENGTH: 21
<212> TYPE: RNA
<213> ORGANISM: Artificial Sequence
<220> FEATURE:
<223> OTHER INFORMATION: siRNA

<400> SEQUENCE: 95
guuuuguagc auuuuauua a                                              21

<210> SEQ ID NO 96
<211> LENGTH: 23
<212> TYPE: RNA
<213> ORGANISM: Artificial Sequence
<220> FEATURE:
<223> OTHER INFORMATION: siRNA
```

```
<400> SEQUENCE: 96
uuaauaaaaa ugcuacaaaa ccc                                          23

<210> SEQ ID NO 97
<211> LENGTH: 19
<212> TYPE: RNA
<213> ORGANISM: Artificial Sequence
<220> FEATURE:
<223> OTHER INFORMATION: siRNA

<400> SEQUENCE: 97
uuuguagcau uuuuauuaa                                               19

<210> SEQ ID NO 98
<211> LENGTH: 21
<212> TYPE: RNA
<213> ORGANISM: Artificial Sequence
<220> FEATURE:
<223> OTHER INFORMATION: siRNA

<400> SEQUENCE: 98
uuaauaaaaa ugcuacaaaa c                                            21

<210> SEQ ID NO 99
<211> LENGTH: 19
<212> TYPE: RNA
<213> ORGANISM: Artificial Sequence
<220> FEATURE:
<223> OTHER INFORMATION: siRNA

<400> SEQUENCE: 99
uuuguagcau uuuuauuaa                                               19

<210> SEQ ID NO 100
<211> LENGTH: 21
<212> TYPE: RNA
<213> ORGANISM: Artificial Sequence
<220> FEATURE:
<223> OTHER INFORMATION: siRNA

<400> SEQUENCE: 100
uuaauaaaaa ugcuacaaaa c                                            21

<210> SEQ ID NO 101
<211> LENGTH: 19
<212> TYPE: RNA
<213> ORGANISM: Artificial Sequence
<220> FEATURE:
<223> OTHER INFORMATION: siRNA

<400> SEQUENCE: 101
uuuguagcau uuuuauuaa                                               19

<210> SEQ ID NO 102
<211> LENGTH: 21
<212> TYPE: RNA
<213> ORGANISM: Artificial Sequence
<220> FEATURE:
<223> OTHER INFORMATION: siRNA

<400> SEQUENCE: 102
uuaauaaaaa ugcuacaaaa c                                            21

<210> SEQ ID NO 103
<211> LENGTH: 21
```

```
<212> TYPE: RNA
<213> ORGANISM: Artificial Sequence
<220> FEATURE:
<223> OTHER INFORMATION: siRNA

<400> SEQUENCE: 103 guuuguagc auuuuauua a                                        21

<210> SEQ ID NO 104
<211> LENGTH: 23
<212> TYPE: RNA
<213> ORGANISM: Artificial Sequence
<220> FEATURE:
<223> OTHER INFORMATION: siRNA

<400> SEQUENCE: 104
uuaauaaaaa ugcuacaaaa ccc                                    23

<210> SEQ ID NO 105
<211> LENGTH: 21
<212> TYPE: RNA
<213> ORGANISM: Artificial Sequence
<220> FEATURE:
<223> OTHER INFORMATION: siRNA

<400> SEQUENCE: 105 guuuguagc auuuuauua a                                        21

<210> SEQ ID NO 106
<211> LENGTH: 23
<212> TYPE: RNA
<213> ORGANISM: Artificial Sequence
<220> FEATURE:
<223> OTHER INFORMATION: siRNA

<400> SEQUENCE: 106
uuaauaaaaa ugcuacaaaa ccc                                    23

<210> SEQ ID NO 107
<211> LENGTH: 21
<212> TYPE: RNA
<213> ORGANISM: Artificial Sequence
<220> FEATURE:
<223> OTHER INFORMATION: siRNA

<400> SEQUENCE: 107 guuuguagc auuuuauua a                                        21

<210> SEQ ID NO 108
<211> LENGTH: 23
<212> TYPE: RNA
<213> ORGANISM: Artificial Sequence
<220> FEATURE:
<223> OTHER INFORMATION: siRNA

<400> SEQUENCE: 108
uuaauaaaaa ugcuacaaaa ccc                                    23

<210> SEQ ID NO 109
<211> LENGTH: 19
<212> TYPE: RNA
<213> ORGANISM: Artificial Sequence
<220> FEATURE:
<223> OTHER INFORMATION: siRNA

<400> SEQUENCE: 109
```

```
uuuguagcau uuuuauuaa                                                    19

<210> SEQ ID NO 110
<211> LENGTH: 21
<212> TYPE: RNA
<213> ORGANISM: Artificial Sequence
<220> FEATURE:
<223> OTHER INFORMATION: siRNA

<400> SEQUENCE: 110
uuaauaaaaa ugcuacaaaa c                                                 21

<210> SEQ ID NO 111
<211> LENGTH: 19
<212> TYPE: RNA
<213> ORGANISM: Artificial Sequence
<220> FEATURE:
<223> OTHER INFORMATION: siRNA

<400> SEQUENCE: 111
uuuguagcau uuuuauuaa                                                    19

<210> SEQ ID NO 112
<211> LENGTH: 21
<212> TYPE: RNA
<213> ORGANISM: Artificial Sequence
<220> FEATURE:
<223> OTHER INFORMATION: siRNA

<400> SEQUENCE: 112
uuaauaaaaa ugcuacaaaa c                                                 21

<210> SEQ ID NO 113
<211> LENGTH: 19
<212> TYPE: RNA
<213> ORGANISM: Artificial Sequence
<220> FEATURE:
<223> OTHER INFORMATION: siRNA

<400> SEQUENCE: 113
uuuguagcau uuuuauuaa                                                    19

<210> SEQ ID NO 114
<211> LENGTH: 21
<212> TYPE: RNA
<213> ORGANISM: Artificial Sequence
<220> FEATURE:
<223> OTHER INFORMATION: siRNA

<400> SEQUENCE: 114
uuaauaaaaa ugcuacaaaa c                                                 21

<210> SEQ ID NO 115
<211> LENGTH: 21
<212> TYPE: RNA
<213> ORGANISM: Artificial Sequence
<220> FEATURE:
<223> OTHER INFORMATION: siRNA

<400> SEQUENCE: 115
guuuuguagc auuuuuauua a                                                 21

<210> SEQ ID NO 116
<211> LENGTH: 23
<212> TYPE: RNA
<213> ORGANISM: Artificial Sequence
```

```
<220> FEATURE:
<223> OTHER INFORMATION: siRNA

<400> SEQUENCE: 116
uuaauaaaaa ugcuacaaaa ccc                                               23

<210> SEQ ID NO 117
<211> LENGTH: 21
<212> TYPE: RNA
<213> ORGANISM: Artificial Sequence
<220> FEATURE:
<223> OTHER INFORMATION: siRNA

<400> SEQUENCE: 117 guuuguagc auuuuauua a                                                   21

<210> SEQ ID NO 118
<211> LENGTH: 23
<212> TYPE: RNA
<213> ORGANISM: Artificial Sequence
<220> FEATURE:
<223> OTHER INFORMATION: siRNA

<400> SEQUENCE: 118
uuaauaaaaa ugcuacaaaa ccc                                               23

<210> SEQ ID NO 119
<211> LENGTH: 21
<212> TYPE: RNA
<213> ORGANISM: Artificial Sequence
<220> FEATURE:
<223> OTHER INFORMATION: siRNA

<400> SEQUENCE: 119 guuuguagc auuuuauua a                                                   21

<210> SEQ ID NO 120
<211> LENGTH: 23
<212> TYPE: RNA
<213> ORGANISM: Artificial Sequence
<220> FEATURE:
<223> OTHER INFORMATION: siRNA

<400> SEQUENCE: 120
uuaauaaaaa ugcuacaaaa ccc                                               23

<210> SEQ ID NO 121
<211> LENGTH: 19
<212> TYPE: RNA
<213> ORGANISM: Artificial Sequence
<220> FEATURE:
<223> OTHER INFORMATION: siRNA

<400> SEQUENCE: 121
gccuggaguu uauucggaa                                                    19

<210> SEQ ID NO 122
<211> LENGTH: 19
<212> TYPE: RNA
<213> ORGANISM: Artificial Sequence
<220> FEATURE:
<223> OTHER INFORMATION: siRNA

<400> SEQUENCE: 122
uuccgaauaa acuccaggc                                                    19
```

```
<210> SEQ ID NO 123
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z11, Z11 is A, U, G or C

<400> SEQUENCE: 123
gccuggaguu uauucggan                                                19

<210> SEQ ID NO 124
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z12, Z12 is a nucleotide complementary to
      Z11, Z11 is selected from A, U, G or C

<400> SEQUENCE: 124
nuccgaauaa acuccaggc                                                19

<210> SEQ ID NO 125
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z11, Z11 is A, U, G or C

<400> SEQUENCE: 125
gccuggaguu uauucggan                                                19

<210> SEQ ID NO 126
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z12, Z12 is a nucleotide complementary to
      Z11, Z11 is selected from A, U, G or C

<400> SEQUENCE: 126
nuccgaauaa acuccaggcc u                                             21

<210> SEQ ID NO 127
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (21)..(21)
<223> OTHER INFORMATION: n is Z11, Z11 is A, U, G or C

<400> SEQUENCE: 127
```
aggccuggag uuuauucgga n                                         21

<210> SEQ ID NO 128
<211> LENGTH: 23
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z12, Z12 is a nucleotide complementary to
      Z11, Z11 is selected from A, U, G or C

<400> SEQUENCE: 128
nuccgaauaa acuccaggcc uau                                       23

<210> SEQ ID NO 129
<211> LENGTH: 19
<212> TYPE: RNA
<213> ORGANISM: Artificial Sequence
<220> FEATURE:
<223> OTHER INFORMATION: siRNA

<400> SEQUENCE: 129
gccuggaguu uauucggaa                                            19

<210> SEQ ID NO 130
<211> LENGTH: 21
<212> TYPE: RNA
<213> ORGANISM: Artificial Sequence
<220> FEATURE:
<223> OTHER INFORMATION: siRNA

<400> SEQUENCE: 130
uuccgaauaa acuccaggcc u                                         21

<210> SEQ ID NO 131
<211> LENGTH: 21
<212> TYPE: RNA
<213> ORGANISM: Artificial Sequence
<220> FEATURE:
<223> OTHER INFORMATION: siRNA

<400> SEQUENCE: 131
aggccuggag uuuauucgga a                                         21

<210> SEQ ID NO 132
<211> LENGTH: 23
<212> TYPE: RNA
<213> ORGANISM: Artificial Sequence
<220> FEATURE:
<223> OTHER INFORMATION: siRNA

<400> SEQUENCE: 132
uuccgaauaa acuccaggcc uau                                       23

<210> SEQ ID NO 133
<211> LENGTH: 19
<212> TYPE: RNA
<213> ORGANISM: Artificial Sequence
<220> FEATURE:
<223> OTHER INFORMATION: siRNA

<400> SEQUENCE: 133
gccuggaguu uauucggaa                                            19

```
<210> SEQ ID NO 134
<211> LENGTH: 21
<212> TYPE: RNA
<213> ORGANISM: Artificial Sequence
<220> FEATURE:
<223> OTHER INFORMATION: siRNA

<400> SEQUENCE: 134
uuccgaauaa acuccaggcc u                                              21

<210> SEQ ID NO 135
<211> LENGTH: 19
<212> TYPE: RNA
<213> ORGANISM: Artificial Sequence
<220> FEATURE:
<223> OTHER INFORMATION: siRNA

<400> SEQUENCE: 135
gccuggaguu uauucggaa                                                 19

<210> SEQ ID NO 136
<211> LENGTH: 21
<212> TYPE: RNA
<213> ORGANISM: Artificial Sequence
<220> FEATURE:
<223> OTHER INFORMATION: siRNA

<400> SEQUENCE: 136
uuccgaauaa acuccaggcc u                                              21

<210> SEQ ID NO 137
<211> LENGTH: 19
<212> TYPE: RNA
<213> ORGANISM: Artificial Sequence
<220> FEATURE:
<223> OTHER INFORMATION: siRNA

<400> SEQUENCE: 137
gccuggaguu uauucggaa                                                 19

<210> SEQ ID NO 138
<211> LENGTH: 21
<212> TYPE: RNA
<213> ORGANISM: Artificial Sequence
<220> FEATURE:
<223> OTHER INFORMATION: siRNA

<400> SEQUENCE: 138
uuccgaauaa acuccaggcc u                                              21

<210> SEQ ID NO 139
<211> LENGTH: 21
<212> TYPE: RNA
<213> ORGANISM: Artificial Sequence
<220> FEATURE:
<223> OTHER INFORMATION: siRNA

<400> SEQUENCE: 139
aggccuggag uuuauucgga a                                              21

<210> SEQ ID NO 140
<211> LENGTH: 23
<212> TYPE: RNA
<213> ORGANISM: Artificial Sequence
<220> FEATURE:
```

<223> OTHER INFORMATION: siRNA

<400> SEQUENCE: 140
uuccgaauaa acuccaggcc uau                               23

<210> SEQ ID NO 141
<211> LENGTH: 21
<212> TYPE: RNA
<213> ORGANISM: Artificial Sequence
<220> FEATURE:
<223> OTHER INFORMATION: siRNA

<400> SEQUENCE: 141
aggccuggag uuuauucgga a                                 21

<210> SEQ ID NO 142
<211> LENGTH: 23
<212> TYPE: RNA
<213> ORGANISM: Artificial Sequence
<220> FEATURE:
<223> OTHER INFORMATION: siRNA

<400> SEQUENCE: 142
uuccgaauaa acuccaggcc uau                               23

<210> SEQ ID NO 143
<211> LENGTH: 21
<212> TYPE: RNA
<213> ORGANISM: Artificial Sequence
<220> FEATURE:
<223> OTHER INFORMATION: siRNA

<400> SEQUENCE: 143
aggccuggag uuuauucgga a                                 21

<210> SEQ ID NO 144
<211> LENGTH: 23
<212> TYPE: RNA
<213> ORGANISM: Artificial Sequence
<220> FEATURE:
<223> OTHER INFORMATION: siRNA

<400> SEQUENCE: 144
uuccgaauaa acuccaggcc uau                               23

<210> SEQ ID NO 145
<211> LENGTH: 19
<212> TYPE: RNA
<213> ORGANISM: Artificial Sequence
<220> FEATURE:
<223> OTHER INFORMATION: siRNA

<400> SEQUENCE: 145
gccuggaguu uauucggaa                                    19

<210> SEQ ID NO 146
<211> LENGTH: 21
<212> TYPE: RNA
<213> ORGANISM: Artificial Sequence
<220> FEATURE:
<223> OTHER INFORMATION: siRNA

<400> SEQUENCE: 146
uuccgaauaa acuccaggcc u                                 21

```
<210> SEQ ID NO 147
<211> LENGTH: 19
<212> TYPE: RNA
<213> ORGANISM: Artificial Sequence
<220> FEATURE:
<223> OTHER INFORMATION: siRNA

<400> SEQUENCE: 147
gccuggaguu uauucggaa                                                  19

<210> SEQ ID NO 148
<211> LENGTH: 21
<212> TYPE: RNA
<213> ORGANISM: Artificial Sequence
<220> FEATURE:
<223> OTHER INFORMATION: siRNA

<400> SEQUENCE: 148
uuccgaauaa acuccaggcc u                                               21

<210> SEQ ID NO 149
<211> LENGTH: 19
<212> TYPE: RNA
<213> ORGANISM: Artificial Sequence
<220> FEATURE:
<223> OTHER INFORMATION: siRNA

<400> SEQUENCE: 149
gccuggaguu uauucggaa                                                  19

<210> SEQ ID NO 150
<211> LENGTH: 21
<212> TYPE: RNA
<213> ORGANISM: Artificial Sequence
<220> FEATURE:
<223> OTHER INFORMATION: siRNA

<400> SEQUENCE: 150
uuccgaauaa acuccaggcc u                                               21

<210> SEQ ID NO 151
<211> LENGTH: 21
<212> TYPE: RNA
<213> ORGANISM: Artificial Sequence
<220> FEATURE:
<223> OTHER INFORMATION: siRNA

<400> SEQUENCE: 151
aggccuggag uuuauucgga a                                               21

<210> SEQ ID NO 152
<211> LENGTH: 23
<212> TYPE: RNA
<213> ORGANISM: Artificial Sequence
<220> FEATURE:
<223> OTHER INFORMATION: siRNA

<400> SEQUENCE: 152
uuccgaauaa acuccaggcc uau                                             23

<210> SEQ ID NO 153
<211> LENGTH: 21
<212> TYPE: RNA
<213> ORGANISM: Artificial Sequence
<220> FEATURE:
<223> OTHER INFORMATION: siRNA
```

```
<400> SEQUENCE: 153
aggccuggag uuuauucgga a                                              21

<210> SEQ ID NO 154
<211> LENGTH: 23
<212> TYPE: RNA
<213> ORGANISM: Artificial Sequence
<220> FEATURE:
<223> OTHER INFORMATION: siRNA

<400> SEQUENCE: 154
uuccgaauaa acuccaggcc uau                                            23

<210> SEQ ID NO 155
<211> LENGTH: 21
<212> TYPE: RNA
<213> ORGANISM: Artificial Sequence
<220> FEATURE:
<223> OTHER INFORMATION: siRNA

<400> SEQUENCE: 155
aggccuggag uuuauucgga a                                              21

<210> SEQ ID NO 156
<211> LENGTH: 23
<212> TYPE: RNA
<213> ORGANISM: Artificial Sequence
<220> FEATURE:
<223> OTHER INFORMATION: siRNA

<400> SEQUENCE: 156
uuccgaauaa acuccaggcc uau                                            23

<210> SEQ ID NO 157
<211> LENGTH: 19
<212> TYPE: RNA
<213> ORGANISM: Artificial Sequence
<220> FEATURE:
<223> OTHER INFORMATION: siRNA

<400> SEQUENCE: 157
gccuggaguu uauucggaa                                                 19

<210> SEQ ID NO 158
<211> LENGTH: 21
<212> TYPE: RNA
<213> ORGANISM: Artificial Sequence
<220> FEATURE:
<223> OTHER INFORMATION: siRNA

<400> SEQUENCE: 158
uuccgaauaa acuccaggcc u                                              21

<210> SEQ ID NO 159
<211> LENGTH: 19
<212> TYPE: RNA
<213> ORGANISM: Artificial Sequence
<220> FEATURE:
<223> OTHER INFORMATION: siRNA

<400> SEQUENCE: 159
gccuggaguu uauucggaa                                                 19

<210> SEQ ID NO 160
<211> LENGTH: 21
```

```
<212> TYPE: RNA
<213> ORGANISM: Artificial Sequence
<220> FEATURE:
<223> OTHER INFORMATION: siRNA

<400> SEQUENCE: 160
uuccgaauaa acuccaggcc u                                              21

<210> SEQ ID NO 161
<211> LENGTH: 19
<212> TYPE: RNA
<213> ORGANISM: Artificial Sequence
<220> FEATURE:
<223> OTHER INFORMATION: siRNA

<400> SEQUENCE: 161
gccuggaguu uauucggaa                                                 19

<210> SEQ ID NO 162
<211> LENGTH: 21
<212> TYPE: RNA
<213> ORGANISM: Artificial Sequence
<220> FEATURE:
<223> OTHER INFORMATION: siRNA

<400> SEQUENCE: 162
uuccgaauaa acuccaggcc u                                              21

<210> SEQ ID NO 163
<211> LENGTH: 21
<212> TYPE: RNA
<213> ORGANISM: Artificial Sequence
<220> FEATURE:
<223> OTHER INFORMATION: siRNA

<400> SEQUENCE: 163
aggccuggag uuuauucgga a                                              21

<210> SEQ ID NO 164
<211> LENGTH: 23
<212> TYPE: RNA
<213> ORGANISM: Artificial Sequence
<220> FEATURE:
<223> OTHER INFORMATION: siRNA

<400> SEQUENCE: 164
uuccgaauaa acuccaggcc uau                                            23

<210> SEQ ID NO 165
<211> LENGTH: 21
<212> TYPE: RNA
<213> ORGANISM: Artificial Sequence
<220> FEATURE:
<223> OTHER INFORMATION: siRNA

<400> SEQUENCE: 165
aggccuggag uuuauucgga a                                              21

<210> SEQ ID NO 166
<211> LENGTH: 23
<212> TYPE: RNA
<213> ORGANISM: Artificial Sequence
<220> FEATURE:
<223> OTHER INFORMATION: siRNA

<400> SEQUENCE: 166
```
uuccgaauaa acuccaggcc uau                                                 23

<210> SEQ ID NO 167
<211> LENGTH: 21
<212> TYPE: RNA
<213> ORGANISM: Artificial Sequence
<220> FEATURE:
<223> OTHER INFORMATION: siRNA

<400> SEQUENCE: 167
aggccuggag uuuauucgga a                                                   21

<210> SEQ ID NO 168
<211> LENGTH: 23
<212> TYPE: RNA
<213> ORGANISM: Artificial Sequence
<220> FEATURE:
<223> OTHER INFORMATION: siRNA

<400> SEQUENCE: 168
uuccgaauaa acuccaggcc uau                                                 23

<210> SEQ ID NO 169
<211> LENGTH: 19
<212> TYPE: RNA
<213> ORGANISM: Artificial Sequence
<220> FEATURE:
<223> OTHER INFORMATION: siRNA

<400> SEQUENCE: 169
gccuggaguu uauucggaa                                                      19

<210> SEQ ID NO 170
<211> LENGTH: 21
<212> TYPE: RNA
<213> ORGANISM: Artificial Sequence
<220> FEATURE:
<223> OTHER INFORMATION: siRNA

<400> SEQUENCE: 170
uuccgaauaa acuccaggcc u                                                   21

<210> SEQ ID NO 171
<211> LENGTH: 19
<212> TYPE: RNA
<213> ORGANISM: Artificial Sequence
<220> FEATURE:
<223> OTHER INFORMATION: siRNA

<400> SEQUENCE: 171
gccuggaguu uauucggaa                                                      19

<210> SEQ ID NO 172
<211> LENGTH: 21
<212> TYPE: RNA
<213> ORGANISM: Artificial Sequence
<220> FEATURE:
<223> OTHER INFORMATION: siRNA

<400> SEQUENCE: 172
uuccgaauaa acuccaggcc u                                                   21

<210> SEQ ID NO 173
<211> LENGTH: 19
<212> TYPE: RNA
<213> ORGANISM: Artificial Sequence

```
<220> FEATURE:
<223> OTHER INFORMATION: siRNA

<400> SEQUENCE: 173
gccuggaguu uauucggaa                                                 19

<210> SEQ ID NO 174
<211> LENGTH: 21
<212> TYPE: RNA
<213> ORGANISM: Artificial Sequence
<220> FEATURE:
<223> OTHER INFORMATION: siRNA

<400> SEQUENCE: 174
uuccgaauaa acuccaggcc u                                              21

<210> SEQ ID NO 175
<211> LENGTH: 21
<212> TYPE: RNA
<213> ORGANISM: Artificial Sequence
<220> FEATURE:
<223> OTHER INFORMATION: siRNA

<400> SEQUENCE: 175
aggccuggag uuuauucgga a                                              21

<210> SEQ ID NO 176
<211> LENGTH: 23
<212> TYPE: RNA
<213> ORGANISM: Artificial Sequence
<220> FEATURE:
<223> OTHER INFORMATION: siRNA

<400> SEQUENCE: 176
uuccgaauaa acuccaggcc uau                                            23

<210> SEQ ID NO 177
<211> LENGTH: 21
<212> TYPE: RNA
<213> ORGANISM: Artificial Sequence
<220> FEATURE:
<223> OTHER INFORMATION: siRNA

<400> SEQUENCE: 177
aggccuggag uuuauucgga a                                              21

<210> SEQ ID NO 178
<211> LENGTH: 23
<212> TYPE: RNA
<213> ORGANISM: Artificial Sequence
<220> FEATURE:
<223> OTHER INFORMATION: siRNA

<400> SEQUENCE: 178
uuccgaauaa acuccaggcc uau                                            23

<210> SEQ ID NO 179
<211> LENGTH: 21
<212> TYPE: RNA
<213> ORGANISM: Artificial Sequence
<220> FEATURE:
<223> OTHER INFORMATION: siRNA

<400> SEQUENCE: 179
aggccuggag uuuauucgga a                                              21
```

```
<210> SEQ ID NO 180
<211> LENGTH: 23
<212> TYPE: RNA
<213> ORGANISM: Artificial Sequence
<220> FEATURE:
<223> OTHER INFORMATION: siRNA

<400> SEQUENCE: 180
uuccgaauaa acuccaggcc uau                                              23

<210> SEQ ID NO 181
<211> LENGTH: 19
<212> TYPE: RNA
<213> ORGANISM: Artificial Sequence
<220> FEATURE:
<223> OTHER INFORMATION: siRNA

<400> SEQUENCE: 181
cuguuuugcu uuguaacu                                                    19

<210> SEQ ID NO 182
<211> LENGTH: 19
<212> TYPE: RNA
<213> ORGANISM: Artificial Sequence
<220> FEATURE:
<223> OTHER INFORMATION: siRNA

<400> SEQUENCE: 182
aguuacaaaa gcaaaacag                                                   19

<210> SEQ ID NO 183
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z15, Z15 is A, U, G or C

<400> SEQUENCE: 183
cuguuuugcu uuguaacn                                                    19

<210> SEQ ID NO 184
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z16, Z16 is a nucleotide complementary to
      Z15, Z15 is selected from A, U, G or C

<400> SEQUENCE: 184
nguuacaaaa gcaaaacag                                                   19

<210> SEQ ID NO 185
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
```

<223> OTHER INFORMATION: n is Z15, Z15 is A, U, G or C

<400> SEQUENCE: 185
cuguuuugcu uuuguaacn                                                    19

<210> SEQ ID NO 186
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z16, Z16 is a nucleotide complementary to
      Z15, Z15 is selected from A, U, G or C

<400> SEQUENCE: 186
nguuacaaaa gcaaaacagg u                                                 21

<210> SEQ ID NO 187
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (21)..(21)
<223> OTHER INFORMATION: n is Z15, Z15 is A, U, G or C

<400> SEQUENCE: 187
accuguuuug cuuuuguaac n                                                 21

<210> SEQ ID NO 188
<211> LENGTH: 23
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z16, Z16 is a nucleotide complementary to
      Z15, Z15 is selected from A, U, G or C

<400> SEQUENCE: 188
nguuacaaaa gcaaaacagg ucu                                               23

<210> SEQ ID NO 189
<211> LENGTH: 19
<212> TYPE: RNA
<213> ORGANISM: Artificial Sequence
<220> FEATURE:
<223> OTHER INFORMATION: siRNA

<400> SEQUENCE: 189
cuguuuugcu uuuguaacu                                                    19

<210> SEQ ID NO 190
<211> LENGTH: 21
<212> TYPE: RNA
<213> ORGANISM: Artificial Sequence
<220> FEATURE:
<223> OTHER INFORMATION: siRNA

<400> SEQUENCE: 190
aguuacaaaa gcaaaacagg u                                                 21

```
<210> SEQ ID NO 191
<211> LENGTH: 21
<212> TYPE: RNA
<213> ORGANISM: Artificial Sequence
<220> FEATURE:
<223> OTHER INFORMATION: siRNA

<400> SEQUENCE: 191
accuguuuug cuuuguaac u                                              21

<210> SEQ ID NO 192
<211> LENGTH: 23
<212> TYPE: RNA
<213> ORGANISM: Artificial Sequence
<220> FEATURE:
<223> OTHER INFORMATION: siRNA

<400> SEQUENCE: 192
aguuacaaaa gcaaaacagg ucu                                           23

<210> SEQ ID NO 193
<211> LENGTH: 19
<212> TYPE: RNA
<213> ORGANISM: Artificial Sequence
<220> FEATURE:
<223> OTHER INFORMATION: siRNA

<400> SEQUENCE: 193
cuguuuugcu uuuguaacu                                                19

<210> SEQ ID NO 194
<211> LENGTH: 21
<212> TYPE: RNA
<213> ORGANISM: Artificial Sequence
<220> FEATURE:
<223> OTHER INFORMATION: siRNA

<400> SEQUENCE: 194
aguuacaaaa gcaaaacagg u                                             21

<210> SEQ ID NO 195
<211> LENGTH: 19
<212> TYPE: RNA
<213> ORGANISM: Artificial Sequence
<220> FEATURE:
<223> OTHER INFORMATION: siRNA

<400> SEQUENCE: 195 cguuuugcu uuuguaacu                                                 19

<210> SEQ ID NO 196
<211> LENGTH: 21
<212> TYPE: RNA
<213> ORGANISM: Artificial Sequence
<220> FEATURE:
<223> OTHER INFORMATION: siRNA

<400> SEQUENCE: 196
aguuacaaaa gcaaaacagg u                                             21

<210> SEQ ID NO 197
<211> LENGTH: 19
<212> TYPE: RNA
<213> ORGANISM: Artificial Sequence
<220> FEATURE:
```

<223> OTHER INFORMATION: siRNA

<400> SEQUENCE: 197
cuguuuugcu uuuguaacu                                               19

<210> SEQ ID NO 198
<211> LENGTH: 21
<212> TYPE: RNA
<213> ORGANISM: Artificial Sequence
<220> FEATURE:
<223> OTHER INFORMATION: siRNA

<400> SEQUENCE: 198
aguuacaaaa gcaaaacagg u                                            21

<210> SEQ ID NO 199
<211> LENGTH: 21
<212> TYPE: RNA
<213> ORGANISM: Artificial Sequence
<220> FEATURE:
<223> OTHER INFORMATION: siRNA

<400> SEQUENCE: 199
accuguuuug cuuuuguaac u                                            21

<210> SEQ ID NO 200
<211> LENGTH: 23
<212> TYPE: RNA
<213> ORGANISM: Artificial Sequence
<220> FEATURE:
<223> OTHER INFORMATION: siRNA

<400> SEQUENCE: 200
aguuacaaaa gcaaaacagg ucu                                          23

<210> SEQ ID NO 201
<211> LENGTH: 21
<212> TYPE: RNA
<213> ORGANISM: Artificial Sequence
<220> FEATURE:
<223> OTHER INFORMATION: siRNA

<400> SEQUENCE: 201
accuguuuug cuuuuguaac u                                            21

<210> SEQ ID NO 202
<211> LENGTH: 23
<212> TYPE: RNA
<213> ORGANISM: Artificial Sequence
<220> FEATURE:
<223> OTHER INFORMATION: siRNA

<400> SEQUENCE: 202
aguuacaaaa gcaaaacagg ucu                                          23

<210> SEQ ID NO 203
<211> LENGTH: 21
<212> TYPE: RNA
<213> ORGANISM: Artificial Sequence
<220> FEATURE:
<223> OTHER INFORMATION: siRNA

<400> SEQUENCE: 203
accuguuuug cuuuuguaac u                                            21

```
<210> SEQ ID NO 204
<211> LENGTH: 23
<212> TYPE: RNA
<213> ORGANISM: Artificial Sequence
<220> FEATURE:
<223> OTHER INFORMATION: siRNA

<400> SEQUENCE: 204
aguuacaaaa gcaaaacagg ucu                                              23

<210> SEQ ID NO 205
<211> LENGTH: 19
<212> TYPE: RNA
<213> ORGANISM: Artificial Sequence
<220> FEATURE:
<223> OTHER INFORMATION: siRNA

<400> SEQUENCE: 205
cuguuuugcu uuuguaacu                                                   19

<210> SEQ ID NO 206
<211> LENGTH: 21
<212> TYPE: RNA
<213> ORGANISM: Artificial Sequence
<220> FEATURE:
<223> OTHER INFORMATION: siRNA

<400> SEQUENCE: 206
aguuacaaaa gcaaaacagg u                                                21

<210> SEQ ID NO 207
<211> LENGTH: 19
<212> TYPE: RNA
<213> ORGANISM: Artificial Sequence
<220> FEATURE:
<223> OTHER INFORMATION: siRNA

<400> SEQUENCE: 207
cuguuuugcu uuuguaacu                                                   19

<210> SEQ ID NO 208
<211> LENGTH: 21
<212> TYPE: RNA
<213> ORGANISM: Artificial Sequence
<220> FEATURE:
<223> OTHER INFORMATION: siRNA

<400> SEQUENCE: 208
aguuacaaaa gcaaaacagg u                                                21

<210> SEQ ID NO 209
<211> LENGTH: 19
<212> TYPE: RNA
<213> ORGANISM: Artificial Sequence
<220> FEATURE:
<223> OTHER INFORMATION: siRNA

<400> SEQUENCE: 209
cuguuuugcu uuuguaacu                                                   19

<210> SEQ ID NO 210
<211> LENGTH: 21
<212> TYPE: RNA
<213> ORGANISM: Artificial Sequence
<220> FEATURE:
<223> OTHER INFORMATION: siRNA
```

```
<400> SEQUENCE: 210
aguuacaaaa gcaaaacagg u                                              21

<210> SEQ ID NO 211
<211> LENGTH: 21
<212> TYPE: RNA
<213> ORGANISM: Artificial Sequence
<220> FEATURE:
<223> OTHER INFORMATION: siRNA

<400> SEQUENCE: 211 accuguuug cuuuuguaac u                                               21

<210> SEQ ID NO 212
<211> LENGTH: 23
<212> TYPE: RNA
<213> ORGANISM: Artificial Sequence
<220> FEATURE:
<223> OTHER INFORMATION: siRNA

<400> SEQUENCE: 212
aguuacaaaa gcaaaacagg ucu                                            23

<210> SEQ ID NO 213
<211> LENGTH: 21
<212> TYPE: RNA
<213> ORGANISM: Artificial Sequence
<220> FEATURE:
<223> OTHER INFORMATION: siRNA

<400> SEQUENCE: 213 accuguuug cuuuuguaac u                                               21

<210> SEQ ID NO 214
<211> LENGTH: 23
<212> TYPE: RNA
<213> ORGANISM: Artificial Sequence
<220> FEATURE:
<223> OTHER INFORMATION: siRNA

<400> SEQUENCE: 214
aguuacaaaa gcaaaacagg ucu                                            23

<210> SEQ ID NO 215
<211> LENGTH: 21
<212> TYPE: RNA
<213> ORGANISM: Artificial Sequence
<220> FEATURE:
<223> OTHER INFORMATION: siRNA

<400> SEQUENCE: 215 accuguuug cuuuuguaac u                                               21

<210> SEQ ID NO 216
<211> LENGTH: 23
<212> TYPE: RNA
<213> ORGANISM: Artificial Sequence
<220> FEATURE:
<223> OTHER INFORMATION: siRNA

<400> SEQUENCE: 216
aguuacaaaa gcaaaacagg ucu                                            23

<210> SEQ ID NO 217
<211> LENGTH: 19
```

```
<212> TYPE: RNA
<213> ORGANISM: Artificial Sequence
<220> FEATURE:
<223> OTHER INFORMATION: siRNA

<400> SEQUENCE: 217
cuguuuugcu uuuguaacu                                                    19

<210> SEQ ID NO 218
<211> LENGTH: 21
<212> TYPE: RNA
<213> ORGANISM: Artificial Sequence
<220> FEATURE:
<223> OTHER INFORMATION: siRNA

<400> SEQUENCE: 218
aguuacaaaa gcaaaacagg u                                                 21

<210> SEQ ID NO 219
<211> LENGTH: 19
<212> TYPE: RNA
<213> ORGANISM: Artificial Sequence
<220> FEATURE:
<223> OTHER INFORMATION: siRNA

<400> SEQUENCE: 219
cuguuuugcu uuuguaacu                                                    19

<210> SEQ ID NO 220
<211> LENGTH: 21
<212> TYPE: RNA
<213> ORGANISM: Artificial Sequence
<220> FEATURE:
<223> OTHER INFORMATION: siRNA

<400> SEQUENCE: 220
aguuacaaaa gcaaaacagg u                                                 21

<210> SEQ ID NO 221
<211> LENGTH: 19
<212> TYPE: RNA
<213> ORGANISM: Artificial Sequence
<220> FEATURE:
<223> OTHER INFORMATION: siRNA

<400> SEQUENCE: 221
cuguuuugcu uuuguaacu                                                    19

<210> SEQ ID NO 222
<211> LENGTH: 21
<212> TYPE: RNA
<213> ORGANISM: Artificial Sequence
<220> FEATURE:
<223> OTHER INFORMATION: siRNA

<400> SEQUENCE: 222
aguuacaaaa gcaaaacagg u                                                 21

<210> SEQ ID NO 223
<211> LENGTH: 21
<212> TYPE: RNA
<213> ORGANISM: Artificial Sequence
<220> FEATURE:
<223> OTHER INFORMATION: siRNA

<400> SEQUENCE: 223
```
accuguuuug cuuuuguaac u                    21

<210> SEQ ID NO 224
<211> LENGTH: 23
<212> TYPE: RNA
<213> ORGANISM: Artificial Sequence
<220> FEATURE:
<223> OTHER INFORMATION: siRNA

<400> SEQUENCE: 224
aguuacaaaa gcaaaacagg ucu                  23

<210> SEQ ID NO 225
<211> LENGTH: 21
<212> TYPE: RNA
<213> ORGANISM: Artificial Sequence
<220> FEATURE:
<223> OTHER INFORMATION: siRNA

<400> SEQUENCE: 225
accuguuuug cuuuuguaac u                    21

<210> SEQ ID NO 226
<211> LENGTH: 23
<212> TYPE: RNA
<213> ORGANISM: Artificial Sequence
<220> FEATURE:
<223> OTHER INFORMATION: siRNA

<400> SEQUENCE: 226
aguuacaaaa gcaaaacagg ucu                  23

<210> SEQ ID NO 227
<211> LENGTH: 21
<212> TYPE: RNA
<213> ORGANISM: Artificial Sequence
<220> FEATURE:
<223> OTHER INFORMATION: siRNA

<400> SEQUENCE: 227
accuguuuug cuuuuguaac u                    21

<210> SEQ ID NO 228
<211> LENGTH: 23
<212> TYPE: RNA
<213> ORGANISM: Artificial Sequence
<220> FEATURE:
<223> OTHER INFORMATION: siRNA

<400> SEQUENCE: 228
aguuacaaaa gcaaaacagg ucu                  23

<210> SEQ ID NO 229
<211> LENGTH: 19
<212> TYPE: RNA
<213> ORGANISM: Artificial Sequence
<220> FEATURE:
<223> OTHER INFORMATION: siRNA

<400> SEQUENCE: 229
cuguuuugcu uuuguaacu                       19

<210> SEQ ID NO 230
<211> LENGTH: 21
<212> TYPE: RNA
<213> ORGANISM: Artificial Sequence

```
<220> FEATURE:
<223> OTHER INFORMATION: siRNA

<400> SEQUENCE: 230
aguuacaaaa gcaaaacagg u                                              21

<210> SEQ ID NO 231
<211> LENGTH: 19
<212> TYPE: RNA
<213> ORGANISM: Artificial Sequence
<220> FEATURE:
<223> OTHER INFORMATION: siRNA

<400> SEQUENCE: 231
cuguuuugcu uuuguaacu                                                 19

<210> SEQ ID NO 232
<211> LENGTH: 21
<212> TYPE: RNA
<213> ORGANISM: Artificial Sequence
<220> FEATURE:
<223> OTHER INFORMATION: siRNA

<400> SEQUENCE: 232
aguuacaaaa gcaaaacagg u                                              21

<210> SEQ ID NO 233
<211> LENGTH: 19
<212> TYPE: RNA
<213> ORGANISM: Artificial Sequence
<220> FEATURE:
<223> OTHER INFORMATION: siRNA

<400> SEQUENCE: 233
cuguuuugcu uuuguaacu                                                 19

<210> SEQ ID NO 234
<211> LENGTH: 21
<212> TYPE: RNA
<213> ORGANISM: Artificial Sequence
<220> FEATURE:
<223> OTHER INFORMATION: siRNA

<400> SEQUENCE: 234
aguuacaaaa gcaaaacagg u                                              21

<210> SEQ ID NO 235
<211> LENGTH: 21
<212> TYPE: RNA
<213> ORGANISM: Artificial Sequence
<220> FEATURE:
<223> OTHER INFORMATION: siRNA

<400> SEQUENCE: 235
accuguuuug cuuuuguaac u                                              21

<210> SEQ ID NO 236
<211> LENGTH: 23
<212> TYPE: RNA
<213> ORGANISM: Artificial Sequence
<220> FEATURE:
<223> OTHER INFORMATION: siRNA

<400> SEQUENCE: 236
aguuacaaaa gcaaaacagg ucu                                            23
```

```
<210> SEQ ID NO 237
<211> LENGTH: 21
<212> TYPE: RNA
<213> ORGANISM: Artificial Sequence
<220> FEATURE:
<223> OTHER INFORMATION: siRNA

<400> SEQUENCE: 237
accuguuuug cuuuuguaac u                                              21

<210> SEQ ID NO 238
<211> LENGTH: 23
<212> TYPE: RNA
<213> ORGANISM: Artificial Sequence
<220> FEATURE:
<223> OTHER INFORMATION: siRNA

<400> SEQUENCE: 238
aguuacaaaa gcaaaacagg ucu                                            23

<210> SEQ ID NO 239
<211> LENGTH: 21
<212> TYPE: RNA
<213> ORGANISM: Artificial Sequence
<220> FEATURE:
<223> OTHER INFORMATION: siRNA

<400> SEQUENCE: 239
accuguuuug cuuuuguaac u                                              21

<210> SEQ ID NO 240
<211> LENGTH: 23
<212> TYPE: RNA
<213> ORGANISM: Artificial Sequence
<220> FEATURE:
<223> OTHER INFORMATION: siRNA

<400> SEQUENCE: 240
aguuacaaaa gcaaaacagg ucu                                            23

<210> SEQ ID NO 241
<211> LENGTH: 19
<212> TYPE: RNA
<213> ORGANISM: Artificial Sequence
<220> FEATURE:
<223> OTHER INFORMATION: siRNA

<400> SEQUENCE: 241
gguuuuguag cauuuuuau                                                 19

<210> SEQ ID NO 242
<211> LENGTH: 19
<212> TYPE: RNA
<213> ORGANISM: Artificial Sequence
<220> FEATURE:
<223> OTHER INFORMATION: siRNA

<400> SEQUENCE: 242
auaaaaaugc uacaaaacc                                                 19

<210> SEQ ID NO 243
<211> LENGTH: 19
<212> TYPE: RNA
<213> ORGANISM: Artificial Sequence
<220> FEATURE:
<223> OTHER INFORMATION: siRNA
```

```
<220> FEATURE:
<221> NAME/KEY: misc_feature
<222> LOCATION: (19)..(19)
<223> OTHER INFORMATION: n is Z19, Z19 is A, U, G or C

<400> SEQUENCE: 243
gguuuuguag cauuuuuan                                              19

<210> SEQ ID NO 244
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z20, Z20 is a nucleotide complementary to
     Z19, Z19 is selected from A, U, G or C

<400> SEQUENCE: 244
nuaaaaaugc uacaaaacc                                              19

<210> SEQ ID NO 245
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z19, Z19 is A, U, G or C

<400> SEQUENCE: 245
gguuuuguag cauuuuuan                                              19

<210> SEQ ID NO 246
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z20, Z20 is a nucleotide complementary to
     Z19, Z19 is selected from A, U, G or C

<400> SEQUENCE: 246
nuaaaaaugc uacaaaaccc a                                           21

<210> SEQ ID NO 247
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (21)..(21)
<223> OTHER INFORMATION: n is Z19, Z19 is A, U, G or C

<400> SEQUENCE: 247
uggguuuugu agcauuuuua n                                           21

<210> SEQ ID NO 248
<211> LENGTH: 23
<212> TYPE: RNA
```

```
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z20, Z20 is a nucleotide complementary to
      Z19, Z19 is selected from A, U, G or C

<400> SEQUENCE: 248
nuaaaaaugc uacaaaaccc aga                                             23

<210> SEQ ID NO 249
<211> LENGTH: 19
<212> TYPE: RNA
<213> ORGANISM: Artificial Sequence
<220> FEATURE:
<223> OTHER INFORMATION: siRNA

<400> SEQUENCE: 249
gguuuuguag cauuuuuau                                                  19

<210> SEQ ID NO 250
<211> LENGTH: 21
<212> TYPE: RNA
<213> ORGANISM: Artificial Sequence
<220> FEATURE:
<223> OTHER INFORMATION: siRNA

<400> SEQUENCE: 250
auaaaaaugc uacaaaaccc a                                               21

<210> SEQ ID NO 251
<211> LENGTH: 21
<212> TYPE: RNA
<213> ORGANISM: Artificial Sequence
<220> FEATURE:
<223> OTHER INFORMATION: siRNA

<400> SEQUENCE: 251
uggguuuugu agcauuuuua u                                               21

<210> SEQ ID NO 252
<211> LENGTH: 23
<212> TYPE: RNA
<213> ORGANISM: Artificial Sequence
<220> FEATURE:
<223> OTHER INFORMATION: siRNA

<400> SEQUENCE: 252
auaaaaaugc uacaaaaccc aga                                             23

<210> SEQ ID NO 253
<211> LENGTH: 19
<212> TYPE: RNA
<213> ORGANISM: Artificial Sequence
<220> FEATURE:
<223> OTHER INFORMATION: siRNA

<400> SEQUENCE: 253
gguuuuguag cauuuuuau                                                  19

<210> SEQ ID NO 254
<211> LENGTH: 21
<212> TYPE: RNA
<213> ORGANISM: Artificial Sequence
<220> FEATURE:
```

```
<223> OTHER INFORMATION: siRNA

<400> SEQUENCE: 254
auaaaaaugc uacaaaaccc a                                              21

<210> SEQ ID NO 255
<211> LENGTH: 19
<212> TYPE: RNA
<213> ORGANISM: Artificial Sequence
<220> FEATURE:
<223> OTHER INFORMATION: siRNA

<400> SEQUENCE: 255
gguuuuguag cauuuuuau                                                 19

<210> SEQ ID NO 256
<211> LENGTH: 21
<212> TYPE: RNA
<213> ORGANISM: Artificial Sequence
<220> FEATURE:
<223> OTHER INFORMATION: siRNA

<400> SEQUENCE: 256
auaaaaaugc uacaaaaccc a                                              21

<210> SEQ ID NO 257
<211> LENGTH: 19
<212> TYPE: RNA
<213> ORGANISM: Artificial Sequence
<220> FEATURE:
<223> OTHER INFORMATION: siRNA

<400> SEQUENCE: 257
gguuuuguag cauuuuuau                                                 19

<210> SEQ ID NO 258
<211> LENGTH: 21
<212> TYPE: RNA
<213> ORGANISM: Artificial Sequence
<220> FEATURE:
<223> OTHER INFORMATION: siRNA

<400> SEQUENCE: 258
auaaaaaugc uacaaaaccc a                                              21

<210> SEQ ID NO 259
<211> LENGTH: 21
<212> TYPE: RNA
<213> ORGANISM: Artificial Sequence
<220> FEATURE:
<223> OTHER INFORMATION: siRNA

<400> SEQUENCE: 259
uggguuuugu agcauuuuua u                                              21

<210> SEQ ID NO 260
<211> LENGTH: 23
<212> TYPE: RNA
<213> ORGANISM: Artificial Sequence
<220> FEATURE:
<223> OTHER INFORMATION: siRNA

<400> SEQUENCE: 260
auaaaaaugc uacaaaaccc aga                                            23
```

```
<210> SEQ ID NO 261
<211> LENGTH: 21
<212> TYPE: RNA
<213> ORGANISM: Artificial Sequence
<220> FEATURE:
<223> OTHER INFORMATION: siRNA

<400> SEQUENCE: 261
uggguuuugu agcauuuuua u                                              21

<210> SEQ ID NO 262
<211> LENGTH: 23
<212> TYPE: RNA
<213> ORGANISM: Artificial Sequence
<220> FEATURE:
<223> OTHER INFORMATION: siRNA

<400> SEQUENCE: 262
auaaaaaugc uacaaaaccc aga                                            23

<210> SEQ ID NO 263
<211> LENGTH: 21
<212> TYPE: RNA
<213> ORGANISM: Artificial Sequence
<220> FEATURE:
<223> OTHER INFORMATION: siRNA

<400> SEQUENCE: 263
uggguuuugu agcauuuuua u                                              21

<210> SEQ ID NO 264
<211> LENGTH: 23
<212> TYPE: RNA
<213> ORGANISM: Artificial Sequence
<220> FEATURE:
<223> OTHER INFORMATION: siRNA

<400> SEQUENCE: 264
auaaaaaugc uacaaaaccc aga                                            23

<210> SEQ ID NO 265
<211> LENGTH: 19
<212> TYPE: RNA
<213> ORGANISM: Artificial Sequence
<220> FEATURE:
<223> OTHER INFORMATION: siRNA

<400> SEQUENCE: 265
gguuuuguag cauuuuuau                                                 19

<210> SEQ ID NO 266
<211> LENGTH: 21
<212> TYPE: RNA
<213> ORGANISM: Artificial Sequence
<220> FEATURE:
<223> OTHER INFORMATION: siRNA

<400> SEQUENCE: 266
auaaaaaugc uacaaaaccc a                                              21

<210> SEQ ID NO 267
<211> LENGTH: 19
<212> TYPE: RNA
<213> ORGANISM: Artificial Sequence
<220> FEATURE:
<223> OTHER INFORMATION: siRNA
```

```
<400> SEQUENCE: 267
gguuuuguag cauuuuuau                                               19

<210> SEQ ID NO 268
<211> LENGTH: 21
<212> TYPE: RNA
<213> ORGANISM: Artificial Sequence
<220> FEATURE:
<223> OTHER INFORMATION: siRNA

<400> SEQUENCE: 268
auaaaaaugc uacaaaaccc a                                            21

<210> SEQ ID NO 269
<211> LENGTH: 19
<212> TYPE: RNA
<213> ORGANISM: Artificial Sequence
<220> FEATURE:
<223> OTHER INFORMATION: siRNA

<400> SEQUENCE: 269
gguuuuguag cauuuuuau                                               19

<210> SEQ ID NO 270
<211> LENGTH: 21
<212> TYPE: RNA
<213> ORGANISM: Artificial Sequence
<220> FEATURE:
<223> OTHER INFORMATION: siRNA

<400> SEQUENCE: 270
auaaaaaugc uacaaaaccc a                                            21

<210> SEQ ID NO 271
<211> LENGTH: 21
<212> TYPE: RNA
<213> ORGANISM: Artificial Sequence
<220> FEATURE:
<223> OTHER INFORMATION: siRNA

<400> SEQUENCE: 271
uggguuuugu agcauuuuua u                                            21

<210> SEQ ID NO 272
<211> LENGTH: 23
<212> TYPE: RNA
<213> ORGANISM: Artificial Sequence
<220> FEATURE:
<223> OTHER INFORMATION: siRNA

<400> SEQUENCE: 272
auaaaaaugc uacaaaaccc aga                                          23

<210> SEQ ID NO 273
<211> LENGTH: 21
<212> TYPE: RNA
<213> ORGANISM: Artificial Sequence
<220> FEATURE:
<223> OTHER INFORMATION: siRNA

<400> SEQUENCE: 273
uggguuuugu agcauuuuua u                                            21

<210> SEQ ID NO 274
<211> LENGTH: 23
```

```
<212> TYPE: RNA
<213> ORGANISM: Artificial Sequence
<220> FEATURE:
<223> OTHER INFORMATION: siRNA

<400> SEQUENCE: 274
auaaaaaugc uacaaaaccc aga                                      23

<210> SEQ ID NO 275
<211> LENGTH: 21
<212> TYPE: RNA
<213> ORGANISM: Artificial Sequence
<220> FEATURE:
<223> OTHER INFORMATION: siRNA

<400> SEQUENCE: 275 uggguuugu agcauuuuua u                                         21

<210> SEQ ID NO 276
<211> LENGTH: 23
<212> TYPE: RNA
<213> ORGANISM: Artificial Sequence
<220> FEATURE:
<223> OTHER INFORMATION: siRNA

<400> SEQUENCE: 276
auaaaaaugc uacaaaaccc aga                                      23

<210> SEQ ID NO 277
<211> LENGTH: 19
<212> TYPE: RNA
<213> ORGANISM: Artificial Sequence
<220> FEATURE:
<223> OTHER INFORMATION: siRNA

<400> SEQUENCE: 277
gguuuuguag cauuuuuau                                           19

<210> SEQ ID NO 278
<211> LENGTH: 21
<212> TYPE: RNA
<213> ORGANISM: Artificial Sequence
<220> FEATURE:
<223> OTHER INFORMATION: siRNA

<400> SEQUENCE: 278
auaaaaaugc uacaaaaccc a                                        21

<210> SEQ ID NO 279
<211> LENGTH: 19
<212> TYPE: RNA
<213> ORGANISM: Artificial Sequence
<220> FEATURE:
<223> OTHER INFORMATION: siRNA

<400> SEQUENCE: 279
gguuuuguag cauuuuuau                                           19

<210> SEQ ID NO 280
<211> LENGTH: 21
<212> TYPE: RNA
<213> ORGANISM: Artificial Sequence
<220> FEATURE:
<223> OTHER INFORMATION: siRNA

<400> SEQUENCE: 280
```
auaaaaaugc uacaaaaccc a                                              21

<210> SEQ ID NO 281
<211> LENGTH: 19
<212> TYPE: RNA
<213> ORGANISM: Artificial Sequence
<220> FEATURE:
<223> OTHER INFORMATION: siRNA

<400> SEQUENCE: 281
gguuuuguag cauuuuuau                                                 19

<210> SEQ ID NO 282
<211> LENGTH: 21
<212> TYPE: RNA
<213> ORGANISM: Artificial Sequence
<220> FEATURE:
<223> OTHER INFORMATION: siRNA

<400> SEQUENCE: 282
auaaaaaugc uacaaaaccc a                                              21

<210> SEQ ID NO 283
<211> LENGTH: 21
<212> TYPE: RNA
<213> ORGANISM: Artificial Sequence
<220> FEATURE:
<223> OTHER INFORMATION: siRNA

<400> SEQUENCE: 283
uggguuuugu agcauuuuua u                                              21

<210> SEQ ID NO 284
<211> LENGTH: 23
<212> TYPE: RNA
<213> ORGANISM: Artificial Sequence
<220> FEATURE:
<223> OTHER INFORMATION: siRNA

<400> SEQUENCE: 284
auaaaaaugc uacaaaaccc aga                                            23

<210> SEQ ID NO 285
<211> LENGTH: 21
<212> TYPE: RNA
<213> ORGANISM: Artificial Sequence
<220> FEATURE:
<223> OTHER INFORMATION: siRNA

<400> SEQUENCE: 285
uggguuuugu agcauuuuua u                                              21

<210> SEQ ID NO 286
<211> LENGTH: 23
<212> TYPE: RNA
<213> ORGANISM: Artificial Sequence
<220> FEATURE:
<223> OTHER INFORMATION: siRNA

<400> SEQUENCE: 286
auaaaaaugc uacaaaaccc aga                                            23

<210> SEQ ID NO 287
<211> LENGTH: 21
<212> TYPE: RNA
<213> ORGANISM: Artificial Sequence
<220> FEATURE:
<223> OTHER INFORMATION: siRNA

<400> SEQUENCE: 287 uggguuugu agcauuuuua u                                        21

<210> SEQ ID NO 288
<211> LENGTH: 23
<212> TYPE: RNA
<213> ORGANISM: Artificial Sequence
<220> FEATURE:
<223> OTHER INFORMATION: siRNA

<400> SEQUENCE: 288 auaaaaugc uacaaaaccc aga                                      23

<210> SEQ ID NO 289
<211> LENGTH: 19
<212> TYPE: RNA
<213> ORGANISM: Artificial Sequence
<220> FEATURE:
<223> OTHER INFORMATION: siRNA

<400> SEQUENCE: 289 gguuuguag cauuuuuau                                           19

<210> SEQ ID NO 290
<211> LENGTH: 21
<212> TYPE: RNA
<213> ORGANISM: Artificial Sequence
<220> FEATURE:
<223> OTHER INFORMATION: siRNA

<400> SEQUENCE: 290 auaaaaugc uacaaaaccc a                                        21

<210> SEQ ID NO 291
<211> LENGTH: 19
<212> TYPE: RNA
<213> ORGANISM: Artificial Sequence
<220> FEATURE:
<223> OTHER INFORMATION: siRNA

<400> SEQUENCE: 291 gguuuguag cauuuuuau                                           19

<210> SEQ ID NO 292
<211> LENGTH: 21
<212> TYPE: RNA
<213> ORGANISM: Artificial Sequence
<220> FEATURE:
<223> OTHER INFORMATION: siRNA

<400> SEQUENCE: 292 auaaaaugc uacaaaaccc a                                        21

<210> SEQ ID NO 293
<211> LENGTH: 19
<212> TYPE: RNA
<213> ORGANISM: Artificial Sequence
<220> FEATURE:
<223> OTHER INFORMATION: siRNA

<400> SEQUENCE: 293 gguuuguag cauuuuuau                                           19

<210> SEQ ID NO 294
<211> LENGTH: 21
<212> TYPE: RNA
<213> ORGANISM: Artificial Sequence
<220> FEATURE:
<223> OTHER INFORMATION: siRNA

<400> SEQUENCE: 294
auaaaaaugc uacaaaaccc a                                              21

<210> SEQ ID NO 295
<211> LENGTH: 21
<212> TYPE: RNA
<213> ORGANISM: Artificial Sequence
<220> FEATURE:
<223> OTHER INFORMATION: siRNA

<400> SEQUENCE: 295
uggguuuugu agcauuuuua u                                              21

<210> SEQ ID NO 296
<211> LENGTH: 23
<212> TYPE: RNA
<213> ORGANISM: Artificial Sequence
<220> FEATURE:
<223> OTHER INFORMATION: siRNA

<400> SEQUENCE: 296
auaaaaaugc uacaaaaccc aga                                            23

<210> SEQ ID NO 297
<211> LENGTH: 21
<212> TYPE: RNA
<213> ORGANISM: Artificial Sequence
<220> FEATURE:
<223> OTHER INFORMATION: siRNA

<400> SEQUENCE: 297
uggguuuugu agcauuuuua u                                              21

<210> SEQ ID NO 298
<211> LENGTH: 23
<212> TYPE: RNA
<213> ORGANISM: Artificial Sequence
<220> FEATURE:
<223> OTHER INFORMATION: siRNA

<400> SEQUENCE: 298
auaaaaaugc uacaaaaccc aga                                            23

<210> SEQ ID NO 299
<211> LENGTH: 21
<212> TYPE: RNA
<213> ORGANISM: Artificial Sequence
<220> FEATURE:
<223> OTHER INFORMATION: siRNA

<400> SEQUENCE: 299
uggguuuugu agcauuuuua u                                              21

<210> SEQ ID NO 300
<211> LENGTH: 23
<212> TYPE: RNA
<213> ORGANISM: Artificial Sequence
<220> FEATURE:
<223> OTHER INFORMATION: siRNA -continued

```
<400> SEQUENCE: 300
auaaaaaugc uacaaaaccc aga                                          23

<210> SEQ ID NO 301
<211> LENGTH: 19
<212> TYPE: RNA
<213> ORGANISM: Artificial Sequence
<220> FEATURE:
<223> OTHER INFORMATION: siRNA

<400> SEQUENCE: 301
gugacuuuuu aaaauaaaa                                               19

<210> SEQ ID NO 302
<211> LENGTH: 19
<212> TYPE: RNA
<213> ORGANISM: Artificial Sequence
<220> FEATURE:
<223> OTHER INFORMATION: siRNA

<400> SEQUENCE: 302
uuuuauuuua aaaagucac                                               19

<210> SEQ ID NO 303
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z23, Z23 is A, U, G or C

<400> SEQUENCE: 303
gugacuuuuu aaaauaaan                                               19

<210> SEQ ID NO 304
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z24, Z24 is a nucleotide complementary to
      Z23, Z23 is selected from A, U, G or C

<400> SEQUENCE: 304
nuuuauuuua aaaagucac                                               19

<210> SEQ ID NO 305
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (19)..(19)
<223> OTHER INFORMATION: n is Z23, Z23 is A, U, G or C

<400> SEQUENCE: 305
gugacuuuuu aaaauaaan                                               19
```

```
<210> SEQ ID NO 306
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z24, Z24 is a nucleotide complementary to
      Z23, Z23 is selected from A, U, G or C

<400> SEQUENCE: 306
nuuuauuuua aaaagucacc a                                            21

<210> SEQ ID NO 307
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (21)..(21)
<223> OTHER INFORMATION: n is Z23, Z23 is A, U, G or C

<400> SEQUENCE: 307
uggugacuuu uuaaaauaaa n                                            21

<210> SEQ ID NO 308
<211> LENGTH: 23
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z24, Z24 is a nucleotide complementary to
      Z23, Z23 is selected from A, U, G or C

<400> SEQUENCE: 308
nuuuauuuua aaaagucacc aua                                          23

<210> SEQ ID NO 309
<211> LENGTH: 19
<212> TYPE: RNA
<213> ORGANISM: Artificial Sequence
<220> FEATURE:
<223> OTHER INFORMATION: siRNA

<400> SEQUENCE: 309
gugacuuuuu aaaauaaaa                                               19

<210> SEQ ID NO 310
<211> LENGTH: 21
<212> TYPE: RNA
<213> ORGANISM: Artificial Sequence
<220> FEATURE:
<223> OTHER INFORMATION: siRNA

<400> SEQUENCE: 310
uuuuauuuua aaaagucacc a                                            21

<210> SEQ ID NO 311
<211> LENGTH: 21
<212> TYPE: RNA
<213> ORGANISM: Artificial Sequence
<220> FEATURE:
```

```
<223> OTHER INFORMATION: siRNA

<400> SEQUENCE: 311
uggugacuuu uuaaaauaaa a                                              21

<210> SEQ ID NO 312
<211> LENGTH: 23
<212> TYPE: RNA
<213> ORGANISM: Artificial Sequence
<220> FEATURE:
<223> OTHER INFORMATION: siRNA

<400> SEQUENCE: 312
uuuuauuuua aaagucacc aua                                             23

<210> SEQ ID NO 313
<211> LENGTH: 19
<212> TYPE: RNA
<213> ORGANISM: Artificial Sequence
<220> FEATURE:
<223> OTHER INFORMATION: siRNA

<400> SEQUENCE: 313
gugacuuuuu aaauaaaa                                                  19

<210> SEQ ID NO 314
<211> LENGTH: 21
<212> TYPE: RNA
<213> ORGANISM: Artificial Sequence
<220> FEATURE:
<223> OTHER INFORMATION: siRNA

<400> SEQUENCE: 314
uuuuauuuua aaagucacc a                                               21

<210> SEQ ID NO 315
<211> LENGTH: 19
<212> TYPE: RNA
<213> ORGANISM: Artificial Sequence
<220> FEATURE:
<223> OTHER INFORMATION: siRNA

<400> SEQUENCE: 315
gugacuuuuu aaauaaaa                                                  19

<210> SEQ ID NO 316
<211> LENGTH: 21
<212> TYPE: RNA
<213> ORGANISM: Artificial Sequence
<220> FEATURE:
<223> OTHER INFORMATION: siRNA

<400> SEQUENCE: 316
uuuuauuuua aaagucacc a                                               21

<210> SEQ ID NO 317
<211> LENGTH: 19
<212> TYPE: RNA
<213> ORGANISM: Artificial Sequence
<220> FEATURE:
<223> OTHER INFORMATION: siRNA

<400> SEQUENCE: 317
gugacuuuuu aaauaaaa                                                  19
```

```
<210> SEQ ID NO 318
<211> LENGTH: 21
<212> TYPE: RNA
<213> ORGANISM: Artificial Sequence
<220> FEATURE:
<223> OTHER INFORMATION: siRNA

<400> SEQUENCE: 318
uuuuauuuua aaagucacc a                                              21

<210> SEQ ID NO 319
<211> LENGTH: 21
<212> TYPE: RNA
<213> ORGANISM: Artificial Sequence
<220> FEATURE:
<223> OTHER INFORMATION: siRNA

<400> SEQUENCE: 319
uggugacuuu uuaaaauaaa a                                             21

<210> SEQ ID NO 320
<211> LENGTH: 23
<212> TYPE: RNA
<213> ORGANISM: Artificial Sequence
<220> FEATURE:
<223> OTHER INFORMATION: siRNA

<400> SEQUENCE: 320
uuuuauuuua aaagucacc aua                                            23

<210> SEQ ID NO 321
<211> LENGTH: 21
<212> TYPE: RNA
<213> ORGANISM: Artificial Sequence
<220> FEATURE:
<223> OTHER INFORMATION: siRNA

<400> SEQUENCE: 321
uggugacuuu uuaaaauaaa a                                             21

<210> SEQ ID NO 322
<211> LENGTH: 23
<212> TYPE: RNA
<213> ORGANISM: Artificial Sequence
<220> FEATURE:
<223> OTHER INFORMATION: siRNA

<400> SEQUENCE: 322
uuuuauuuua aaagucacc aua                                            23

<210> SEQ ID NO 323
<211> LENGTH: 21
<212> TYPE: RNA
<213> ORGANISM: Artificial Sequence
<220> FEATURE:
<223> OTHER INFORMATION: siRNA

<400> SEQUENCE: 323
uggugacuuu uuaaaauaaa a                                             21

<210> SEQ ID NO 324
<211> LENGTH: 23
<212> TYPE: RNA
<213> ORGANISM: Artificial Sequence
<220> FEATURE:
<223> OTHER INFORMATION: siRNA
```

```
<400> SEQUENCE: 324
uuuuauuuua aaaagucacc aua                                              23

<210> SEQ ID NO 325
<211> LENGTH: 19
<212> TYPE: RNA
<213> ORGANISM: Artificial Sequence
<220> FEATURE:
<223> OTHER INFORMATION: siRNA

<400> SEQUENCE: 325
gugacuuuuu aaaauaaaa                                                   19

<210> SEQ ID NO 326
<211> LENGTH: 21
<212> TYPE: RNA
<213> ORGANISM: Artificial Sequence
<220> FEATURE:
<223> OTHER INFORMATION: siRNA

<400> SEQUENCE: 326
uuuuauuuua aaaagucacc a                                                21

<210> SEQ ID NO 327
<211> LENGTH: 19
<212> TYPE: RNA
<213> ORGANISM: Artificial Sequence
<220> FEATURE:
<223> OTHER INFORMATION: siRNA

<400> SEQUENCE: 327
gugacuuuuu aaaauaaaa                                                   19

<210> SEQ ID NO 328
<211> LENGTH: 21
<212> TYPE: RNA
<213> ORGANISM: Artificial Sequence
<220> FEATURE:
<223> OTHER INFORMATION: siRNA

<400> SEQUENCE: 328
uuuuauuuua aaaagucacc a                                                21

<210> SEQ ID NO 329
<211> LENGTH: 19
<212> TYPE: RNA
<213> ORGANISM: Artificial Sequence
<220> FEATURE:
<223> OTHER INFORMATION: siRNA

<400> SEQUENCE: 329
gugacuuuuu aaaauaaaa                                                   19

<210> SEQ ID NO 330
<211> LENGTH: 21
<212> TYPE: RNA
<213> ORGANISM: Artificial Sequence
<220> FEATURE:
<223> OTHER INFORMATION: siRNA

<400> SEQUENCE: 330
uuuuauuuua aaaagucacc a                                                21

<210> SEQ ID NO 331
<211> LENGTH: 21
```

```
<212> TYPE: RNA
<213> ORGANISM: Artificial Sequence
<220> FEATURE:
<223> OTHER INFORMATION: siRNA

<400> SEQUENCE: 331
uggugacuuu uuaaaauaaa a                                              21

<210> SEQ ID NO 332
<211> LENGTH: 23
<212> TYPE: RNA
<213> ORGANISM: Artificial Sequence
<220> FEATURE:
<223> OTHER INFORMATION: siRNA

<400> SEQUENCE: 332
uuuuauuuua aaagucacc aua                                             23

<210> SEQ ID NO 333
<211> LENGTH: 21
<212> TYPE: RNA
<213> ORGANISM: Artificial Sequence
<220> FEATURE:
<223> OTHER INFORMATION: siRNA

<400> SEQUENCE: 333
uggugacuuu uuaaaauaaa a                                              21

<210> SEQ ID NO 334
<211> LENGTH: 23
<212> TYPE: RNA
<213> ORGANISM: Artificial Sequence
<220> FEATURE:
<223> OTHER INFORMATION: siRNA

<400> SEQUENCE: 334
uuuuauuuua aaagucacc aua                                             23

<210> SEQ ID NO 335
<211> LENGTH: 21
<212> TYPE: RNA
<213> ORGANISM: Artificial Sequence
<220> FEATURE:
<223> OTHER INFORMATION: siRNA

<400> SEQUENCE: 335
uggugacuuu uuaaaauaaa a                                              21

<210> SEQ ID NO 336
<211> LENGTH: 23
<212> TYPE: RNA
<213> ORGANISM: Artificial Sequence
<220> FEATURE:
<223> OTHER INFORMATION: siRNA

<400> SEQUENCE: 336
uuuuauuuua aaagucacc aua                                             23

<210> SEQ ID NO 337
<211> LENGTH: 19
<212> TYPE: RNA
<213> ORGANISM: Artificial Sequence
<220> FEATURE:
<223> OTHER INFORMATION: siRNA

<400> SEQUENCE: 337
```

```
gugacuuuuu aaaauaaaa                                                    19

<210> SEQ ID NO 338
<211> LENGTH: 21
<212> TYPE: RNA
<213> ORGANISM: Artificial Sequence
<220> FEATURE:
<223> OTHER INFORMATION: siRNA

<400> SEQUENCE: 338
uuuuauuuua aaagucacc a                                                  21

<210> SEQ ID NO 339
<211> LENGTH: 19
<212> TYPE: RNA
<213> ORGANISM: Artificial Sequence
<220> FEATURE:
<223> OTHER INFORMATION: siRNA

<400> SEQUENCE: 339
gugacuuuuu aaaauaaaa                                                    19

<210> SEQ ID NO 340
<211> LENGTH: 21
<212> TYPE: RNA
<213> ORGANISM: Artificial Sequence
<220> FEATURE:
<223> OTHER INFORMATION: siRNA

<400> SEQUENCE: 340
uuuuauuuua aaagucacc a                                                  21

<210> SEQ ID NO 341
<211> LENGTH: 19
<212> TYPE: RNA
<213> ORGANISM: Artificial Sequence
<220> FEATURE:
<223> OTHER INFORMATION: siRNA

<400> SEQUENCE: 341
gugacuuuuu aaaauaaaa                                                    19

<210> SEQ ID NO 342
<211> LENGTH: 21
<212> TYPE: RNA
<213> ORGANISM: Artificial Sequence
<220> FEATURE:
<223> OTHER INFORMATION: siRNA

<400> SEQUENCE: 342
uuuuauuuua aaagucacc a                                                  21

<210> SEQ ID NO 343
<211> LENGTH: 21
<212> TYPE: RNA
<213> ORGANISM: Artificial Sequence
<220> FEATURE:
<223> OTHER INFORMATION: siRNA

<400> SEQUENCE: 343
uggugacuuu uuaaaauaaa a                                                 21

<210> SEQ ID NO 344
<211> LENGTH: 23
<212> TYPE: RNA
<213> ORGANISM: Artificial Sequence
```

```
<220> FEATURE:
<223> OTHER INFORMATION: siRNA

<400> SEQUENCE: 344
uuuuauuuua aaagucacc aua                                          23

<210> SEQ ID NO 345
<211> LENGTH: 21
<212> TYPE: RNA
<213> ORGANISM: Artificial Sequence
<220> FEATURE:
<223> OTHER INFORMATION: siRNA

<400> SEQUENCE: 345
uggugacuuu uuaaaauaaa a                                           21

<210> SEQ ID NO 346
<211> LENGTH: 23
<212> TYPE: RNA
<213> ORGANISM: Artificial Sequence
<220> FEATURE:
<223> OTHER INFORMATION: siRNA

<400> SEQUENCE: 346
uuuuauuuua aaagucacc aua                                          23

<210> SEQ ID NO 347
<211> LENGTH: 21
<212> TYPE: RNA
<213> ORGANISM: Artificial Sequence
<220> FEATURE:
<223> OTHER INFORMATION: siRNA

<400> SEQUENCE: 347
uggugacuuu uuaaaauaaa a                                           21

<210> SEQ ID NO 348
<211> LENGTH: 23
<212> TYPE: RNA
<213> ORGANISM: Artificial Sequence
<220> FEATURE:
<223> OTHER INFORMATION: siRNA

<400> SEQUENCE: 348
uuuuauuuua aaagucacc aua                                          23

<210> SEQ ID NO 349
<211> LENGTH: 19
<212> TYPE: RNA
<213> ORGANISM: Artificial Sequence
<220> FEATURE:
<223> OTHER INFORMATION: siRNA

<400> SEQUENCE: 349
gugacuuuuu aaauaaaa                                               19

<210> SEQ ID NO 350
<211> LENGTH: 21
<212> TYPE: RNA
<213> ORGANISM: Artificial Sequence
<220> FEATURE:
<223> OTHER INFORMATION: siRNA

<400> SEQUENCE: 350
uuuuauuuua aaagucacc a                                            21
```

<210> SEQ ID NO 351
<211> LENGTH: 19
<212> TYPE: RNA
<213> ORGANISM: Artificial Sequence
<220> FEATURE:
<223> OTHER INFORMATION: siRNA

<400> SEQUENCE: 351
gugacuuuuu aaauaaaa                                                   19

<210> SEQ ID NO 352
<211> LENGTH: 21
<212> TYPE: RNA
<213> ORGANISM: Artificial Sequence
<220> FEATURE:
<223> OTHER INFORMATION: siRNA

<400> SEQUENCE: 352
uuuuauuuua aaagucacc a                                                21

<210> SEQ ID NO 353
<211> LENGTH: 19
<212> TYPE: RNA
<213> ORGANISM: Artificial Sequence
<220> FEATURE:
<223> OTHER INFORMATION: siRNA

<400> SEQUENCE: 353
gugacuuuuu aaauaaaa                                                   19

<210> SEQ ID NO 354
<211> LENGTH: 21
<212> TYPE: RNA
<213> ORGANISM: Artificial Sequence
<220> FEATURE:
<223> OTHER INFORMATION: siRNA

<400> SEQUENCE: 354
uuuuauuuua aaagucacc a                                                21

<210> SEQ ID NO 355
<211> LENGTH: 21
<212> TYPE: RNA
<213> ORGANISM: Artificial Sequence
<220> FEATURE:
<223> OTHER INFORMATION: siRNA

<400> SEQUENCE: 355
uggugacuuu uuaaaauaaa a                                               21

<210> SEQ ID NO 356
<211> LENGTH: 23
<212> TYPE: RNA
<213> ORGANISM: Artificial Sequence
<220> FEATURE:
<223> OTHER INFORMATION: siRNA

<400> SEQUENCE: 356
uuuuauuuua aaagucacc aua                                              23

<210> SEQ ID NO 357
<211> LENGTH: 21
<212> TYPE: RNA
<213> ORGANISM: Artificial Sequence
<220> FEATURE:
<223> OTHER INFORMATION: siRNA

```
<400> SEQUENCE: 357 ugguugacuuu uuaaaauaaa a                                       21

<210> SEQ ID NO 358
<211> LENGTH: 23
<212> TYPE: RNA
<213> ORGANISM: Artificial Sequence
<220> FEATURE:
<223> OTHER INFORMATION: siRNA

<400> SEQUENCE: 358
uuuuauuuua aaagucacc aua                                       23

<210> SEQ ID NO 359
<211> LENGTH: 21
<212> TYPE: RNA
<213> ORGANISM: Artificial Sequence
<220> FEATURE:
<223> OTHER INFORMATION: siRNA

<400> SEQUENCE: 359
uggugacuuu uuaaaauaaa a                                        21

<210> SEQ ID NO 360
<211> LENGTH: 23
<212> TYPE: RNA
<213> ORGANISM: Artificial Sequence
<220> FEATURE:
<223> OTHER INFORMATION: siRNA

<400> SEQUENCE: 360
uuuuauuuua aaagucacc aua                                       23

<210> SEQ ID NO 361
<211> LENGTH: 19
<212> TYPE: RNA
<213> ORGANISM: Artificial Sequence
<220> FEATURE:
<223> OTHER INFORMATION: siRNA

<400> SEQUENCE: 361
aagcaagcag acauuuauc                                           19

<210> SEQ ID NO 362
<211> LENGTH: 21
<212> TYPE: RNA
<213> ORGANISM: Artificial Sequence
<220> FEATURE:
<223> OTHER INFORMATION: siRNA

<400> SEQUENCE: 362
gauaaauguc ugcuugcuug g                                        21

<210> SEQ ID NO 363
<211> LENGTH: 19
<212> TYPE: RNA
<213> ORGANISM: Artificial Sequence
<220> FEATURE:
<223> OTHER INFORMATION: siRNA

<400> SEQUENCE: 363
uuuguagcau uuuuauuaa                                           19

<210> SEQ ID NO 364
```

```
<211> LENGTH: 21
<212> TYPE: RNA
<213> ORGANISM: Artificial Sequence
<220> FEATURE:
<223> OTHER INFORMATION: siRNA

<400> SEQUENCE: 364
uuaauaaaaa ugcuacaaaa c                                              21

<210> SEQ ID NO 365
<211> LENGTH: 19
<212> TYPE: RNA
<213> ORGANISM: Artificial Sequence
<220> FEATURE:
<223> OTHER INFORMATION: siRNA

<400> SEQUENCE: 365
gccuggaguu uauucggaa                                                 19

<210> SEQ ID NO 366
<211> LENGTH: 21
<212> TYPE: RNA
<213> ORGANISM: Artificial Sequence
<220> FEATURE:
<223> OTHER INFORMATION: siRNA

<400> SEQUENCE: 366
uuccgaauaa acuccaggcc u                                              21

<210> SEQ ID NO 367
<211> LENGTH: 19
<212> TYPE: RNA
<213> ORGANISM: Artificial Sequence
<220> FEATURE:
<223> OTHER INFORMATION: siRNA

<400> SEQUENCE: 367
cuguuuugcu uuuguaacu                                                 19

<210> SEQ ID NO 368
<211> LENGTH: 21
<212> TYPE: RNA
<213> ORGANISM: Artificial Sequence
<220> FEATURE:
<223> OTHER INFORMATION: siRNA

<400> SEQUENCE: 368
aguuacaaaa gcaaaacagg u                                              21

<210> SEQ ID NO 369
<211> LENGTH: 19
<212> TYPE: RNA
<213> ORGANISM: Artificial Sequence
<220> FEATURE:
<223> OTHER INFORMATION: siRNA

<400> SEQUENCE: 369
gguuuuguag cauuuuuau                                                 19

<210> SEQ ID NO 370
<211> LENGTH: 21
<212> TYPE: RNA
<213> ORGANISM: Artificial Sequence
<220> FEATURE:
<223> OTHER INFORMATION: siRNA

<400> SEQUENCE: 370
```

-continued auaaaaaugc uacaaaaccc a                                          21

<210> SEQ ID NO 371
<211> LENGTH: 19
<212> TYPE: RNA
<213> ORGANISM: Artificial Sequence
<220> FEATURE:
<223> OTHER INFORMATION: siRNA

<400> SEQUENCE: 371
gugacuuuuu aaaauaaaa                                             19

<210> SEQ ID NO 372
<211> LENGTH: 21
<212> TYPE: RNA
<213> ORGANISM: Artificial Sequence
<220> FEATURE:
<223> OTHER INFORMATION: siRNA

<400> SEQUENCE: 372
uuuuauuuua aaagucacc a                                           21

<210> SEQ ID NO 373
<211> LENGTH: 491
<212> TYPE: DNA
<213> ORGANISM: Artificial Sequence
<220> FEATURE:
<223> OTHER INFORMATION: DNA

<400> SEQUENCE: 373
ggcgtgcctg ccaagctcac acagcaggaa ctgagccaga aacgcagatt gggctggctc      60
tgaagccaag cctcttctta cttcacccgg ctgggctcct cattttttacg ggtaacagtg    120 aggctgggaa ggggaacaca gaccaggaag ctcggtgagt gatggcagaa cgatgcctgc    180
aggcatggaa cttttttccgt tatcacccag gcctgattca ctggcctggc ggagatgctt    240
ctaaggcatg gtcgggggag agggccaaca actgtccctc cttgagcacc agccccaccc    300
aagcaagcag acatttatct tttgggtctg tcctctctgt tgccttttta cagccaactt    360
ttctagacct gttttgcttt tgtaacttga agatatttat tctgggtttt gtagcatttt    420
tattaatatg gtgactttt aaaataaaaa caaacaaacg ttgtcctaac aaaaaaaaa     480 aaaaaaaaa a                                                          491

<210> SEQ ID NO 374
<211> LENGTH: 590
<212> TYPE: DNA
<213> ORGANISM: Artificial Sequence
<220> FEATURE:
<223> OTHER INFORMATION: DNA

<400> SEQUENCE: 374
gcgtggccaa gggtgccagc atgcgcagcc tgcgcgtgct caactgccaa gggaagggca      60
cggttagcgg caccctcata ggcctggagt ttattcggaa aagccagctg gtccagcctg    120
tggggccact ggtggtgctg ctgcccctgg cgggtgggta cagccgcgtc ctcaacgccg    180
cctgccagcg cctggcgagg gctggggtcg tgctggtcac cgctgccggc aacttccggg    240
acgatgcctg cctctactcc ccagcctcag ctcccgaggt catcacagtt ggggccacca    300
atgcccaaga ccagccggtg accctgggga ctttggggac caactttggc cgctgtgtgg    360
acctctttgc cccaggggag gacatcattg gtgcctccag cgactgcagc acctgctttg    420

```
tgtcacagag tgggacatca caggctgctg cccacgtggc tggcattgca gccatgatgc      480
tgtctgccga gccggagctc accctggccg agttgaggca gagactgatc cacttctctg      540
ccaaagatgt catcaatgag gcctggttcc ctgaggacca gcgggtactg                 590
```

<210> SEQ ID NO 375
<211> LENGTH: 21
<212> TYPE: DNA
<213> ORGANISM: Artificial Sequence
<220> FEATURE:
<223> OTHER INFORMATION: DNA

<400> SEQUENCE: 375

```
gataaatgtc tgcttgcttg g                                                21
```

<210> SEQ ID NO 376
<211> LENGTH: 21
<212> TYPE: DNA
<213> ORGANISM: Artificial Sequence
<220> FEATURE:
<223> OTHER INFORMATION: DNA

<400> SEQUENCE: 376

```
ttaataaaaa tgctacaaaa c                                                21
```

<210> SEQ ID NO 377
<211> LENGTH: 21
<212> TYPE: DNA
<213> ORGANISM: Artificial Sequence
<220> FEATURE:
<223> OTHER INFORMATION: DNA

<400> SEQUENCE: 377

```
ttccgaataa actccaggcc t                                                21
```

<210> SEQ ID NO 378
<211> LENGTH: 21
<212> TYPE: DNA
<213> ORGANISM: Artificial Sequence
<220> FEATURE:
<223> OTHER INFORMATION: DNA

<400> SEQUENCE: 378

```
agttacaaaa gcaaaacagg t                                                21
```

<210> SEQ ID NO 379
<211> LENGTH: 21
<212> TYPE: DNA
<213> ORGANISM: Artificial Sequence
<220> FEATURE:
<223> OTHER INFORMATION: DNA

<400> SEQUENCE: 379

```
ataaaaatgc tacaaaaccc a                                                21
```

<210> SEQ ID NO 380
<211> LENGTH: 21
<212> TYPE: DNA
<213> ORGANISM: Artificial Sequence
<220> FEATURE:
<223> OTHER INFORMATION: DNA

<400> SEQUENCE: 380

```
tttattttta aaaagtcacc a                                                21
```

-continued

```
<210> SEQ ID NO 381
<211> LENGTH: 21
<212> TYPE: DNA
<213> ORGANISM: Artificial Sequence
<220> FEATURE:
<223> OTHER INFORMATION: DNA

<400> SEQUENCE: 381
aacctaccta ctccatttat c                                             21

<210> SEQ ID NO 382
<211> LENGTH: 21
<212> TYPE: DNA
<213> ORGANISM: Artificial Sequence
<220> FEATURE:
<223> OTHER INFORMATION: DNA

<400> SEQUENCE: 382
tggggtgcta cggtttatta a                                             21

<210> SEQ ID NO 383
<211> LENGTH: 21
<212> TYPE: DNA
<213> ORGANISM: Artificial Sequence
<220> FEATURE:
<223> OTHER INFORMATION: DNA

<400> SEQUENCE: 383
cttaagttct gggattcgga a                                             21

<210> SEQ ID NO 384
<211> LENGTH: 21
<212> TYPE: DNA
<213> ORGANISM: Artificial Sequence
<220> FEATURE:
<223> OTHER INFORMATION: DNA

<400> SEQUENCE: 384
caagtggggt aggttgtaac t                                             21

<210> SEQ ID NO 385
<211> LENGTH: 21
<212> TYPE: DNA
<213> ORGANISM: Artificial Sequence
<220> FEATURE:
<223> OTHER INFORMATION: DNA

<400> SEQUENCE: 385
gtttggggtg ctaatttta t                                              21

<210> SEQ ID NO 386
<211> LENGTH: 21
<212> TYPE: DNA
<213> ORGANISM: Artificial Sequence
<220> FEATURE:
<223> OTHER INFORMATION: DNA

<400> SEQUENCE: 386
gttgtcaggg ggcaaataaa a                                             21

<210> SEQ ID NO 387
<211> LENGTH: 21
<212> TYPE: DNA
<213> ORGANISM: Artificial Sequence
<220> FEATURE:
<223> OTHER INFORMATION: DNA
```

-continued

<400> SEQUENCE: 387
tcgcccgtga ggcttgcttt t                                              21

<210> SEQ ID NO 388
<211> LENGTH: 21
<212> TYPE: DNA
<213> ORGANISM: Artificial Sequence
<220> FEATURE:
<223> OTHER INFORMATION: DNA

<400> SEQUENCE: 388
ggccgccccc ggctacaaac a                                              21

<210> SEQ ID NO 389
<211> LENGTH: 21
<212> TYPE: DNA
<213> ORGANISM: Artificial Sequence
<220> FEATURE:
<223> OTHER INFORMATION: DNA

<400> SEQUENCE: 389
ggaatccgcc cctccaggca g                                              21

<210> SEQ ID NO 390
<211> LENGTH: 21
<212> TYPE: DNA
<213> ORGANISM: Artificial Sequence
<220> FEATURE:
<223> OTHER INFORMATION: DNA

<400> SEQUENCE: 390
ctggcacccc tcaaaacagt g                                              21

<210> SEQ ID NO 391
<211> LENGTH: 21
<212> TYPE: DNA
<213> ORGANISM: Artificial Sequence
<220> FEATURE:
<223> OTHER INFORMATION: DNA

<400> SEQUENCE: 391
cgcccccgta gacaaaacca c                                              21

<210> SEQ ID NO 392
<211> LENGTH: 21
<212> TYPE: DNA
<213> ORGANISM: Artificial Sequence
<220> FEATURE:
<223> OTHER INFORMATION: DNA

<400> SEQUENCE: 392
ggggcggggc caaagtcaca c                                              21

<210> SEQ ID NO 393
<211> LENGTH: 20
<212> TYPE: DNA
<213> ORGANISM: Artificial Sequence
<220> FEATURE:
<223> OTHER INFORMATION: primer

<400> SEQUENCE: 393
gaaggggaac acagaccagg                                                20

<210> SEQ ID NO 394
<211> LENGTH: 20

```
<212> TYPE: DNA
<213> ORGANISM: Artificial Sequence
<220> FEATURE:
<223> OTHER INFORMATION: primer

<400> SEQUENCE: 394
ctccatcagg ccacagtgaa                                           20

<210> SEQ ID NO 395
<211> LENGTH: 20
<212> TYPE: DNA
<213> ORGANISM: Artificial Sequence
<220> FEATURE:
<223> OTHER INFORMATION: primer

<400> SEQUENCE: 395
gggagccaaa agggtcatca                                           20

<210> SEQ ID NO 396
<211> LENGTH: 20
<212> TYPE: DNA
<213> ORGANISM: Artificial Sequence
<220> FEATURE:
<223> OTHER INFORMATION: primer

<400> SEQUENCE: 396
cgtggactgt ggtcatgagt                                           20

<210> SEQ ID NO 397
<211> LENGTH: 22
<212> TYPE: DNA
<213> ORGANISM: Artificial Sequence
<220> FEATURE:
<223> OTHER INFORMATION: siRNA, combined DNA/RNA molecule

<400> SEQUENCE: 397
cuagaccugu dtuugcuuuu gu                                        22

<210> SEQ ID NO 398
<211> LENGTH: 23
<212> TYPE: RNA
<213> ORGANISM: Artificial Sequence
<220> FEATURE:
<223> OTHER INFORMATION: siRNA

<400> SEQUENCE: 398
acaaaagcaa aacaggucua gaa                                       23

<210> SEQ ID NO 399
<211> LENGTH: 19
<212> TYPE: RNA
<213> ORGANISM: Artificial Sequence
<220> FEATURE:
<223> OTHER INFORMATION: siRNA

<400> SEQUENCE: 399
agaccuguuu ugcuuuugu                                            19

<210> SEQ ID NO 400
<211> LENGTH: 19
<212> TYPE: RNA
<213> ORGANISM: Artificial Sequence
<220> FEATURE:
<223> OTHER INFORMATION: siRNA

<400> SEQUENCE: 400
```

```
acaaaagcaa aacaggucu                                                    19

<210> SEQ ID NO 401
<211> LENGTH: 20
<212> TYPE: DNA
<213> ORGANISM: Artificial Sequence
<220> FEATURE:
<223> OTHER INFORMATION: siRNA, combined DNA/RNA molecule
<220> FEATURE:
<221> NAME/KEY: misc_feature
<222> LOCATION: (20)..(20)
<223> OTHER INFORMATION: n is Z27,Z27 is A, U, G or C

<400> SEQUENCE: 401
agaccugudt uugcuuuugn                                                   20

<210> SEQ ID NO 402
<211> LENGTH: 19
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z28, Z28 is a nucleotide complementary to
      Z27, Z27 is selected from A, U, G or C

<400> SEQUENCE: 402
ncaaaagcaa aacaggucu                                                    19

<210> SEQ ID NO 403
<211> LENGTH: 20
<212> TYPE: DNA
<213> ORGANISM: Artificial Sequence
<220> FEATURE:
<223> OTHER INFORMATION: siRNA, combined DNA/RNA molecule
<220> FEATURE:
<221> NAME/KEY: misc_feature
<222> LOCATION: (20)..(20)
<223> OTHER INFORMATION: n is Z27,Z27 is A, U, G or C

<400> SEQUENCE: 403
agaccugudt uugcuuuugn                                                   20

<210> SEQ ID NO 404
<211> LENGTH: 21
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z28, Z28 is a nucleotide complementary to
      Z27, Z27 is selected from A, U, G or C

<400> SEQUENCE: 404
ncaaaagcaa aacaggucua g                                                 21

<210> SEQ ID NO 405
<211> LENGTH: 22
<212> TYPE: DNA
<213> ORGANISM: Artificial Sequence
<220> FEATURE:
<223> OTHER INFORMATION: siRNA, combined DNA/RNA molecule
<220> FEATURE:
<221> NAME/KEY: misc_feature
<222> LOCATION: (22)..(22)
<223> OTHER INFORMATION: n is Z27,Z27 is A, U, G or C
```

```
<400> SEQUENCE: 405
cuagaccugu dtuugcuuuu gn                                           22

<210> SEQ ID NO 406
<211> LENGTH: 23
<212> TYPE: RNA
<213> ORGANISM: Artificial Sequence
<220> FEATURE:
<223> OTHER INFORMATION: siRNA
<220> FEATURE:
<221> NAME/KEY: misc_feature
<222> LOCATION: (1)..(1)
<223> OTHER INFORMATION: n is Z28, Z28 is a nucleotide complementary to
      Z27, Z27 is selected from A, U, G or C

<400> SEQUENCE: 406
ncaaaagcaa aacaggucua gaa                                          23

<210> SEQ ID NO 407
<211> LENGTH: 20
<212> TYPE: DNA
<213> ORGANISM: Artificial Sequence
<220> FEATURE:
<223> OTHER INFORMATION: siRNA, combined DNA/RNA molecule

<400> SEQUENCE: 407
agaccugudt uugcuuugu                                               20

<210> SEQ ID NO 408
<211> LENGTH: 21
<212> TYPE: RNA
<213> ORGANISM: Artificial Sequence
<220> FEATURE:
<223> OTHER INFORMATION: siRNA

<400> SEQUENCE: 408
acaaaagcaa aacaggucua g                                            21

<210> SEQ ID NO 409
<211> LENGTH: 22
<212> TYPE: DNA
<213> ORGANISM: Artificial Sequence
<220> FEATURE:
<223> OTHER INFORMATION: siRNA, combined DNA/RNA molecule

<400> SEQUENCE: 409
cuagaccugu dtuugcuuuu gu                                           22

<210> SEQ ID NO 410
<211> LENGTH: 23
<212> TYPE: RNA
<213> ORGANISM: Artificial Sequence
<220> FEATURE:
<223> OTHER INFORMATION: siRNA

<400> SEQUENCE: 410
acaaaagcaa aacaggucua gaa                                          23

<210> SEQ ID NO 411
<211> LENGTH: 20
<212> TYPE: DNA
<213> ORGANISM: Artificial Sequence
<220> FEATURE:
<223> OTHER INFORMATION: siRNA, combined DNA/RNA molecule

<400> SEQUENCE: 411
```

```
agaccugudt uugcuuuugu                                              20

<210> SEQ ID NO 412
<211> LENGTH: 21
<212> TYPE: RNA
<213> ORGANISM: Artificial Sequence
<220> FEATURE:
<223> OTHER INFORMATION: siRNA

<400> SEQUENCE: 412
acaaaagcaa aacaggucua g                                            21

<210> SEQ ID NO 413
<211> LENGTH: 22
<212> TYPE: DNA
<213> ORGANISM: Artificial Sequence
<220> FEATURE:
<223> OTHER INFORMATION: siRNA, combined DNA/RNA molecule

<400> SEQUENCE: 413
cuagaccugu dtuugcuuuu gu                                           22

<210> SEQ ID NO 414
<211> LENGTH: 23
<212> TYPE: RNA
<213> ORGANISM: Artificial Sequence
<220> FEATURE:
<223> OTHER INFORMATION: siRNA

<400> SEQUENCE: 414
acaaaagcaa aacaggucua gaa                                          23

<210> SEQ ID NO 415
<211> LENGTH: 20
<212> TYPE: DNA
<213> ORGANISM: Artificial Sequence
<220> FEATURE:
<223> OTHER INFORMATION: siRNA, combined DNA/RNA molecule

<400> SEQUENCE: 415
agaccugudt uugcuuuugu                                              20

<210> SEQ ID NO 416
<211> LENGTH: 21
<212> TYPE: RNA
<213> ORGANISM: Artificial Sequence
<220> FEATURE:
<223> OTHER INFORMATION: siRNA

<400> SEQUENCE: 416
acaaaagcaa aacaggucua g                                            21

<210> SEQ ID NO 417
<211> LENGTH: 22
<212> TYPE: DNA
<213> ORGANISM: Artificial Sequence
<220> FEATURE:
<223> OTHER INFORMATION: siRNA, combined DNA/RNA molecule

<400> SEQUENCE: 417
cuagaccugu dtuugcuuuu gu                                           22

<210> SEQ ID NO 418
<211> LENGTH: 23
<212> TYPE: RNA
```

```
<213> ORGANISM: Artificial Sequence
<220> FEATURE:
<223> OTHER INFORMATION: siRNA

<400> SEQUENCE: 418
acaaaagcaa aacaggucua gaa                                              23

<210> SEQ ID NO 419
<211> LENGTH: 20
<212> TYPE: DNA
<213> ORGANISM: Artificial Sequence
<220> FEATURE:
<223> OTHER INFORMATION: siRNA, combined DNA/RNA molecule

<400> SEQUENCE: 419
agaccugudt uugcuuugu                                                   20

<210> SEQ ID NO 420
<211> LENGTH: 21
<212> TYPE: RNA
<213> ORGANISM: Artificial Sequence
<220> FEATURE:
<223> OTHER INFORMATION: siRNA

<400> SEQUENCE: 420
acaaaagcaa aacaggucua g                                                21

<210> SEQ ID NO 421
<211> LENGTH: 22
<212> TYPE: DNA
<213> ORGANISM: Artificial Sequence
<220> FEATURE:
<223> OTHER INFORMATION: siRNA, combined DNA/RNA molecule

<400> SEQUENCE: 421
cuagaccugu dtuugcuuuu gu                                               22

<210> SEQ ID NO 422
<211> LENGTH: 23
<212> TYPE: RNA
<213> ORGANISM: Artificial Sequence
<220> FEATURE:
<223> OTHER INFORMATION: siRNA

<400> SEQUENCE: 422
acaaaagcaa aacaggucua gaa                                              23

<210> SEQ ID NO 423
<211> LENGTH: 20
<212> TYPE: DNA
<213> ORGANISM: Artificial Sequence
<220> FEATURE:
<223> OTHER INFORMATION: siRNA, combined DNA/RNA molecule

<400> SEQUENCE: 423
agaccugudt uugcuuugu                                                   20

<210> SEQ ID NO 424
<211> LENGTH: 21
<212> TYPE: RNA
<213> ORGANISM: Artificial Sequence
<220> FEATURE:
<223> OTHER INFORMATION: siRNA

<400> SEQUENCE: 424
acaaaagcaa aacaggucua g                                                21
```

```
<210> SEQ ID NO 425
<211> LENGTH: 22
<212> TYPE: DNA
<213> ORGANISM: Artificial Sequence
<220> FEATURE:
<223> OTHER INFORMATION: siRNA, combined DNA/RNA molecule

<400> SEQUENCE: 425
cuagaccugu dtuugcuuuu gu                                              22

<210> SEQ ID NO 426
<211> LENGTH: 23
<212> TYPE: RNA
<213> ORGANISM: Artificial Sequence
<220> FEATURE:
<223> OTHER INFORMATION: siRNA

<400> SEQUENCE: 426
acaaaagcaa aacaggucua gaa                                             23
```